(12) United States Patent
Cohen et al.

(10) Patent No.: US 11,008,030 B2
(45) Date of Patent: May 18, 2021

(54) ADAPTABLE MODULAR ATTACHMENT AND ACCESSORY SYSTEM FOR USE WITH COOLERS, BAIT BUCKETS AND OTHER CONTAINERS

(71) Applicant: Santiva Outdoors, L.L.C.—Series IP, Dallas, TX (US)

(72) Inventors: William Jason Cohen, Dallas, TX (US); Tomas L. Ortiz Ferrer, Sai Kung (CN); Nicholas Zager, New York, NY (US); R Barrett Kotnik, Oswego, IL (US)

(73) Assignee: Santiva Outdoors, L.L.C.—Series IP, Dallas, TX (US)

( * ) Notice: Subject to any disclaimer, the term of this patent is extended or adjusted under 35 U.S.C. 154(b) by 0 days.

(21) Appl. No.: 16/798,213

(22) Filed: Feb. 21, 2020

(65) Prior Publication Data

US 2020/0269894 A1 Aug. 27, 2020

Related U.S. Application Data

(60) Provisional application No. 62/943,084, filed on Dec. 3, 2019, provisional application No. 62/916,085, filed
(Continued)

(51) Int. Cl.
*B62B 1/00* (2006.01)
*B62B 3/02* (2006.01)
(Continued)

(52) U.S. Cl.
CPC ............... *B62B 3/02* (2013.01); *B62B 3/005* (2013.01); *B62B 3/04* (2013.01); *B62B 5/067* (2013.01)

(58) Field of Classification Search
CPC ..... B62B 5/067; B62B 5/0083; B62B 5/0086; B62B 3/00; B62B 3/02; B62B 3/005;
(Continued)

(56) References Cited

U.S. PATENT DOCUMENTS 3,966,340 A 6/1976 Morris
4,213,310 A 7/1980 Buss
(Continued)

OTHER PUBLICATIONS

International Search Report, International Application No. PCT/US2020/019357, dated Apr. 28, 2020.
(Continued)

*Primary Examiner* — James M Dolak
(74) *Attorney, Agent, or Firm* — Craige Thompson; Thompson Patent Law

(57) ABSTRACT

Various apparatuses and methods relate to coolers or other containers having attachment features to which modular accessories may be attached. Various apparatuses and methods relate to wheel and modular accessory attachment systems for attaching to a cooler or other container. Various apparatuses and methods relate to rails and channels for sliding attachment couplers. Various apparatuses and methods relate to keyed male-female attachment couplers. Various apparatuses and methods relate to a chassis configured to adjust in size for adapting the chassis to fit a variety of container sizes. Various apparatuses and methods relate to a coupler assembly for mechanically securing a container to a container undercarriage system.

14 Claims, 118 Drawing Sheets

Related U.S. Application Data on Oct. 16, 2019, provisional application No. 62/907,242, filed on Sep. 27, 2019, provisional application No. 62/862,526, filed on Jun. 17, 2019, provisional application No. 62/809,365, filed on Feb. 22, 2019.

(51) Int. Cl.
*B62B 5/06* (2006.01)
*B62B 3/00* (2006.01)
*B62B 3/04* (2006.01)

(58) Field of Classification Search
CPC ......... B62B 3/04; B62B 3/10; B62B 2202/12; B62B 2202/52; B62B 2203/00; B62B 2203/60; B62B 2204/06; B62B 2205/006; B62B 2205/10; B62B 2205/104; B62B 2301/05

See application file for complete search history.

(56) References Cited

U.S. PATENT DOCUMENTS

| | | | |
|---|---|---|---|
| 4,407,089 A | 10/1983 | Miller | |
| 5,249,823 A | 10/1993 | McCoy et al. | |
| 5,313,817 A * | 5/1994 | Meinders | A45C 5/146 62/457.1 |
| 5,342,126 A | 8/1994 | Heston et al. | |
| 5,465,996 A | 11/1995 | Wisz | |
| 5,471,779 A | 12/1995 | Downey | |
| 5,480,170 A | 1/1996 | Kaiser, II | |
| 5,513,940 A * | 5/1996 | Florentin | B60P 1/64 188/22 |
| 5,871,335 A | 2/1999 | Bartlett | |
| 5,988,658 A * | 11/1999 | Ritchie | A45C 13/385 280/47.17 |
| 6,467,779 B1 | 10/2002 | Mills | |
| 6,474,097 B2 | 11/2002 | Treppedi et al. | |
| 6,550,791 B2 | 4/2003 | Ramsey | |
| 6,836,998 B1 | 1/2005 | Rucker | |
| 6,923,468 B1 | 8/2005 | Barnett et al. | |
| 7,389,608 B1 | 6/2008 | MacKay | |
| 7,963,530 B1 | 6/2011 | Garcia | |
| 8,020,880 B2 * | 9/2011 | Zhu | B62B 3/007 280/47.11 |
| 8,453,771 B1 * | 6/2013 | Hirschfeld | B60L 8/003 180/65.1 |
| 8,925,752 B2 | 1/2015 | Smith | |
| 9,010,770 B2 * | 4/2015 | Cantrell | B62B 5/062 280/35 |
| 9,067,614 B2 | 6/2015 | Vanderberg et al. | |
| 9,278,704 B2 * | 3/2016 | Cates | B62B 5/067 |
| 9,316,428 B2 | 4/2016 | Mech | |
| 9,415,787 B2 * | 8/2016 | Mericle | B62B 3/02 |
| 9,616,910 B2 | 4/2017 | Chaloux et al. | |
| 9,913,464 B1 | 3/2018 | Stokes | |
| 9,956,978 B1 | 5/2018 | Worley | |
| 10,071,303 B2 | 9/2018 | Pikulski | |
| 10,633,009 B2 * | 4/2020 | Webber | B62B 5/0083 |
| 2008/0185493 A1 | 8/2008 | Wakefield et al. | |
| 2013/0207360 A1 | 8/2013 | Vanderberg et al. | |
| 2016/0326765 A1 | 11/2016 | Barbret | |

OTHER PUBLICATIONS

Cooler Accessories, Cooler Works, n.d., [online], [retrieved on Dec. 9, 2018]. Retrieved from the Internet <http://www.coolerworks.com/>.

Rokform, Rokform 335499 Belt Clip for all RokLock twist lock cases made from Aluminum and Stainless Steel, Black, Amazon.com, n.d., [online], [retrieved on Dec. 9, 2018]. Retrieved from the Internet <https://www.amazon.com/Rokform-RokLock-twist-Aluminum-Stainless/dp/B0198U4LQG>.

Twist Lock, domite.com, n.d., [online], [retrieved on Dec. 9, 2018]. Retrieved from the Internet <http://domite.com/twist-lock/>.

Quad Lock run kit iPhone 7 Plus/8 Plus sports armband, triathlon-accessories.com, n.d., [online], [retrieved on Dec. 9, 2018]. Retrieved from the Internet <https://www.triathlon-accessories.com/running/running-accessories/quad-lock-run-kit-iphone-7-plus-8-plus-sports-armband/>.

Get Your Cooler Moving, Sherpa, n.d., [online], [retrieved on Dec. 9, 2018]. Retrieved from the Internet <https://sherpawheels.com/>.

Wheels, Badger, n.d., [online], [retrieved on Dec. 9, 2018]. Retrieved from the Internet <http://www.coolerextras.com/wheels/>.

Standard Wheel Original Badger Wheels™—Single Axle (Fits Tundra 35-45-50-65-75-105-110-125-160), Badger, n.d., [online], [retrieved on Dec. 9, 2018]. Retrieved from the Internet <http://www.coolerextras.com/standard-wheel-original-badger-wheels-single-axle-fits-tundra-35-45-50-65-75-105-110-125-160/>.

Ozark Trail High Performance Cooler Wheel Kit, Walmart.com, n.d., [online], [retrieved on Dec. 9, 2018]. Retrieved from the Internet <https://www.walmart.com/ip/Ozark-Trail-High-Performance-Cooler-Wheel-Kit/753017914>.

Presscable, ShadeCooler, LLC's Beach Umbrella Cooler Mount Has Successful Launch Apr. 2016, PressCable, May 18, 2016, [online], [retrieved on Dec. 9, 2019]. Retrieved from the Internet <https://marketersmedia.com/shadecooler-llcs-beach-umbrella-cooler-mount-has-successful-launch-april-2016/115560>.

* cited by examiner

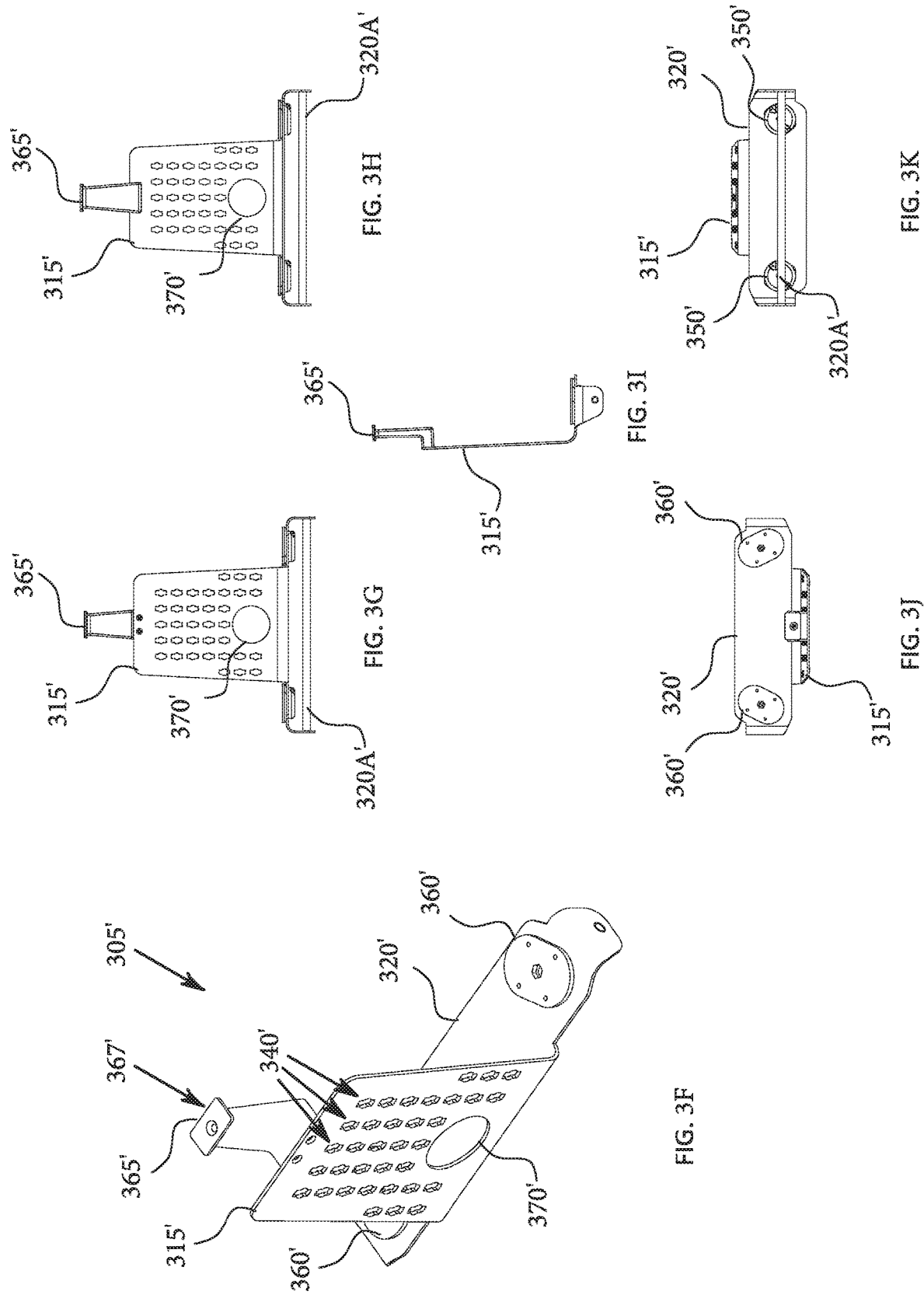

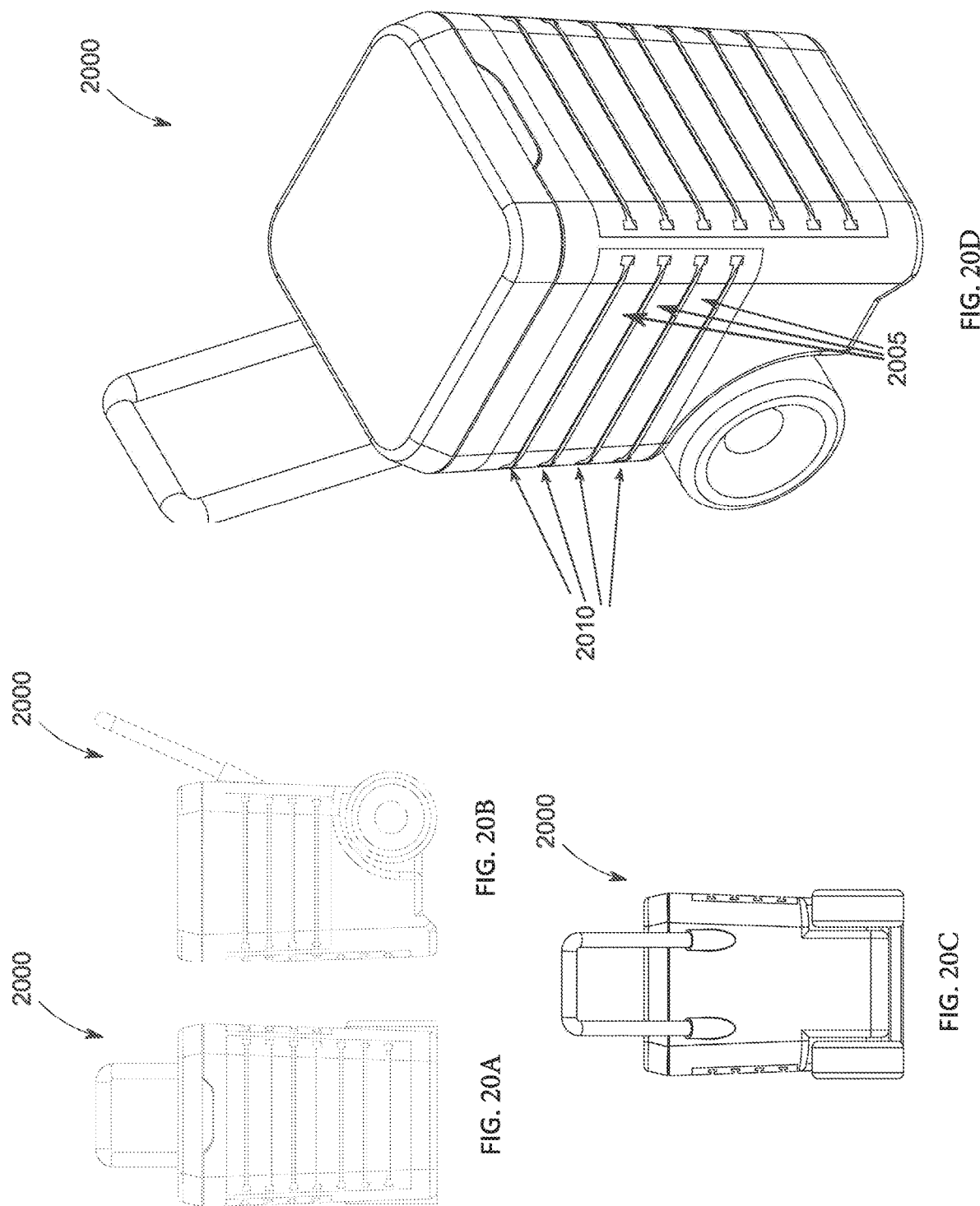

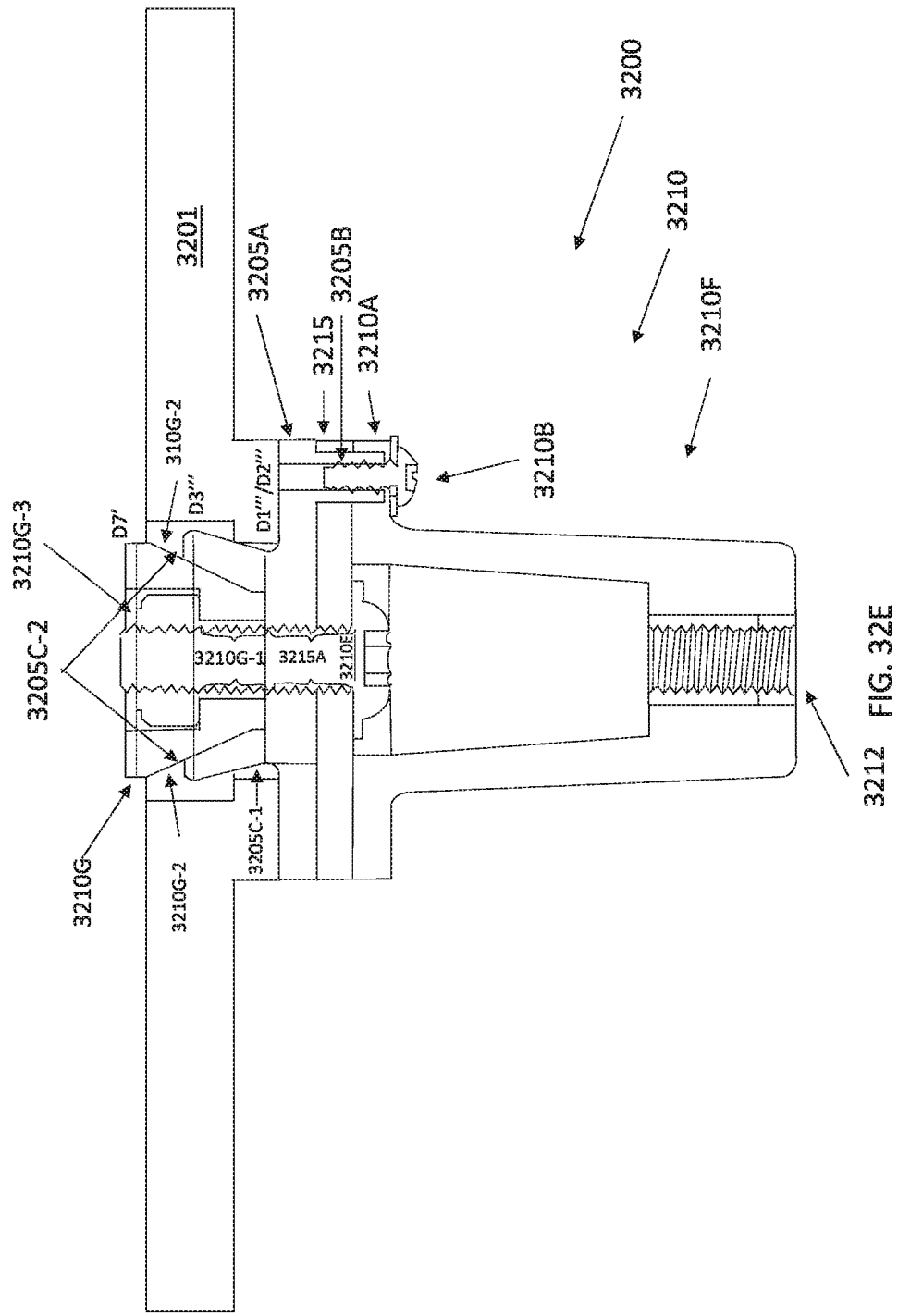

ADAPTABLE MODULAR ATTACHMENT AND ACCESSORY SYSTEM FOR USE WITH COOLERS, BAIT BUCKETS AND OTHER CONTAINERS

CROSS-REFERENCE TO RELATED APPLICATIONS

This application claims the benefit of U.S. Provisional Application Ser. No. 62/809,365, titled "Modular Attachment and Accessory System for Containers," filed by William Jason Cohen, et al., on Feb. 22, 2019.

This application claims the benefit of U.S. Provisional Application Ser. No. 62/862,526, titled "Modular Attachment and Accessory System for Cooler, Bait Bucket, and Cart Devices," filed by William Jason Cohen, et al., on Jun. 17, 2019.

This application claims the benefit of U.S. Provisional Application Ser. No. 62/907,242, titled "Modular Attachment and Accessory System for Bait Buckets," filed by William Jason Cohen, et al., on Sep. 27, 2019.

This application claims the benefit of U.S. Provisional Application Ser. No. 62/916,085, titled "Adaptable Modular Attachment and Accessory System for Fitting Containers of Varying Sizes," filed by William Jason Cohen, et al., on Oct. 16, 2019.

This application claims the benefit of U.S. Provisional Application Ser. No. 62/943,084, titled "Coupler Assembly for Mechanically Securing a Cooler to a Cooler Undercarriage System," filed by William Jason Cohen, et al., on Dec. 3, 2019.

This application incorporates the entire contents of the foregoing application(s) herein by reference.

TECHNICAL FIELD

Various embodiments relate generally to modular transport and accessory systems for containers.

BACKGROUND

Outdoor activities are a pastime for many people who enjoy being active and present out in nature. Some people may spend at least a portion of their leisure time hiking in the woods, lounging on a beach, boating on a lake, or playing at a park, for example. When people participate in recreational activities like the ones described above, they often like to bring various utilitarian devices and leisure-facilitating consumer goods that may increase and/or augment the enjoyment of these recreational activities. For example, some people bring floats or paddle boards to a beach or a river for recreational enjoyment. Some people may receive significant satisfaction from carrying ice chests filled with cool drinks to an outdoor concert. Yet other people may spend their leisure time camping in the woods using an array of utilitarian items and survival gear.

Various brands in the marketplace today have branded themselves as so-called "lifestyle brands." A lifestyle brand may be a brand that endeavors to embody the values, interests, attitudes, and/or opinions of a group or a culture for marketing purposes. While each lifestyle brand may satisfy a specific place in the marketplace, there are many lifestyle brands that appeal to the segment of the market that enjoys outdoor recreation and other associated activities. For example, the North Face® brand is a highly recognizable brand known as being a "mainstay" outerwear brand. Coleman® is another popular outdoor brand known for providing an array of outdoor products (including camping tents, for example). Yet another brand known for its lifestyle appeal is the YETI® brand, known for selling high-end coolers, as well as other items such as drinkware and apparel. Various outdoor and lifestyle brand companies may produce or distribute a wide array of useful outdoor items, including tents, backpacks, sleeping bags, lanterns, camp chairs, knives, and containers, for example.

BRIEF DESCRIPTION OF THE DRAWINGS

FIG. 1A depicts a side perspective view of an exemplary cooler having attachment features for attaching accessories to the cooler, while

FIGS. 3F-3K depict an exemplary wheel and modular accessory attachment system having male-female attachment couplers.

FIGS. 20A-20D depict elevation and perspective views of an exemplary bait bucket device having an external sliding rail/channel attachment system.

FIGS. 32A-32E depict various view of an exemplary fourth embodiment of a coupler assembly for mechanically securing a cooler to a cooler undercarriage system.

Like reference symbols in the various drawings indicate like elements.

DETAILED DESCRIPTION OF ILLUSTRATIVE EMBODIMENTS

Figure 1A:
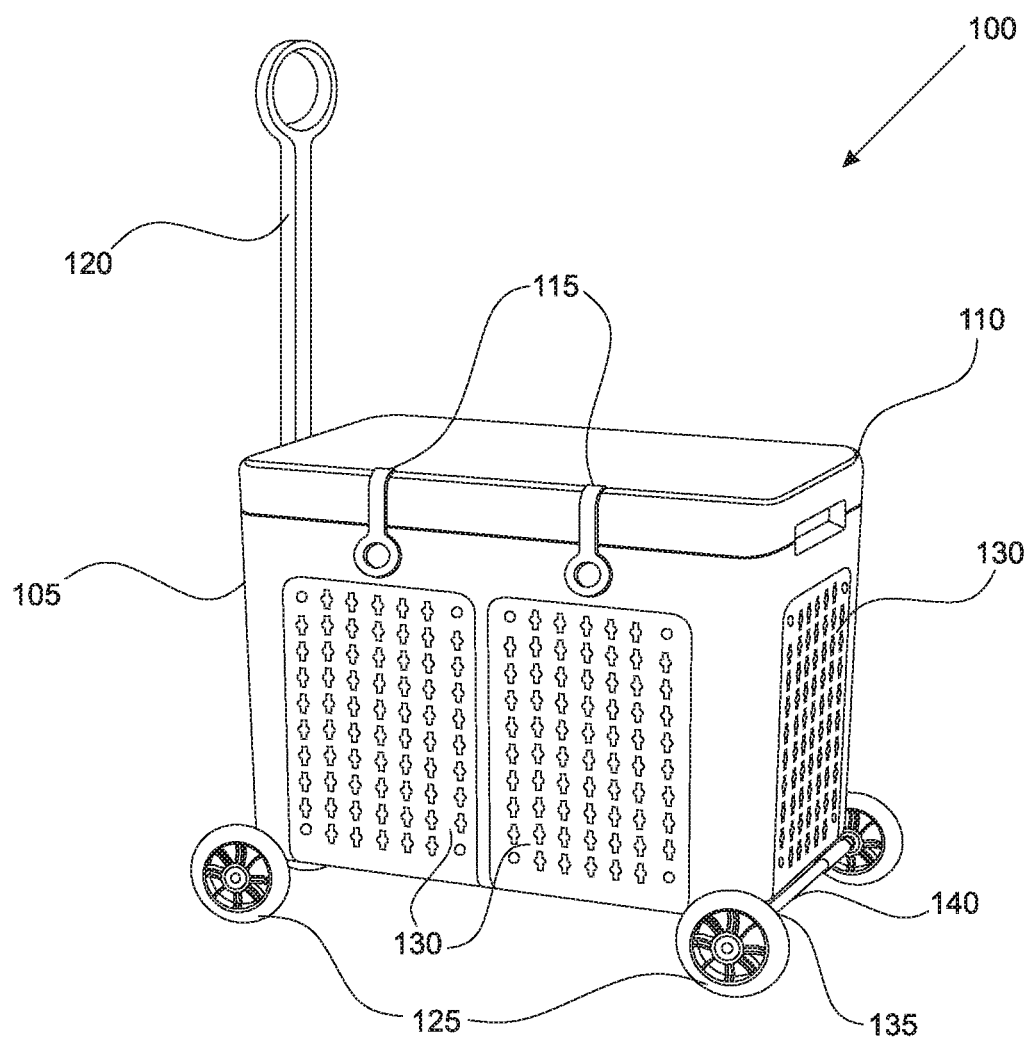
Figure 1B:
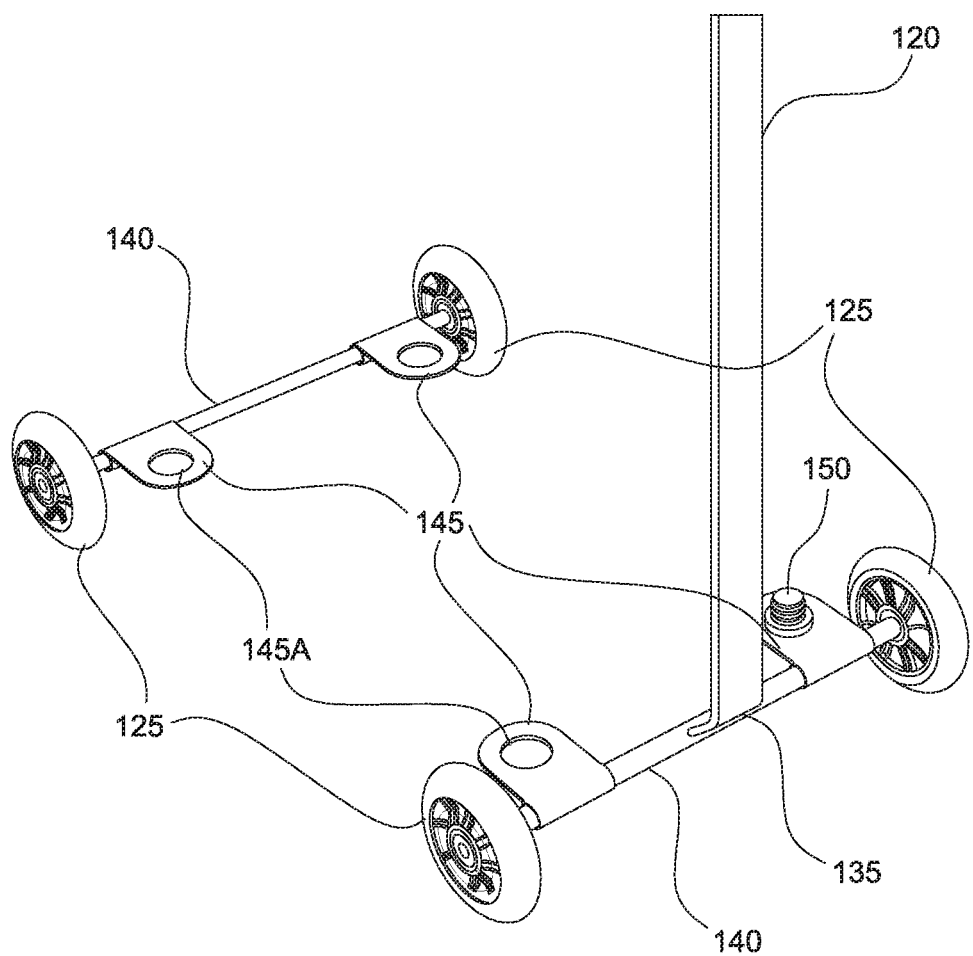
FIG. 1B depicts a top perspective view of an exemplary wheel coupling system for attaching to a cooler.

FIG. 1A depicts a side perspective view of an exemplary cooler having attachment features for attaching accessories to the cooler, while FIG. 1B depicts a top perspective view of an exemplary wheel coupling system for attaching to a cooler. A cooler 100 includes a cooler body 105 and a lid 110. The lid 110 may be held shut relative to the body 105 using latches 115. The cooler 100 includes a handle 120 for towing the cooler 100. The cooler 100 has bottom wheels 125 attached to the underside of the cooler 100. Located on the sides of the cooler 100 are accessory attachment features 130. The accessory attachment features 130 may be located on any surface of the cooler 100. For example, the attachment features 130 may be located on the sides, front, and back surfaces of the cooler 100. In some examples, the attachment features 130 may be included on a (planar) board or plate (shown in FIG. 1A), which may be fixedly coupled to the cooler 100. The attachment features 130 include multiple keyed female attachment apertures configured to individually mate with a male coupler attached to an accessory. By using the attachment features 130, a user may releasably attach an accessory (e.g., the accessories depicted in FIGS. 17A-17E) to the cooler 100 for increased utility, functionality, and modularity.

As detailed in FIG. 1B, an exemplary wheel coupling system 135 for attaching to the cooler 100 includes wheels 125, axels 140, cooler undercarriage 145, and undercarriage-cooler attachment features 150 (only one out of four shown). Various systems may have different ways of attaching to a cooler. For example, the exemplary system shown in FIG. 1B includes undercarriage plates 145 having holes 145A that a fastener 150 (e.g., threaded nut) may pass through to fasten (e.g., screw) the undercarriage plates 145 to an undersurface of the cooler 100. The wheel attachment system 135 may include the wheel 125, a wheel coupler, a fastener (screw), and a cooler fastener complement (e.g., a screw hole). In some examples, a (male) undercarriage-cooler attachment feature 150 may be complementary to a (female) feature (e.g., hole, depression, or orifice) of the cooler 100.

Figure 2A:
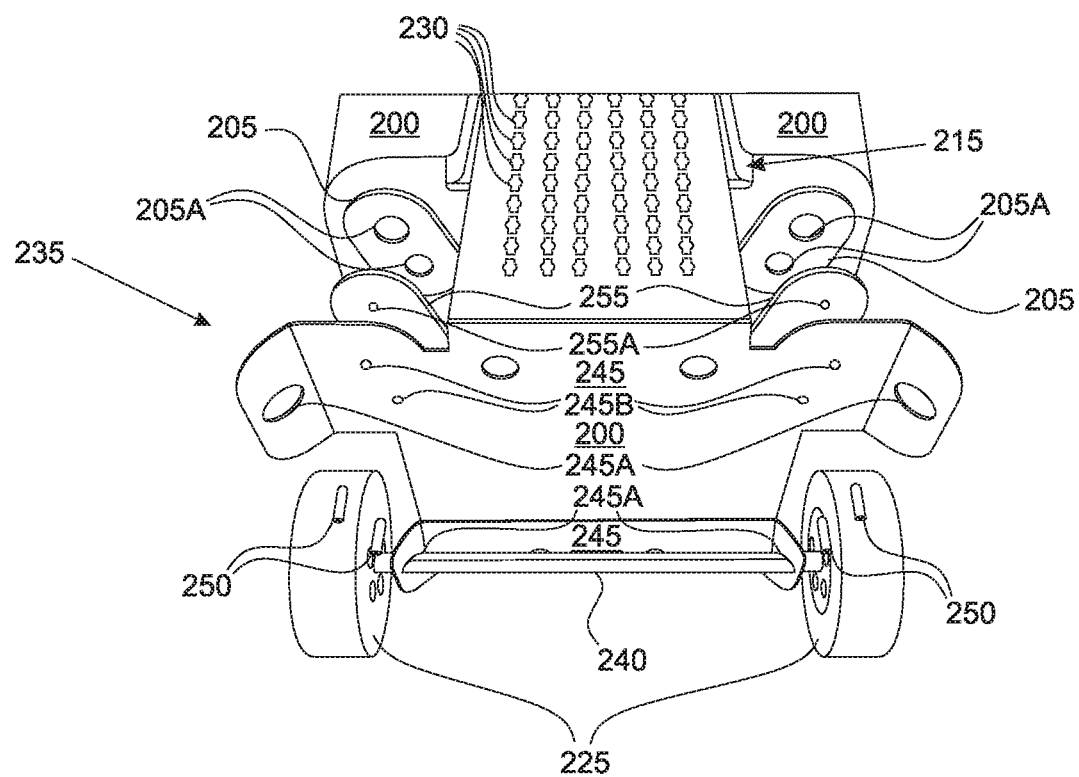
FIGS. 2A-2E depict various (perspective, cross-sectional) views of an exemplary cooler being fitted with exemplary wheel and modular accessory attachment systems.

FIGS. 2A-2E depict various (perspective, cross-sectional) views of an exemplary cooler being fitted with exemplary wheel and modular accessory attachment systems. In some examples, an exemplary cooler 200 may be manufactured and sold without wheels or a modular accessory attachment system (e.g., the cooler 200 may be a commercially available cooler purchasable at a retail store). Accordingly, a wheel and modular accessory attachment system 235 may be retrofitted on to the cooler 200 to enable the cooler 200 to (1) be transported using wheels 225, and (2) support various accessories to enhance the cooler's functionality. As shown in FIG. 2A, the proximate viewed side of the cooler 200 is shown with the wheel and modular accessory attachment system 235 exploded (minus the axle 240 and the wheels 225), while the distal viewed side of the cooler 200 is shown with wheel and modular accessory attachment system 235 fully attached/fixed to the cooler 200. Various components and features of the system 235 may be similar to the wheel attachment system 135.

In the exemplary depiction of FIG. 2A, an array of attachment features 230 (e.g., similar to the female attachment features shown in FIG. 1A) are located at a side surface of the cooler 200 when the accessory attachment system 235 is operably coupled to the cooler 200. The array of attachment features 230 are located on a board, panel, or plate 215, which is mechanically coupled with an undercarriage 245 that supports the wheels 225 of the wheel and modular accessory attachment system 235. More specifically, an attachment panel 215 is mechanically fixed to (e.g., integrally formed with) to an associated undercarriage plate 245. An attachment panel 215 and undercarriage plate 235 combination may be formed out of a monolithic piece of material (e.g., a metal, such as aluminum, or hard plastic). Each undercarriage plate 245 includes at least one hole 245A for retaining an axle 240. Each axle 240 may be mechanically coupled to associated wheels 225. The attachment panel 215 may also have a secondary aperture (see, e.g., the large circular aperture of the panel shown in FIGS. 3F-3K) that may be configured to complement a drain of the cooler.

The cooler 200 includes feet 205 each having at least one hole 205A. Configured to be inserted into the feet 205 are feet couplers 255. The feet couplers 255 may possess structures similar to the male mechanical compression feature depicted in FIGS. 2C and 2E. For example, the feet couplers 255 may include a (planar) body 255A with a hollow male protrusion 255C extending from one side of the planar body 255A, where the male protrusion may be inserted into a female hole 205A of a foot 205 of the cooler 200. After the feet couplers 255 have been inserted into the cooler feet 205, the undercarriage plate 245 is aligned with the feet couplers 255, and then fasteners 250 (e.g., screws) are inserted into apertures 245B, 255A, and 205A of the undercarriage plate 245, the feet couplers 255, and the feet 205, respectively, to cause the undercarriage plate 245 to become fixedly coupled to the cooler 200. Accordingly, the wheel and modular accessory attachment system 235 may be optionally fitted to an existing cooler 200, thus augmenting and expanding the functionality and utility of the cooler 200.

Figure 2B:
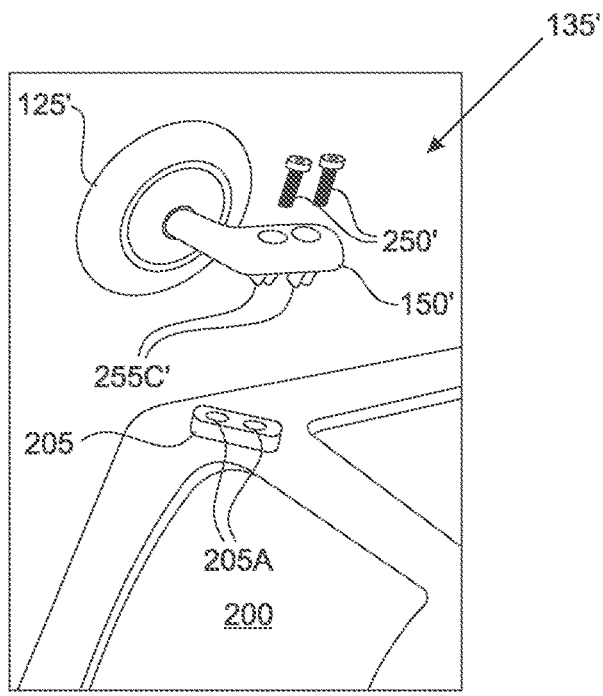

As shown in FIG. 2B a wheel attachment system 135' may attach to already existing feet 205 on a cooler 200. Various components and features of the system 135' may be similar to the wheel attachment system 135 and the wheel and modular accessory attachment system 235. For example, a wheel attachment system may include a pair of wheels 125', each with an associated undercarriage attachment member 150'. The undercarriage attachment member 150' functions (similar to the wheel coupler 150) to couple the wheel 125' to the cooler 200. The undercarriage attachment member 150' further includes at least one male mechanical compression feature 255C' configured to mechanically interface with at least one fastener 250' (e.g., a screw).

Figure 2C:
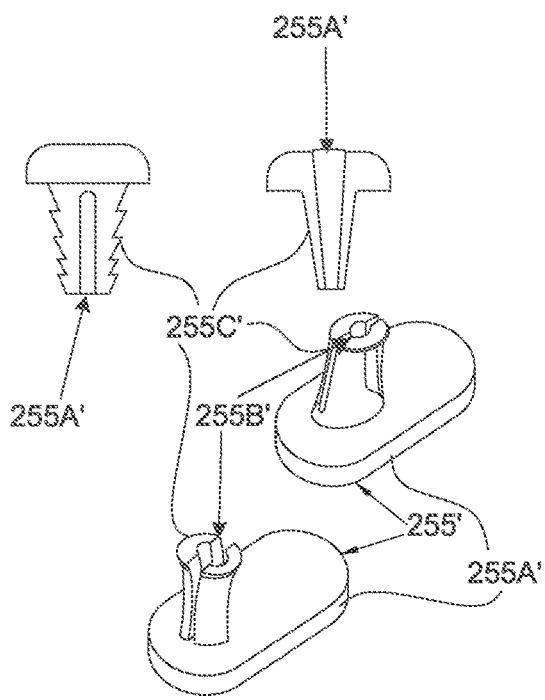

To attach a wheel 125' to a cooler 200 in this exemplary embodiment, a male mechanical compression feature 255C' is inserted into a female hole 205A of a foot 205 of the cooler 200. A fastener 250' may then be inserted into the male mechanical compression feature 255C', which may expand/bend the male mechanical compression feature 255C' outwards to create a mechanical compression and retaining force between the inside surface of the female hole 205A of the foot 205 and the outside surface of the male mechanical compression feature 255C' (e.g., as illustrated in FIG. 2C and an alternative embodiment and illustration in FIG. 2E). Such outward compression may be similar to the principle of operation of a wall plug/anchor. For example, a tube wall of the male compression member 255C' may expand into the feet 205 of the cooler 200 to provide for mechanical retaining force to couple the system 135' to the cooler 200. Such a wheel attachment system 135' may allow for retrofitting/mounting of wheels 125' on the cooler 200 without wheels, advantageously increasing/augmenting the mobility/functionality of the cooler 200.

Figure 2D:
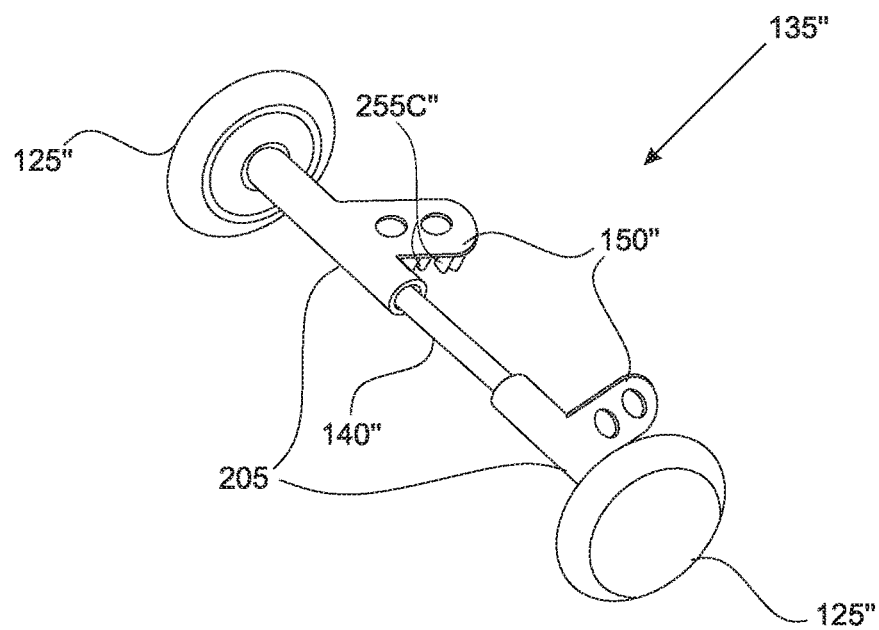

As shown in FIG. 2D a wheel attachment system 135" may attach to already existing feet 205 on a cooler 200. Various components and features of the system 135" may be similar to the wheel attachment systems 135 and 135', as well as the wheel and modular accessory attachment system 235. For example, a wheel attachment system 135" may include a pair of wheels 125", an axle 140", and an undercarriage attachment member 150". The undercarriage attachment member 150" further includes at least one male mechanical compression feature 255C" configured to mechanically interface with at least one fastener (not shown). To attach a wheel 125" to a cooler 200 in this exemplary embodiment, a male mechanical compression feature 255C" is inserted into a female hole of a foot 205 of the cooler 200 (e.g., similar to system 135'). A fastener may then be inserted into the male mechanical compression feature 255C", which may expand/bend the male mechanical compression feature 255C" outwards to create a mechanical compression and retaining force between the inside surface of the female hole 205A of the foot 205 and the outside surface of the male mechanical compression feature 255C" (e.g., as illustrated in FIG. 2C and an alternative embodiment and illustration in FIG. 2E). The wheel attachment system 135" may therefore allow for an alternative way of retrofitting/mounting of wheels 125" on a cooler 200 without wheels. The system 135" may be formed of two symmetrical pieces or undercarriage members or plates 150" joined by a common axle 140" to provide for additional strength.

Figure 2E:
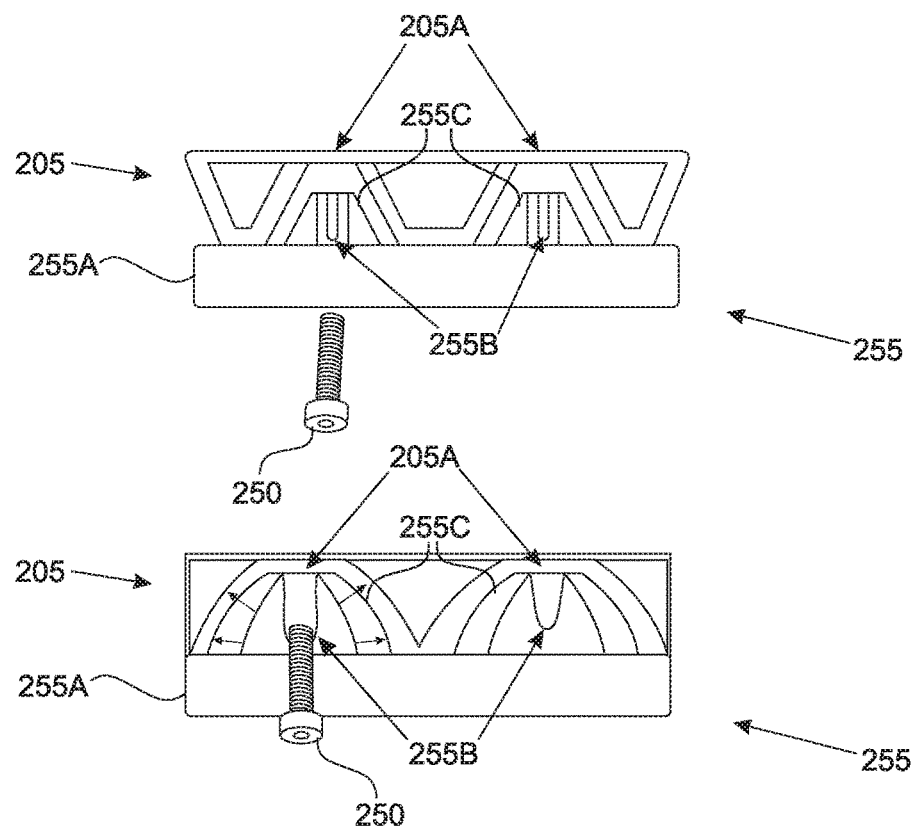

FIG. 2E depicts a cross sectional view of the feet 205 and feet couplers 255 (from FIG. 2A), with a fastener 250 (e.g., screw) being inserted into an aperture 255B of the feet coupler 255 to cause the male protrusion 255C to expand/bend outward (moving from top to bottom in FIG. 2E), thus putting the protrusion 255C into mechanical compression with the interior surface of the foot aperture 205A (as shown on the bottom of FIG. 2E). This compression may facilitate a fixed, mechanical coupling between the cooler 200 and the panel/undercarriage plate 235 (via the feet 205, feet couplers 255, and fasteners 250).

Figure 3A:
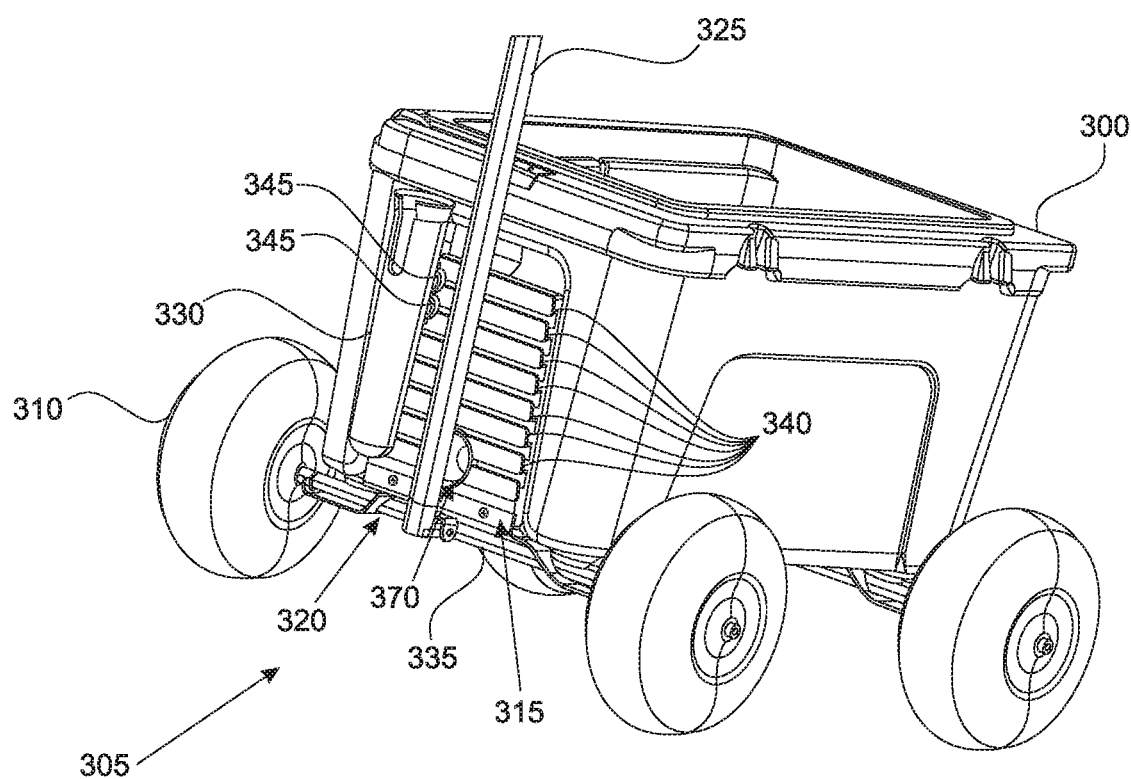
FIGS. 3A-3E depict various views of an exemplary cooler fitted with a wheel and modular accessory attachment system having channels and sliding attachment couplers.
Figure 3B:
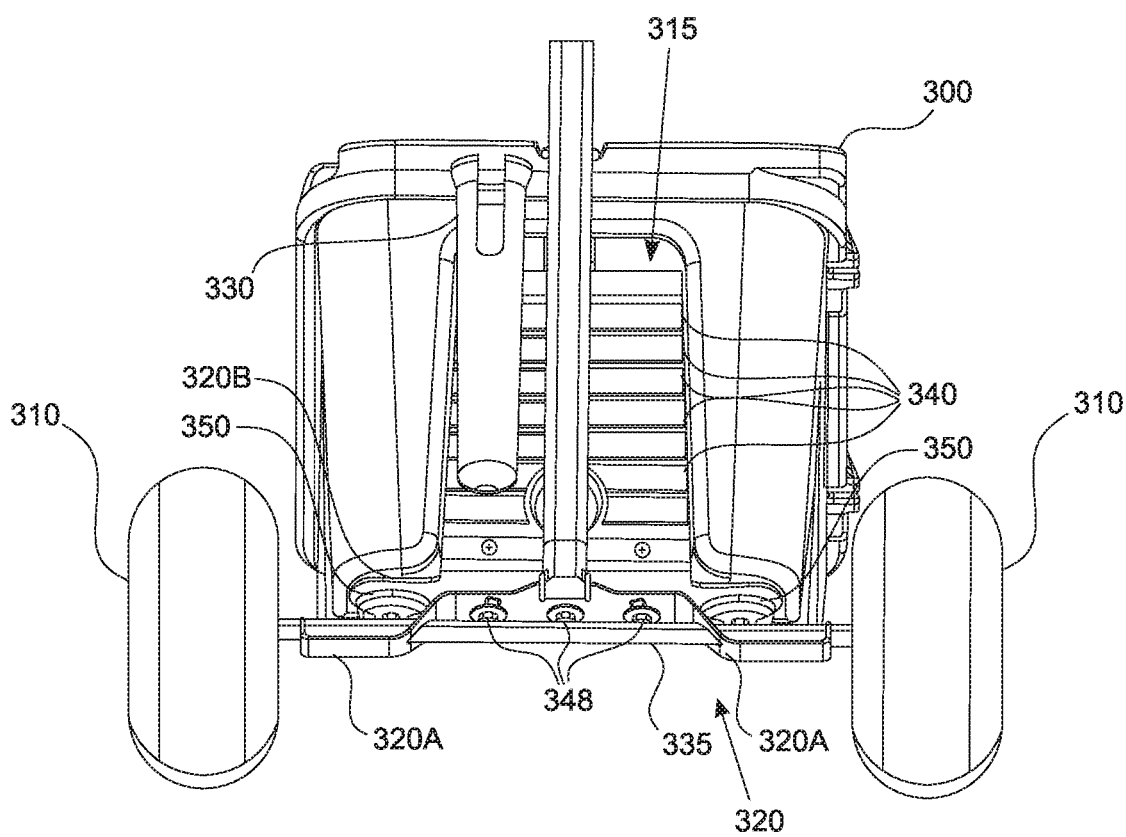

FIGS. 3A-3E depict various views of an exemplary cooler fitted with a wheel and modular accessory attachment system having channels and sliding attachment couplers. A cooler 300 is mechanically and fixedly coupled with a wheel-undercarriage-board (WUB) system 305. At least some aspects of the WUB system 305 may be substantially similar or identical to the system depicted in FIGS. 3F-3K. However, the WUB system 305 employs multiple channels instead of multiple keyed female locking apertures to releasably/lockingly couple an accessory to a cooler. The WUB system 305 includes four wheels 310, an accessory attachment board 315, and an undercarriage 320. In this depicted embodiment, the board 315 is fixedly coupled (e.g., fastened to) the undercarriage 320. Hingedly coupled to the undercarriage is a handle 325. FIG. 3A depicts a perspective view and FIG. 3B depicts a front view (opposite side views may be a substantial mirror image one another). In various examples, one undercarriage 320, one attachment board 315, and one pair of wheels 310 may be located at a first position (e.g., front) of the cooler, and another undercarriage 320, another attachment board 315, and another pair of wheels 310 may be located at a second position (e.g., back) of the cooler. An accessory 330 is releasably/lockably coupled to the board 315. Mechanically and rotatably coupled to the undercarriage 320 is an axle 335. The axle 335 is shown as passing through at least two axle holes of the undercarriage 320. The axle 335 is connected at opposing ends to a respective pair of wheels 310.

Shown in FIGS. 3A and 3B are multiple channels 340 of the board 315. The channels 340 slidingly receive at least one attachment member 345 to releasably/lockingly couple the accessory 330 to the board 315. For example, the attachment member 345 may be slid into a channel 340, and then rotated 90° to releasingly lock the attachment member 345 (and correspondingly, the accessory 330) to the board 315. In the depicted example, the accessory 330 includes two attachment member 345 to provide added structural support and reinforcement.

Figure 3C:
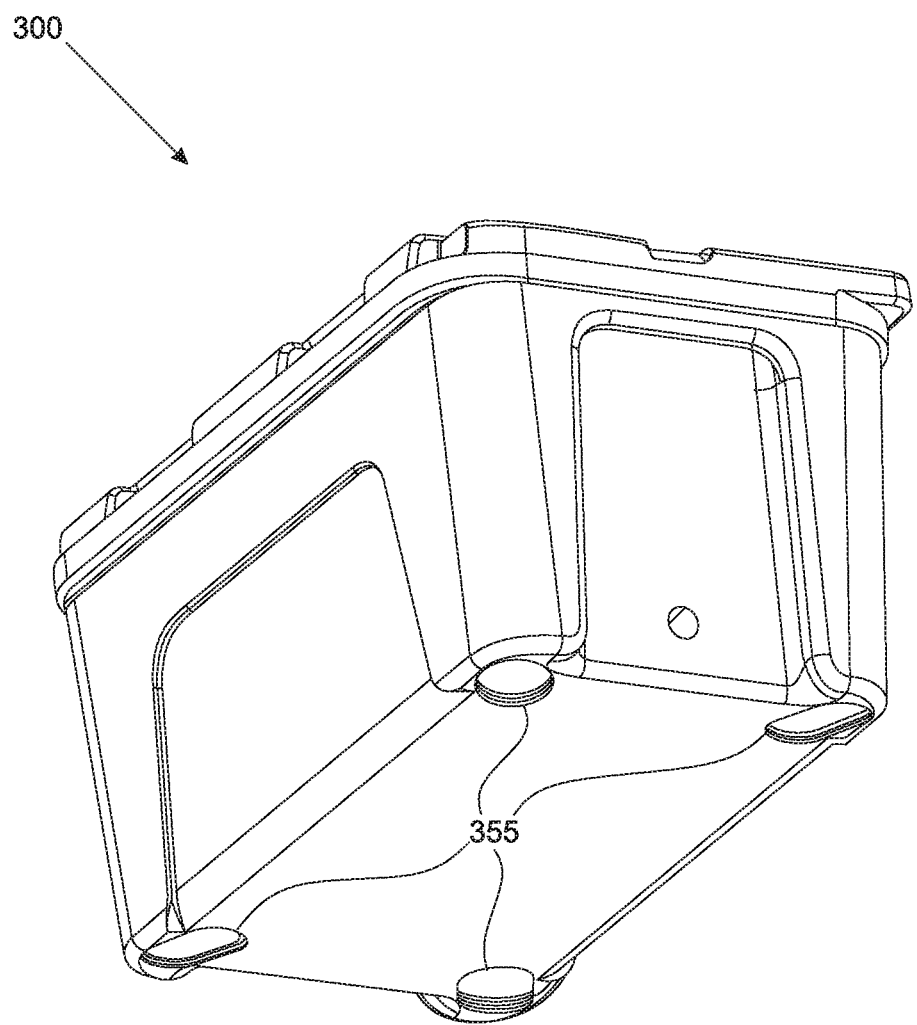
Figure 3D:
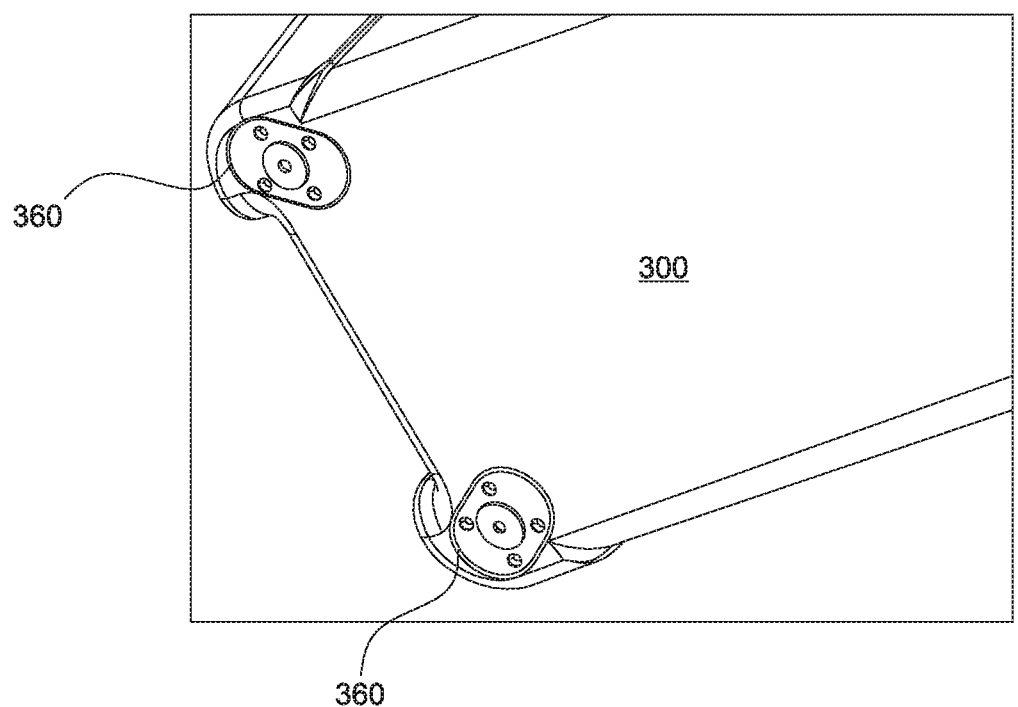

As seen in FIG. 3B, the undercarriage 320 includes an axle coupling portion 320A and a cooler coupling portion 320B. The portion 320A is fixedly coupled (e.g., fastened via screws 348) to the portion 320B. The portion 320B is fixedly coupled to the bottom of the cooler 300 via a pair of knobs 350 and a pair of nut-feet 360 (depicted in FIG. 3D). As shown in FIGS. 3C and 3D, the nut-feet 360 reside in feet recesses 355 of the cooler 300. The nut-feet 360 are fixedly coupled (e.g., fastened) in the feet recesses 355. Similar to the embodiments of FIGS. 3F-3K (discussed further below), the undercarriage portion 320B is compressingly retained between the nut-feet 360 and the knobs 350 to fix the undercarriage 320 to the underside of the cooler 300. Given that many parts of the WUB system 305 are fastened to one another, a user may advantageously couple and decouple various parts of the WUB system 305 from each other, as well as from the cooler 300. For example, a user may keep the cooler (without the WUB system 305 attached) in their closet or garage. Whenever the user decides to go to the park or the beach, the user may take out the various parts of the WUB system 305, and mechanically couple/attach them to the cooler 300. Therefore, the cooler 300 may be augmented by the WUB system 305 to include wheels 310 and a modular accessory attachment board 315, thus increasing the overall utility of the cooler 300 for a user.

Figure 3E:
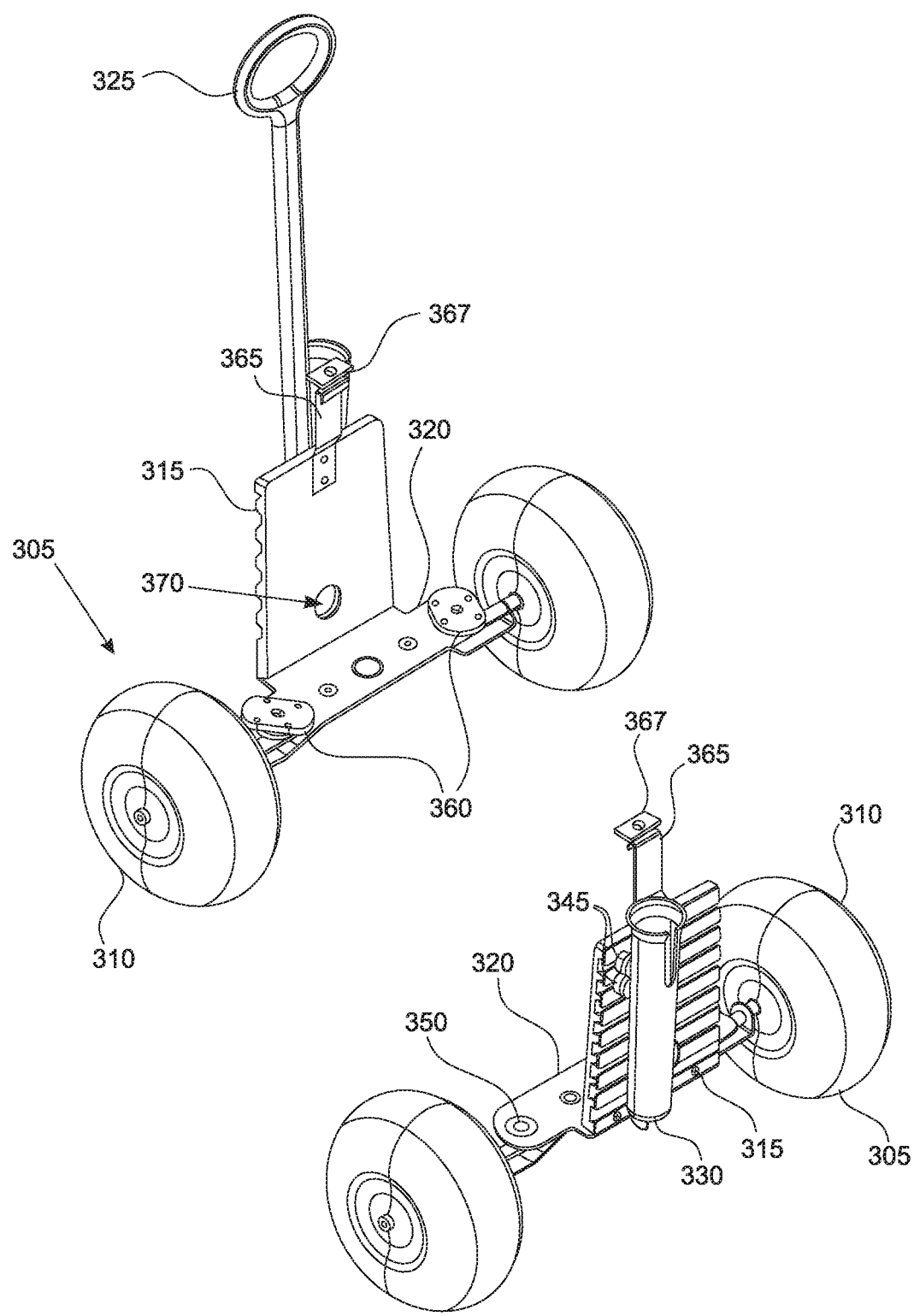
Figure 3L:
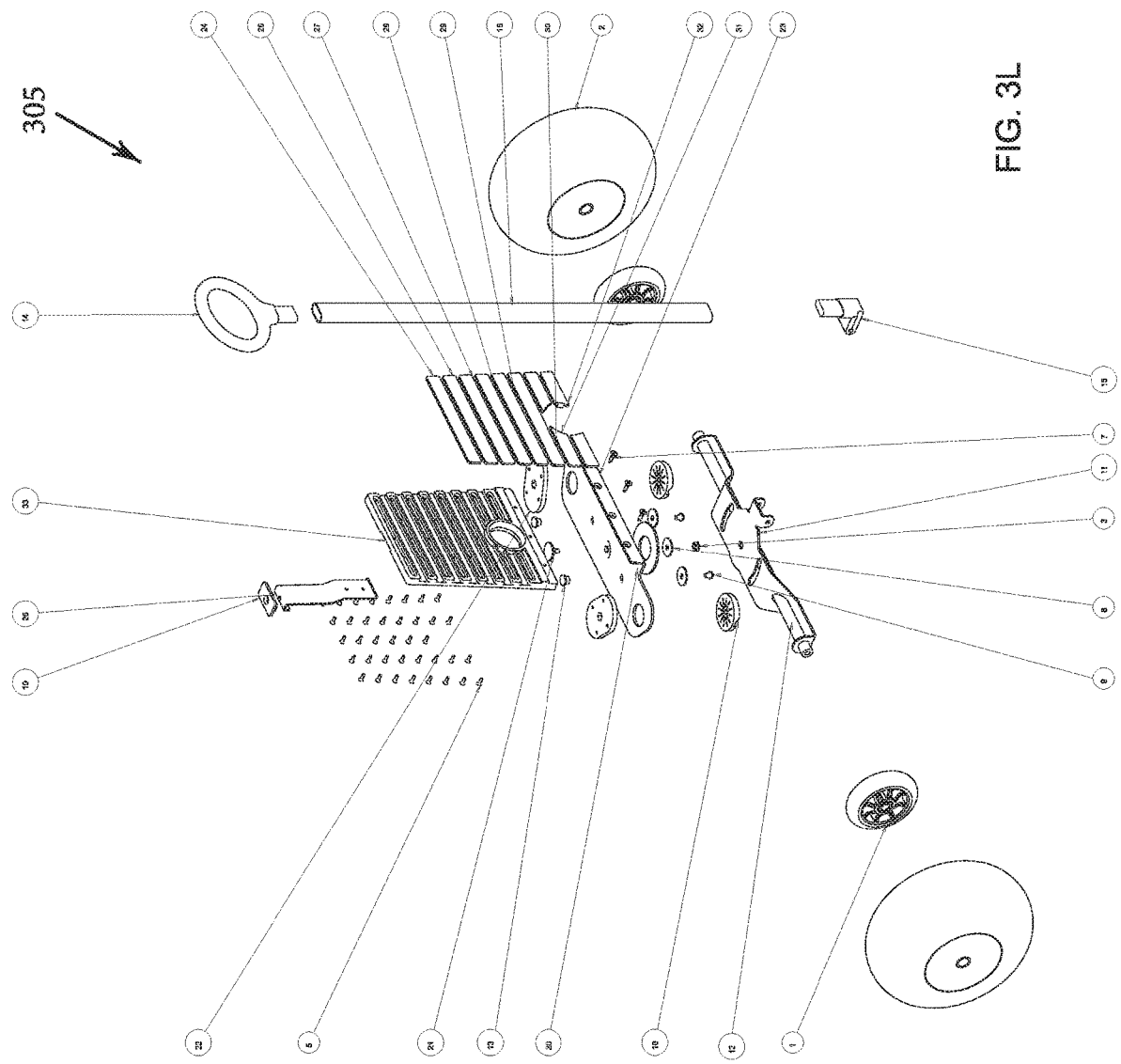
FIG. 3L depicts an exploded view of an exemplary wheel and modular accessory attachment system having channels and sliding attachment couplers.

FIG. 3E depicts parts of the WUB system 305 without the cooler 300. Fixedly coupled (e.g., fastened) to the board 315 is a reinforcement member 365. The reinforcement member 365 may function similarly to the reinforcement member depicted in FIGS. 3F-3K (e.g., it may compressingly couple with a hole of the cooler 300 to provide additional mechanical support for the WUB system 305). FIG. 3L depicts an exploded view to illustrate the various parts of the WUB system 305.

An exemplary process of fitting a cooler with a wheel and modular accessory attachment system (e.g., systems 305 and 305') may be as follows. As shown in FIG. 3C a cooler 300 includes a foot recess 355. Some coolers 300 may be sold with a foot (not shown) that occupies the foot recess 355. The foot recess 355 includes fastener coupling features (e.g., screw holes). The nut-foot 360 is shaped complementary to the foot recess 355 (e.g., oval or a rectangle with two semicircles at opposing ends of the rectangle). The nut-foot 360 includes fastener coupling features (e.g., screw holes, shown in FIG. 3D) that are complementary to (and configured to align with) the foot recess 355 fastener coupling features. Fasteners (e.g., screws) may then fasten and fix the nut-foot 360 to the cooler 300 (in the foot recess 355) via the fastener coupling features of the recess 355 and nut-foot 360. The nut-foot 360 also includes a central aperture (also depicted in FIG. 3D).

As depicted in FIGS. 3B and 3E (and also similarly in FIGS. 3G and 3H) the nut-foot 360 and a knob 350 may be referred to in combination as a "nut and knob". The knob 350 includes a central aperture configured to align with the central aperture of the nut-foot 360. The knob 350 also includes an elevated portion/plateau that surrounds the central aperture. When properly aligned, the side of the knob 350 having the elevated portion faces toward the nut-foot 360. The nut and knob 360, 350 cooperate with each other to fixedly couple the undercarriage plate 320 to the cooler 300. Specifically, the nut-feet 360 are first fastened and fixedly coupled with the cooler (e.g., at the foot recesses 310 using the screw holes and screws). Next, the undercarriage plate 320 is aligned with the nut-feet 360, such that holes in the plate 320 are respectively aligned with the central apertures of the nut-feet 360. Next, the knobs 350 are placed on the plate 320, such that the central apertures of the knobs 350 respectively align with the holes in the plate 320 and central apertures of the nut-feet 360. Finally, a fastener (e.g., screw) is inserted through all three of (1) the central aperture of the knob, (2) the hole of the plate, and (3) the central aperture of the nut-foot, to mechanically and fixedly couple the undercarriage 320 to the bottom of the cooler 300. The undercarriage plate 320 is compressingly retained between the knobs 350 and the nut-feet 360 via fasteners.

The undercarriage 320 is fixed to (e.g., fastened to or integrally and unitarily formed with) an accessory attachment board 315. In the depicted embodiment, the board 315 is located in a side recess of the cooler 300. The board 315 includes multiple of keyed apertures configured to couple with a male locking feature of an attachment accessory to releasably/lockingly couple an attachment accessory (e.g., an umbrella holder) to the board 315. The undercarriage 320 includes a pair of axle coupling flanges 320A located on opposing lateral sides of the carriage 320 and directed in a downward facing direction (relative to the cooler 300). Each flange 320A includes an axle aperture configured to receive an axle 335 coupled to a pair of wheels 310. Accordingly, the undercarriage 320, the board 315, and the axle flanges 320A (along with wheels and an axle) may together form a wheel and modular accessory attachment system configured to mechanically attach (and detach) to (from) the bottom of the cooler 300.

FIG. 3E depicts a reinforcement member 365 (and similar reinforcement member shown in FIG. 10 and discussed further below) configured to reinforce the mechanical attachment of the undercarriage 320 and board 315 to the cooler 300. In the depicted exemplary embodiment, the reinforcement member 365 is shown as an L-shaped structure that is fixedly coupled to an upper area of the board 315 (e.g., via fasteners). The member 365 includes an upper hole. The member 365 is configured to align with a hole of the cooler 300. To mechanically and fixedly couple the member 365 to the cooler 300, a compression plate 367 is provided having a fastener aperture through which a fastener (screw) may be inserted. The compression plate 367 is placed on and aligned with the hole of the cooler 300, and the fastener is then inserted through the hole of the plate 367 and the hole of the cooler 300 to meet the upper hole of the member 365. The fastener is then tightened (screwed) in the hole of the reinforcement member 365, such that the member 365 is compressingly retained and fixed to the cooler by the plate 367 and the fastener via the hole of the cooler 300. In various examples, the plate 367 may include an elevated portion/plateau that fits in and is complementary to, the hole of the cooler (for better alignment and fitting).

An exemplary accessory (e.g., a fishing rod holder) may be releasably/lockingly coupled with the board 315. The accessory may be fixedly coupled to an attachment member. The attachment member may include a male locking portion configured to couple with one of the multiple rails/channels of the board. In some examples, the accessory may be releasably coupled with the attachment member (e.g., by a threaded mechanical coupling). By having the ability to selectively attach the accessory to the board 315, a user may beneficially customize which accessories are fixed to the cooler 300 (via the board 315), and may also advantageously couple and decouple the accessory from the cooler dynamically (e.g., "on-the-fly").

FIGS. 3F-3K depict an exemplary wheel and modular accessory attachment system having male-female attachment couplers. The system 305' shown in FIGS. 3F-3L is similar to the system 305 depicted in FIGS. 3A-3E. For example, the system 305' of FIGS. 3F-3L include an undercarriage (plate) 320', an accessory attachment board 315' (having multiple keyed female locking apertures 340'), a reinforcement member 365' (having plate 367), axle flanges 320A' (through which an axle is inserted), nut-feet 360', and knobs 350'. The board 315' is shown with a large aperture 370' (e.g., similar to the aperture 370) configured to align with a spout/drain of a cooler.

Exemplary accessories and attachment members may be releasably locked with an attachment board or surface. An attachment member may have, at a proximal end, a threaded interface configured to threadingly couple with a complementary threaded interface of the accessory (see, e.g., FIGS. 15G and 15H discussed further below). At a distal end of the attachment member may be a locking tab configured to slide within the slide channels of the board, and lock in place when the attachment member is rotated 90° (see, e.g., FIGS. 15E and 15D discussed further below). An accessory (e.g., umbrella holder) may be mechanically coupled (e.g., fixed or hinged) with an attachment member. A WUB system may be configured to interface with an attachment member (and associated accessory) to lockingly couple the accessory with the board.

FIG. 3L depicts an exploded view of an exemplary wheel and modular accessory attachment system having channels and sliding attachment couplers. Various aspects of the system depicted in FIG. 3L may be substantially similar or identical to various aspects of the WUB system 305 depicted in FIGS. 3A-3E. The WUB system includes multiple components (1)-(33), all of which may not necessarily be required for operation. Part (1) is a small (street) wheel configured to be optionally mechanically coupled to a big (beach) wheel (2). Part (3) is a nut that cooperates with washer (8) and screw (21) to pivotably couple the undercarriage axle coupling portion (11) with the undercarriage cooler coupling portion (23). Parts (5) are screws that fixedly couple the board (33) with respective rails (24, 26-32) to make the unique structural shape of the channels of the board. Parts (7) are screws that fixedly couple the undercarriage portion (23) to the board (33). Parts (9) are screws that pass through a respective pair of curve-shaped apertures of the undercarriage portion (11) and respectively couple with stoppers (13) to facilitate controlled and guided pivoting of the undercarriage portion (11) relative to the undercarriage portion (23) about the pivot axis aligned with screw (21) and nut (3). Part (12) is an axle that is rotatably supported in holes the undercarriage portion (11) and configured to mechanically attach to wheels (1). Parts (15) and (17) are pivots/hinges that pivotably/hingedly couple the handle (14) and (16) to the undercarriage portion (11). Parts (18) are the knobs, which cooperate with the nut-feet (22) to fixedly couple the undercarriage to the bottom of the cooler. Parts (19) and (25) make up the reinforcement member/bracket that reinforces the mechanical attachment between the WUB system and the cooler. The accessory attachment board includes a lattice structure (in this case, hexagonal/honeycomb-shaped lattice) that reduces the weight of the board while providing additional reinforced structural support to the board. The undercarriage cooler coupling portion is sandwiched between a pair of nut-feet and a pair of knobs. The axle is also shown as passing through four apertures of the undercarriage axle coupling portion.

In some examples, the WUB system may be referred to as a "bogie." A bogie may be defined, for example, as a chassis or framework that carries a wheelset, attached to a body (a modular subassembly of wheels and axles). Various parts of the WUB system may be referred to as a "bracket." A bracket may be defined, for example, an intermediate component for fixing one part to another. For example, the reinforcement member (19) and (25) may be referred to as a bracket, since it aids in fixing the WUB system to the cooler. In various examples, an upward facing flange of the undercarriage portion (23) may be referred to as a bracket, since it fixedly couples the board (33) to the undercarriage portion (23).

Various embodiments may employ slide rail connection system for use with modular attachable accessories. Various examples of attachment members that may be configured to attach to a slide rail board include: a lever, a round lick, a linear clip, a bungee cord, and a screw fix. These various attachment members may allow a user to attach many different types of accessories to a cooler (or bait bucket) employing a slide rail/channel board system.

An exemplary channel of a slide rail/channel board system may include multiple grooves that may cooperate with an attachment member to provide for a more tight and secure lock between the attachment member and the channel boundaries. For example, the distal end of an attachment member may include a locking tab that, when rotated 90°, occupies the area defined by the grooves to more securely lock the attachment member in the channel of the board.

An exemplary latch for use in a cooler may include a wide distal end, a wide proximal end, and a narrow center portion. At the distal end, the opposing side surfaces of the latch may include respective protrusions that are complementary to recesses in the cooler. The cooler may include a channel configured to receive the latch. The channel may have a wide upper end, a wide bottom end, and a narrow center portion (all complementary to the dimensions of the latch). The wide and narrow portions of the latch and cooler channel may cooperate (along with the protrusions and recesses), to latchingly close the lid of the cooler with the cooler body.

The nut and knob/chassis/attachment board system shown may not only be deployed on a cooler, but also on a bait bucket. For example, the cooler may instead be an exemplary bait bucket, where the bait bucket is supported by a wheel system that includes the undercarriage/chassis and modular accessory attachment board, where the undercarriage/chassis is modularly coupled to the bait bucket. More generally, the wheel and modular attachment system may be employed on a general container, which may be a cooler, a bait bucket, or storage bin, for example.

An exemplary handle having a towel holder may include at least one pivoting member hingedly coupled to the body of the handle, and configured to retain a towel. In various examples, the pivoting members may be spring loaded, such that they are biased in engagement with the body of the handle. In various examples, the towel holder may hold other items (e.g., clothes).

Figure 4:
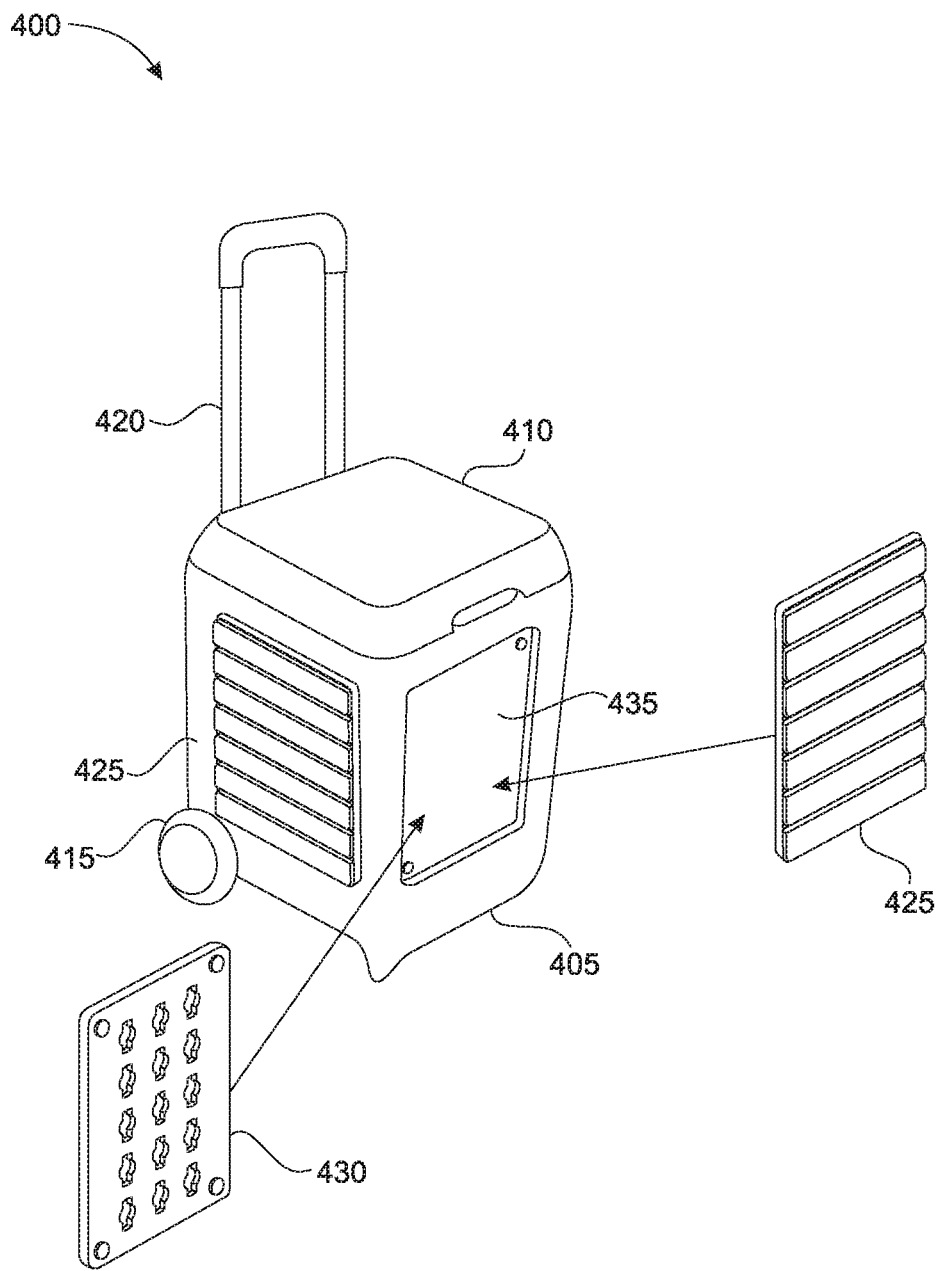
FIG. 4 depicts a front perspective view of an exemplary bait bucket configured to utilize a modular accessory attachment system, including a slide rail/channel board or a male/female attachment board.

FIG. 4 depicts a front perspective view of an exemplary bait bucket configured to utilize a modular accessory attachment system, including a slide rail/channel board or a male/female attachment board. An exemplary bait bucket 400 is a container similar to the cooler 100 depicted in FIG. 1A. For example, the bait bucket 400 may include a bucket body 405, a bucket lid 410, wheels 415, and a handle 420. In some examples, the bait bucket 400 may include the slide rail/channel board 425 (as discussed above). In various embodiments, the bait bucket 400 may include a male/female attachment board 430 (as discussed above). More generally, various containers and systems disclosed herein may be configured with either board 425 or 430, or potentially a combination of both types of boards 425 and 430 (e.g., as shown in FIG. 4). The boards 425 and 430 may be configured to fixingly and customizingly attach to a board receptacle 435 (e.g., via fasteners or welding).

Various embodiments may include an accessory attachment system having a square-shaped rail and channel attachment board. Various embodiments may include an accessory attachment system having trapezoid-shaped rail and channel attachment boards. Various embodiments may include an attachment system having elongated trapezoid-shaped rail and channel attachment boards. Various embodiments may include an attachment system having elongated trapezoid-shaped rail and channel attachment boards. Various embodiments may include a handle having two towel holders for use with an attachment system. Various embodiments may include an exemplary bogie for use as a component of an attachment system.

Figure 5A:
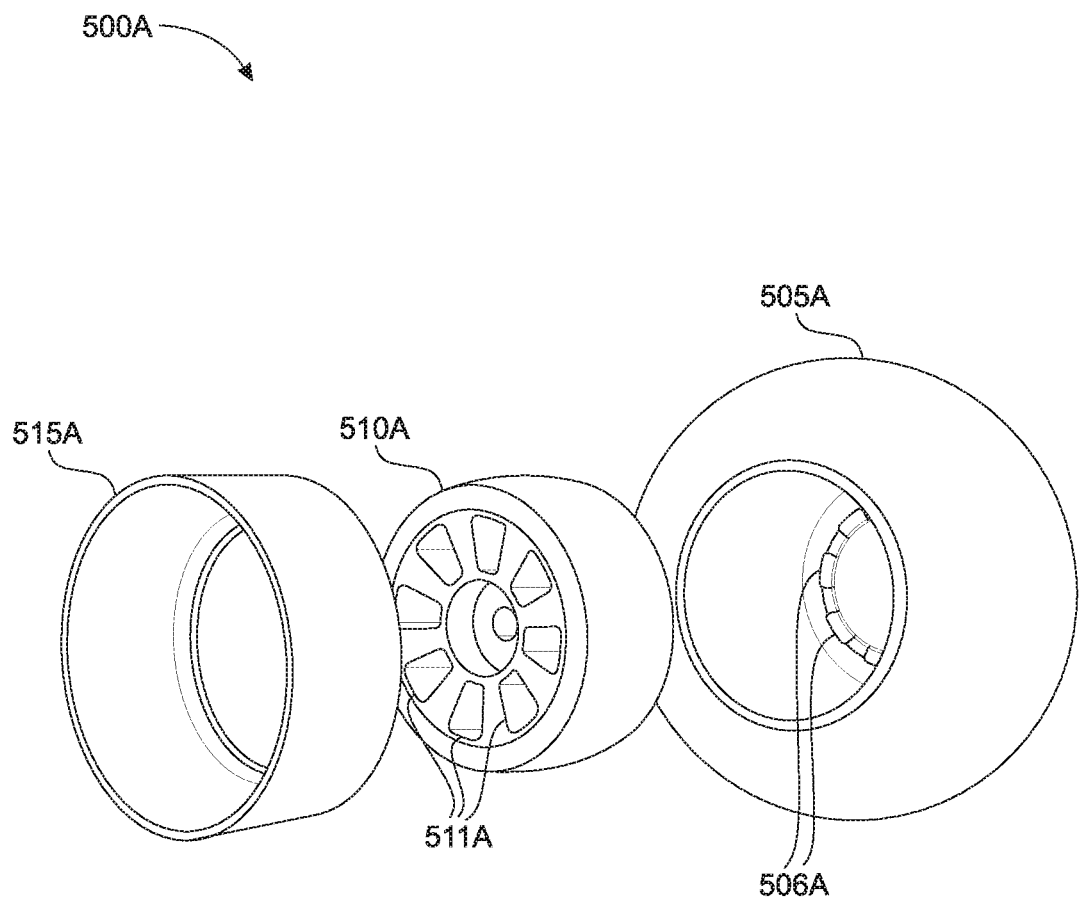
FIGS. 5A and 5B depict an exemplary inner and outer wheel systems for use with an attachment system.
Figure 5B:
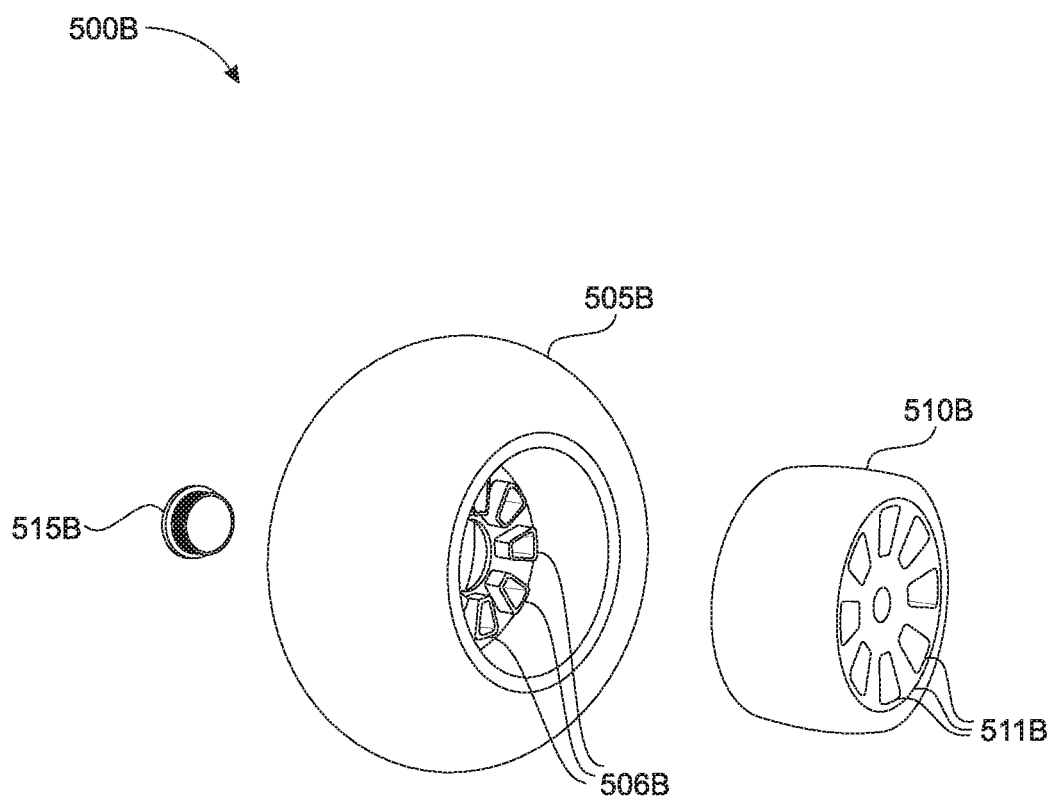

FIGS. 5A and 5B depict an exemplary inner and outer wheel system for use with an attachment system. As shown in FIG. 5A, an exemplary inner and outer wheel system 500A for use with an attachment system includes a large wheel 505A and a small wheel 510A. The large wheel 505A include multiple (internal) teeth 506A that engage with holes 511A in the small wheel 510A to lock the small wheel 510A to the large wheel 505A. An intermediate cylinder 515A may be configured to sit between the small wheel and the large wheel to frictionally and compressingly retain the small wheel when residing in the large wheel. An outer radius of the small wheel 510A may be slightly smaller than an inner radius of the large wheel 505A (e.g., as shown in FIG. 5A).

FIG. 5B depicts an exemplary inner and outer wheel system 500B for use with an attachment system. A large wheel 505B includes multiple of teeth 506B that engage holes 511B in a small wheel 510B to lock the small wheel to the large wheel. A fastener 515B (e.g., screw stopper) may be configured to fasten (e.g., screw) to the small wheel 510B, such that an annulus 507B fixed with the large wheel 505B (on which the teeth 506V may be located) is compressingly retained between the fastener 515B and the small wheel 510B.

Various embodiments may include an accessory attachment system having a square-shaped attachment board having multiple keyed female apertures configured to individually lockingly receive a distal (male) end of an attachment member. Various embodiments may include an accessory attachment system having a large trapezoid-shaped attachment board having multiple keyed female apertures configured to individually lockingly receive a distal (male) end of an attachment member. Various embodiments may include an accessory attachment system having a small trapezoid-shaped attachment board having multiple keyed female apertures configured to individually lockingly receive a distal (male) end of an attachment member.

Figure 6A:
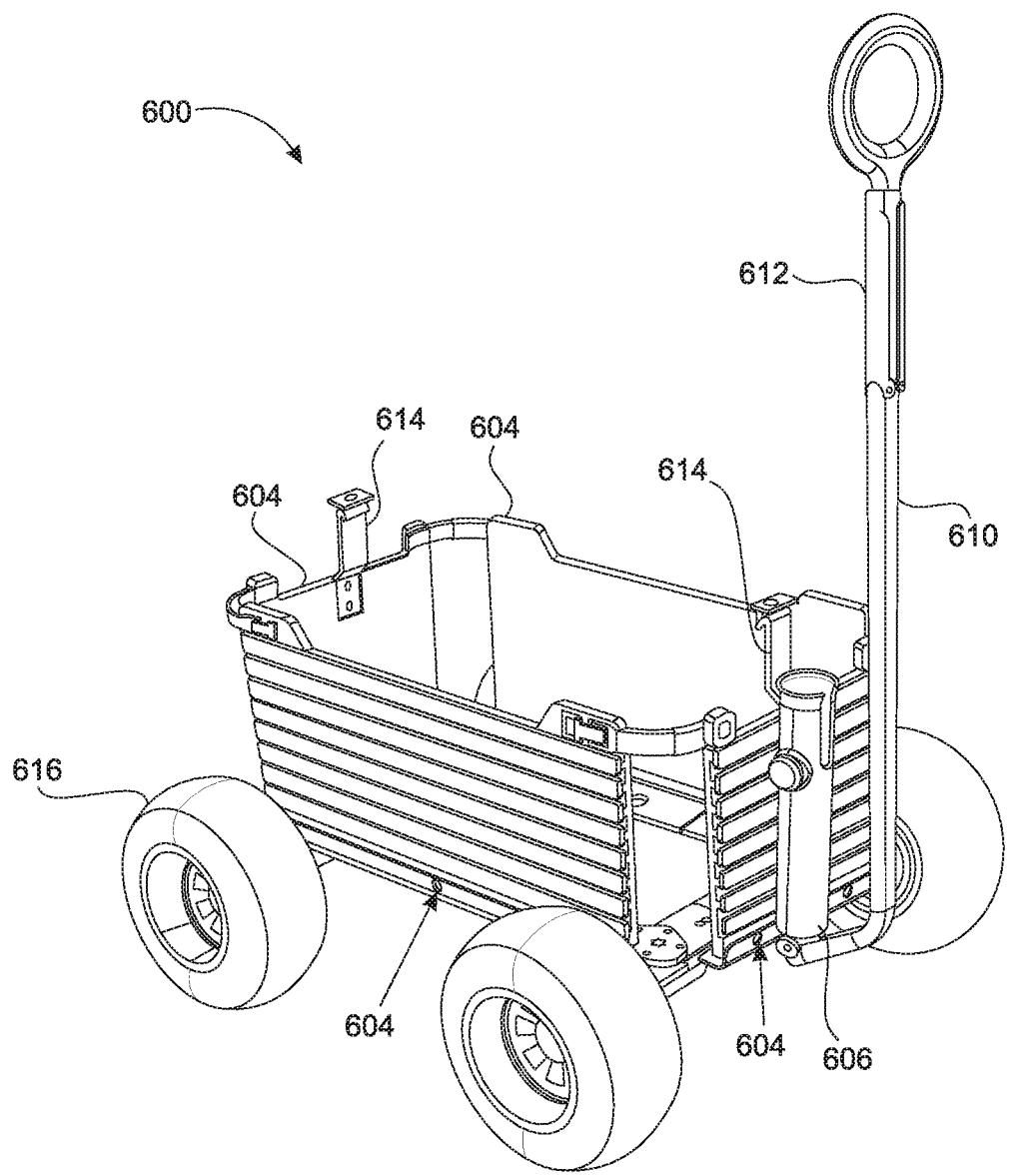
FIGS. 6A and 6B depict top perspective and top plan views, respectively, of an exemplary chassis having sliding rail/channel boards for connecting to modular accessories.
Figure 6B:
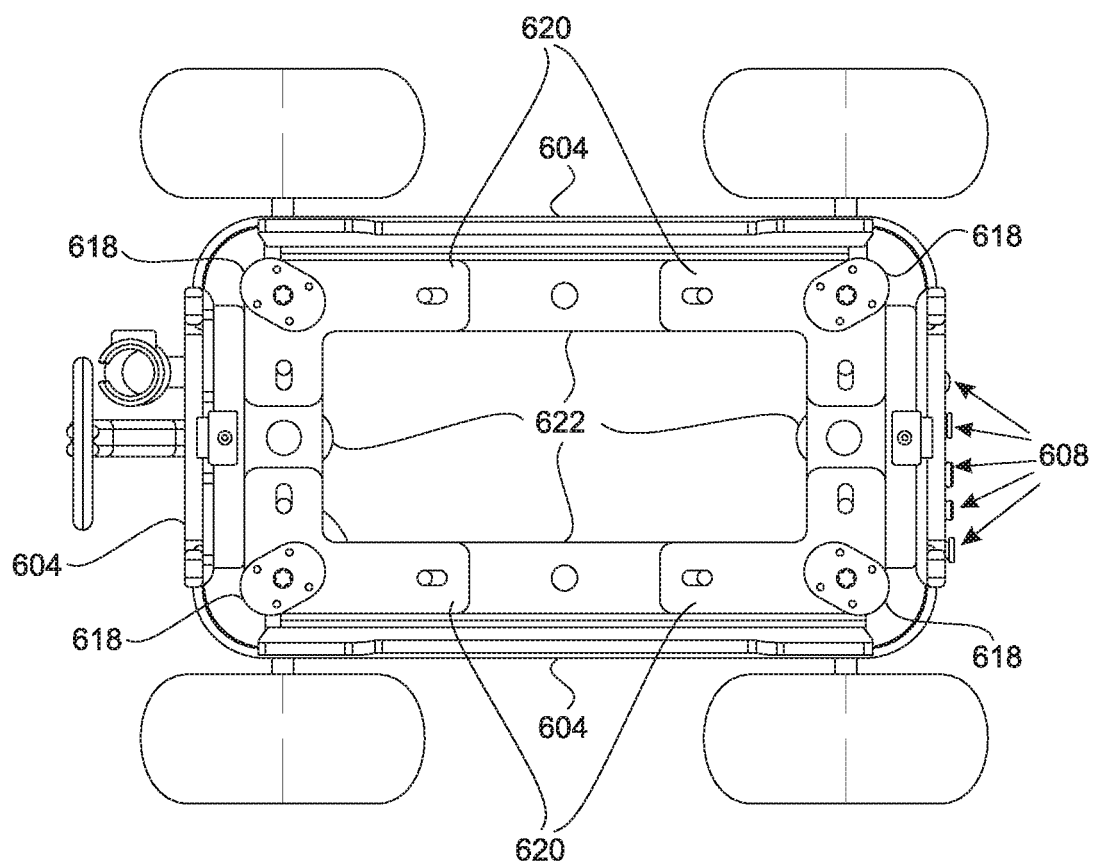

FIGS. 6A and 6B depict top perspective and top plan views, respectively, of an exemplary chassis having sliding rail/channel boards for connecting to modular accessories. An exemplary chassis 600 may be configured to support and carry a cooler 602 (see, e.g., FIG. 7I). The chassis 600 includes four sliding rail/channel boards 604 located on front, back, and sides of the chassis 600. At the front board 604, an accessory 606 is attached to the front board 604 via attachment members (not shown). Hingedly coupled to the chassis 600 is a handle 610 having towel holders 612. Fixedly coupled to the back and front boards 604 are associated reinforcement members/brackets 614 configured to provide additional mechanical coupling between the chassis 600 and the cooler 602 (when they are attached to one another). The chassis 600 includes four large wheels 616. As shown in FIG. 6B, multiple attachment members 608 are depicted as being coupled to the back board 604.

Also as shown in FIG. 6B, the chassis 600 includes four nut-feet 618, each configured to fixedly couple to a bottom surface of the cooler. Respectively fastened to the four nut-feet 618 are four L-shaped brackets 620. Each bracket 620 is fasteningly coupled to two adjacent board brackets 622. The board brackets 622 are fasteningly coupled to their respective boards 604. The L-shaped brackets 620 facilitate mechanical coupling between the boards 604 to form a base structure of the chassis 600, as well as for allowing each boards 604 to be located at a different surface (front/back/side) of the cooler 600. Having four boards 604 for the chassis may advantageously increase the number of possible accessories 608 that may be coupled to the boards 604/chassis 600. For example, a user may attach three fishing rod holders to a left side board 604, attach three drink holders to a right side board 604, attach three phone holders to a front side board 604, and attach a chair to a back side board 604.

Figure 7A:
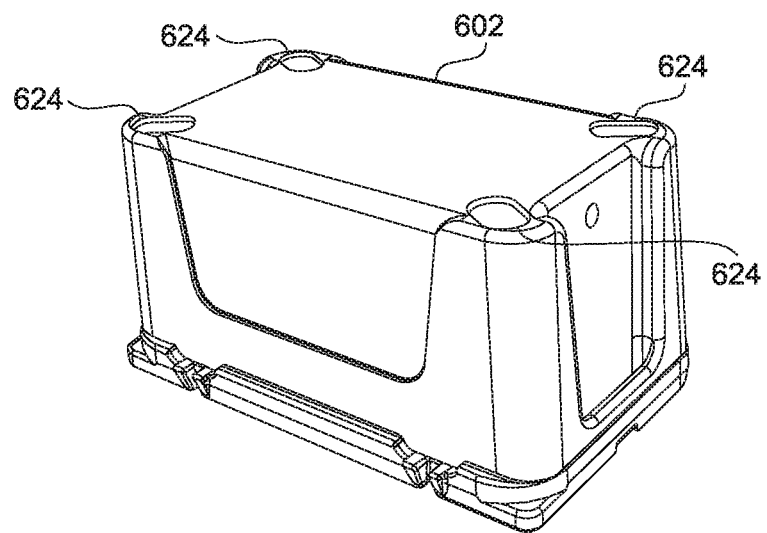
FIGS. 7A-7I depict an exemplary method of assembling an exemplary chassis having sliding rail/channel boards for connecting to modular accessories.
Figure 7B:
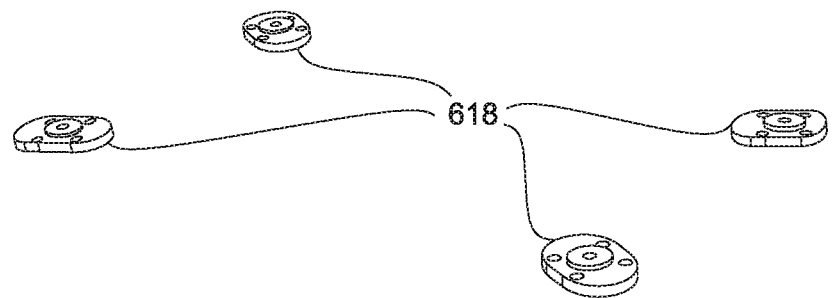
Figure 7C:
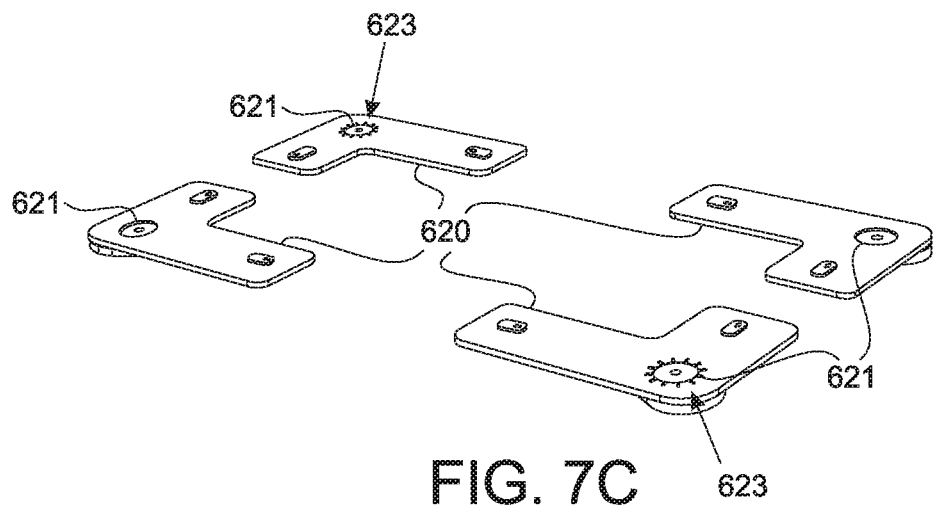
Figure 7D:
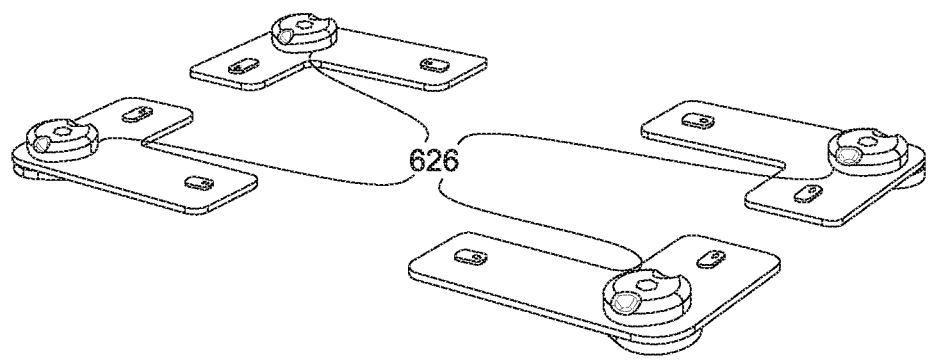
Figure 7E:
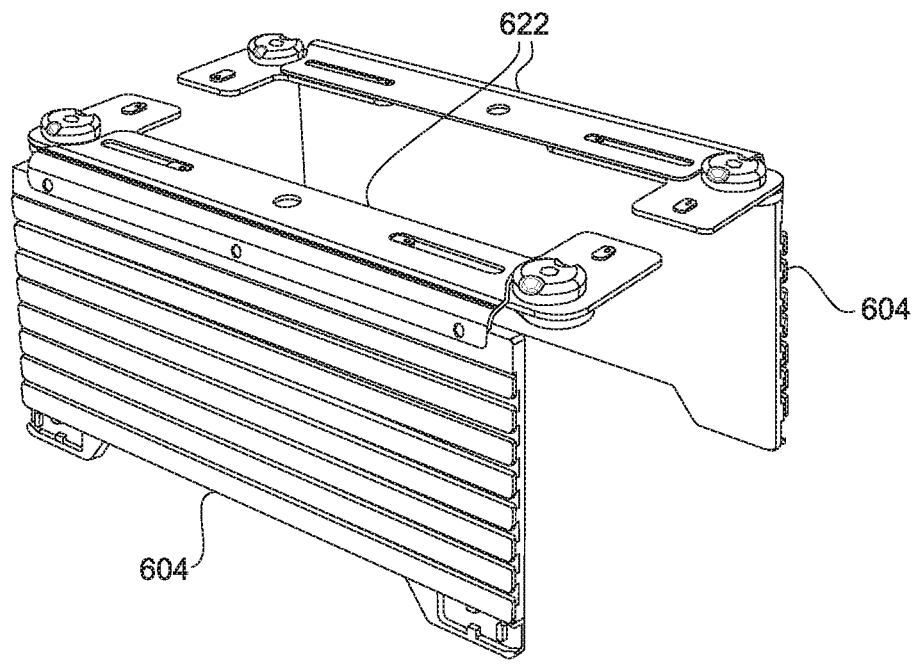
Figure 7F:
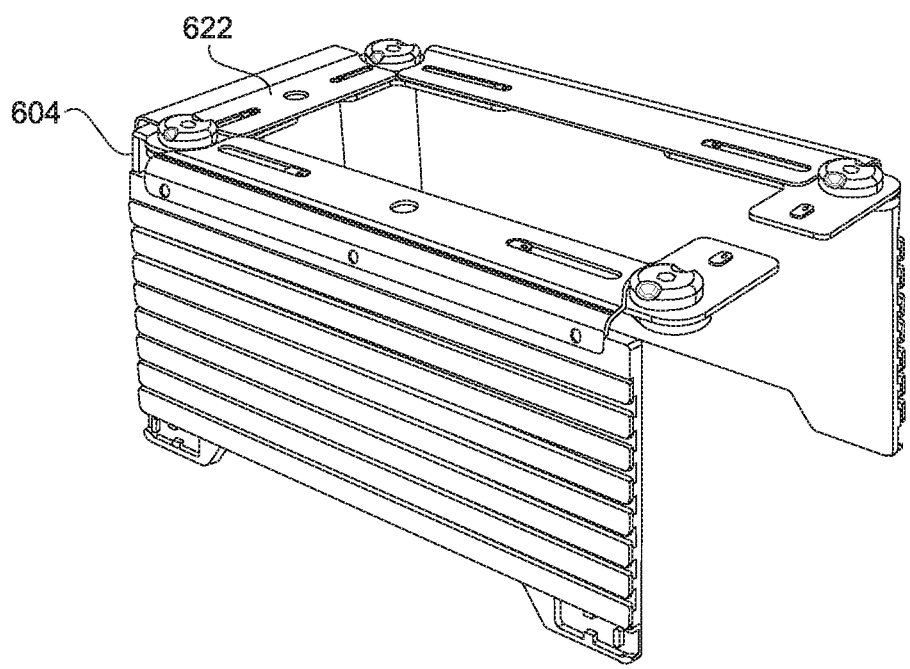
Figure 7G:
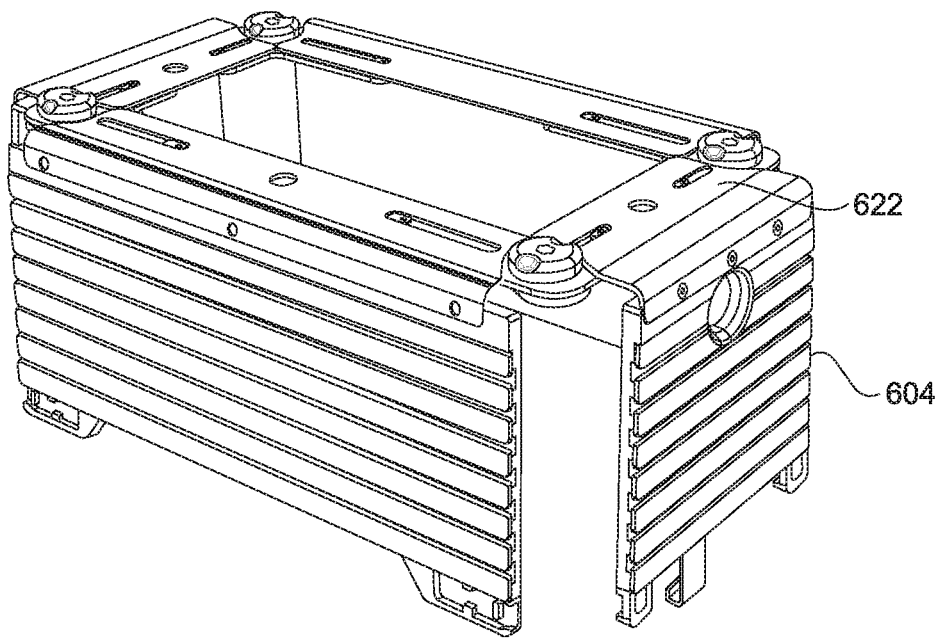
Figure 7H:
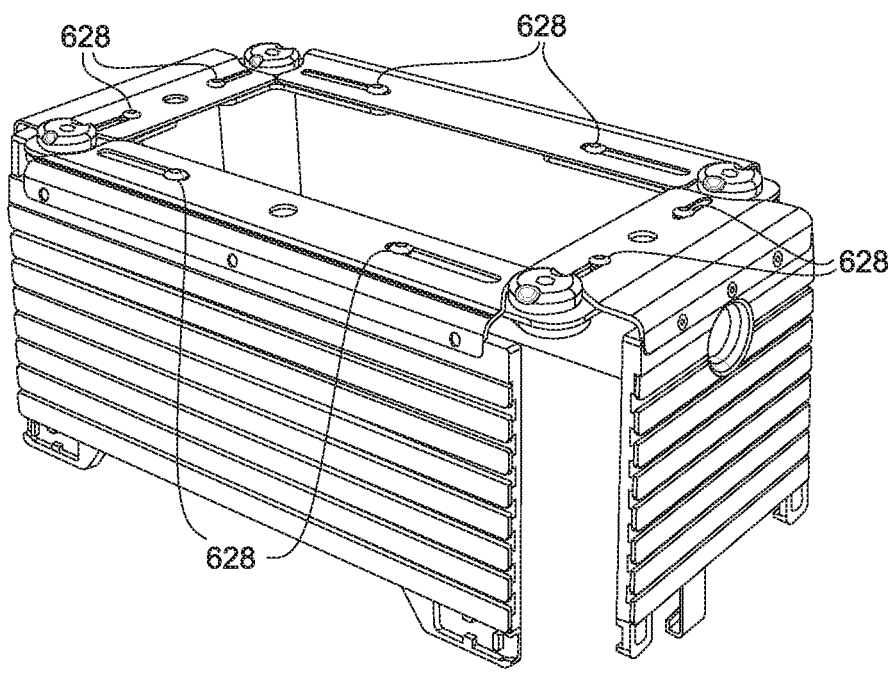
Figure 7I:
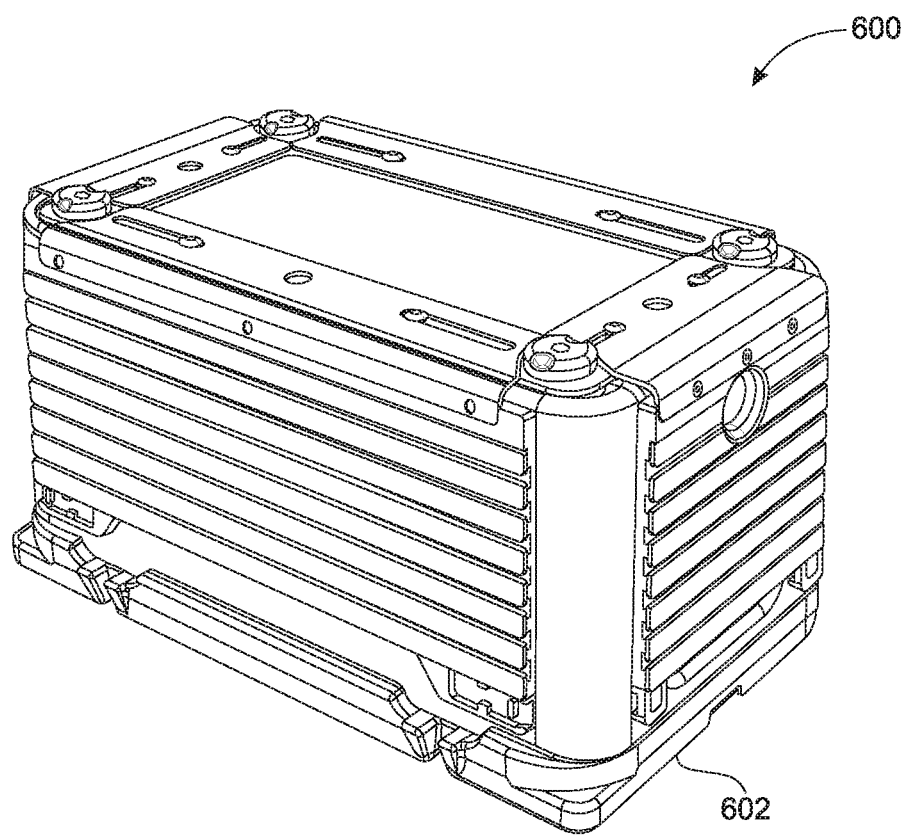

FIGS. 7A-7I depict an exemplary method of assembling an exemplary chassis having sliding rail/channel boards for connecting to modular accessories. An exemplary sequence for assembling parts of the chassis 600 and mechanically attaching the chassis 600 to the cooler 602 starts at FIG. 7A. As shown FIG. 7A, the cooler 602 may have, for example, four feet recesses 624. A user may respectively fasten four nut-feet 618 into the four feet recesses 624 (as indicated in FIG. 7B, with cooler 602 not shown for purposes of illustration). A user may then respectively align feet holes 621 of the L-shaped brackets 620 with the fastening holes of the nut-feet 618 (see FIG. 7C). In various examples, a surface of the brackets 620 may include (star-shaped) grooves 623. The grooves 623 of the bracket 620 may be configured to engage with complementary (star-shaped) ribs 641 (see FIG. 8A) of a knob 626 when the knob 626 is fastened to the nut-foot 618, with the bracket 620 sandwiched in between (see FIG. 7D). Next, the board brackets 622 associated with boards 604 may be respectively aligned with fastening holes of the L-shaped brackets 620 (see FIGS. 7E-7G). Next, fasteners 628 are inserted through the slots of the board brackets 622 and the fastening holes of the L-shaped brackets 620 to fixedly couple the board brackets 622 with the L-shaped brackets 620 (see FIG. 7H). The chassis 600 is then fully attached to the cooler 600 (see FIG. 7I).

Figure 8A:
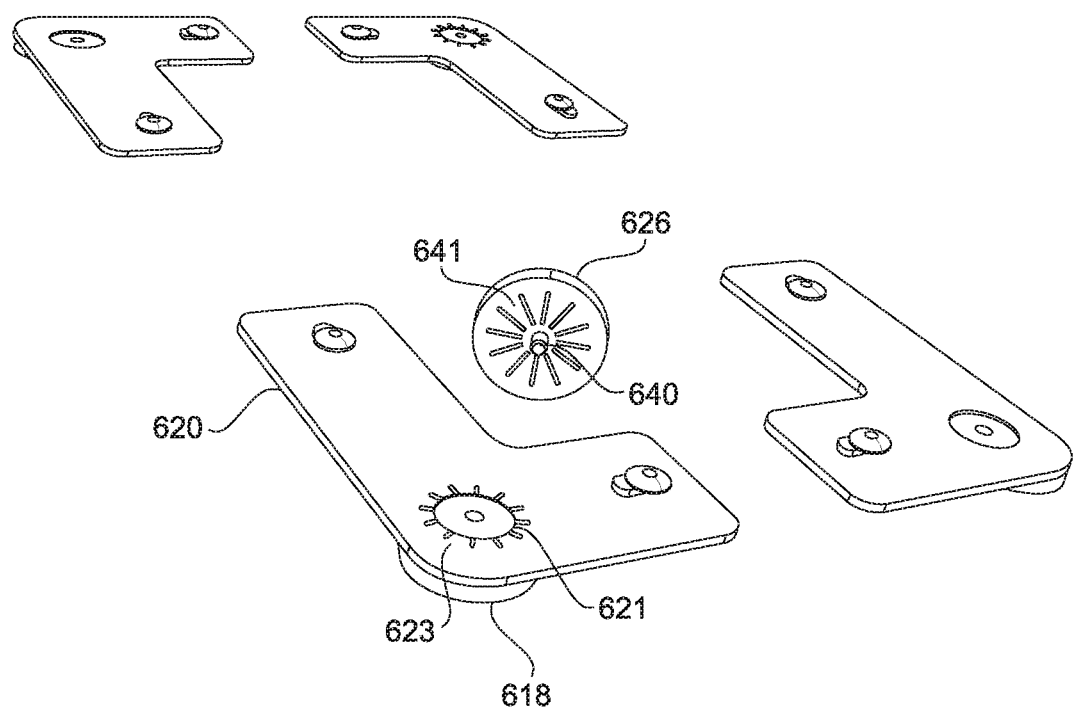
FIGS. 8A and 8B depict an exemplary engagement between nut-feet, L-shaped brackets, and knobs associated with an exemplary chassis.
Figure 8B:
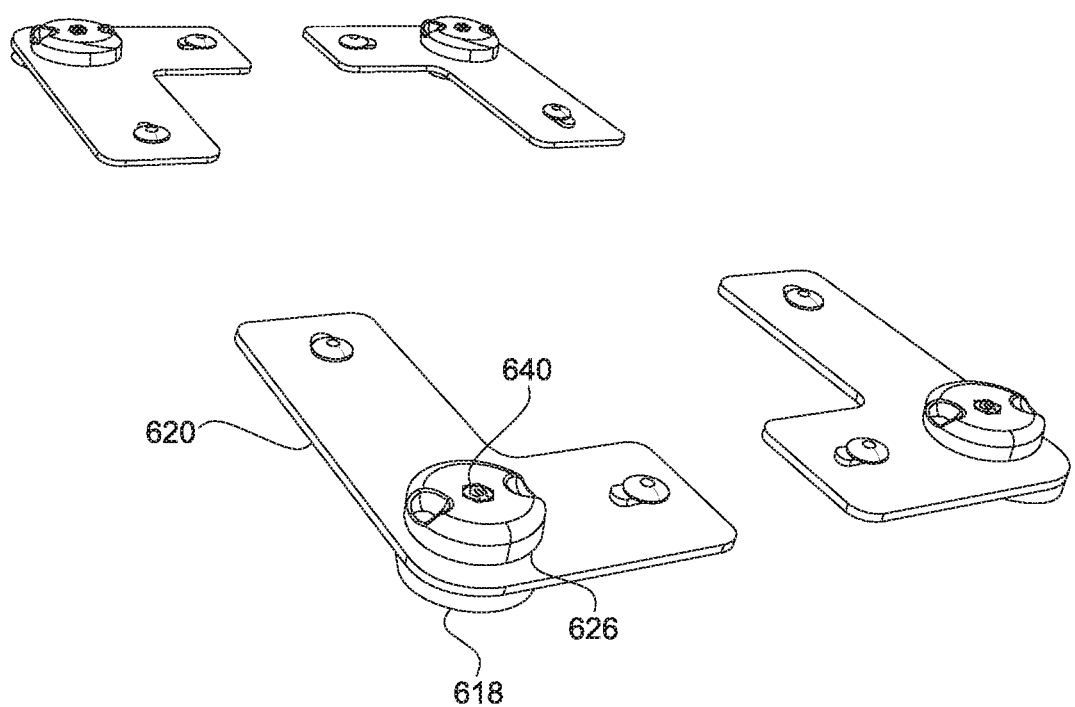
Figure 9A:
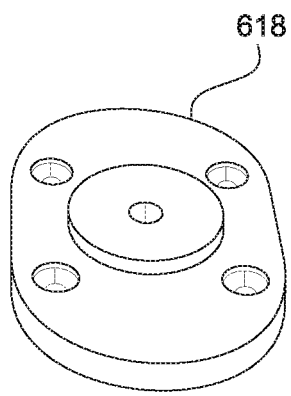
FIGS. 9A-9D an exemplary sequence for assembling parts of an exemplary chassis.
Figure 9B:
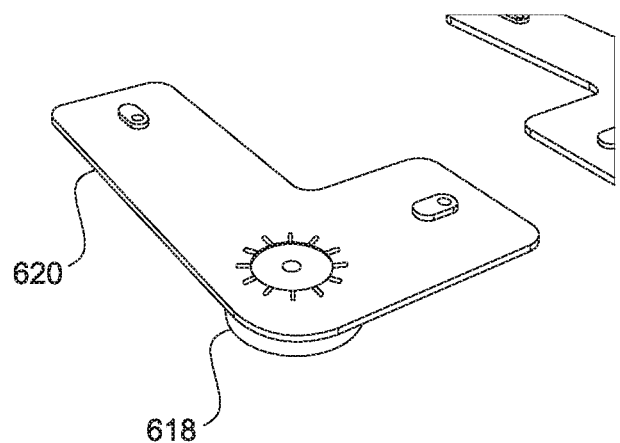
Figures 9C, 9D:
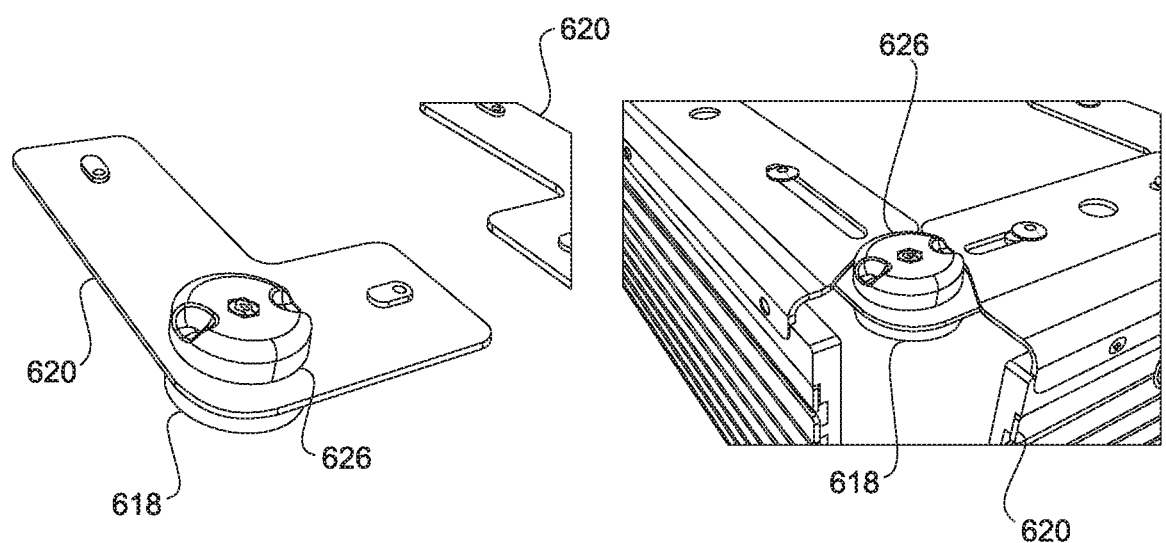

FIGS. 8A and 8B depict an exemplary engagement between nut-feet, L-shaped brackets, and knobs associated with an exemplary chassis. Exemplary engagement between nut-feet 618, L-shaped brackets 620, and knobs 626 starts at FIG. 8A. The L-shaped bracket 620 includes (star-shaped) grooves 623 surrounding the foot hole 621 of the L-shaped bracket 620. The grooves 623 are complementary to (star-shaped) ribs 641 located on an engagement surface of the knob 626, such that when the knob 626 is fastened to the nut-foot 618 (using fastener 640), the grooves 623 receive the ribs 641 to compressingly and securely fix all three parts (nut-foot 618, L-shaped bracket 620, and knob 626) together (as shown in FIG. 8B). The grooves 623 and ribs 641 may cooperate to provide an anti-reversing, anti-unscrewing/uncoupling function to substantially mitigate decoupling of the nut 618 from the knob 626. Preventing or mitigating decoupling of the nut from the knob may advantageously provide additional resilience and strength to the chassis system (so the chassis doesn't fall apart due to a loosening of the mechanical coupling between nut and knob).

FIGS. 9A-9D an exemplary sequence for assembling parts of an exemplary chassis. The exemplary sequence (with zoomed-in views) for assembling parts of the chassis 600 may be similar to various steps the sequence depicted in FIGS. 7A-7I.

Figure 10:
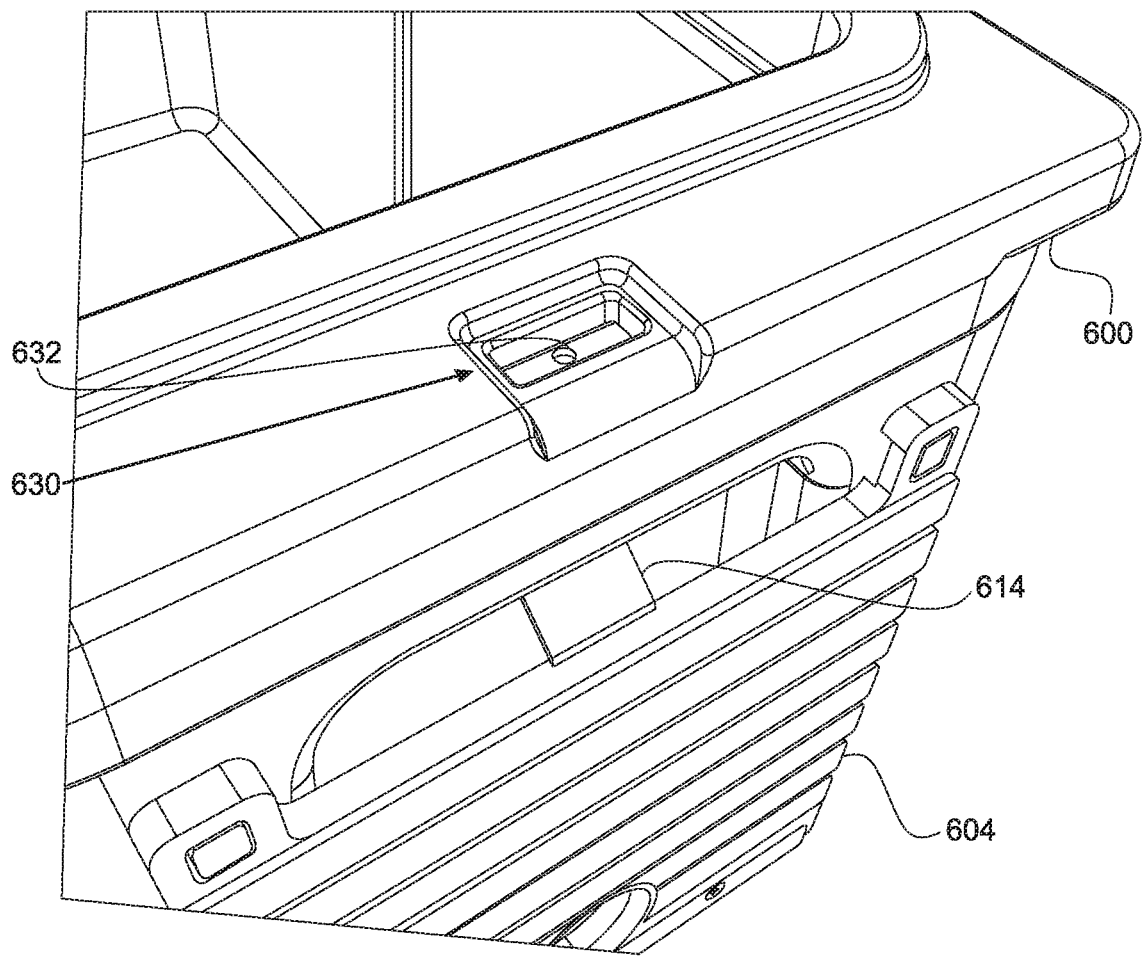
FIG. 10 depicts of top perspective view of an exemplary reinforcement member/bracket configured to engage with a hole of a cooler.
Figure 11B:
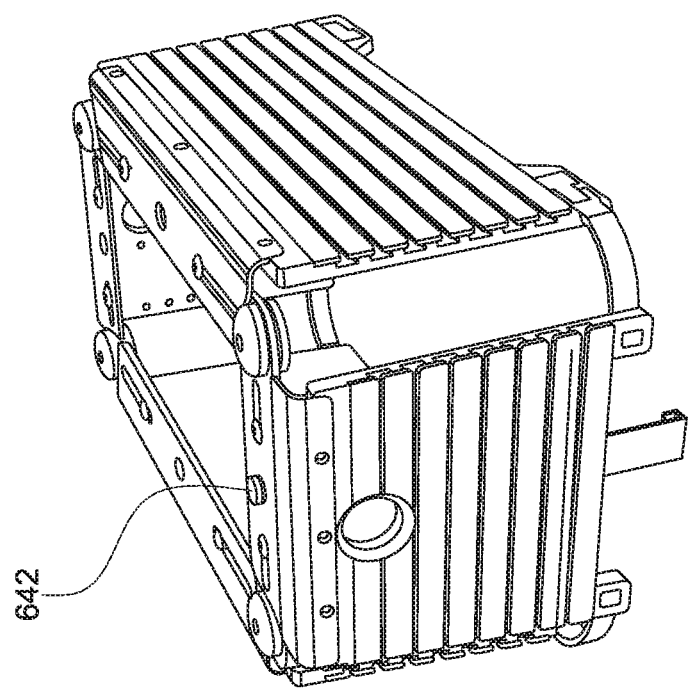
FIGS. 11A-11H depicts an exemplary sequence for assembling an axle and wheel set to a chassis.
Figure 11A:
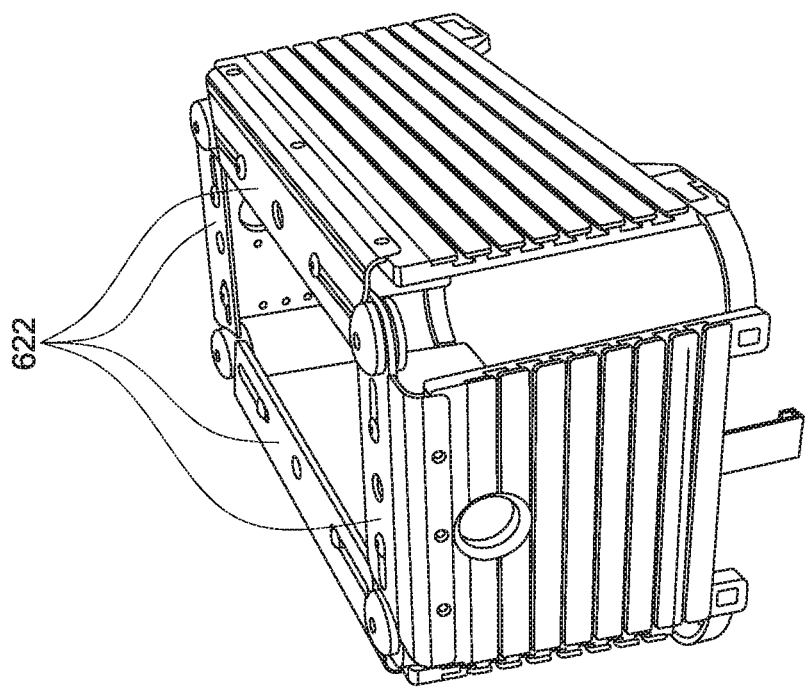
Figure 11D:
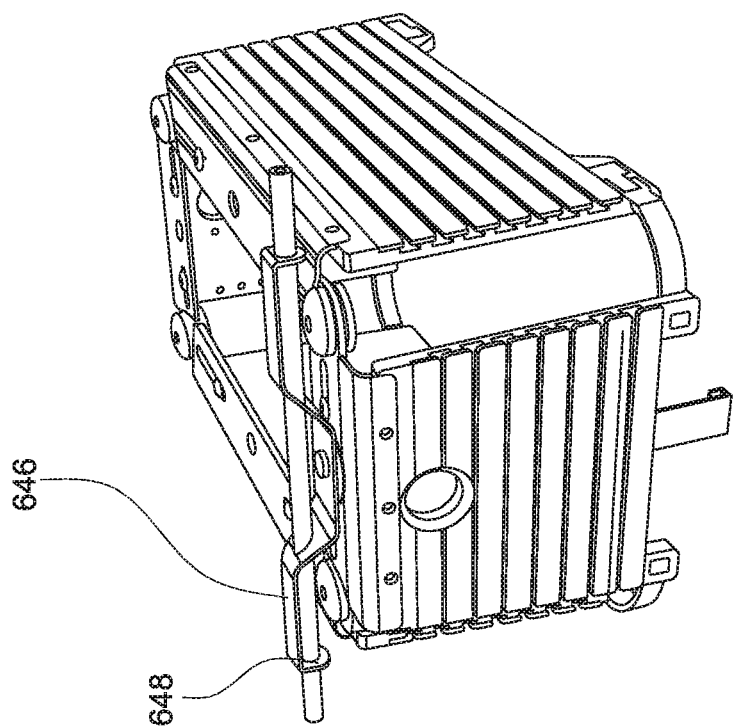
Figure 11C:
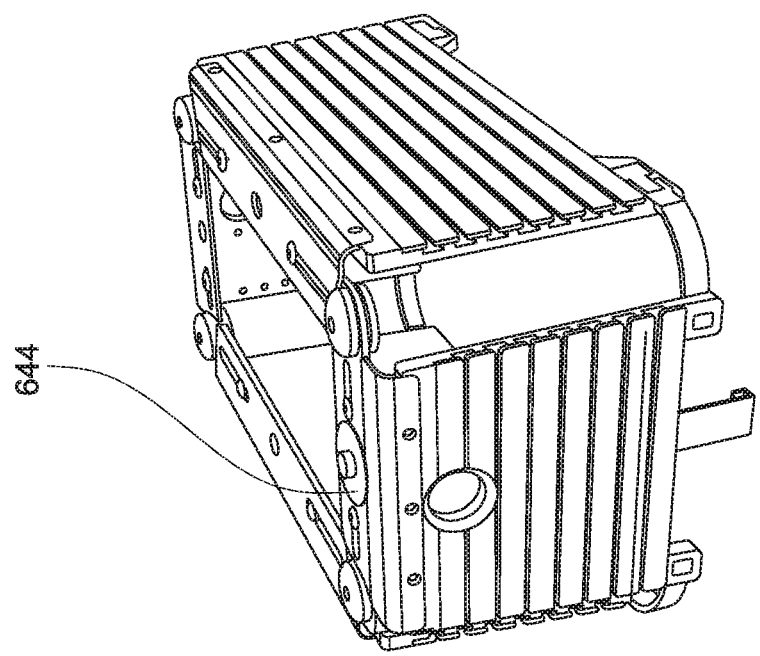
Figure 11F:
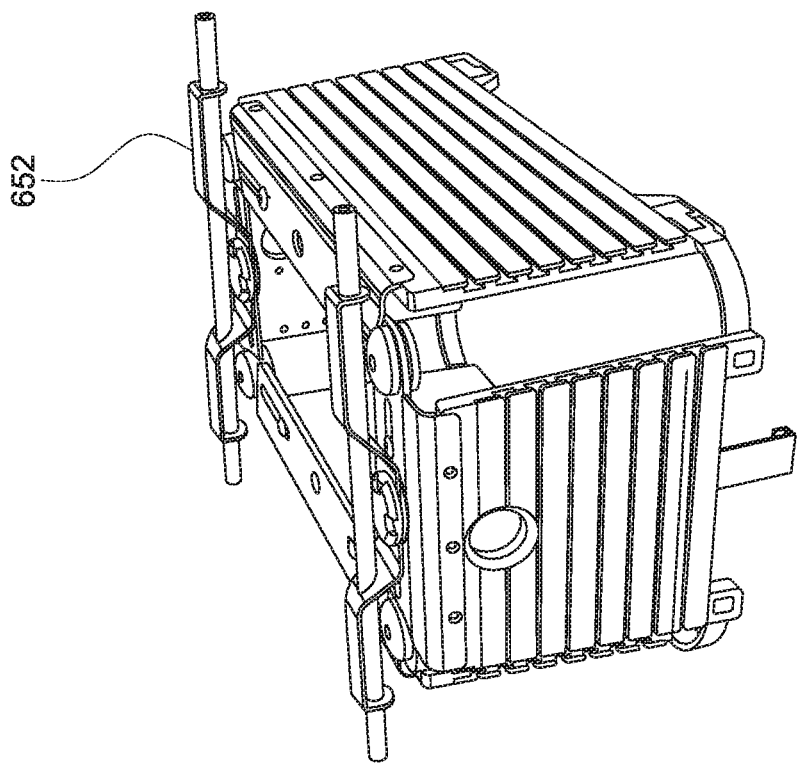
Figure 11E:
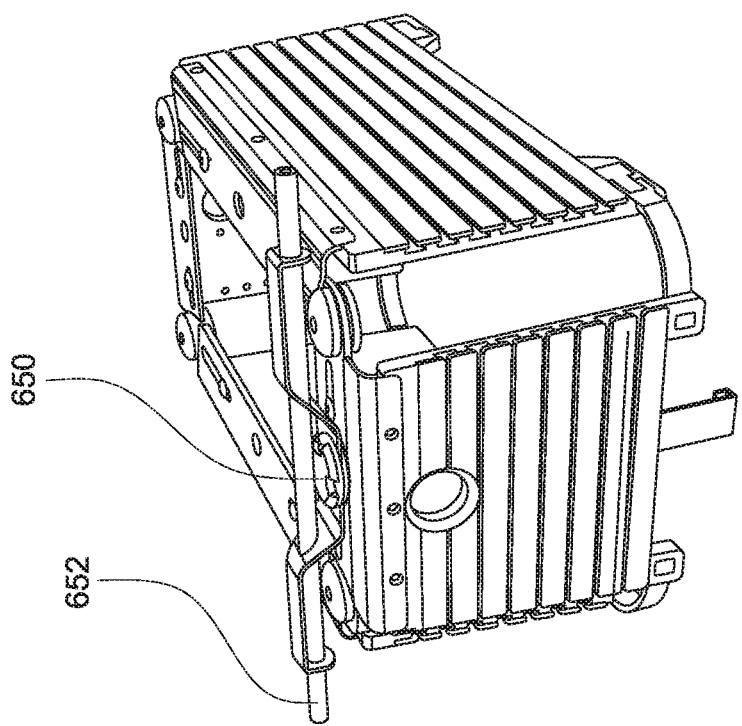
Figure 11H:
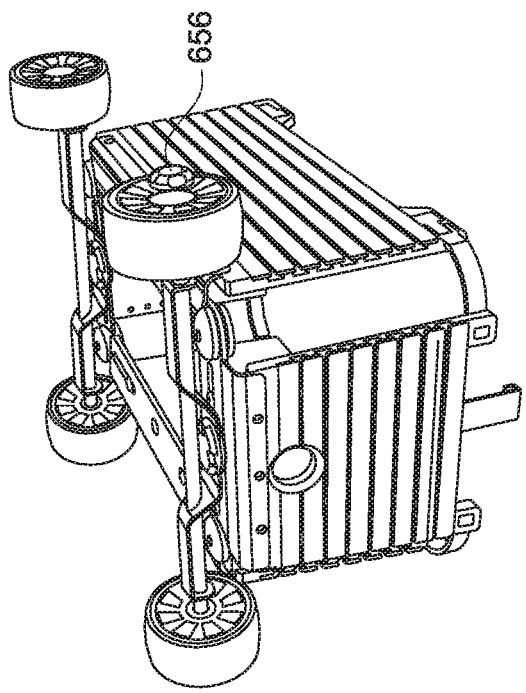
Figure 11G:
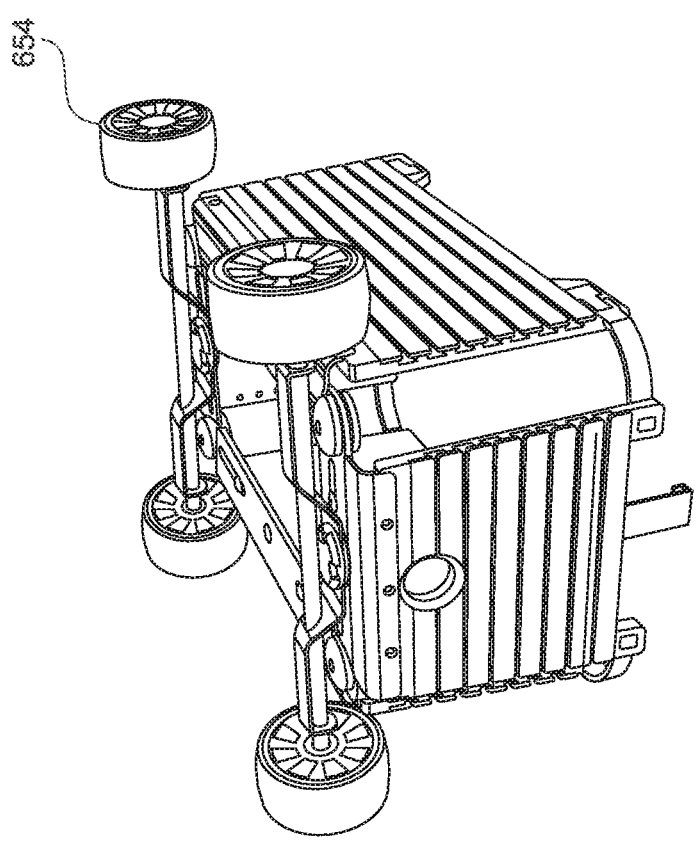

FIG. 10 depicts of top perspective view of an exemplary reinforcement member/bracket configured to engage with a hole of a cooler. An exemplary sequence for mechanically coupling a reinforcement member/bracket 614 to a cooler 600 may start first with the reinforcement member 614 (which is fixedly coupled to the board 604) being aligned with a hole 630 of the cooler. Notably, the reinforcement member 614 includes a fastening hole 632 configured to receive a fastener 638 (e.g., a screw). The fastening hole 632 is aligned with the hole 630. Next, a compression bracket 634 (having its own fastening hole 636) is placed over the hole 630. Lastly, the fastener 638 is inserted into all three of the holes 630, 632, and 638, and is fastened to the member 614, such that the part of the cooler 600 defining the hole 630 is compressingly held between the bracket 634 and the bracket 614. Therefore, the bracket 614 (along with other related parts) may beneficially provide for additional reinforcement for attaching the chassis 600 to the cooler 602.

FIGS. 11A-11H depicts an exemplary sequence for assembling an axle and wheel set to a chassis. An exemplary sequence for assembling a wheel set to the remainder of the chassis 600 starts at FIG. 11A, with a partially assembled chassis 600 being provided. A fastener 642 is then inserted into a fastening hole of an end board bracket 622, along with a (optional) washer 644 (see FIGS. 11A and 11C). Next, a fastening hole of an axle bracket 646 is then aligned with the fastener 642 (see FIG. 11D). An axle 648 is also inserted into axle holes of the axle bracket 646 to form the axle and bracket subassembly 652. Next, a nut 650 is mechanically coupled to the fastener 642 to pivotably/rotatably couple the axle bracket 646 to the board bracket 622 (see FIG. 11E). Next, another axle and bracket subassembly 652 is similarly coupled to an opposite (front) end of the chassis 600 (see FIG. 11F). Next, (small) wheels 654 are then respectively mechanically coupled at opposite ends of the axles 648 (see FIG. 11G). Lastly, a retaining fastener 656 is then coupled with the wheel to retainingly, lockingly, and rotatably couple each wheel 654 to its axle 648 (see FIG. 11H). For example, the (smaller) wheel 654 may be connected to the axle via a screw or C-clamp (much like a Razor® style scooter).

Figure 12A:
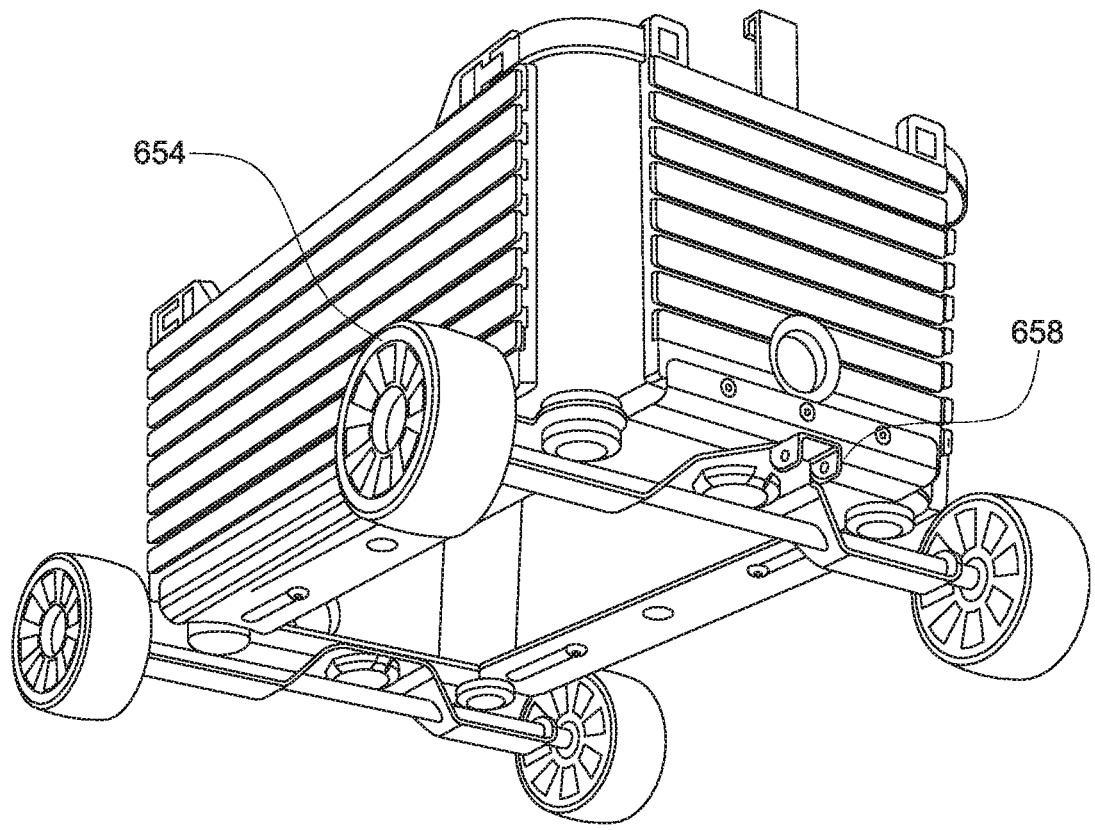
FIGS. 12A-12C depicts an exemplary sequence for attaching large wheels to small wheels, as well at attaching a handle to a chassis.
Figure 12B:
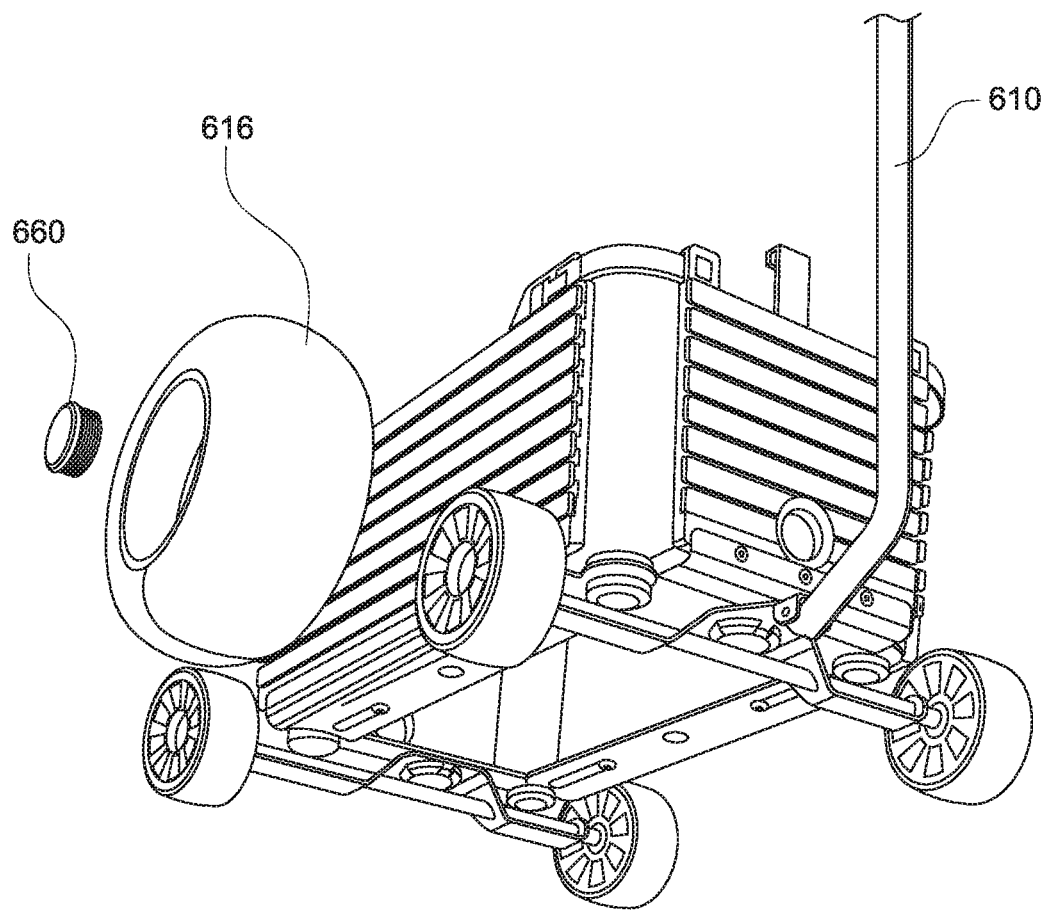
Figure 12C:
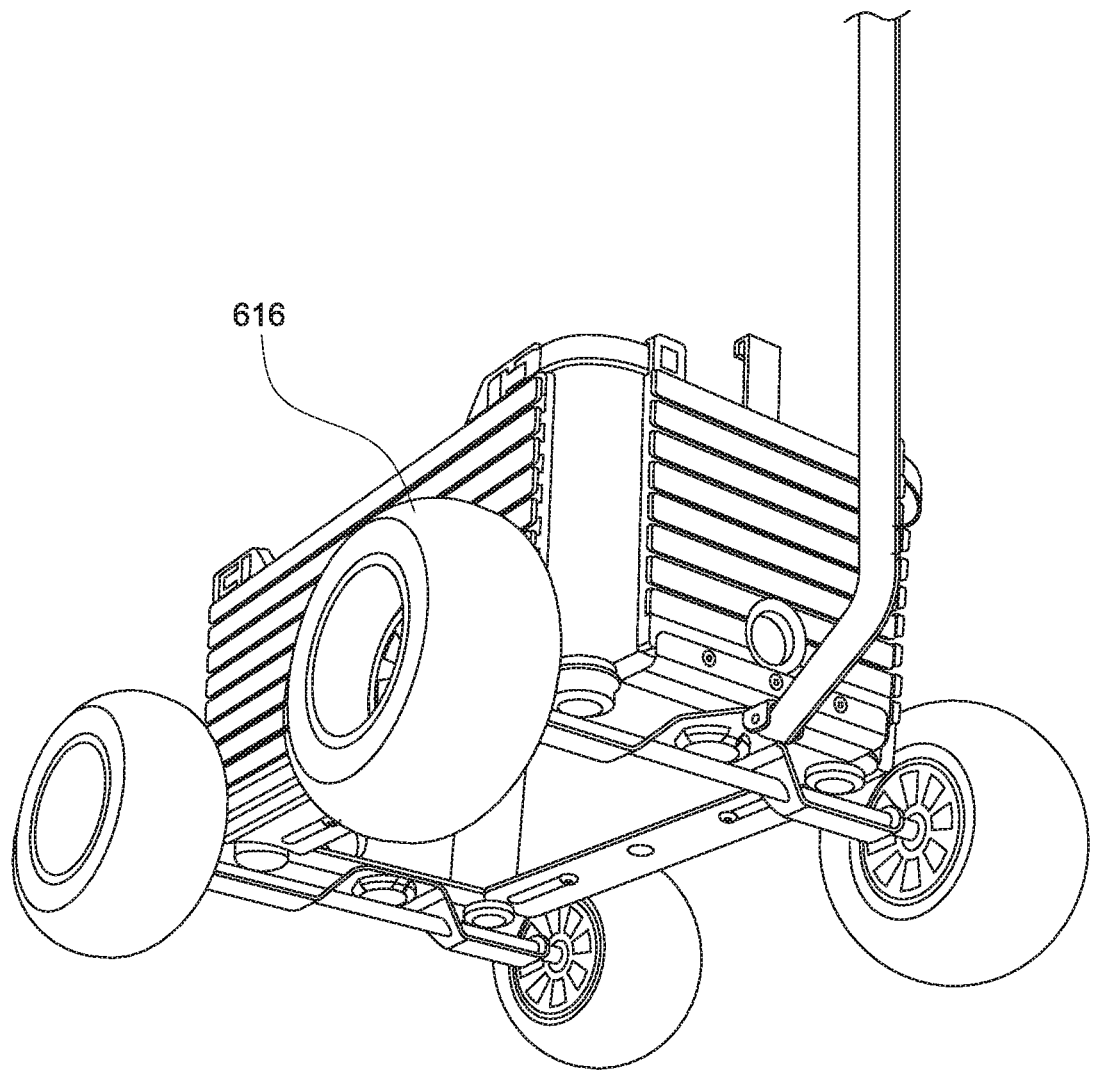

FIGS. 12A-12C depicts an exemplary sequence for attaching large wheels to small wheels, as well at attaching a handle to a chassis. As shown in FIG. 12A, a chassis 600 is provided along with small wheels 654. The chassis includes an axle bracket having a hinge portion 658 having hinge holes that connect to a handle 610. Next, a user aligns a rotational axis point a of big wheel 616 (and wheel-to-wheel fastener 660) with a rotational axis point of the small wheel 654 (see FIG. 12B). Next, the big wheel 616 is pushed onto the small wheel 654, and secured in page using the fastener 660 (see FIG. 12C). For example, once a user has attached the (smaller) wheels 654, a (larger/beach) wheel 616 may be molded to fit directly over the wheel 654 and lock in via the nut/bolt 660.

Figure 13:
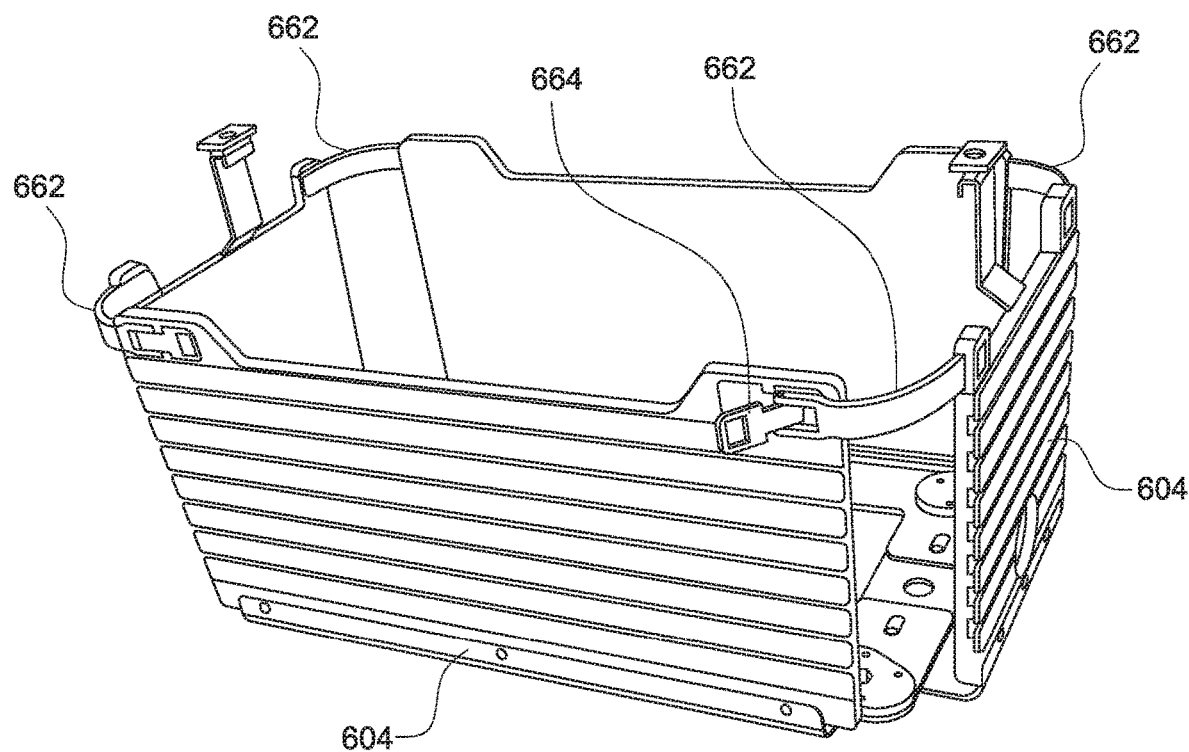
FIG. 13 depicts an exemplary chassis having adjustable upper support members and latches.

FIG. 13 depicts an exemplary chassis having adjustable upper support members and latches. An exemplary sequence for configuring upper support members and latches of the chassis 600 may be as follows. A chassis 600 includes four upper support members 662 (e.g., support bands) configured to mechanically couple an upper part of one board 604 with an upper part of an adjacent board 604. An upper support member 662 is rotatably coupled to a latch 664. The latch 664 is releasably and lockingly coupled to the top of another board 604 (via a latch channel in the board 604), such that a user may selectively couple and decouple an upper support member 662 from a board 604 (FIG. 13 illustrates the unlocked/decoupled state, while FIG. 12A illustrates the locked/coupled state). In this sense, the members 662 may provide additional upper reinforcement and structural support to the chassis 600 (e.g., so the upper sections of the boards 604 are rigidly fixed to one another and don't rattle/vibrate as the chassis drives along various surfaces).

Figure 14A:
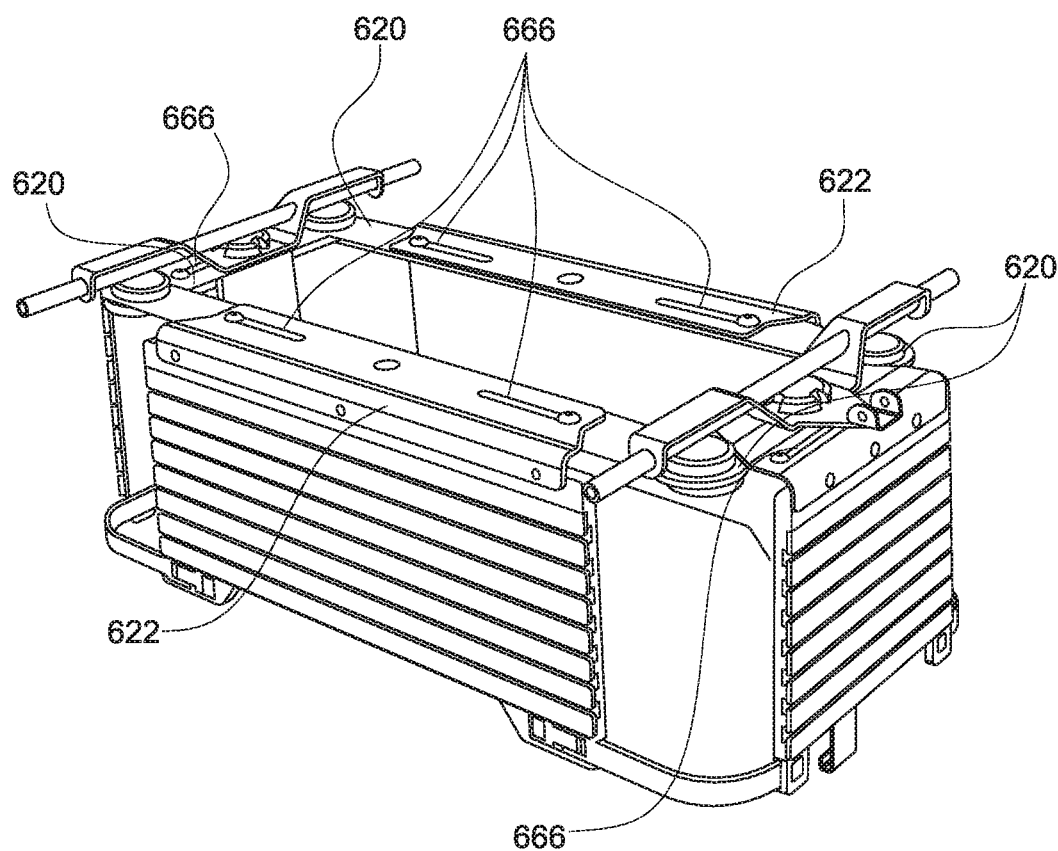
FIGS. 14A and 14B depict an exemplary chassis configured to adjust in size for adapting the chassis to fit a variety of cooler sizes.
Figure 14B:
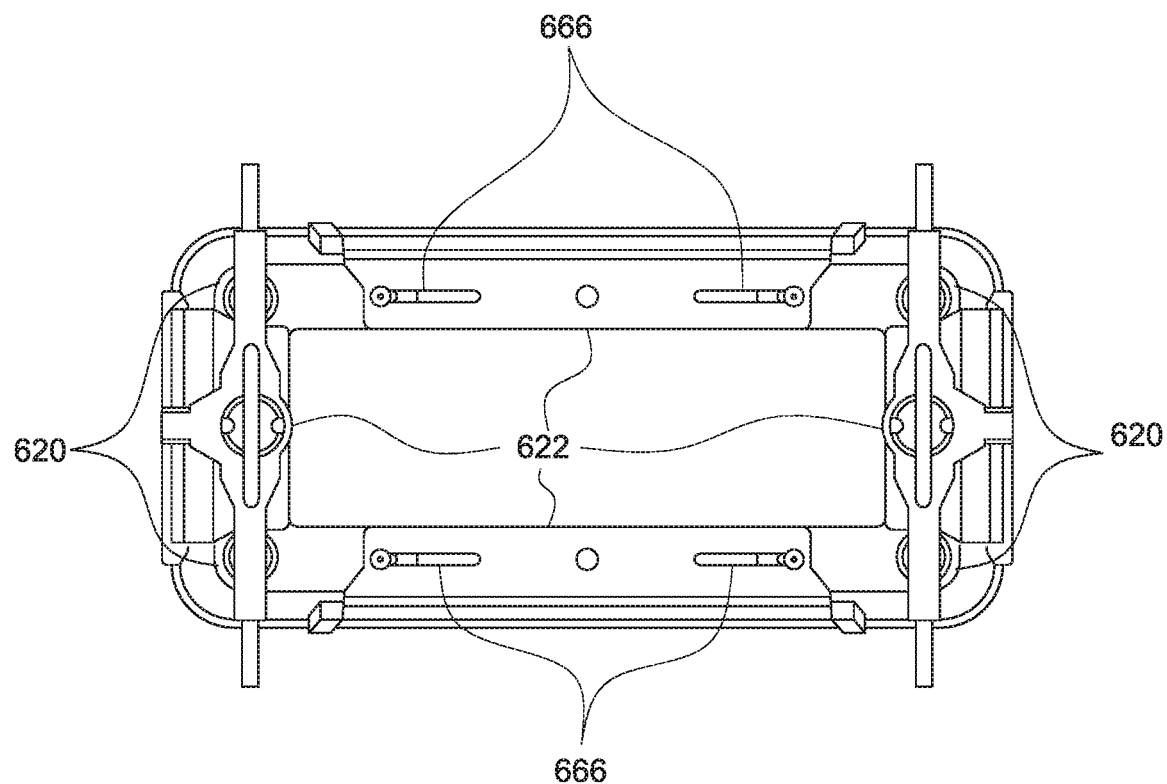

FIGS. 14A and 14B depict an exemplary chassis configured to adjust in size for adapting the chassis to fit a variety of cooler sizes. An exemplary chassis 600 is configured to adjust in size for adapting the chassis 600 to fit a variety of cooler 602 sizes. A chassis 600 includes the board brackets 622. Each board bracket 622 includes two fastener channels 666 for fastening the L-shaped brackets 620 to the board brackets 622. As depicted in FIGS. 14A and 14B, fasteners are located in the fastener channels 666 as the farthest distance away from the center of the chassis 600. Accordingly, the chassis 600 depicted in FIGS. 14A and 14B is configured in its maximum lengthwise dimension size, which utilizes the full length of the L-shaped brackets 620 to provide for maximum separation between front and back boards 604. In this state, the chassis 600 may be configured to support a longer cooler. Similarly, the distance between the side boards 604 may be increased or decreased using the fastener channels 666 on the front and back board brackets 622. Both width and length dimensions of the chassis 600 may be customized to snugly and securely fit coolers of various sizes, advantageously making the chassis 600 size-adaptable "on-the-fly." Accordingly, the chassis 600 may be an expandable modular system, where at least part of the utility of the expandable modular system is the ability to expand (and contract) to fit different sizes of coolers.

FIGS. 15A-15H depict an exemplary chassis having boards with female locking apertures for connecting to modular accessories. A chassis 1500 may be substantially similar (in at least some aspects) to the chassis 600 of FIGS. 6A-14B. However, the chassis 1500 employs multiple keyed female locking apertures instead of a slide rail/channel system. For example, the chassis 1500 includes accessory attachment boards 1504, each having multiple keyed, female, locking apertures configured to attachingly and lockingly receive a male attachment member. The chassis 1500 mechanically and fixedly supports a cooler 1502. Sequences for assembling parts of the chassis 1500 and mechanically attaching the chassis 1500 to the cooler 1502 may be substantially similar to the sequences described in FIGS. 6A-14B with respect to chassis 600.

FIGS. 15B-15H depict attachment of an accessory 1508 to an accessory attachment board 1504 having multiple keyed, female, locking apertures 1506. As shown on FIG. 15B, the accessory 1508 is releasably lockingly attached to the board 1504 via an attachment member 1510 coupled inside of a locking aperture 1506. The various parts of the accessory attachment board 1504 and attachment member 1510 may be substantially similar to the keyed male/female attachment system depicted in FIGS. 2A and 3F-3K.

Figure 15A:
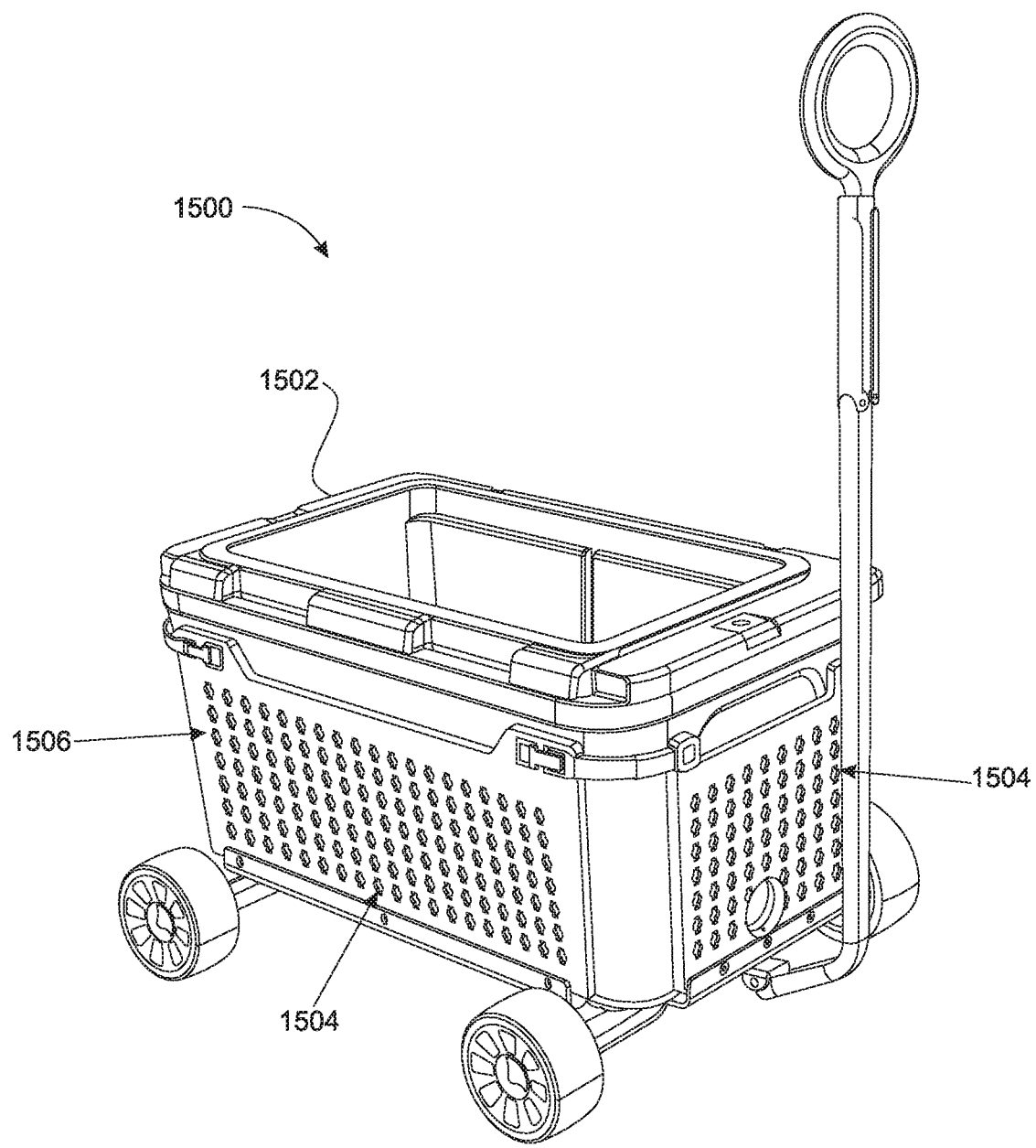
FIGS. 15A-15H depict an exemplary chassis having boards with female locking apertures for connecting to modular accessories.
Figure 15B:
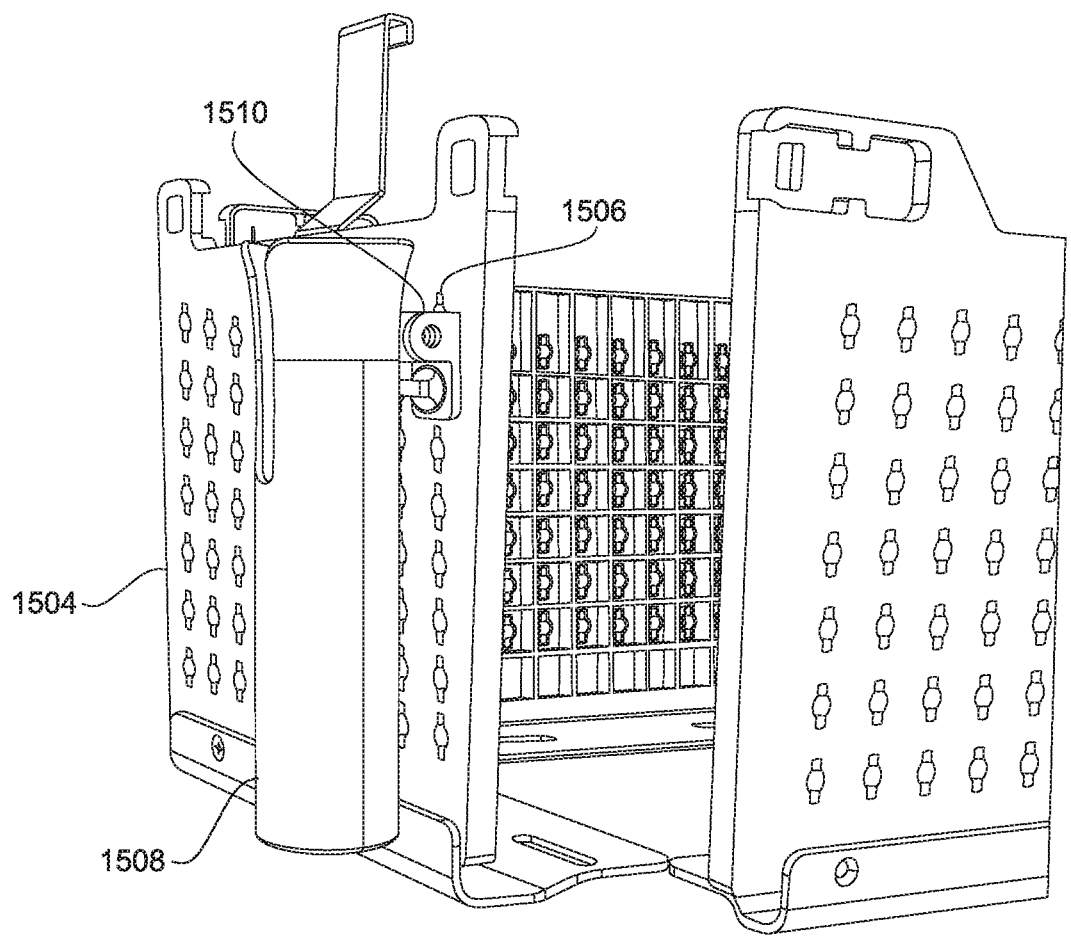
Figure 15C:
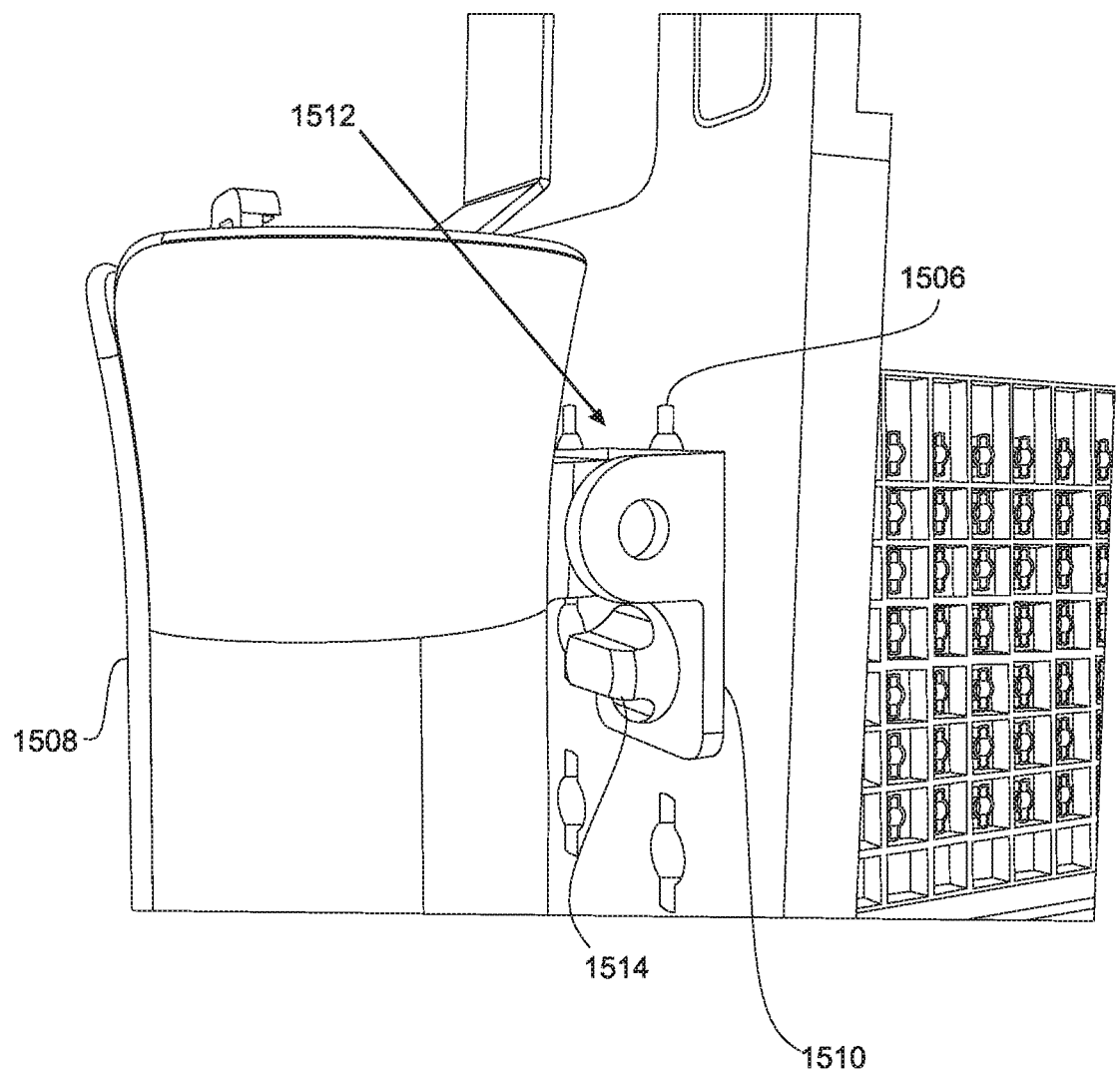
Figure 15D:
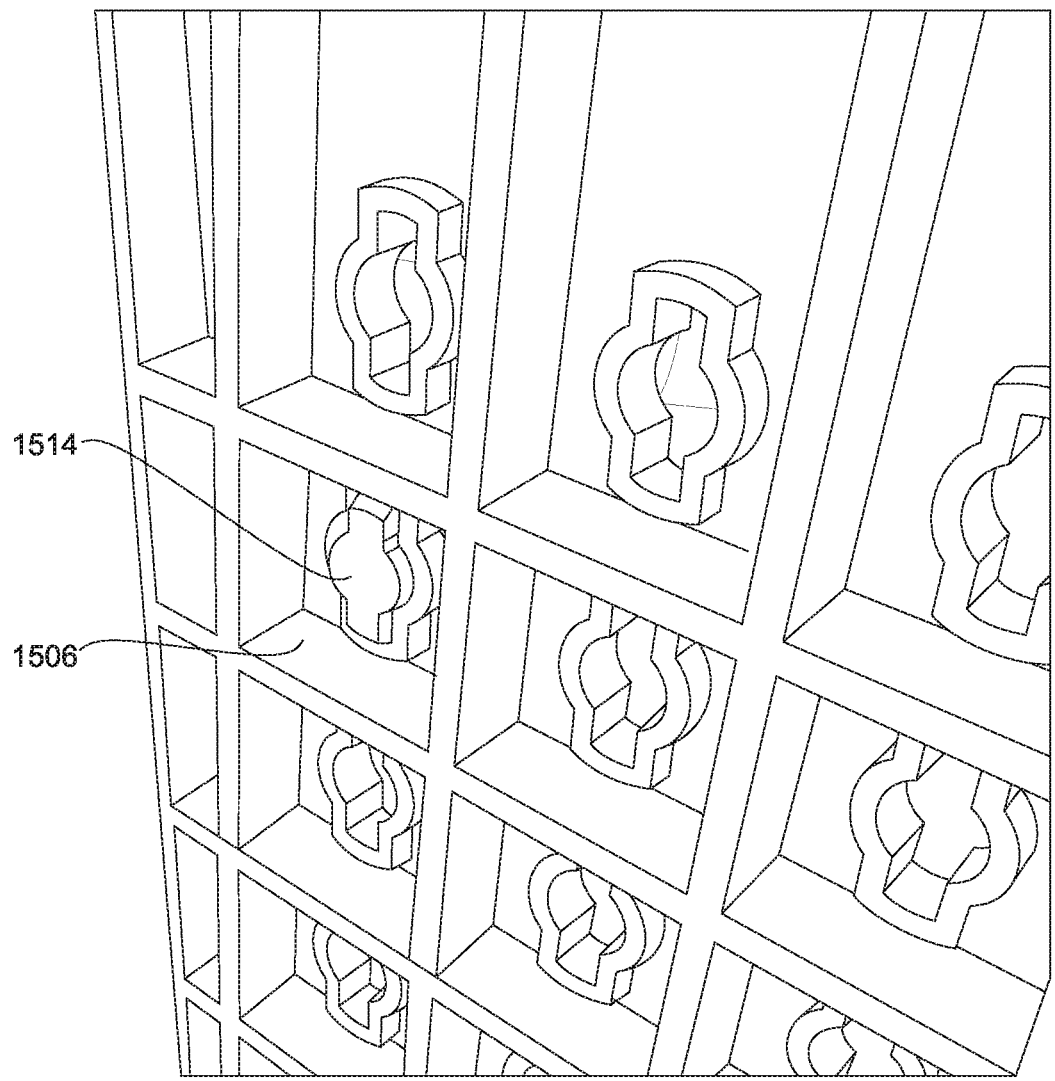

In particular, FIG. 15D depicts a backside view of the attachment board 1504, with the male coupler 1514 and accessory coupler 1506 in an unlocked state. In this unlocked state, the ears/tabs of the male coupler are oriented vertically, such that the male insertion feature can freely move in and out of the respective apertures of the cooler attachment board and accessory coupler 1510. In the locked state (FIG. 15E), the ears are rotated 90°, such that the ears are retained behind the board and the accessory coupler 1510 is locked or sandwiched between the male coupler 1514 and the cooler attachment board 1504. In some examples, the cooler attachment board may be a non-planar surface (e.g., it may possess curved or angled surfaces).

In various examples, the attachment board 1504 includes at least one female attachment aperture. A cross-sectional shape of the female aperture 1506 may be the shape of a (rectangular) slot with a circle overlaid on the center point of the slot. A male coupler 1514 may be configured to releasably attach to the board 1504 via the female aperture of the board 1504. The male coupler 1514 may include a hand torque/twisting structure (e.g., as shown in FIG. 15C). The male coupler includes the male insertion feature (e.g., shown in FIGS. 15D and 15E). The cross-sectional shape of the male insertion feature is shaped complementary to the cross-sectional shape of the female aperture (e.g., two ears on opposite sides on a circle, where the two ears are configured to align with a slot). An accessory coupler 1510 includes an accessory coupler aperture (in this exemplary case, also shaped complementary to the female aperture). The accessory coupler 1510 also includes an accessory attachment feature 1512 (in this case, a pair of hinge holes configured to hingedly couple with an accessory).

Figure 15E:
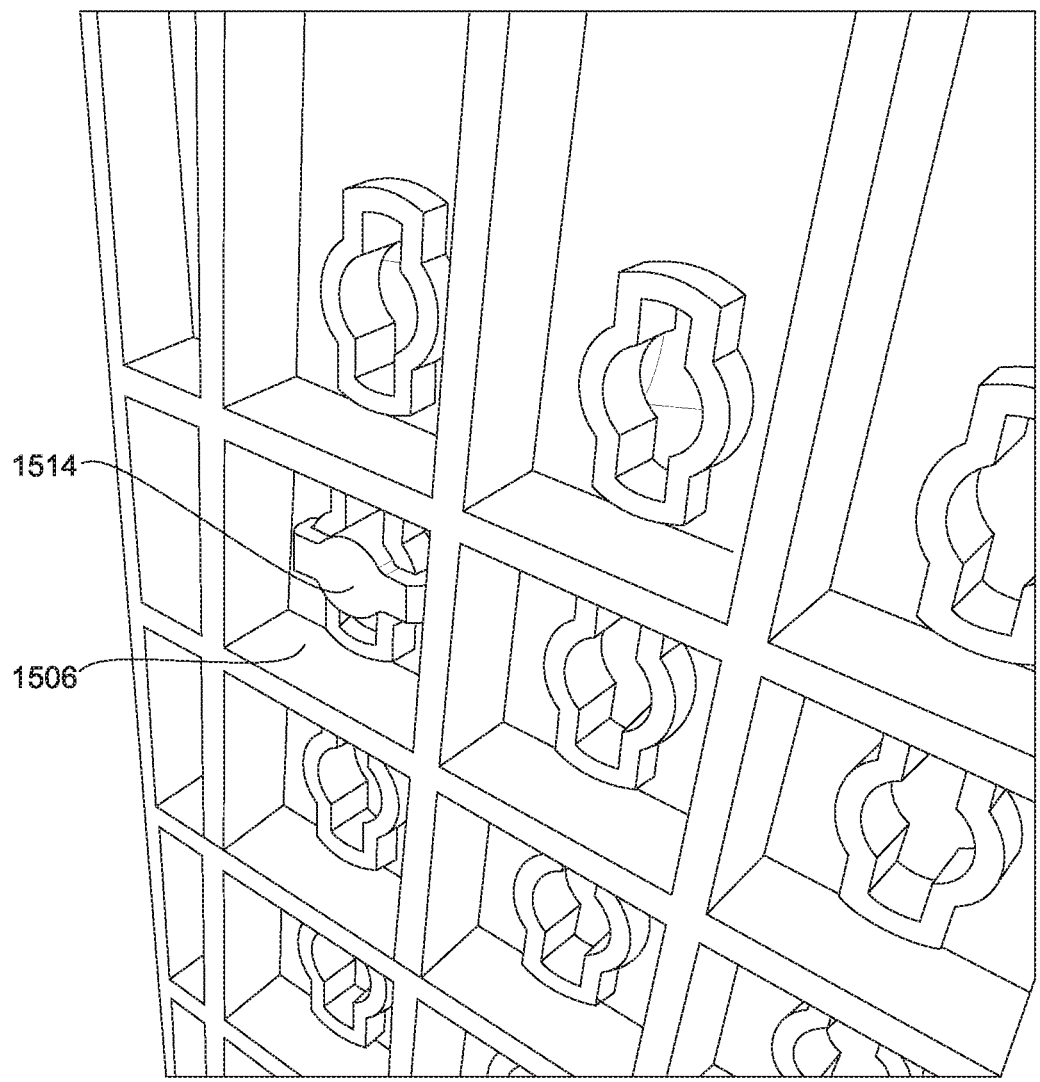
Figure 15F:
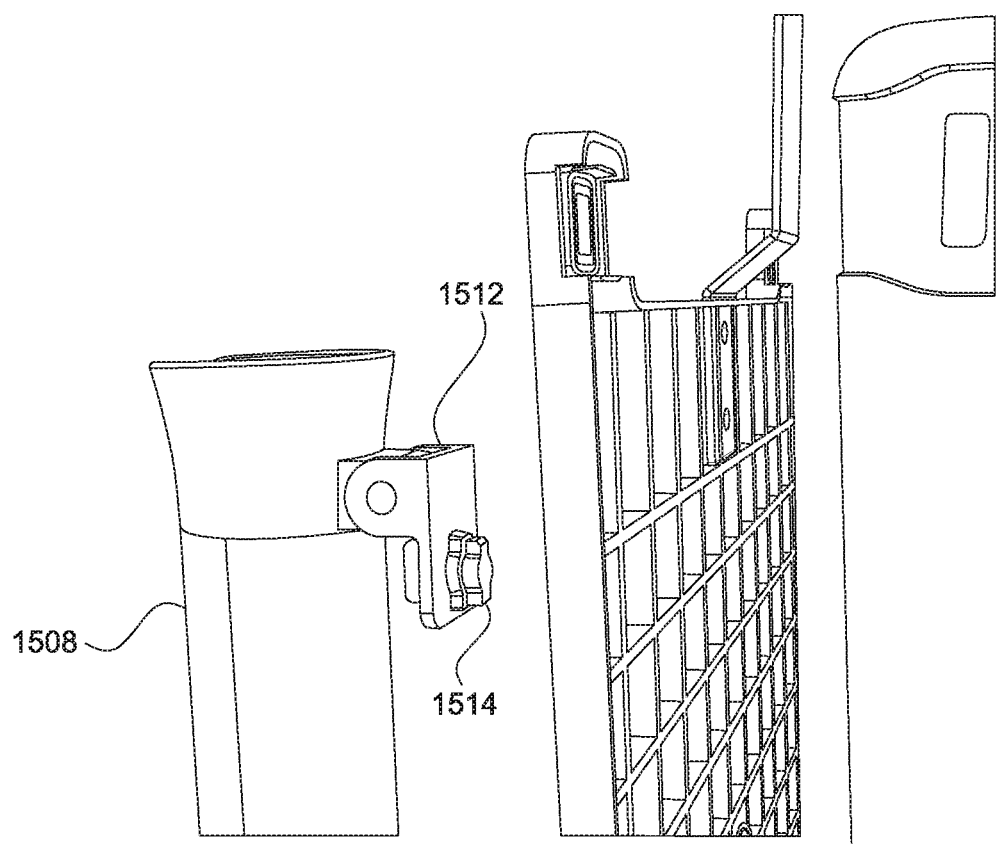

To attach an accessory to the attachment board, the following exemplary process can be followed. First, the aperture of the accessory coupler is properly aligned with the aperture of the board. The accessory coupler may have an elevated surface feature shaped complementary to the aperture (e.g., sized slightly smaller than the aperture, as shown in FIG. 15F), such that the elevated surface feature cooperates with the aperture to aid in alignment of the aperture with the aperture. Once the accessory coupler is properly aligned with and engaged with the board and the aperture, the male insertion feature of the male coupler is inserted into both apertures (of the board and accessory coupler, respectively). In this sense, the accessory coupler is "sandwiched" in between the board and the male coupler. Next, a user may rotate/twist the male coupler using the hand torque/twisting structure about 90° to lock the accessory coupler to the board (as shown in FIG. 15E). This locking is accomplished by the fact that the ears of the male insertion feature are in mechanical compression with the back side of the board once the male coupler has been rotated 90° from the insertion position. As shown in FIG. 15C the accessory coupler may be mechanically coupled/attached to an accessory (in this case, a fishing rod holder 1508). For example, the accessory may include attachment features (such as a hinge coupler) configured to mechanically couple with an associated accessory attachment feature (such as a complementary hinge coupler). Using the male coupler, a user may selectively attach and remove various accessories to a cooler, which may advantageously provide the user with a wide variety of accessory options and increased functionality and utility of the cooler.

Figure 15G:
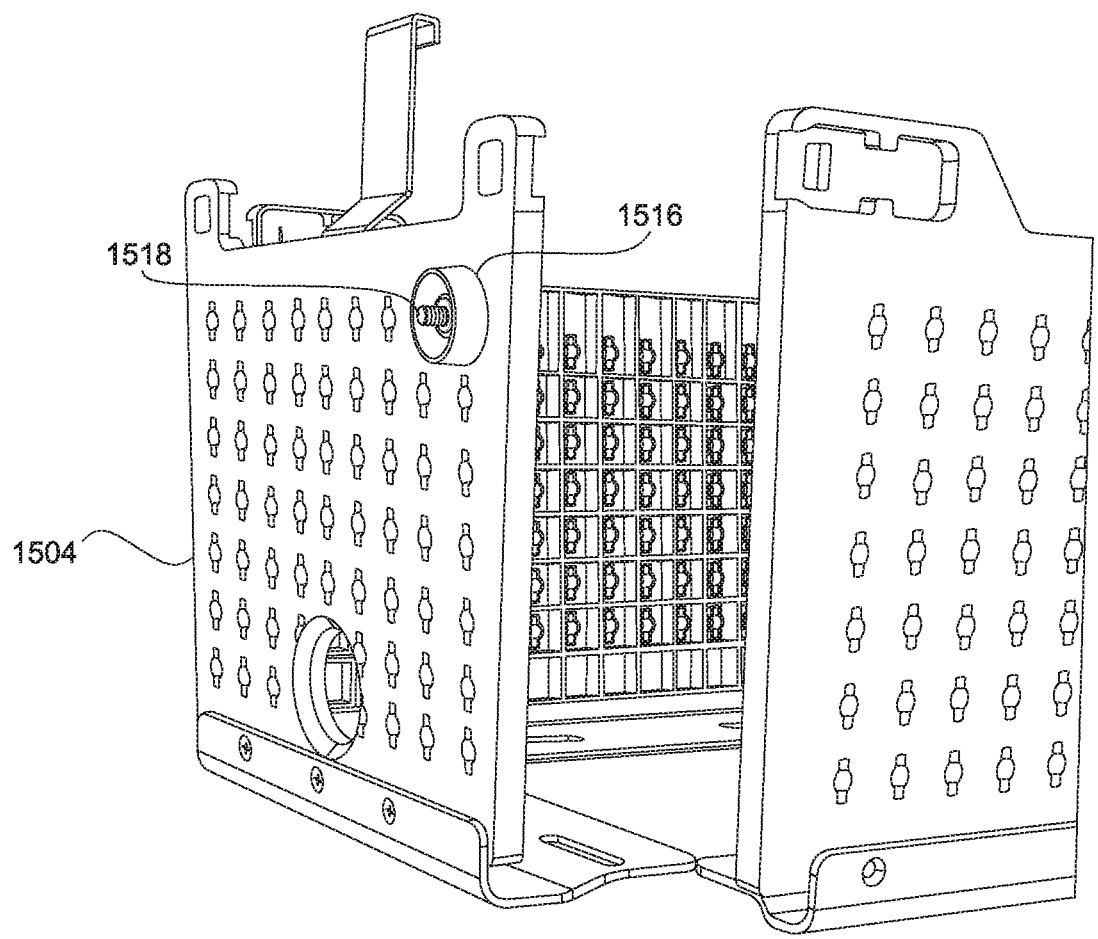
Figure 15H:
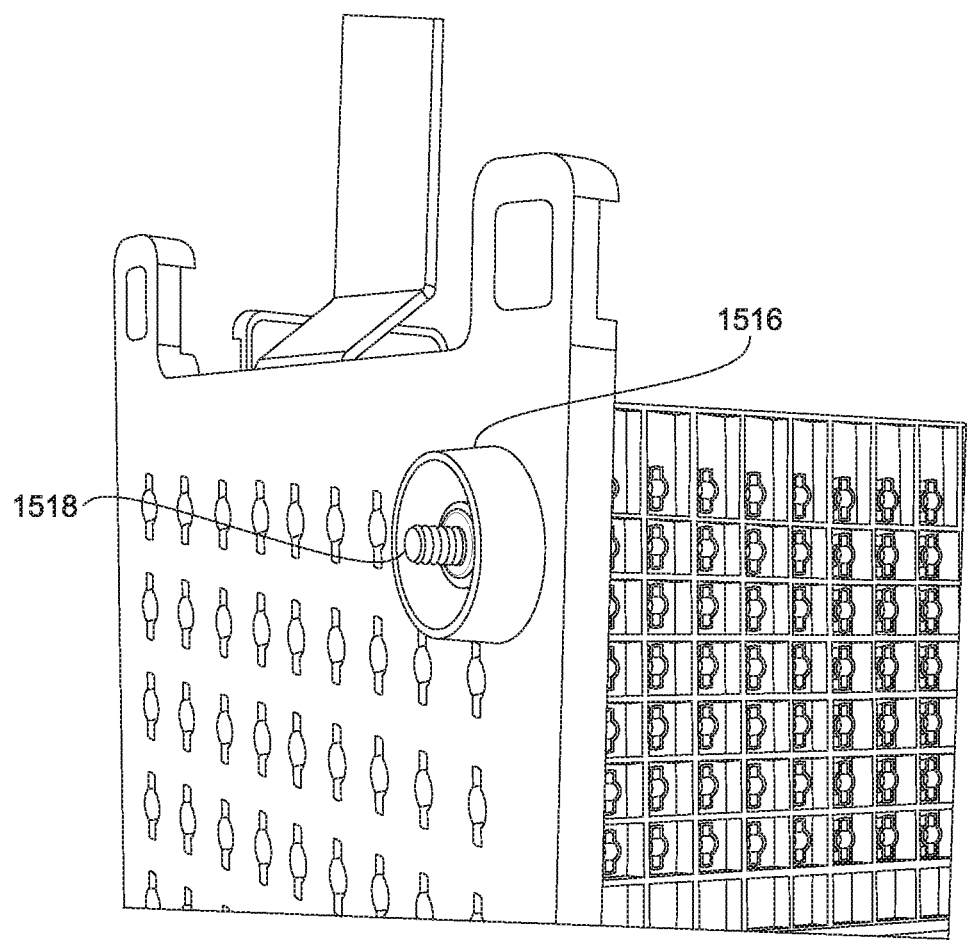

Furthermore, and as shown in FIGS. 15A-15H, the attachment member 1510 may include a male keyed twist-to-lock member 1514 complementary to, and configured to be inserted into and releasably lock with, a keyed aperture 1506. The attachment member 1510 includes an intermediate bracket 1512 configured to be retainingly compressed between the board 1504 and the male keyed member 1514. As shown FIG. 15D, the male member 1514 is properly aligned (keyed) with, and inserted into, the female aperture 1506. As shown in FIG. 15E, the male member 1514 is then rotated 90°, such that the tabs of the male member 1515 are lockingly retained behind the board 1504. In the depicted example the intermediate bracket 1512 is hingedly coupled to the accessory 1508. As shown in FIGS. 15G and 15H, another attachment member 1516 is mechanically and lockingly coupled to the board 1504. The attachment member 1516 includes a threaded member 1518 configured to engage with complementary threads on an accessory to releasably and lockingly attach the accessory to the attachment member 1516.

Figure 16A:
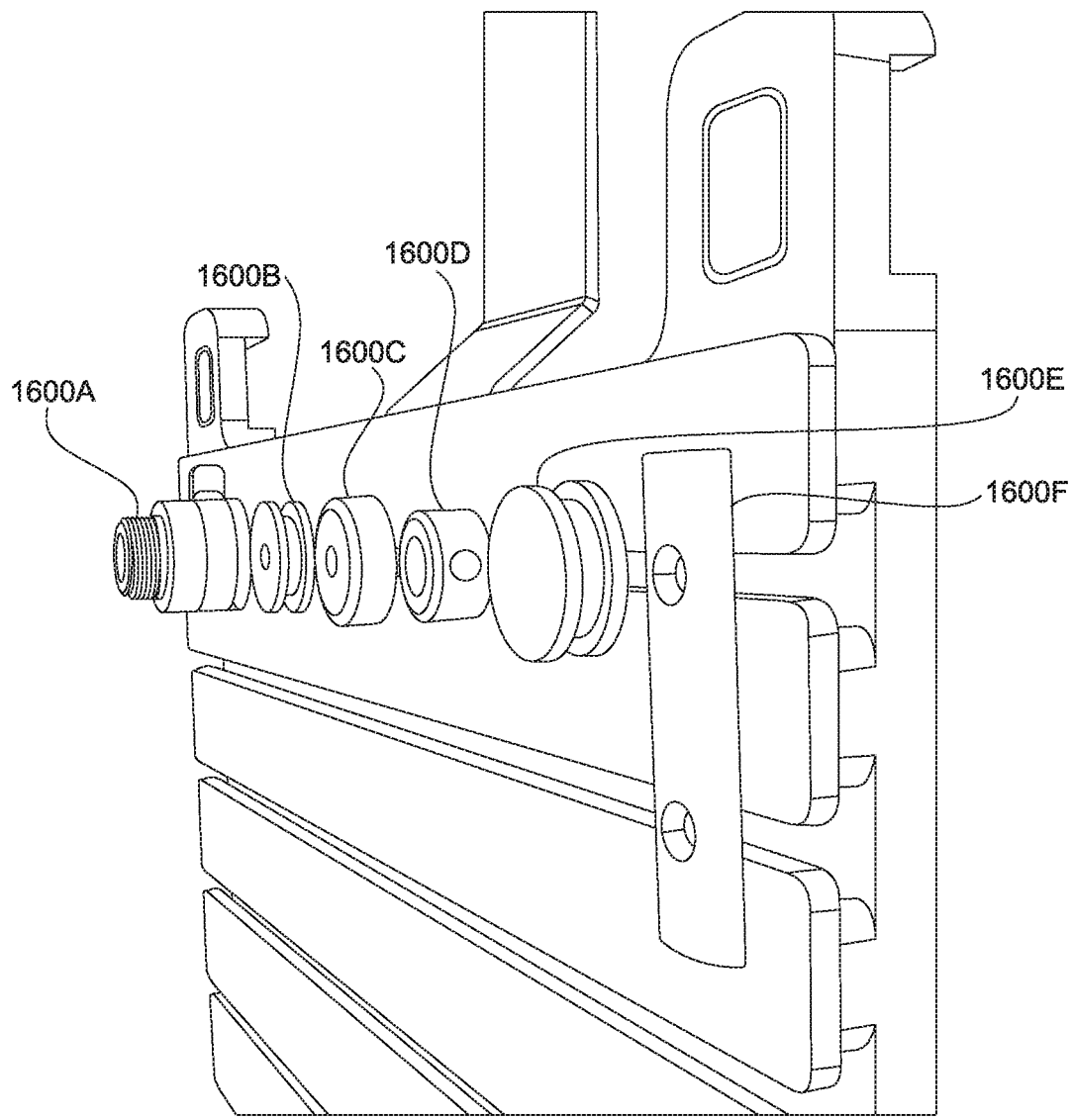
FIGS. 16A-16T depicts various exemplary attachment members for attaching to a sliding rail/channel board.
Figure 16B:
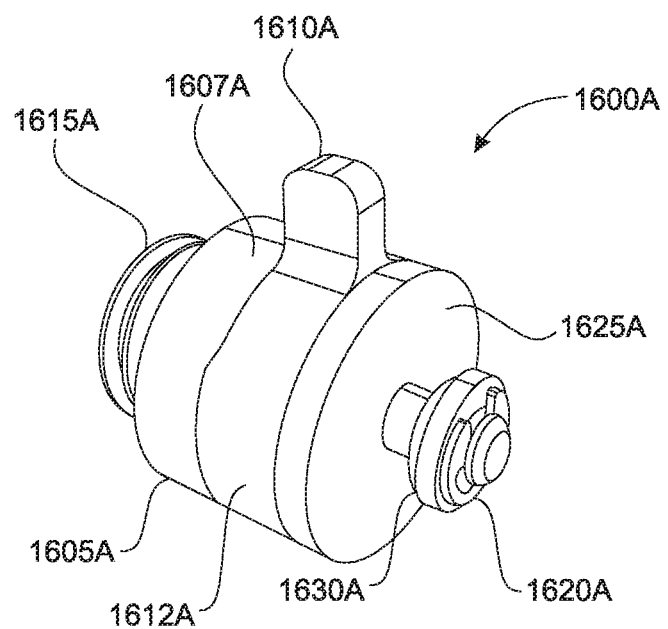
Figure 16C:
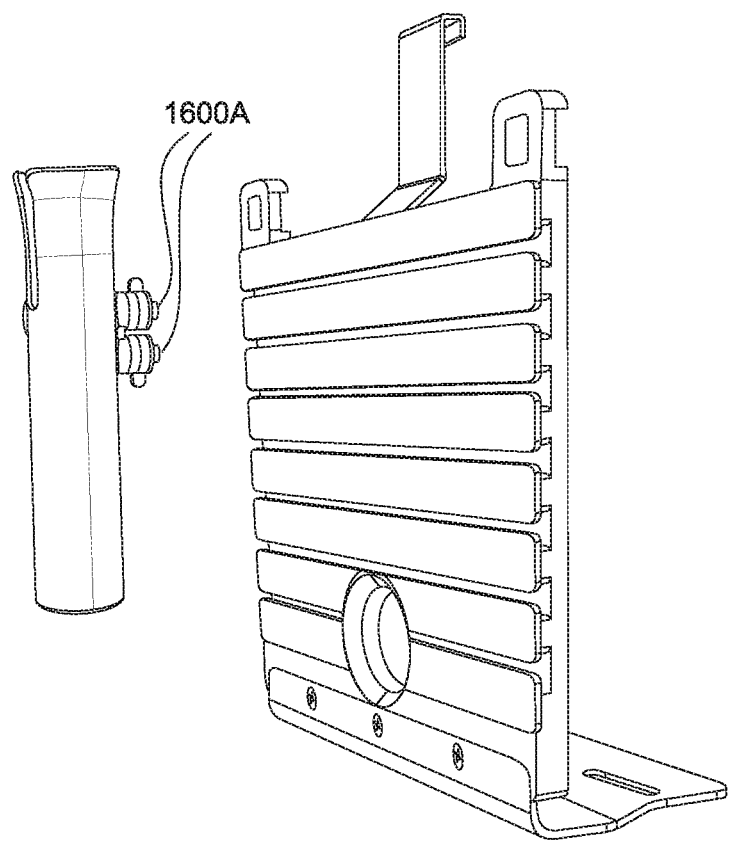
Figure 16D:
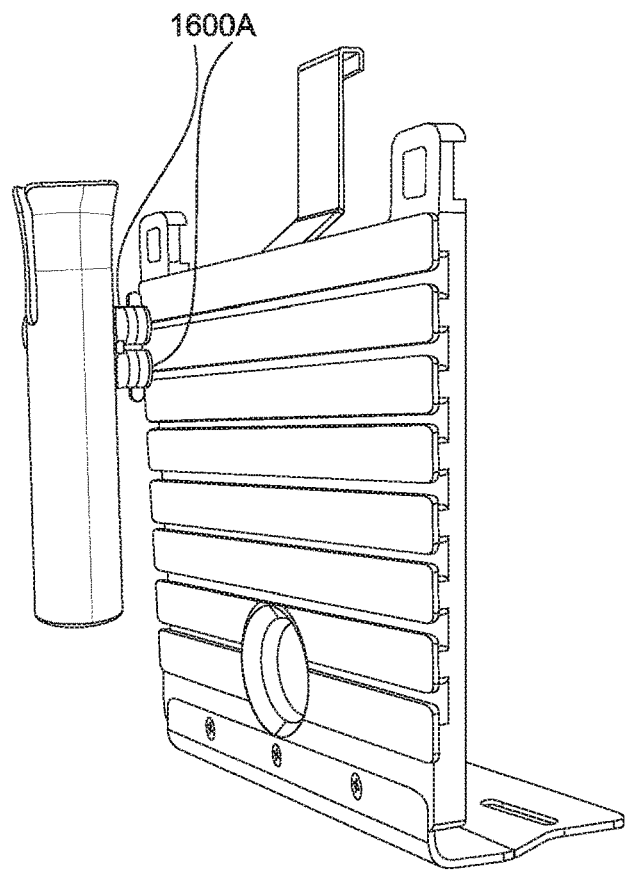
Figure 16E:
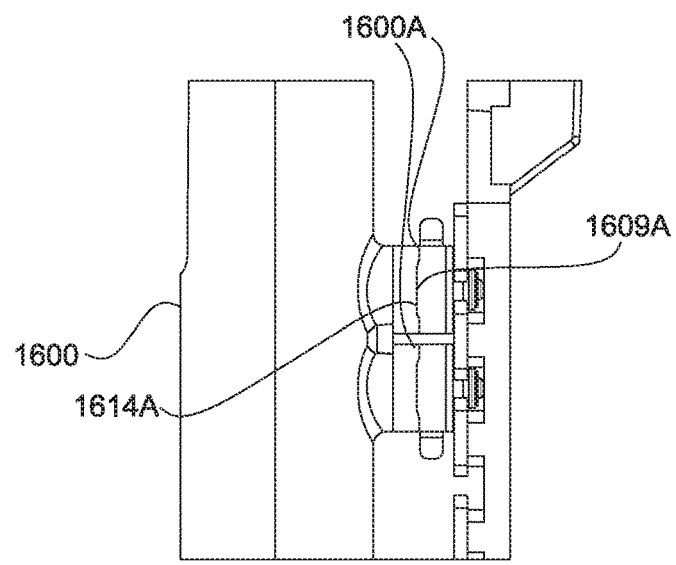
Figure 16F:
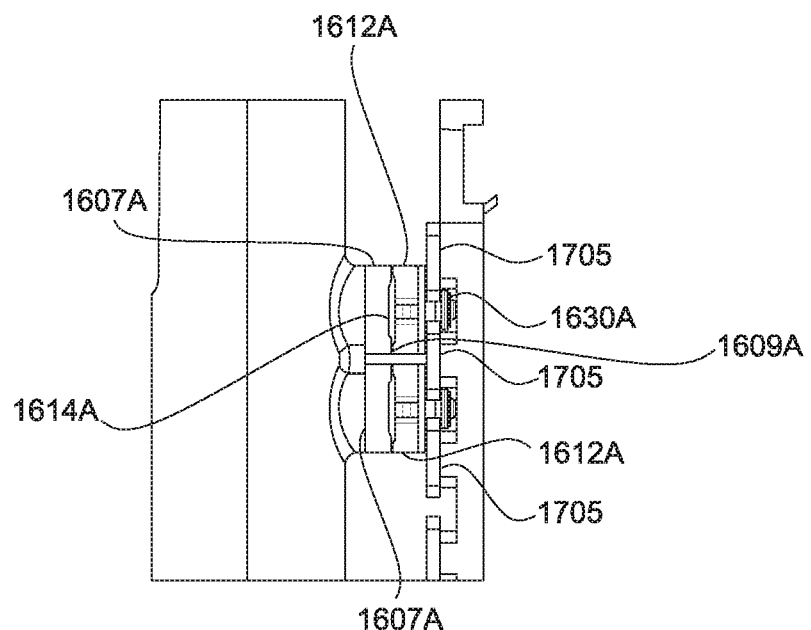
Figure 16G:
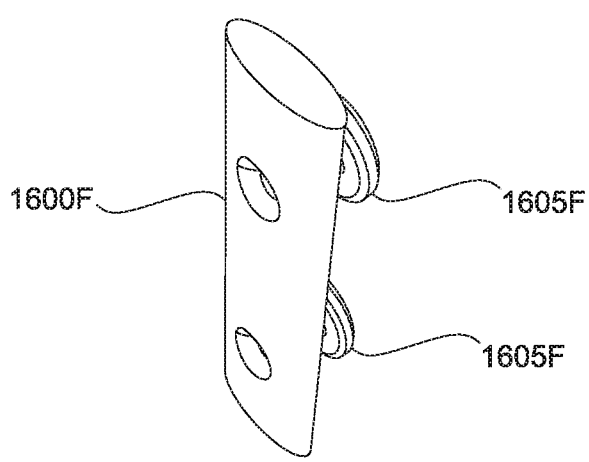
Figure 16H:
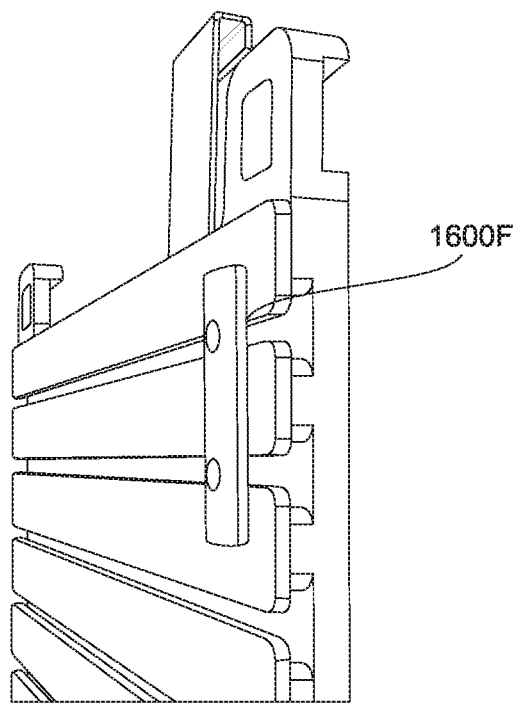
Figure 16I:
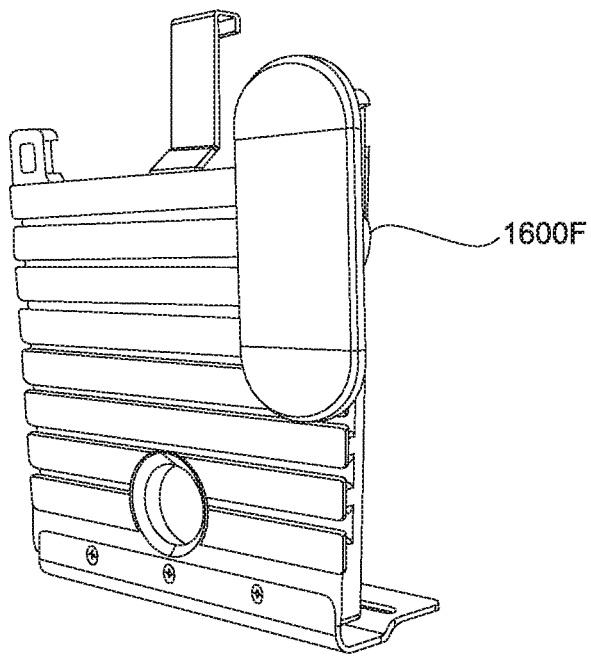
Figure 16J:
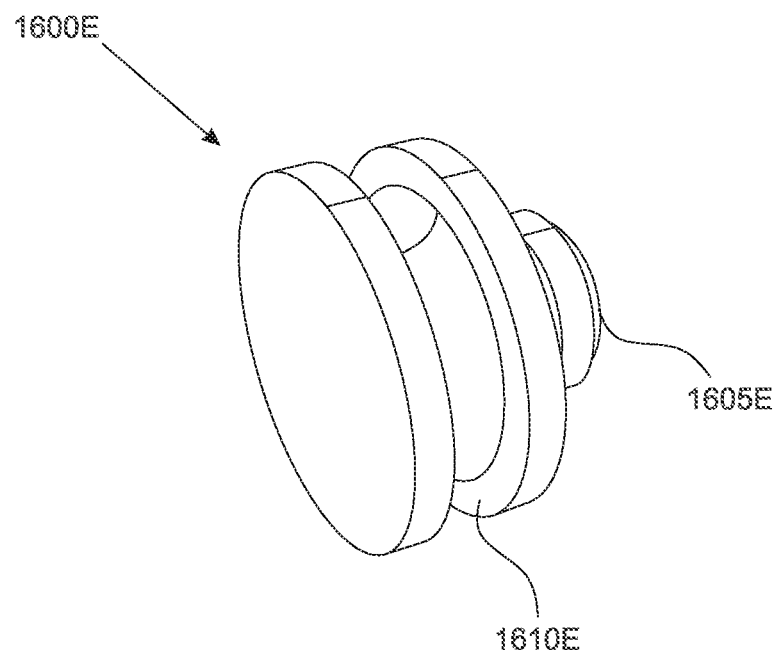
Figure 16K:
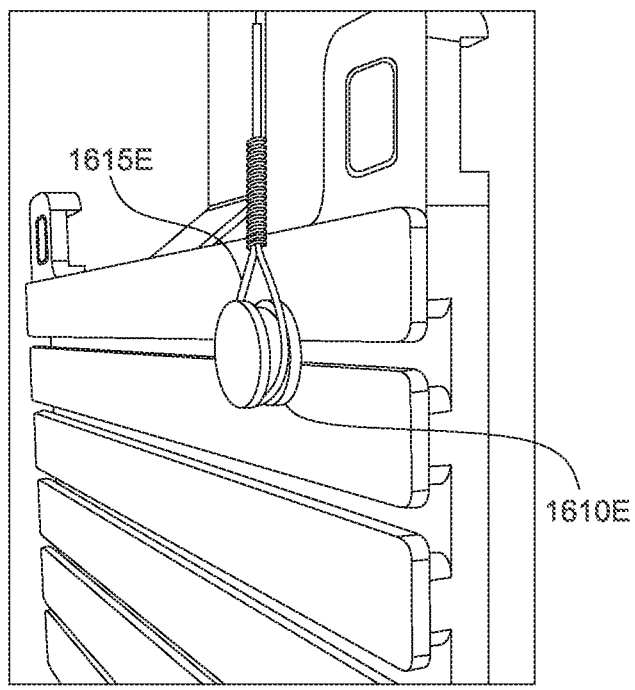
Figure 16L:
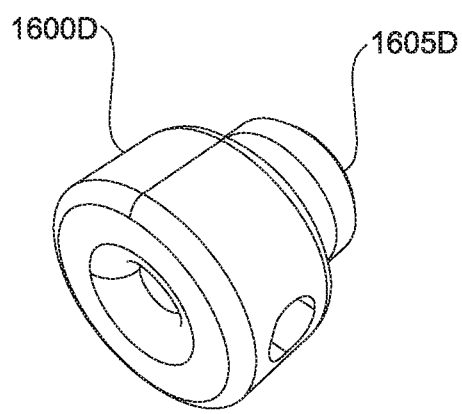
Figure 16M:
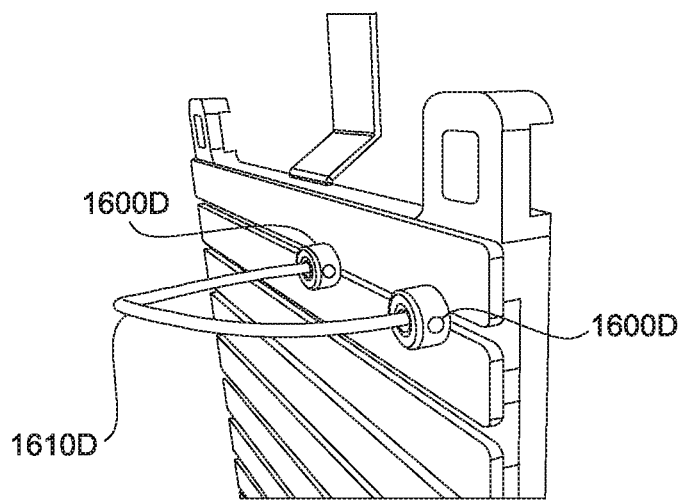
Figure 16N:
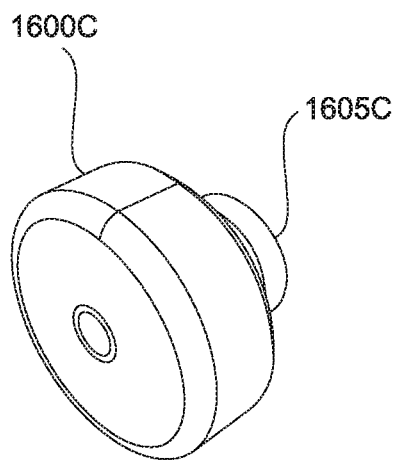
Figure 16O:
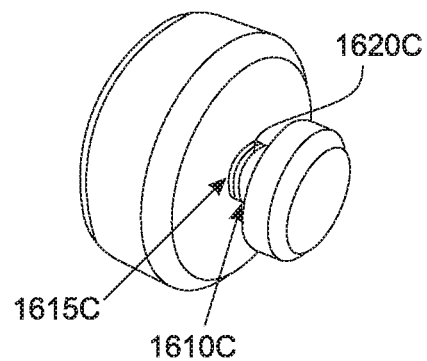
Figure 16P:
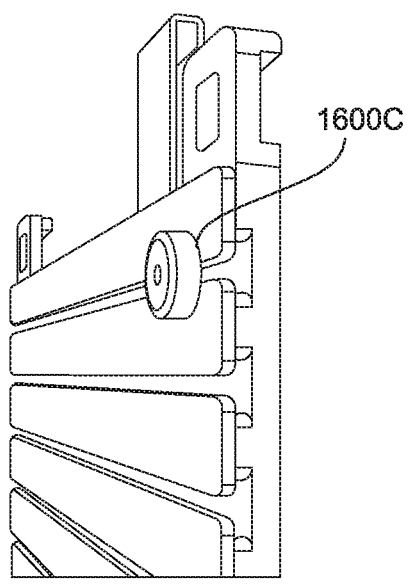
Figure 16Q:
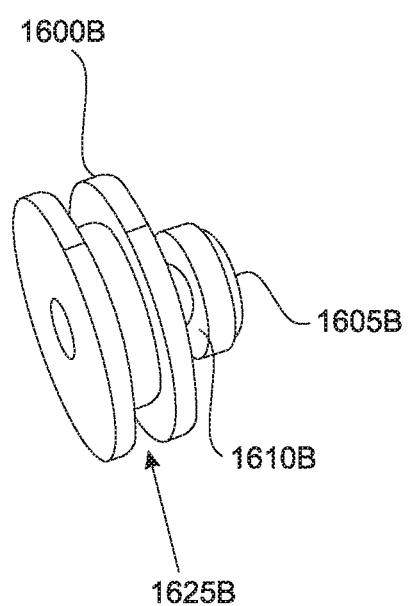
Figure 16R:
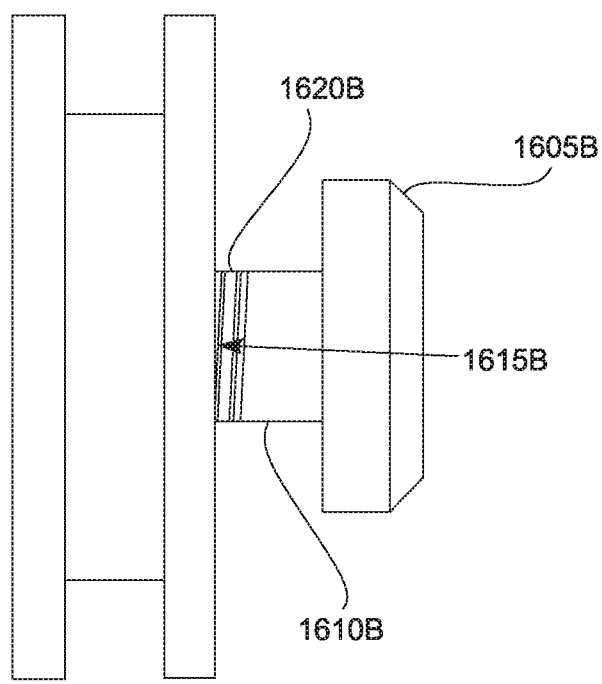
Figure 16S:
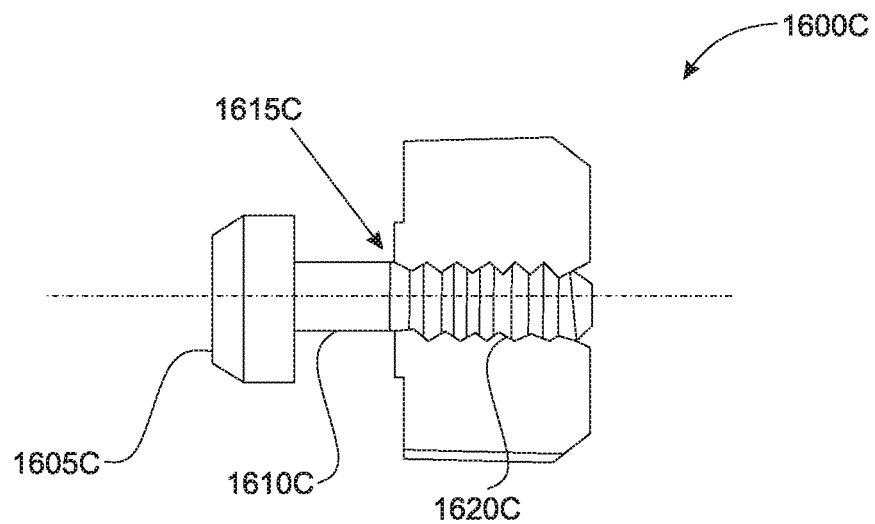
Figure 16T:
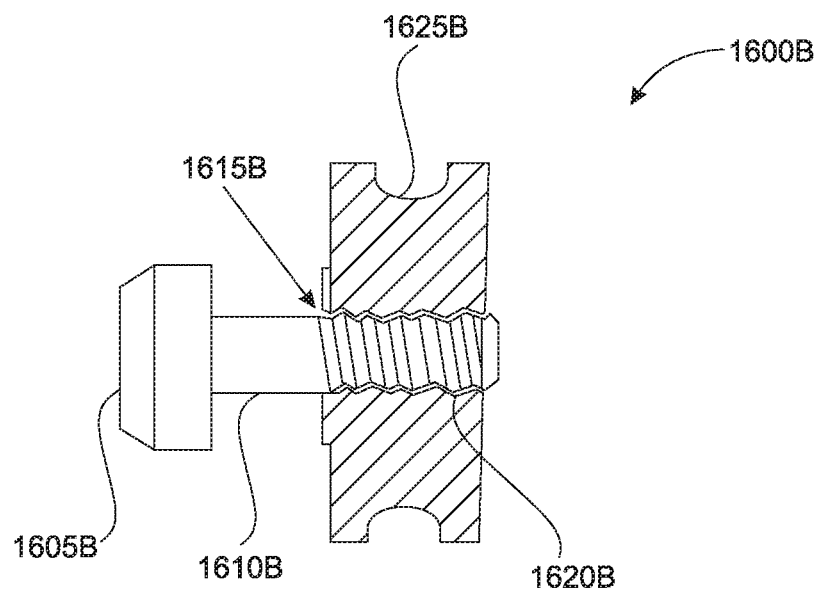
Figure 17A:
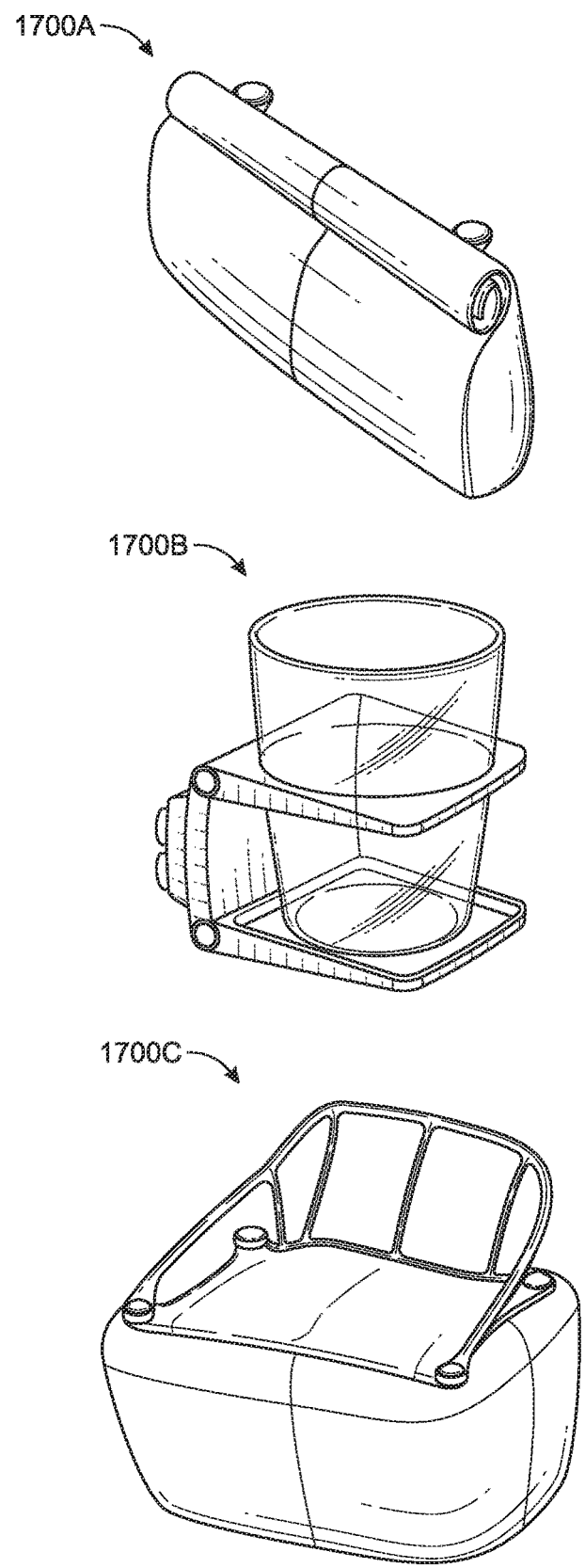
FIGS. 17A-17E depict various exemplary accessories for attaching to a modular accessory attachment chassis.
Figure 17B:
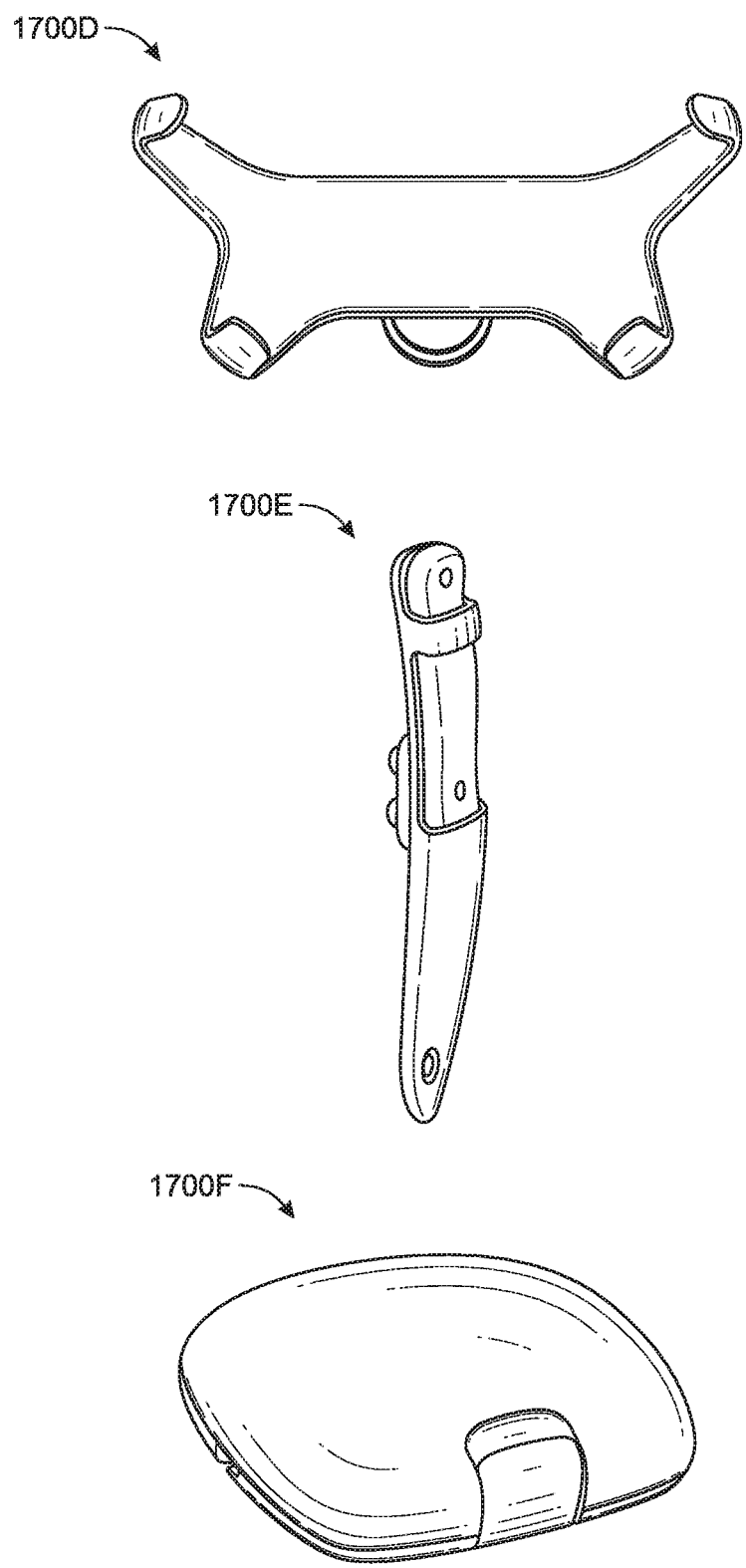
Figure 17C:
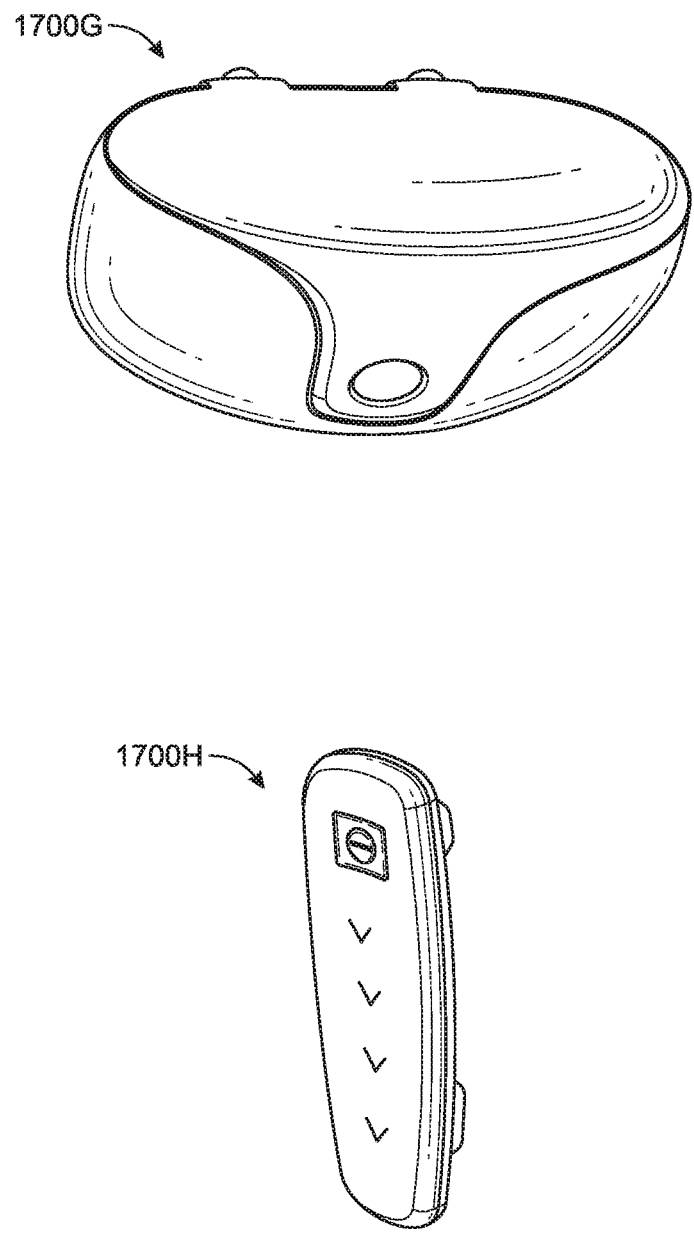
Figure 17D:
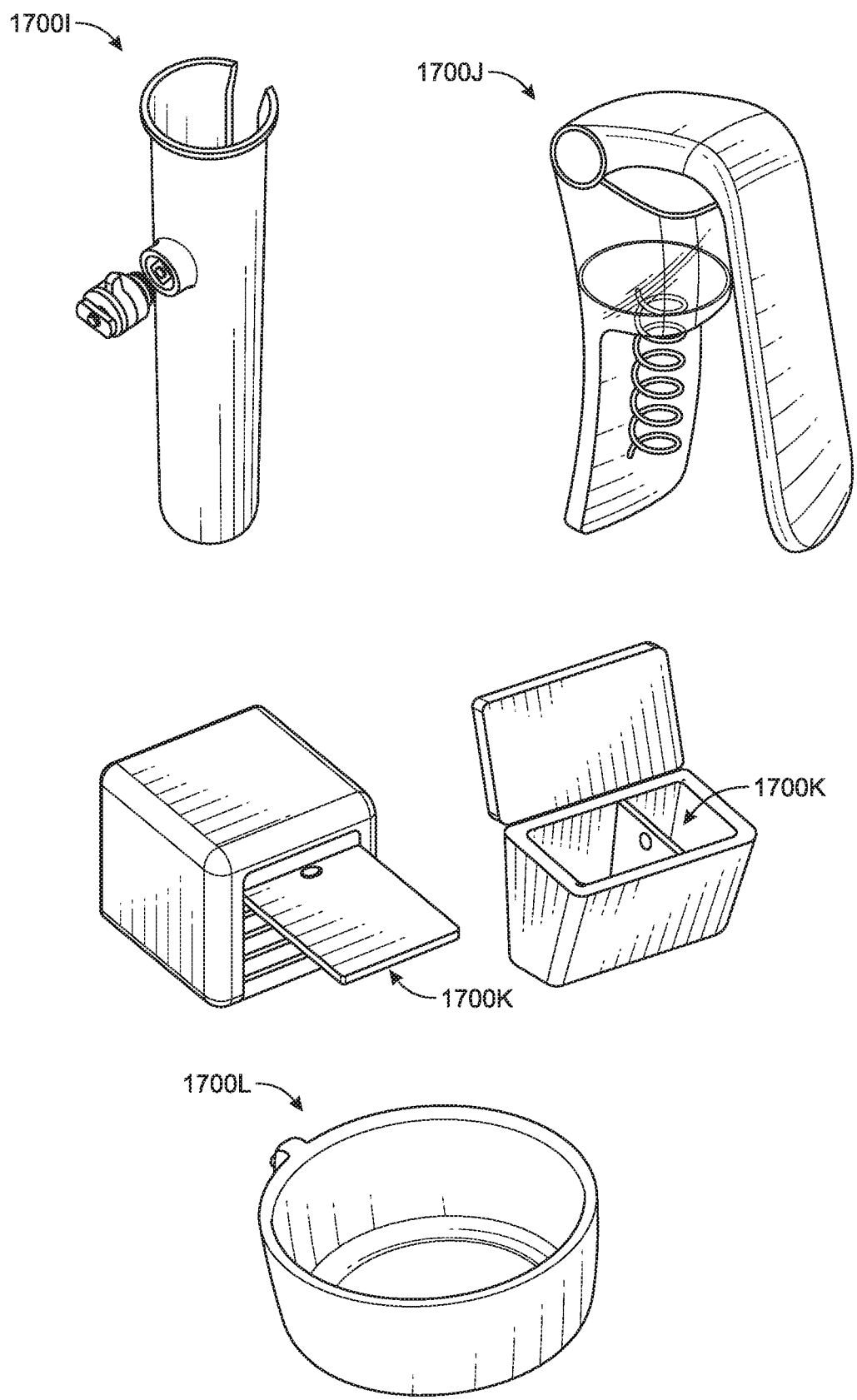
Figure 17E:
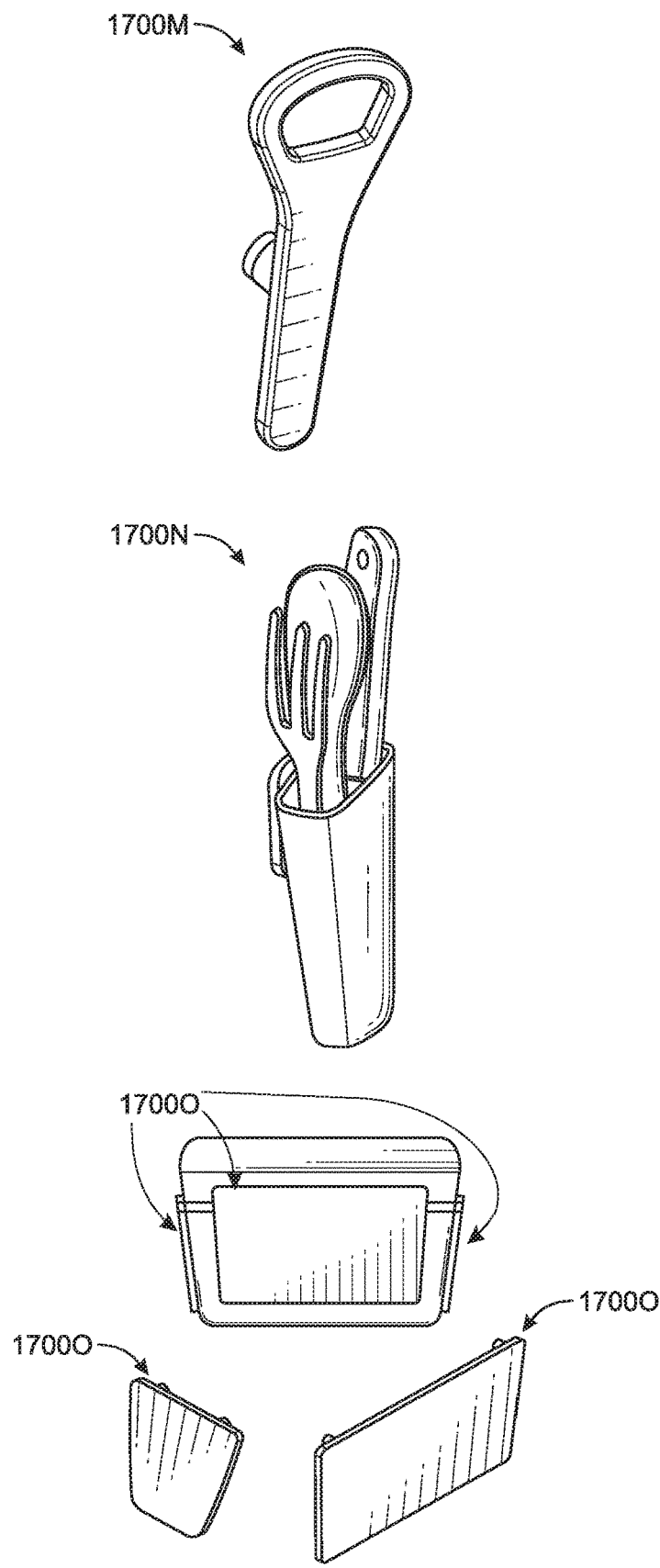

FIGS. 16A-16T depicts various exemplary attachment members for attaching to a sliding rail/channel board. Attachment members 1600A-1600F may be used in conjunction with an accessory to attach the accessory to an accessory attachment board. Some of the attachment members may have various ways of achieving a locking 90 degree turn. For example, a locking 90 degree turn may be achieved through mechanical or automated approach using springs, levers, latches, or clamps. A mechanical or automated approach may put pressure on the connection system to lock clips into place. In various examples, 1600A may be a lever clip (mechanical turn), 1600B may be a mechanical screw, 1600C may be a screw, 1600D and 1600E may be secured via rubber or elastic materials, and 1600F may screw in two grooves for stronger hold for bigger accessory pieces.

FIGS. 16A and 16B depict various aspects and structures of an attachment member 1600A. The attachment member 1600A includes a body 1605A having a finger torque tab 1610A. The body 1605A includes a stationary ring 1607A. The finger torque tab 1610A is integrally formed with a rotatable ring 1612A. At one end of the body 1605A is a threaded end 1615A configured to threadingly couple to an accessory 1300. At the other end of the body 1605A is a slide channel member 1620A configured to be received in a slide channel of an accessory attachment board. The slide channel member 1620A includes a narrow section and a wide section. The body 1605A includes a rail engagement surface 1625A, while the slide channel member 1620A includes its own rail engagement surface 1630A. When slid into a channel of a board (see FIG. 16C to 16D), the rail engagement surface 1625A may engage with an outer facing surface of a rail, while the rail engagement surface 1630A may engage with an inner facing surface of a different rail 1305. By twisting the attachment member 1600A 90° using the tab 1610A, the engagement surfaces 1625A, 1630A are brought into a tight compressive fit with respective rails 1305 (see FIG. 16F).

To illustrate further, FIG. 16E depicts the attachment member 1600A in an untightened or unlocked state, while FIG. 16F depicts the attachment member 1600A in a tightened or locked state. The transition between the untightened/unlocked state and tightened/locked state is achieved when the rotatable ring 1612A is rotated out of keyed alignment with the stationary ring 1607A. For example, the ring 1612A includes a male key surface 1609A, while the ring 1607A includes a female key surface 1614A. As shown in FIG. 16E, the male key surface 1609A is mated with the female key surface 1614A, such that the rings 1607A, 1612A are brought within a minimum distance of each other (e.g., the rings fully engage one another). In this untightened/unlocked state, the attachment member 1600A may be easily slid onto a rail/channel system, as there is sufficient space between the rail engagement surfaces 1625A, 1630A for there to be clearance between the rail engagement surfaces 1625A, 1630A and the rail 1305 (see, e.g., FIGS. 16D and 16E). To transition the attachment member 1600A to a tightened/locked state, the rotatable ring 1612A is rotated 90° out of alignment with the stationary ring 1607A, such that the key surfaces 1609A, 1614A are 90° out of phase with one another (see, e.g., transition from FIG. 16E to 16F). This 90° rotation causes the rings 1607A, 1612A to separate from each other to achieve maximum separation distance from the rings 1607A, 1612A. Maximum separation of the rings causes the rail engagement surface 1625A to translate closer to the rail engagement surface 1630A, which stays stationary relative to the body 1605A and stationary ring 1607A. Accordingly, tightening/locking of the attachment member 1600A may result in the space between the rail engagement surfaces 1625A, 1630A being minimized, such that a rail 1305 located between the surfaces 1625A, 1630A is compressingly/frictionally held between the surfaces 1625A, 1630A to lock the attachment member 1600A to the rail system. In various examples, the rings 1607A, 1612A are spring biased to forcefully engage one another.

FIGS. 16G and 16H depict an attachment member 1600F. The attachment member 1600F includes two slide channel members 1605F configured to be slidingly and retainingly received in two respective channels of a slide channel/rail board. FIG. 16I depicts a larger profile version of the attachment member 1600F.

FIGS. 16J and 16K depict an attachment member 1600E. The attachment member 1600E includes a slide channel member 1605E configured to be slidingly and retainingly received in a channel of a slide channel/rail board (held in place by a compression fit between the attachment member 1600E and rails 1305). The attachment member 1600E includes an annular cord recess 1610E. A cord 1615E may be wrapped/tied around the annular recess 1610E, such that an accessory (e.g., a phone) may be supported by the cord 1615E.

FIGS. 16L and 16M depict an attachment member 1600D. The attachment member 1600D includes a slide channel member 1605D configured to be slidingly and retainingly received in a channel of a slide channel/rail board (held in place by a compression fit between the attachment member 1600D and rails 1305). A stretchable cord 1610D may be fixedly coupled (at opposite ends) to two attachment members 1600D, respectively. Accordingly, an accessory (e.g., a hand-held lighting device) may be placed in the area defined between the cord 1610D and the sliding channel/rail board to couple the accessory to the board.

FIGS. 16N, 16O, and 16S depict an attachment member 1600C. The attachment member 1600C includes a slide channel member 1605C configured to be slidingly and retainingly received in a channel of a slide channel/rail board (held in place by a compression fit between the attachment member 1600C and rails 1305). The attachment member 1600C includes a screw portion 1610C configured to screw into a hole 1615C in the attachment member 1600C. The screw portion 1610C includes threads 1620C to facilitate screwing and tightening of the member 1600C. Accordingly, the attachment member 1600C may compressingly/frictionally hold a pair of rails 1305 when the member 1600C is tightened to attach the attachment member 1600C to a rail/channel board.

FIGS. 16Q, 16R, and 16T depict an attachment member 1600B. The attachment member 1600B includes a slide channel member 1605B configured to be slidingly and retainingly received in a channel of a slide channel/rail board (held in place by a compression fit between the attachment member 1600B and rails 1305). The attachment member 1600B includes a screw portion 1610B configured to screw into a hole 1615B in the attachment member 1600B (e.g., similar to attachment member 1600C). The screw portion 1610B includes threads 1620B to facilitate screwing and tightening of the member 1600B. Accordingly, the attachment member 1600B may compressingly/frictionally hold a pair of rails 1305 when the member 1600B is tightened to attach the attachment member 1600B to a rail/channel board. The attachment member 1600B also includes an annular cord recess 1625B (e.g., similar to attachment member 1600E). A cord may be wrapped/tied around the annular recess 1625E, such that an accessory (e.g., a phone) may be supported by the cord.

FIGS. 16S and 16T depict cross-sectional views of attachment members 1600B and 1600C illustrating the screw portions 1610B, 1610C, and the complementary threads 1620B, 1620C. By tightening (screwing in) the screw portions 1610B, 1610C, the attachment members may be compressingly locked or attached to a rail/channel board to support an accessory (such as a fishing rod holder, for example).

FIGS. 17A-17E depict various exemplary accessories for attaching to a modular accessory attachment chassis. The accessories disclosed in FIGS. 17A-17E may be configured to couple with exemplary attachment members disclosed herein (e.g., from 16A-16T). Although the list of accessories disclosed in FIGS. 17A-17E may be extensive, this list may not be exhaustive. Furthermore, the various accessories, their structures, and what they are made of are merely for purposes of illustration and should not be construed as limiting (e.g., parts may be formed of materials other than plastic or aluminum).

An exemplary attachable accessory includes a dry tool bag 1700A, which may be a soft tool storage bag that folds to close, may be waterproof, and may attach to cooler mod systems with clips. An exemplary attachable accessory includes a cup holder 1700B, which may be made of plastic, and may attach to a modular accessory attachment system with clips. An exemplary attachable accessory includes a seat 1700C, which may be made of vinyl and plastic and may attach to a modular accessory attachment system. An exemplary attachable accessory includes a cellphone holder 1700D, which may be made of plastic and may attach to a modular accessory attachment system with clips. An exemplary attachable accessory includes a knife holder 1700E, which may be made of nylon, plastic, or aluminum and may attach to a modular accessory attachment system with clips. An exemplary attachable accessory includes a dry box 1700F, which may be waterproof, may be made of plastic and may attach to a modular accessory attachment system with clips. An exemplary attachable accessory includes a sunglasses holder 1700G, which may be made of plastic and may attach to a modular accessory attachment system with clips. An exemplary attachable accessory includes an LED light 1700H, which may be made of plastic and aluminum and may attach to a modular accessory attachment system with clips.

An exemplary attachable accessory includes a rod and umbrella holder 1700I, which may be made of plastic and may attach to a modular accessory attachment system with clips. An exemplary attachable accessory includes a wine opener holder 1700J, which may be made of plastic and may attach to a modular accessory attachment system with clips. An exemplary attachable accessory includes a divider/serving table 1700K, which may be made of aluminum and plastic and may attach to a modular accessory attachment system with clips, as well as may be used inside a cooler or other container as a divider. An exemplary attachable accessory includes a dog bowl 1700L, which may be made of rubber and plastic and may attach to modular accessory attachment system with clips. An exemplary attachable accessory includes a bottle opener 1700M, which may be made of plastic and may attach to a modular accessory attachment system with clips. An exemplary attachable accessory includes a silverware holder 1700N, which may be made of plastic and may attach to a modular accessory attachment system with clips. An exemplary attachable accessory includes wraps for coolers 17000, which may be made of plastic and nylon and may use an adhesive to attach to coolers or other containers.

Although various embodiments have been described with reference to FIGS. 1A-17B, other embodiments are possible. For example, various embodiments may be used with devices other than coolers. For example, an accessory attachment board may be employed with a golf cart or a bait bucket. Various examples may include elevated rails on the cooler with elongated female attach points (e.g., 2 or 3 rails per side). Various cooler attachments may have, in some embodiments, elongated male attach points that fit into the female attach points on the cooler. Once the male attachment is fitted into the female attach point, the male attachment may click to the right/left, so that it cannot come out until clicked to the left/right. Multiple attachments/accessories may beneficially allow users to customize a cooler to their owner preferences. Fishing accessories may include: rod holder, bait tank pump, wheels, dry box, dry storage tray, grip attachment to stand on top of cooler and fish, special tool holders—fishing line, boca grips, knives. "Soccer mom"/Outdoorsman accessories may include: seat cushion, wheels, cutting board, drink holder, bottle opener, flashlight, dry rack basket, side table, cooler separator, umbrella holder. Beachgoer accessories may include: umbrella holder, phone holder, waterproof bluetooth speaker, bottle opener, solar charger, towel straps. A cooler handle may include a rack to place and attach small garbage bag, for example. In some examples, an attachment system may be permanently fixed or integrated with a cooler. An attachment system may be used with a cooler, where the attachment system may be modular and configured to attach/detach to/from the cooler. Coolers may be customized based on color, attachments, and function, for example. A locking/attachment/wheel/chassis system may be used in conjunction with existing brands of coolers that are already being sold on the market.

Figure 18A:
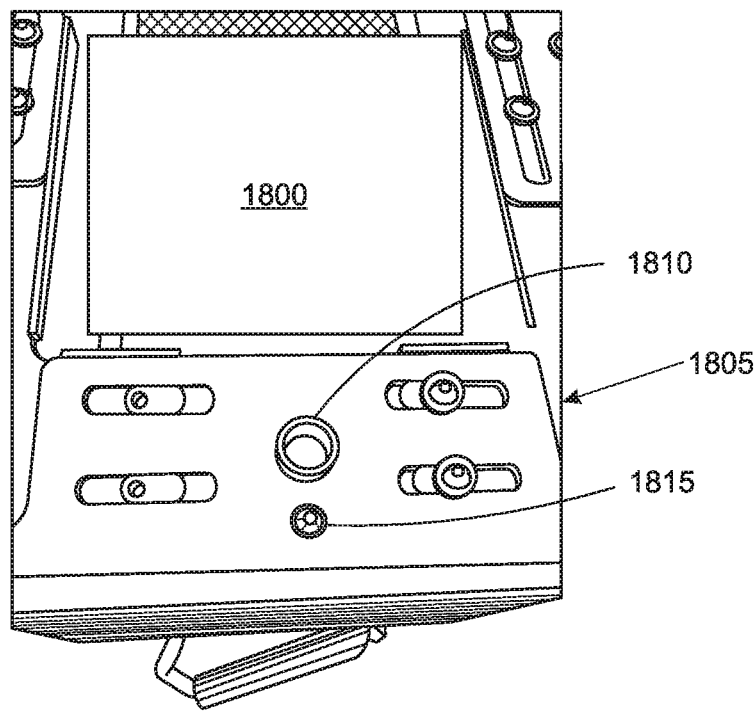
FIGS. 18A and 18B depicts various views of a cart/cooler/exoskeleton undercarriage underside and attachable dual-mode axle.
Figure 18B:
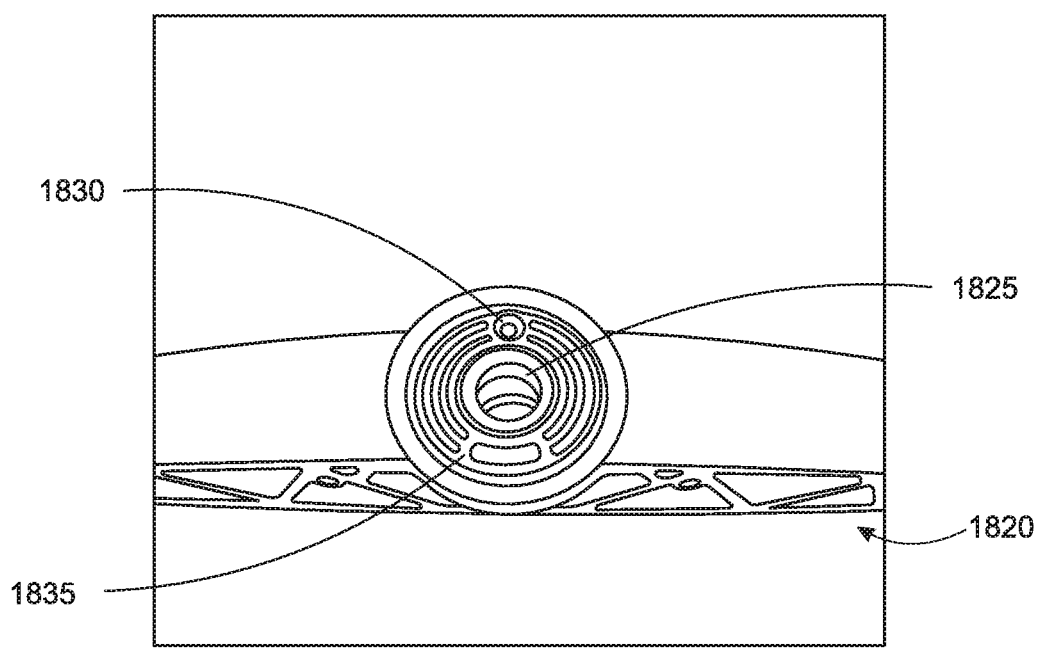

FIGS. 18A and 18B depicts various views of a cart/cooler/exoskeleton undercarriage underside and attachable dual-mode axle. Attached to a cooler 1800 is an exoskeleton undercarriage 1805. The undercarriage 1805 includes a threaded axle coupler 1810. The coupler 1810 may cooperate with a nut to mechanically couple an axle 1820 to the undercarriage 1805. This exemplary coupler 1810 includes inner threads to threadably engage with a nut. The undercarriage 1810 also includes a vertically extending protrusion 1815. The protrusion is configured to be received in either the aperture 1830 or the curved channel 1835 of the axle 1820. For example, in a first mode, when the axle 1820 is installed with the aperture 1830 receiving the protrusion 1815, the axle 1820 may be in a fixed orientation relative to the undercarriage 1805 (e.g., the axle may be limited to a purely lateral extending orientation and be prohibited from rotating about the coupler 1810). In a second mode where the axle 1820 is installed with the channel 1835 receiving the protrusion 1815, the axle may be allowed to rotate about the coupler 1810, such that wheels attached to the axle 1820 may be able to change direction within a limited range (e.g., limited by the length of the channel 1835). In this sense, the axle 1820 may be configured in two possible modes (fixed vs. rotating), thus functioning as an attachable/removable dual-mode axle. Put another way, the circular system of the axle 1820 rotates left/right if it is installed in the second mode, and stays stationary relative to the undercarriage 1805 if it is installed in the first mode.

FIGS. 19A-19E depict top perspective, bottom perspective, and front elevation views of an exemplary cooler device having an external sliding rail/channel attachment system. A cooler device 1900 includes multiple horizontally-extending rails 1905 defining channels 1910 that may be used to connect various accessories to the outside of the cooler 1900. Examples of sliding rails/channels for use in attaching modular accessories to a container may be found, for example, in U.S. Provisional Application Ser. No. 62/809,365, titled "Modular Attachment and Accessory System for Containers," filed by William Jason Cohen, et al., on Feb. 22, 2019, the entire contents of which is incorporated herein by reference.

Figure 19A:
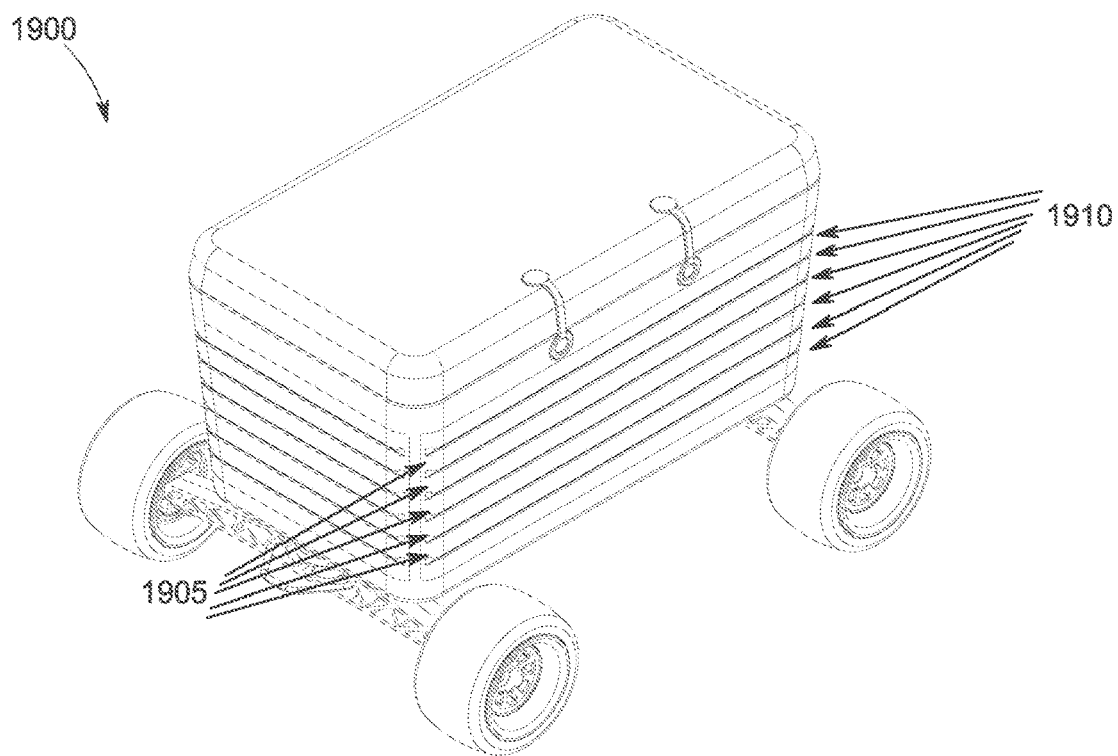
FIGS. 19A-19E depict top perspective, bottom perspective, and front elevation views of an exemplary cooler device having an external sliding rail/channel attachment system.
Figure 19B:
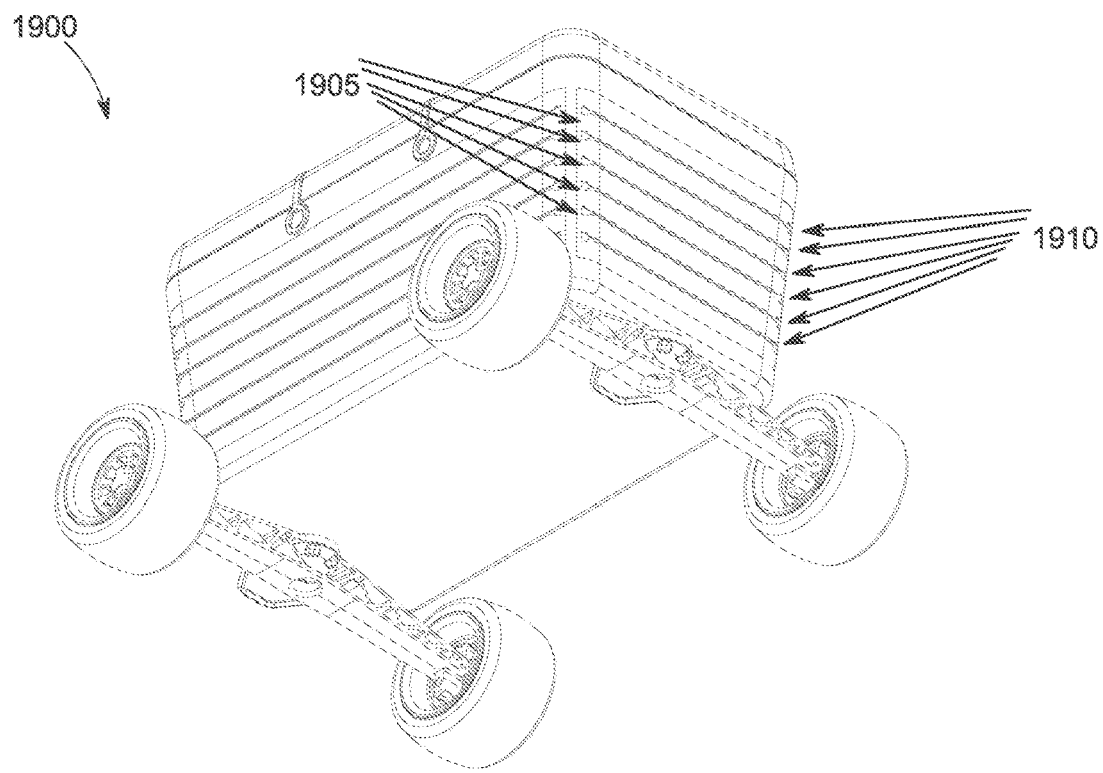
Figure 19C:
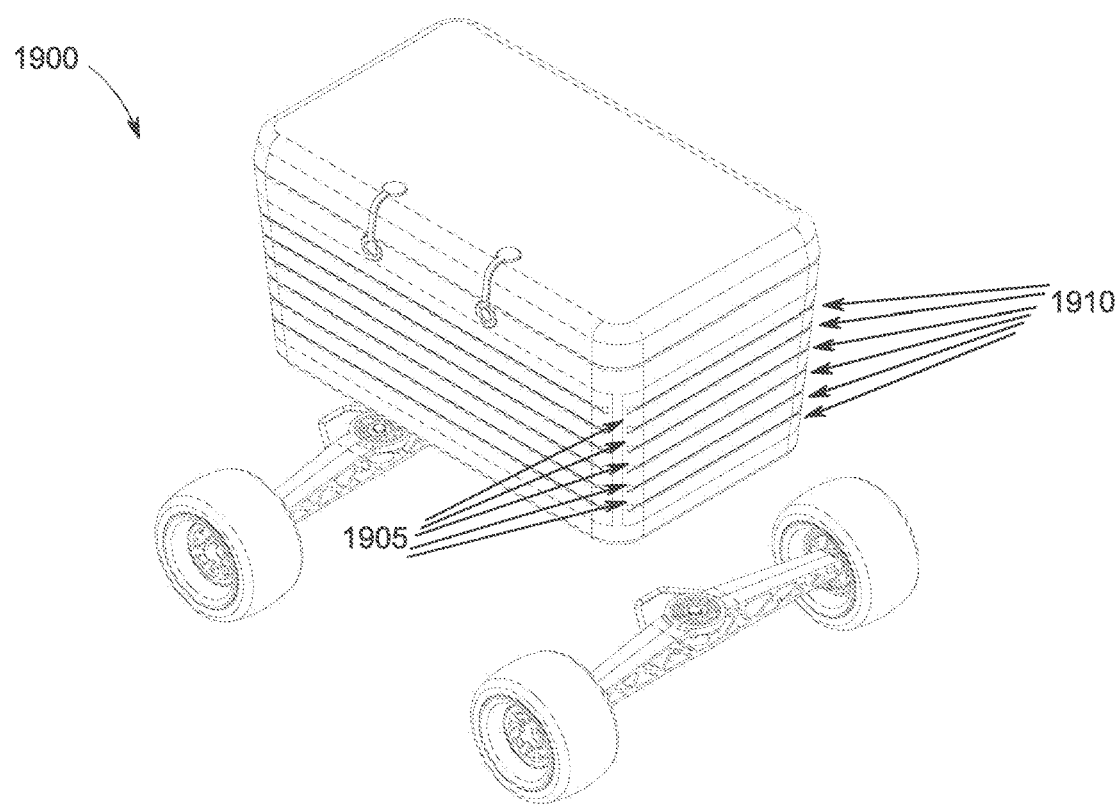
Figure 19D:
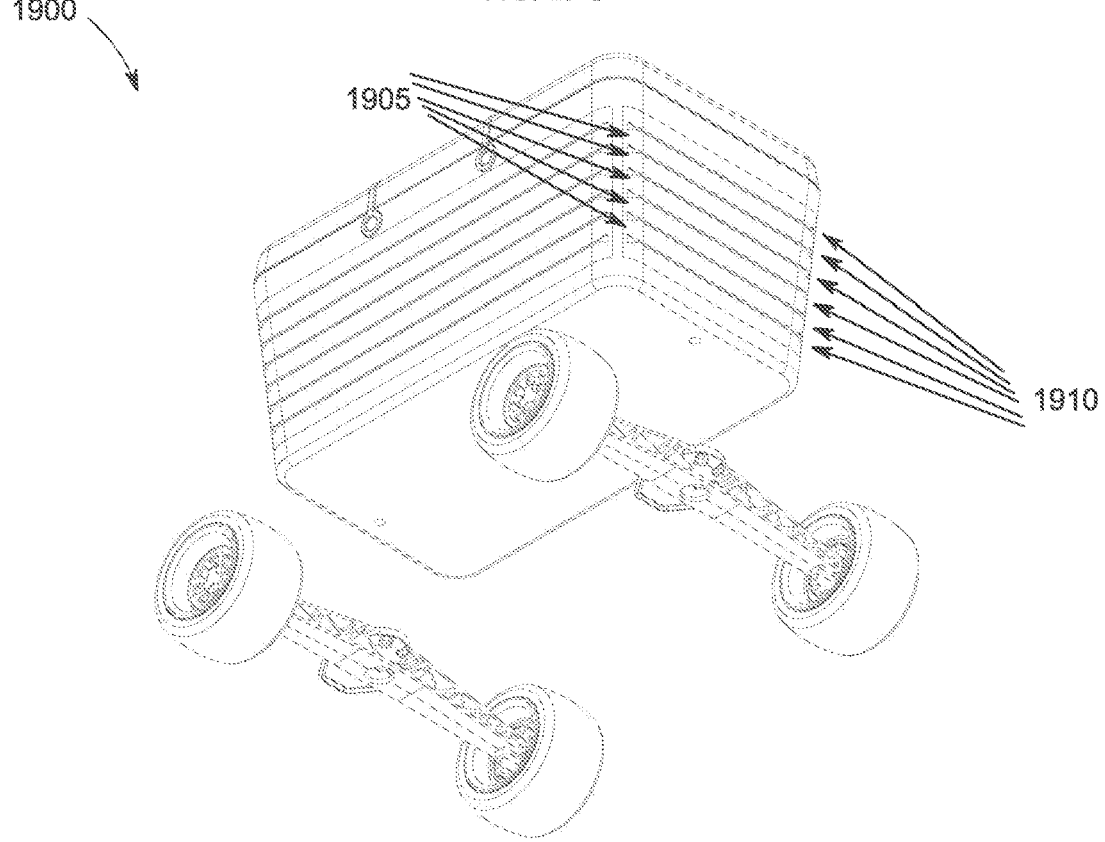
Figure 19E:
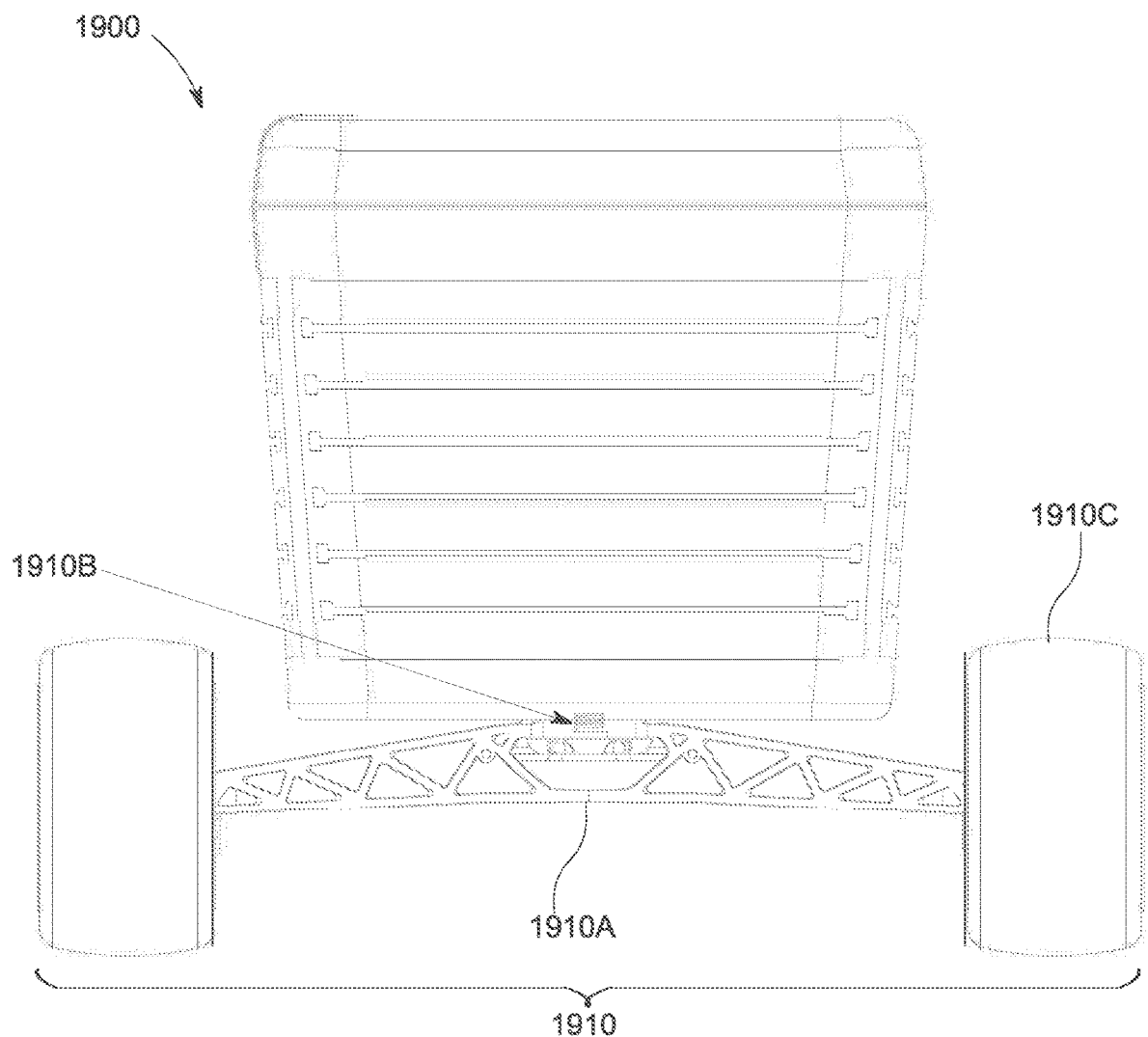

FIG. 19E depicts a front elevation view of an exemplary cooler device 1900 illustrating attachment/detatchment of a wheel and axle system 1910. A cooler may have a detachable axle 1910A that operably couples wheels to the cooler 1900. The axle 1910A may couple to the bottom of the cooler 1900 via a nut 1910B that screws into a threaded screw hole (not shown) in the cooler 1900. In the exemplary depiction, there is a front hole at the front of the cooler and a back hole at the back of the cooler for mounting a total of two axles 1910A and four wheels 1910C to the cooler 1900.

FIGS. 20A-20D depict elevation and perspective views of an exemplary bait bucket device having an external sliding rail/channel attachment system. A bait bucket device 2000 includes multiple horizontally-extending rails 2005 defining channels 2010 that may be used to connect various accessories to the outside of the bait bucket 2000. The bait bucket 2000 may be similar in many respects to the bait bucket 400 depicted in FIG. 4 (e.g., having a bucket body, a bucket lid, wheels, and a handle).

Figure 21A:
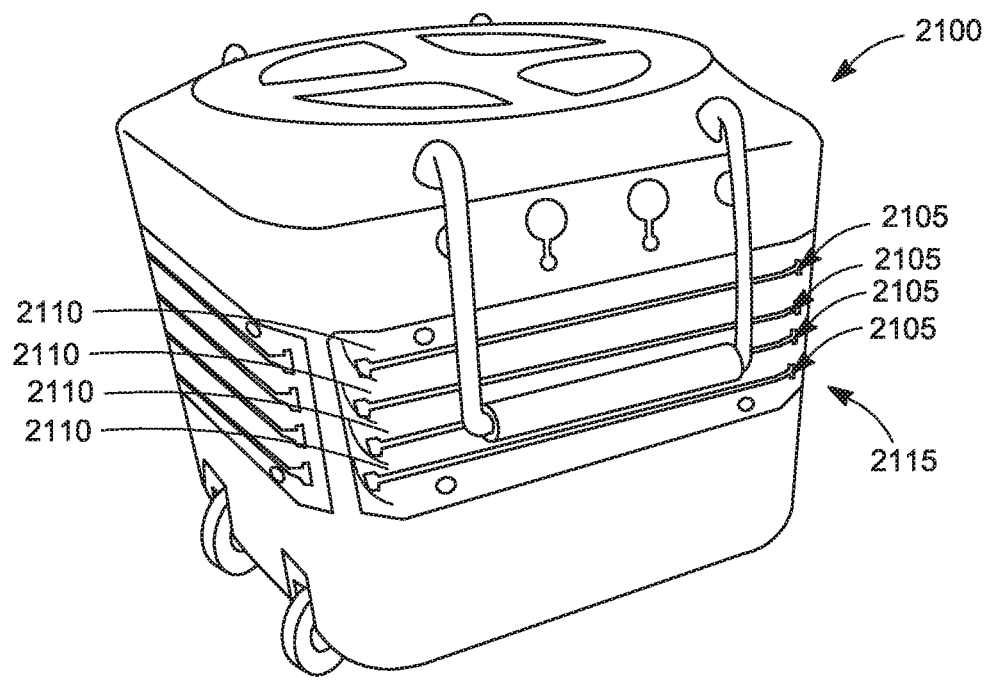
FIGS. 21A-21H depict various views of an exemplary bait bucket device having an external sliding rail and channel attachment system.

FIGS. 21A-21H depict various views of an exemplary bait bucket device having an external sliding rail and channel attachment system. FIG. 21A depicts atop perspective view of an exemplary bait bucket device 2100 having an external sliding rail and channel attachment system 2115. The bait bucket 2100 is a multi-functional device used as a water container to store (live) bait, and also as a hub to which multiple accessories may be releasably coupled. In this exemplary depiction, the bait bucket 2100 includes at least one channel 2105 defined by a pair of rails 2110, that form a mechanical coupling feature to which a modular accessory (such as a fishing rod or umbrella holder, for example) may advantageously be attached. Containers (such as coolers and bait buckets) employing external sliding rail/channel attachment systems may be found, for example, in U.S. Provisional Application Ser. No. 62/809,365, titled "Modular Attachment and Accessory System for Containers," filed by William Jason Cohen, et al., on Feb. 22, 2019, and in U.S. Provisional Application Ser. No. 62/862,526, titled "Modular Attachment And Accessory System For Cooler, Bait Bucket, And Cart Devices," filed by William Jason Cohen, et al., on Jun. 17, 2019, the entire contents of which are hereby incorporated by reference. Modular accessories (e.g., found in U.S. Provisional Application Ser. No. 62/809,365) may also be attached to the channel and rails 2105, 2110 of the bait bucket 2100. The channel and rails 2105, 2110 in this exemplary embodiment include four channels 2105 and eight rails 2110 on the front, right, and left sides of the bait bucket 2100.

Figure 21B:
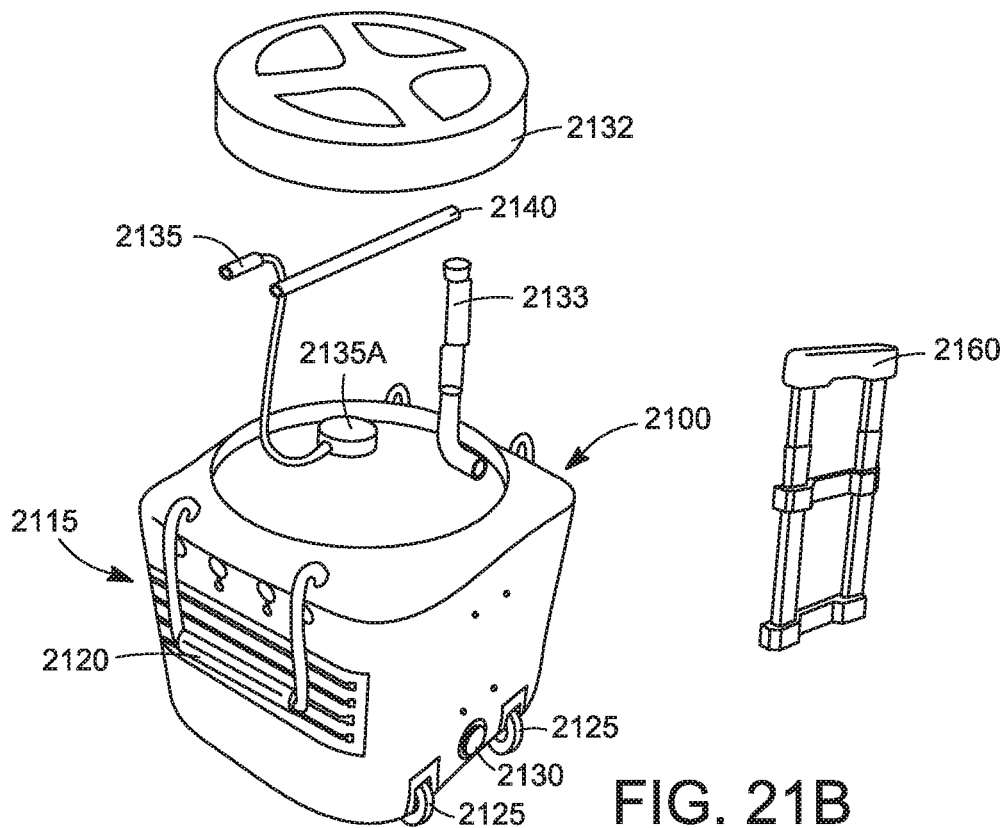

FIG. 21B depicts a rear top perspective (and partially exploded) view of an exemplary bait bucket bait bucket device having an external sliding rail and channel attachment system 2115, illustrating various external features and internal contents of the bait bucket device. The bait bucket includes a "stripe system" 2115 that is formed by the channels 2105 and the rails 2110 to which modular accessories (e.g., a cellphone holder) may be attached. The bait bucket 2100 includes a pair of side handles 2120 used to transport the bait bucket 2100. The bait bucket includes a pair of wheels 2125 on opposing bottom edges of the bait bucket 2100. The bait bucket 2100 includes a drain port 2130 near the bottom of the bait bucket 2100. The inner contents of the bait bucket 2100 may be accessed by removing a lid 2132 of the bait bucket 2100.

The inner contents of the bait bucket 2100 include a telescoping water leveling conduit/tube 2133 (also referred to as an "air/water-out conduit"), which may be operably coupled to the drain port 2130. The inner contents of the bait bucket 2100 include an air-in conduit/line 2135 and associated aeration unit 2135A (such as an aeration stone, for example). The inner contents of the bait bucket 2100 include a water-in conduit/line 2140 for delivering an external supply of water into the bait bucket 2100. The bait bucket 2100, along with the inner contents of the bait bucket 2100 (and perhaps other parts such as various attached modular accessories) may be referred to herein as a "bait bucket system."

Figure 21C:
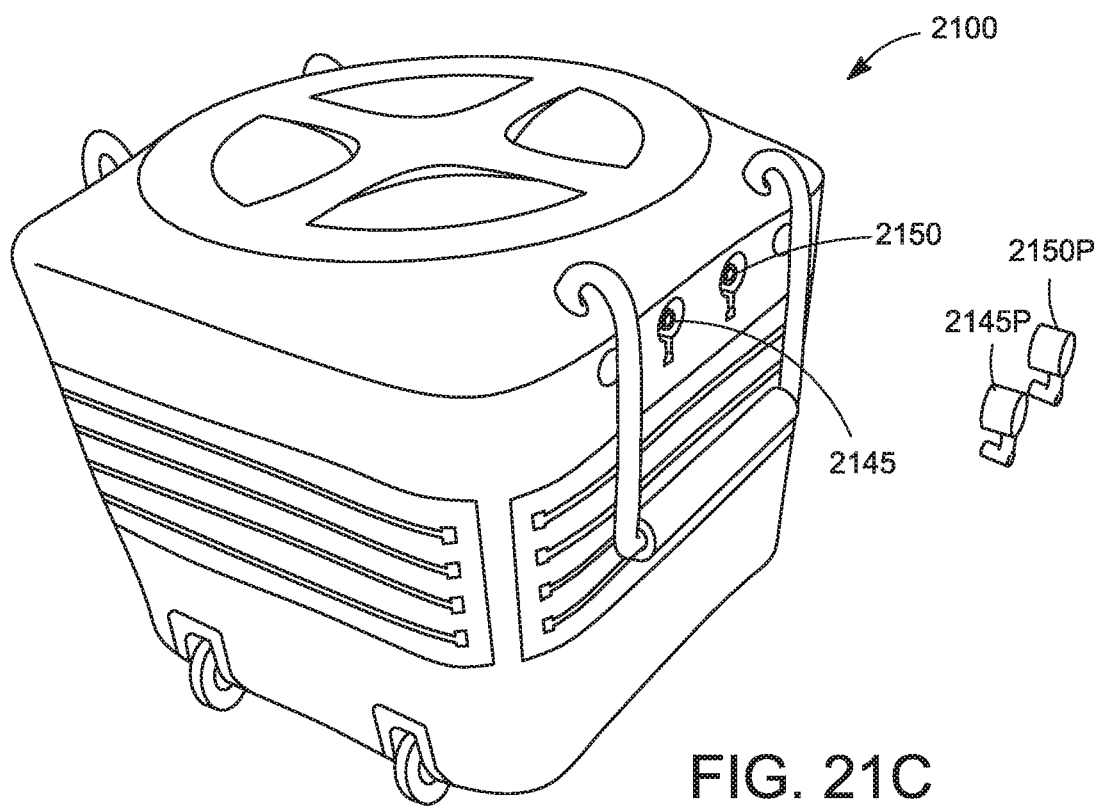

FIG. 21C depicts a top rear/side perspective view of an exemplary bait bucket illustrating air/water ports. The bait bucket 2100 includes an air-in port 2145 configured to operably couple with the air-in conduit 2135. The bait bucket 2100 includes a water-in port 2150 configured to operably couple with the water-in conduit 2140. Each port 2145, 2150 includes its respective plug 2145P, 2150P. The ports 2145, 2150, may further couple to (respective) external conduits/lines to facilitate delivery of air/water into the bait bucket 2100.

Figure 21D:
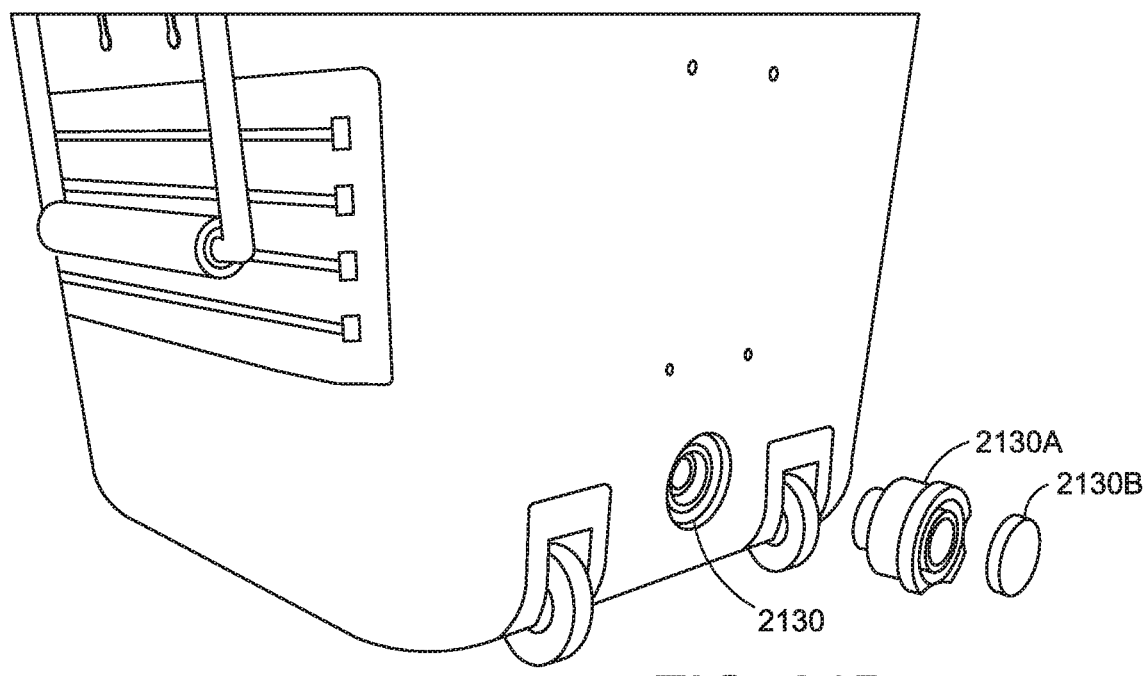

FIG. 21D depicts a rear perspective detail view of an exemplary bait bucket illustrating an exemplary drain port. A drain port 2130 may couple to a port adapter 2130A and/or a drain plug 2130B. The port adapter 2130A may be used to resize the size (diameter) of the drain hole to interface with different sized external drain conduits. An exemplary bait bucket may be used in conjunction with an exemplary watercraft, including a drain conduit and discharge pathway from the bait bucket. The bait bucket 2100 may be operably coupled (at the drain port 2130) to an external drain conduit, which facilitates egress of water from the inside of the bait bucket 2100.

Figure 21E:
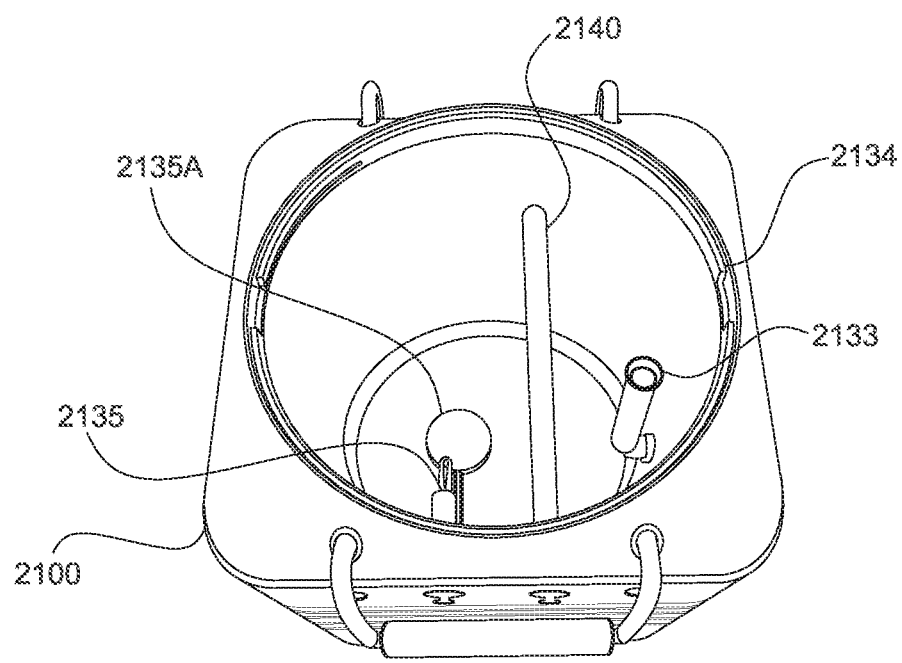

FIG. 21E depicts a top overhead view of an exemplary bait bucket with top removed to view the inner contents of the bait bucket. This overhead view depicts the telescoping water leveling conduit/tube 2133, the air-in conduit/line 2135 (and associated aeration unit 2135A), and the water-in conduit/line 2140. The lid 2132 may be releasably coupled to the bait bucket 2100 via a lid coupler 2134.

Figure 21F:
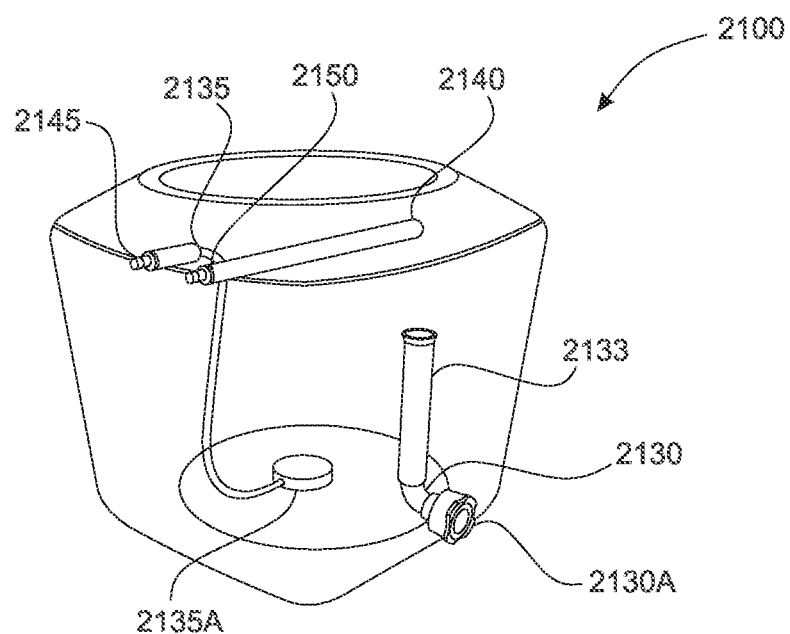

FIG. 21F depicts a perspective transparent view of an exemplary bait bucket illustrating the inner contents of the bait bucket. This transparent view shows the bait bucket 2100 in transparent texture to illustrate the inner contents of the bait bucket 2100, including the telescoping water leveling conduit/tube 2133, the air-in conduit/line 2135 (and associated aeration unit 2135A), and the water-in conduit/line 2140. The air-in line 2135 is coupled to the air-in port 2145, the water-in line 2140 is coupled to the water-in port 2150, and the drain tube 2135 is coupled to the drain port 2130 (as depicted in FIG. 9 discussed below).

Figure 21G:
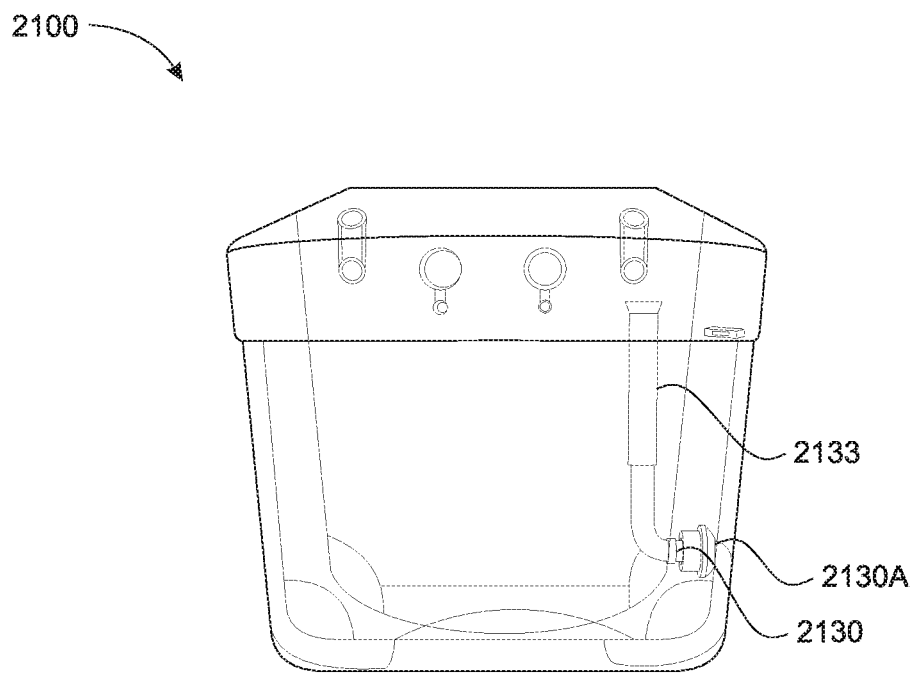

FIG. 21G depicts a side elevation transparent view of an exemplary bait bucket illustrating the inner contents (e.g., water leveling tube and drain port) of the bait bucket. This transparent view shows the bait bucket 2100 in transparent texture to illustrate some of the inner contents of the bait bucket 2100, including the telescoping (height-adjustable) air/water-out conduit 2133 coupled to the drain port 2130.

Figure 21H:
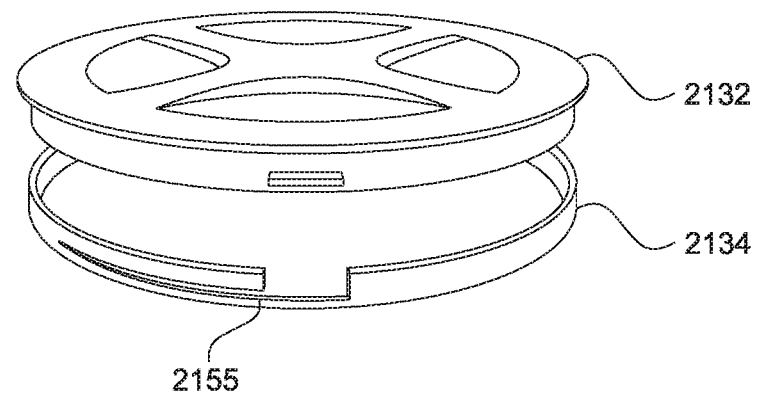

FIG. 21H depicts a perspective view of an exemplary bait bucket lid and lid coupler. A lid coupler 2134 may be fixedly coupled to (e.g., integrally formed with or mechanically attached to) the top of the bait tank 2100. A lid 2132 may be released from the lid coupler 2134 by rotating the lid with respect to the coupler to disengage a locking feature 2155.

The bait bucket 2100 may be used in conjunction with an exemplary watercraft (e.g., a kayak). A person using the watercraft (kayaking on a lake, for example) may find significant utility and benefit in using the bait bucket 2100 as a multi-functional tool to both (1) store healthy live bait in, and (2) attach modular accessories to, such as a phone holder or a fishing rod holder. The bait bucket 2100 may be transported by user via an exemplary bait bucket handle and wheels.

Figure 22A:
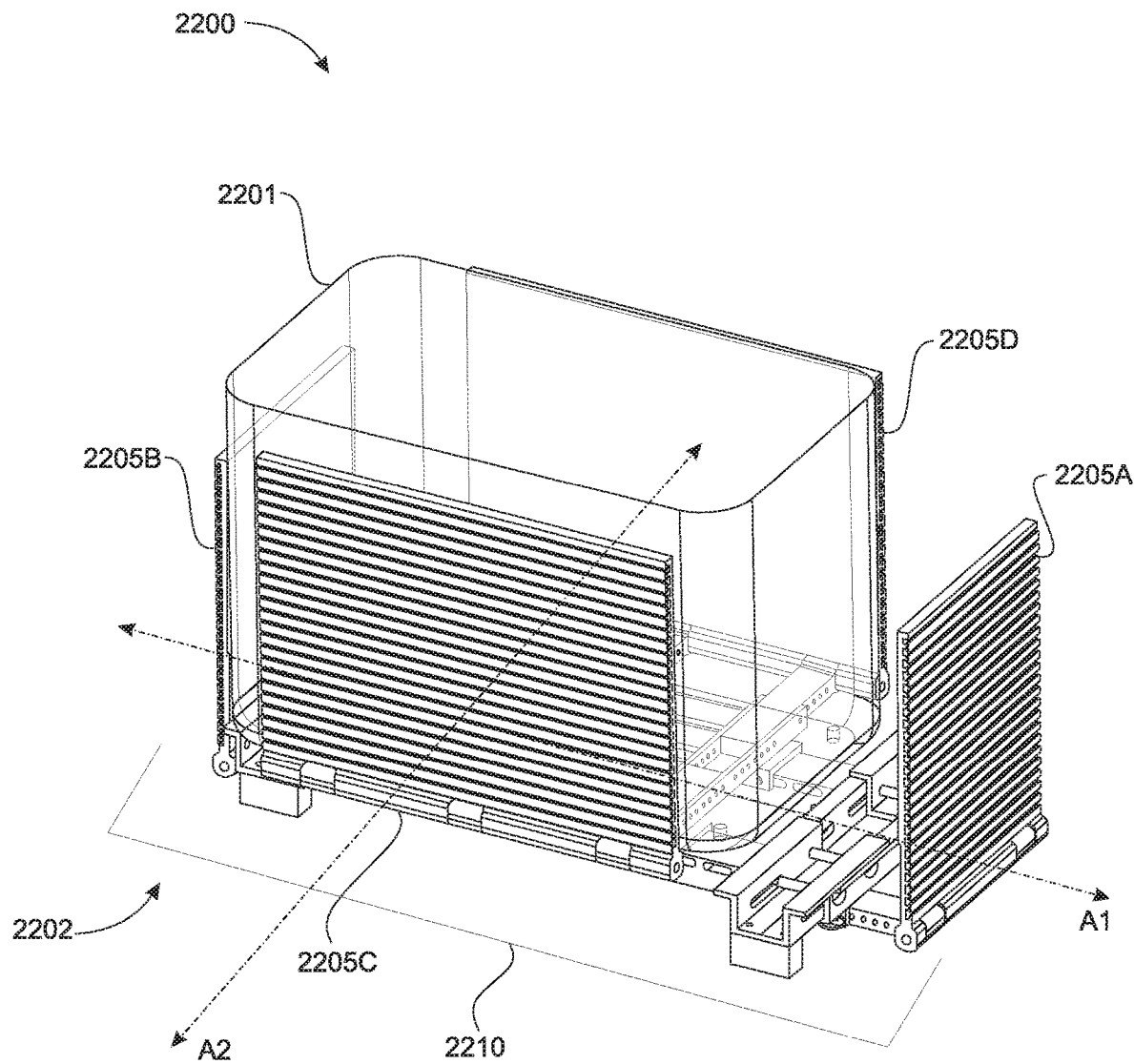
FIGS. 22A-22H depicts perspective views of an exemplary modular accessory attachment system adapted for adjustably coupling to different sized coolers, along with exemplary assembly steps for assembling the individual (sub-)components of the modular accessory attachment system.

FIGS. 22A-22H depicts a perspective view of an exemplary modular accessory attachment system adapted for adjustably coupling to different sized coolers, along with exemplary assembly steps for assembling the individual (sub-)components of the modular accessory attachment system. FIG. 22A depicts an assembled cooler system 2200 including a cooler 2201, which may be used for keeping various items cold, such as food and beverages. Coupled to the cooler 2201 is a modular accessory attachment system 2202. Examples of modular accessory attachment systems configured to securely and releasably coupled to accessories (such as fishing rod holders) and containers (such as coolers) may be found, for example, in U.S. Provisional Application Ser. No. 62/809,365, titled "Modular Attachment and Accessory System for Containers," filed by William Jason Cohen, et al., on Feb. 22, 2019, and in U.S. Provisional Application Ser. No. 62/862,526, titled "Modular Attachment and Accessory System for Cooler, Bait Bucket, and Cart Devices," filed by William Jason Cohen, et al., on Jun. 17, 2019, the partial contents of which is expressly incorporated herein as Attached Appendices A and B, respectively. The improved modular accessory attachment system 2202, disclosed herein, is designed for adjustably coupling to different sized coolers. More specifically, the elements and functions of the modular accessory attachment system 2202 are configured to adjust in both lateral and longitudinal directions to selectively adjust the system 2202 for securely and mechanically coupling to containers of varying sizes (e.g., about 5, 10, 15, 20, 30, 40, or about 50 gallon, or more, coolers). FIGS. 22A-22H depict a top, front, right-side perspective view of the system 2202 (including the system's various components and sub-components, and illustrating how the components may be assembled together).

As shown in FIG. 22A, the system 2202 includes multiple accessory attachment panels or surfaces—a front-side surface 2205A, a back-side surface 2205B, a right-side surface 2205C, and a left-side surface 2205D. Each of the surfaces 2205A-2205D is configured to couple with a modular accessory, such that a user may select and customize which accessories (e.g., a phone case, drink holder, pouch, towel holder) are attached to the assembled cooler system 2200. Each of the surfaces 2205A-2205D are mechanically coupled to a chassis 2210 (also referred to as a base or undercarriage of the system 2200). The chassis 2210 is configured to securely, yet releasably couple to the cooler 2201. Furthermore, the chassis 2210 and surfaces 2205A-2205$ are configured to adjust in size/dimension (e.g., along a longitudinal axis A1 and lateral axis A2) to adapt the modular accessory attachment system 2202 to coolers of larger or smaller sizes/dimensions. The modular accessory attachment system 2202 may therefore not only act as a user-customizable and accessorize-able apparatus for securely transporting a cooler, the system 2202 may also advantageously be fitted to many different sized and dimensioned coolers from a variety of different brands and models, thus providing for a "universal" cooler fitting function.

Figure 22B:
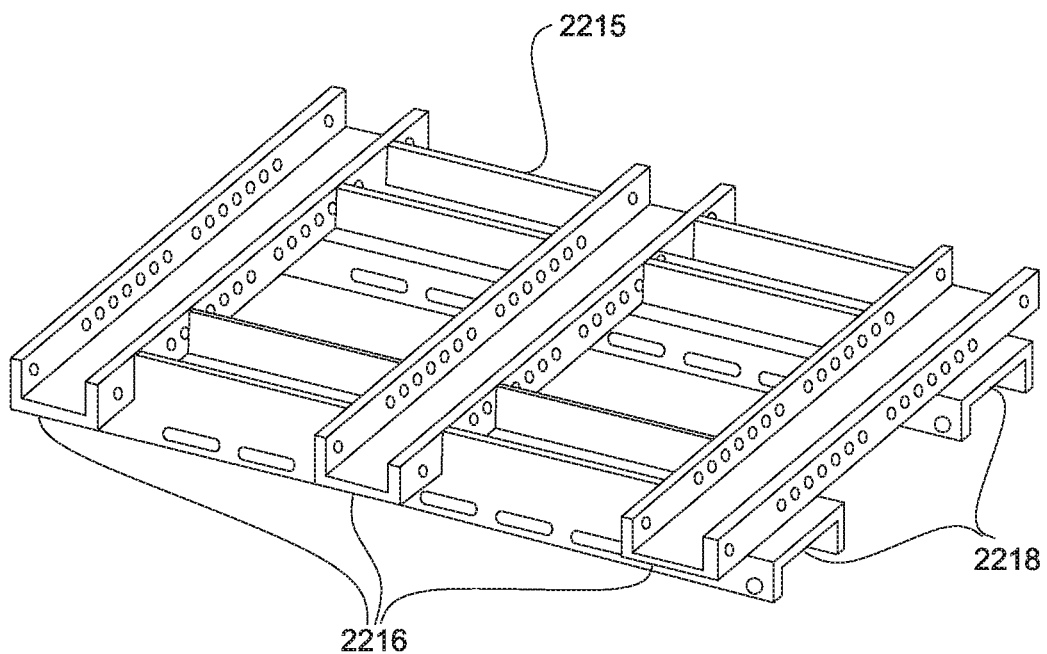
Figure 22C:
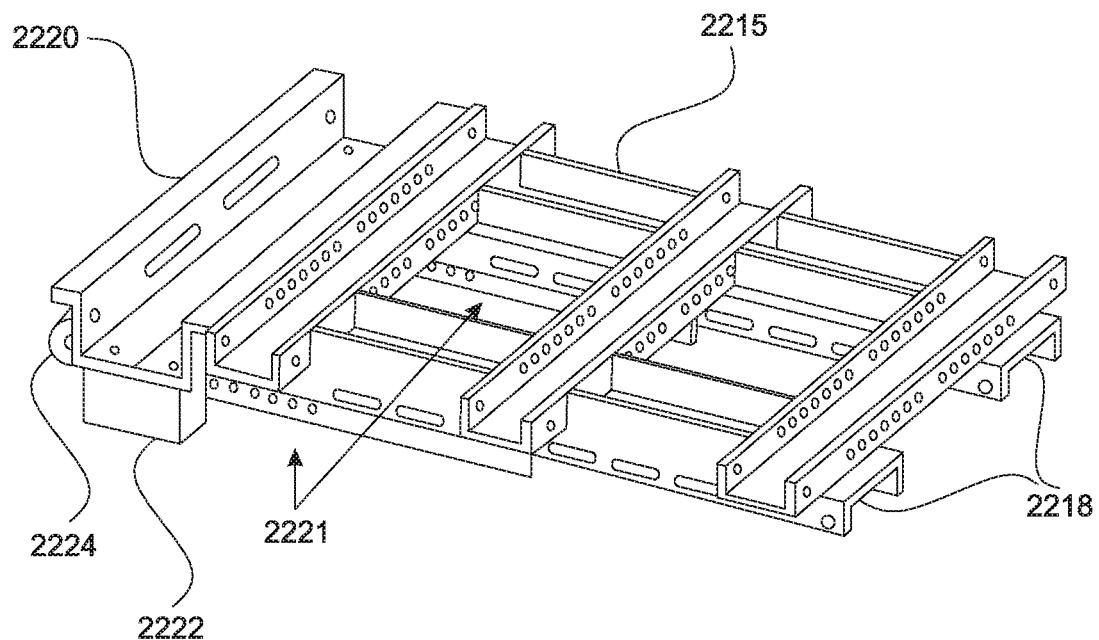

FIGS. 22B-22H depict successive assembly steps for assembling the individual components (and sub components) of the modular accessory attachment system 2202. As shown in FIG. 22B, the system 2202 includes a backbone member 2215. The backbone member 2215 includes three lateral slide channels 2216 (having associated fastening apertures) and two longitudinal slide channels 2218 (also having associated fastening apertures). Releasably fastened to the two longitudinal channels 2218, respectively, are two rear chassis extension members 2221 (see FIG. 22C). Fixedly coupled to the rear chassis extension members 2221 is a rear chassis support member 2220 configured to supportingly couple with the cooler 2201. Releasably fastened to the rear chassis support member 2220 are two laterally opposed rear chassis feet 2222. Releasably fastened to the two rear chassis extension members 2221, respectively, are two rear surface extension members 2224. The rear surface extension members 2224 are configured to couple (e.g., hingedly) to the rear accessory attachment surface 2205B.

Figure 22D:
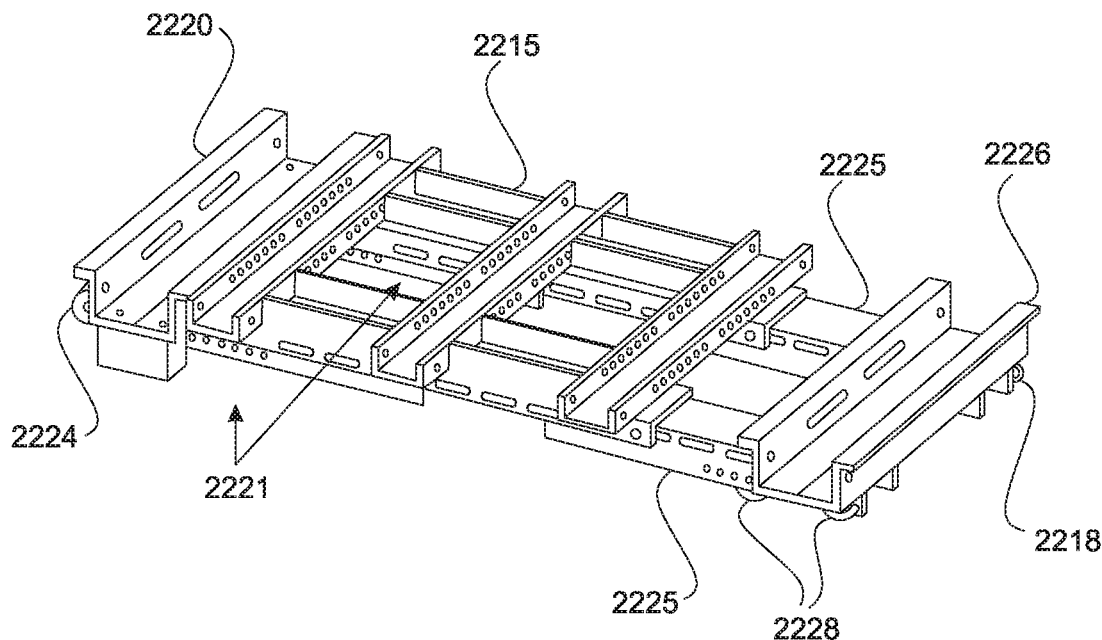

As shown in FIG. 22D, the system 2202 includes two front chassis extension members 2225, each releasably fastened to a respective one of the two longitudinal slide channels 2218. Fixedly coupled to the two front chassis extension members 2225 is a front chassis support member 2226 configured to supportingly couple with the cooler 2201. Multiple front extension member fasteners/locking pins 2228 are also depicted in FIG. 22D, each of the pins 2228 being configured to selectively fasten/lock the position of an associated one of two front surface extension members 2234 (depicted in FIG. 22F). Examples of locking pins may also be found in FIG. 6, discussed further below.

Figure 22E:
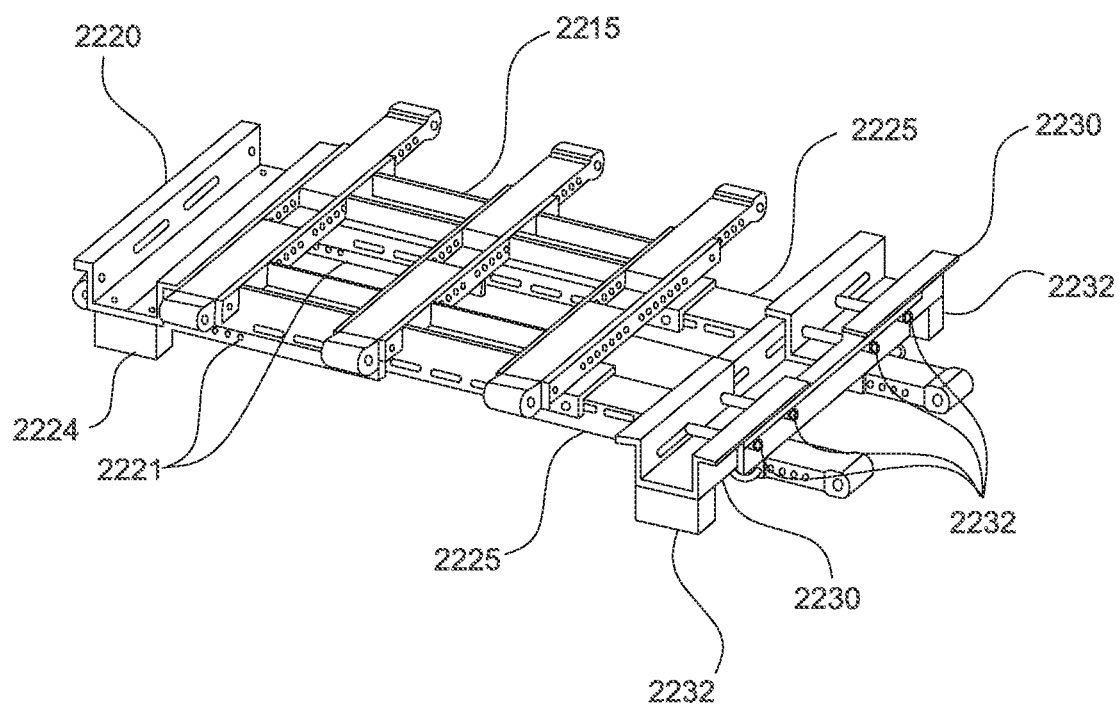
Figure 22F:
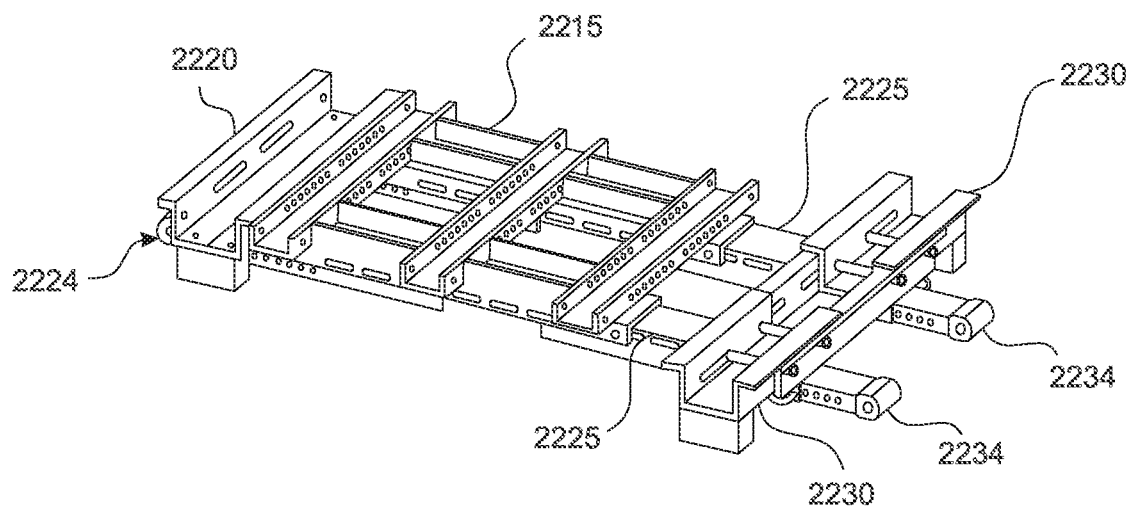

As shown in FIG. 22E, the system 2202 includes two laterally opposed foot extension members 2230 releasably coupled to the front chassis support member 2226 (via fasteners 2232, which may be screws or bolts, for example). Releasably fastened to the two front chassis support members 2226, respectively, are two laterally opposed front chassis feet 2232. As shown in FIG. 22F and mentioned above, releasably fastened to the two front chassis extension members 2225, respectively, are two front surface extension members 2234. The rear surface extension members 2224 are configured to couple (e.g., hingedly) to the rear accessory attachment surface 2205B.

Figure 22G:
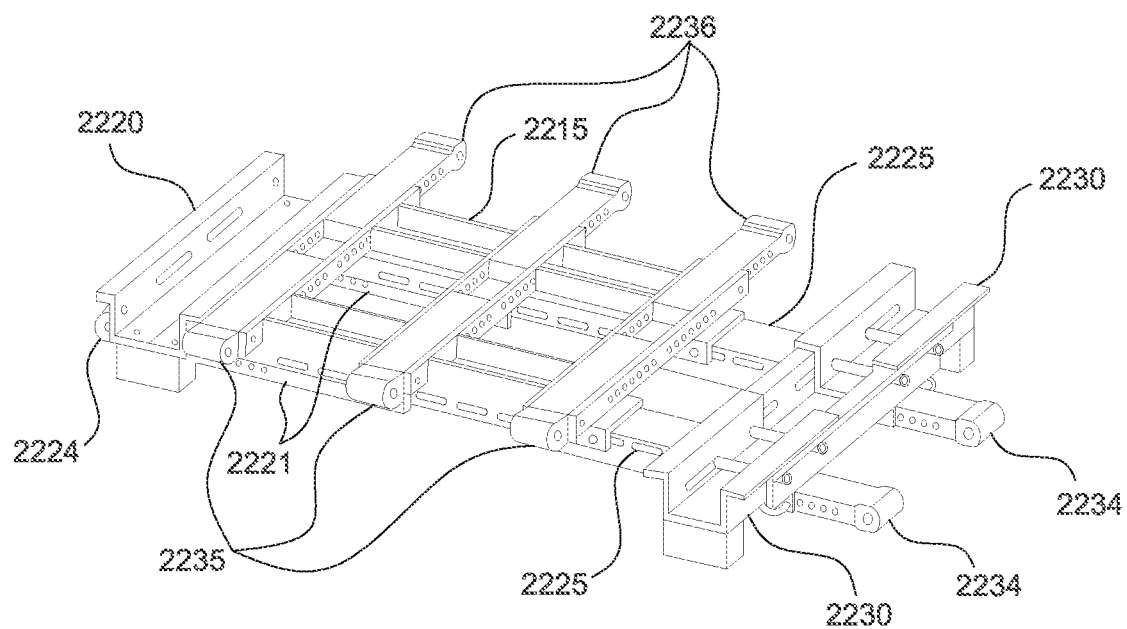

FIG. 22G depicts three right surface extension members 2235 each releasably fastened to an associated one of the three lateral slide channels 2216. FIG. 22G also depicts three left surface extension members 2236 each releasably fastened to an associated one of the three lateral slide channels 2216. The right extension members 2235 are also laterally opposed relative to left extension members 2236. The right surface extension members 2235 are configured to couple (e.g., hingedly) to the right accessory attachment surface 2205C, while the left surface extension members 2236 are configured to couple (e.g., hingedly) to the left accessory attachment surface 2205D. The system 2202, minus the panels/surfaces 2205A-2205B, may be referred to as the chassis 2210 of the modular accessory attachment system 2202 (or the undercarriage of an assembled cooler system 2200).

Figure 22H:
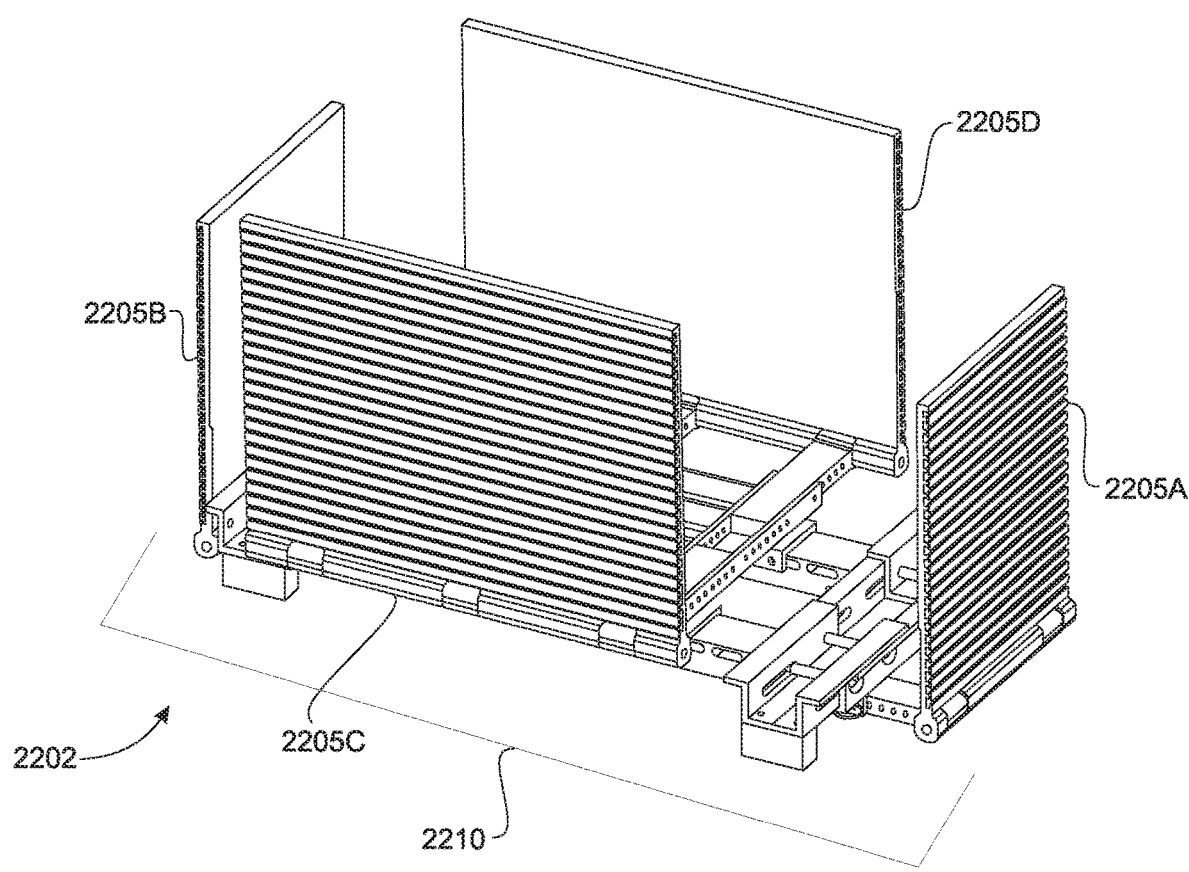

By selectively adjusting the components of the fully-assembled system 2202 shown in FIG. 22H (e.g., including the chassis extension members 2221, 2225 and/or the surface extension members 2224, 2234, 2235, 2236), a user may advantageously adapt the system 2202 to securely, yet releasably couple to a wide range of differently-sized coolers of different brands/models. Specifically, as depicted in FIGS. 22A, 22G, and 22H (and also 23B and 23C discussed further below), the right surface extension members 2235 are in a fully retracted state (suitable for smaller coolers), while the left surface extension members 2236 are in a partially extended state (suitable for mid-sized coolers). Therefore, a user may adjust a level of lateral extension of the members 2235, 2236 to set the surfaces 2205C, 2205D at a proper lateral spacing for ideal fitting to a cooler of almost any (practical) size. Similarly, a user may adjust a level of longitudinal extension of the members 2224, 2234 to set the surfaces 2205A, 2205B at a proper longitudinal spacing for ideal fitting to coolers of varying size. The dimensions of the chassis 2210 may also be adjusted to fit the dimensions of differently sized coolers. For example, the rear/front chassis extension members 2221, 2225 may be extended/retracted in the longitudinal direction (relative to the longitudinal slide channels 2218 of the backbone 2215) to allow the chassis 2210 to fixedly, yet releasably couple to a cooler of a small, large, or medium size. With this capability to selectively adjust in size and dimension, the adaptable modular accessory attachment system 2202 fits many different sized coolers in a dimension/model/brand-agnostic fashion (which may be especially beneficial for consumers who have already purchased a cooler, but desire the additional accessorizability and functionality provided by the adaptable modular accessory attachment system 2202).

Figure 23A:
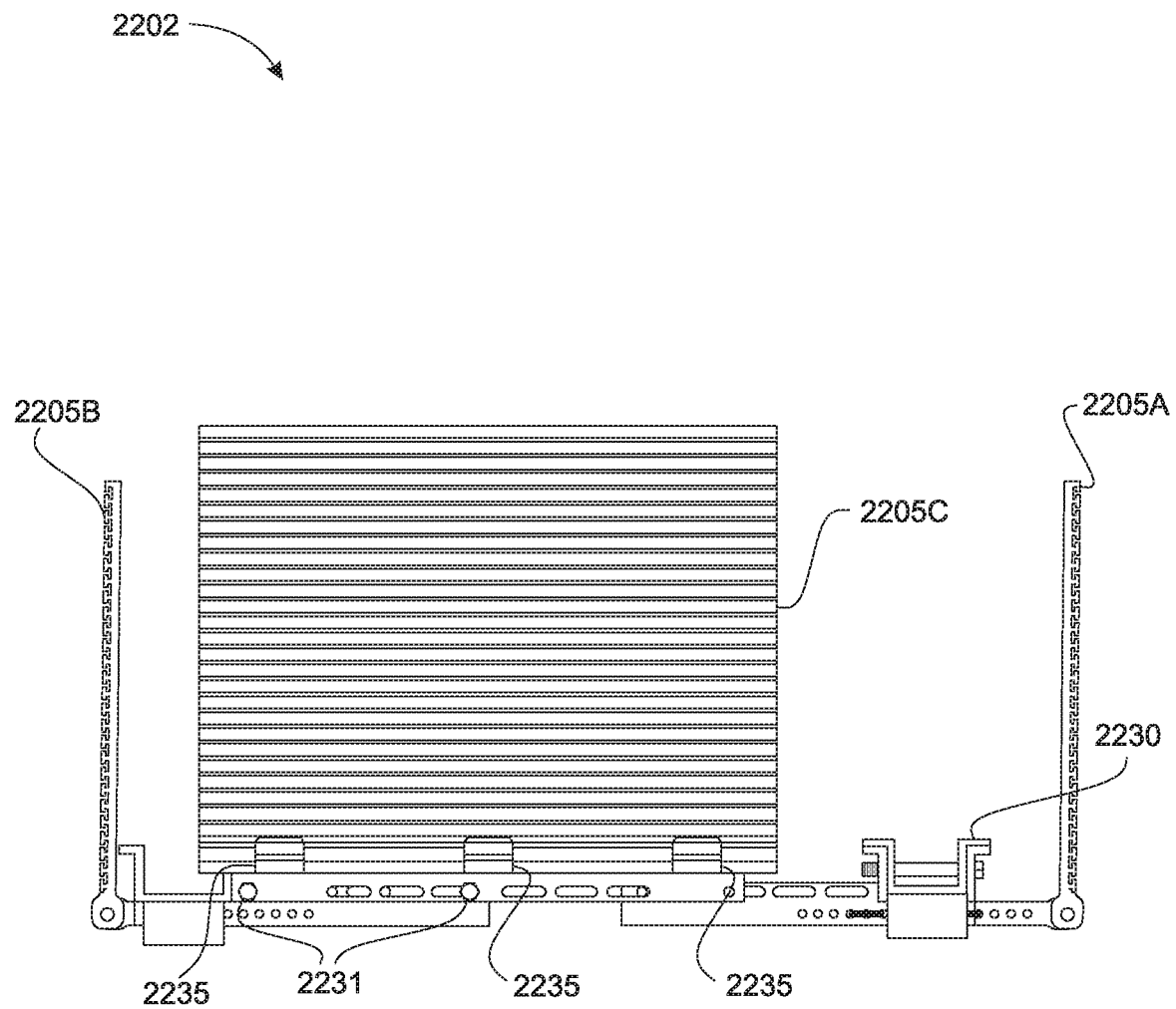
FIGS. 23A-23C depict a right-side elevation view, a top plan view, and a bottom plan view of an exemplary modular accessory attachment system adapted for adjustably coupling to different sized coolers.
Figure 23B:
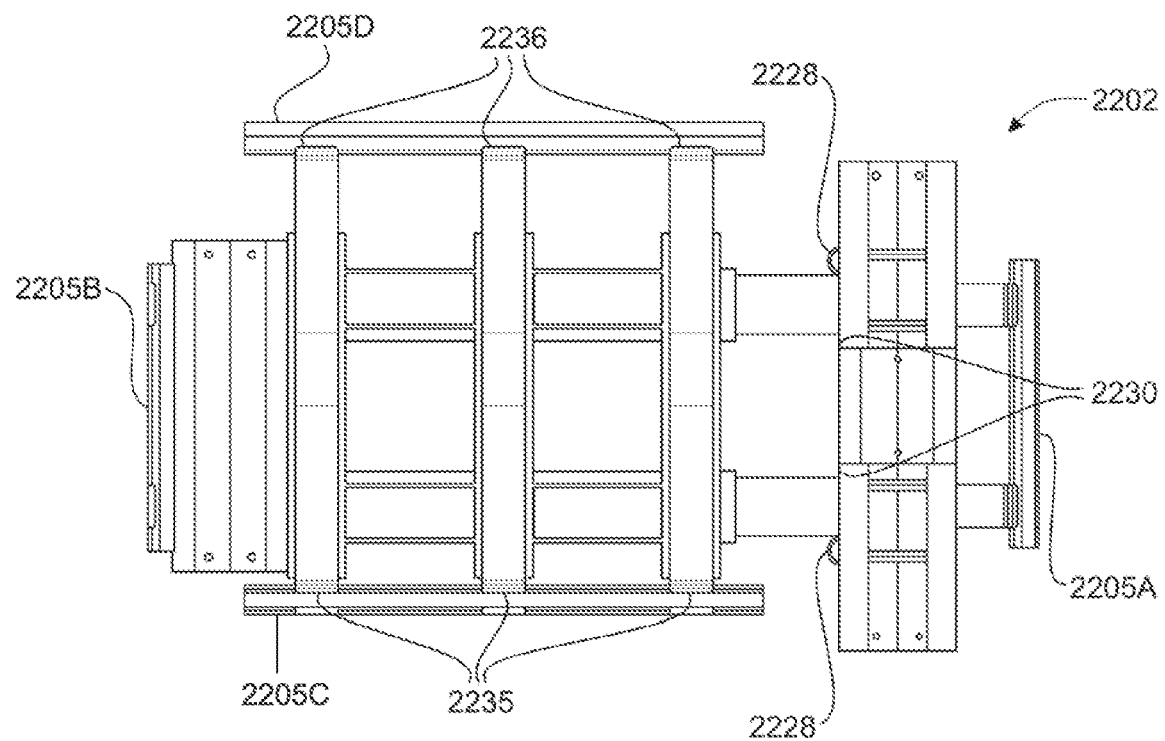
Figure 23C:
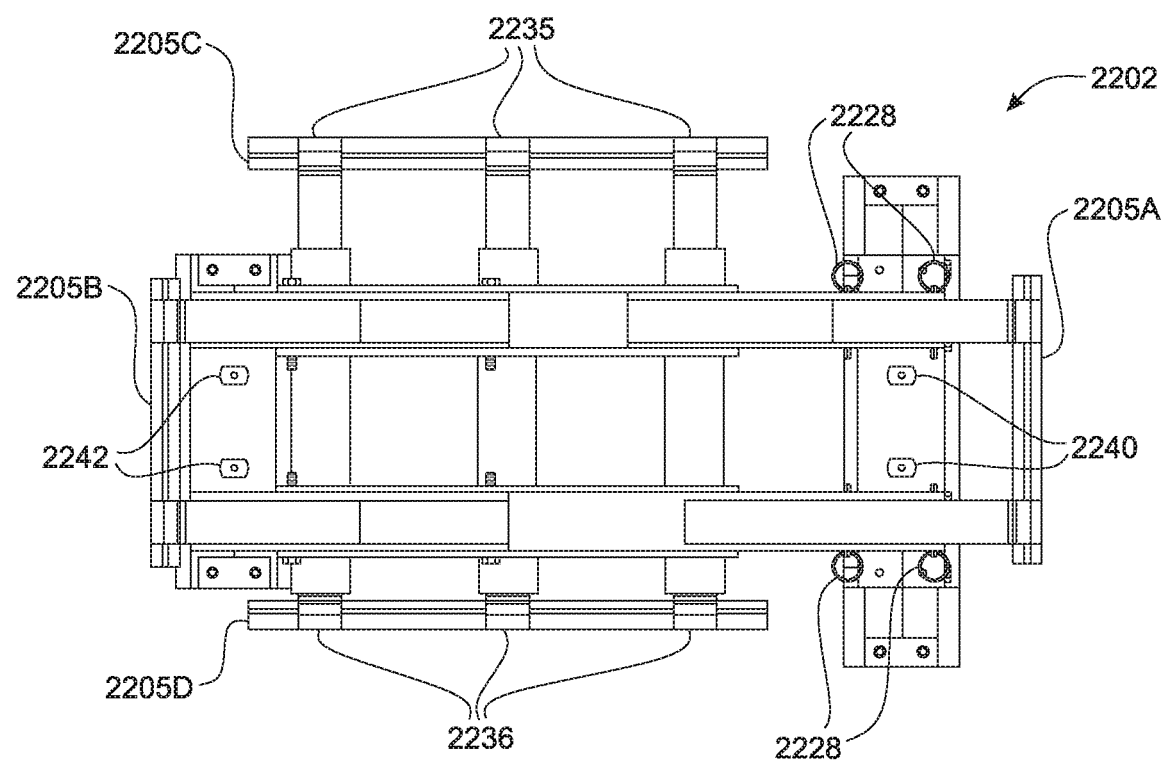

FIGS. 23A-23C depict a right-side elevation view, top plan view, and bottom plan view of an exemplary modular accessory attachment system adapted for adjustably coupling to different sized coolers. FIG. 23A depicts a right-side elevation view of the system 2202, where the left side of the system 2202 may be a substantial mirror image of the right side shown in FIG. 23A, in various implementations. FIG. 23B depicts a top plan view of the system 2202, while FIG. 23C depicts a bottom plan view of the system 2202.

In various examples, the panel/surface extensions 2224, 2234, 2235, and 2236 may be substantially identical to one another, which may beneficially ease the manufacturing difficulty of the system 2202 (e.g., only one mold may be required for all panel extension members/arms). The panel extensions, in some implementations, may be held in place using a quick release pins, each pin having a spring loaded ball in the nose of the pin (see, e.g., FIG. 6). In various embodiments, a (similar) quick release pin may be used for attaching a wheel shaft of the system 2202 to an axle of the system 2202 (see, e.g., FIGS. 2H and 4L).

Some embodiments may be configured with the surfaces/panels 2205A-2205D having a substantially identical height profile. In some examples, the height of some panels 2205A-2205D may be less than/greater than the height of some other of the panels 2205A-2205D, which may advantageously allow the system 2202 to fold in on itself efficiently for ease of storage and transport. In various examples, the couplings between the attachment surfaces 2205A-2205B and the extension members 2224, 2234, 2235, and 2236 may be a tight compression or interference coupling, such that a given surface 2205A-2205B may maintain a fixed spatial relationship relative to its respective extension members 2224, 2234, 2235, and 2236 unless and until a predetermined amount of (user applied) force/torque is applied to that surface.

The combined assembly of the rear/front chassis extension members/arms 2221, 2225 and associated rear/front chassis support members 2220, 2226 may be referred to herein as a "rear/front chassis cap" (respectively). In many exemplary embodiments, lateral extension/retraction/setting of the foot extension members 2230 may accomplished via fasteners 2232 (e.g., threaded bolts). To make lateral adjustments to the foot extension members 2230, the bolts 2232 may be loosened so the part moves freely. Once in position the bolts 2232 may be tightened down. Similarly, bolts 2231 (shown in FIG. 1I) may also be used to releasably fasten the rear/front chassis extension members 2221, 2225 to the backbone 2215. In an exemplary embodiment, a size of the foot extension bolts 2232 may be about 10 mm, while a size of the chassis extension bolts 2231 may be about 8 mm. Various implementations may utilize a nut holding feature (e.g., into injection molded parts) so that a given bolt only needs to be turned in order to make adjustments. In some examples, the chassis feet 2222, 2232 may couple with (two) screws to either the (rear) chassis cap or the (front) foot extension (2230), depending whether the foot extension members 2230 are needed. The feet, in some embodiments, may be injection molded with a rubber over-molded pad on the surface that may contact the ground for decreased manufacturing complexity and improved durability. In various examples, the front/rear chassis cap may be formed as a single, unitary body (e.g., through injection molding or 3D printing).

Figure 24A:
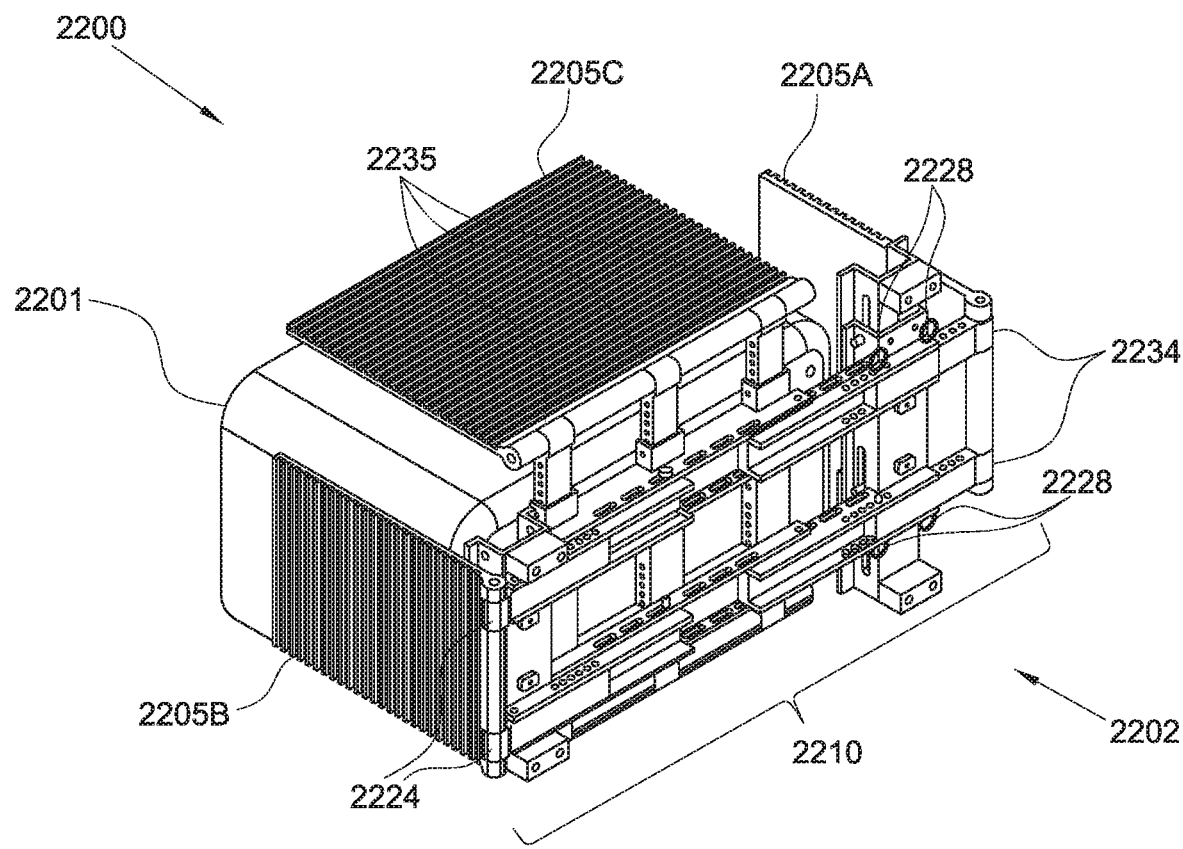
FIGS. 24A-24F depict various underside views of an exemplary adaptable modular accessory attachment system fitted to two differently sized coolers.
Figure 24B:
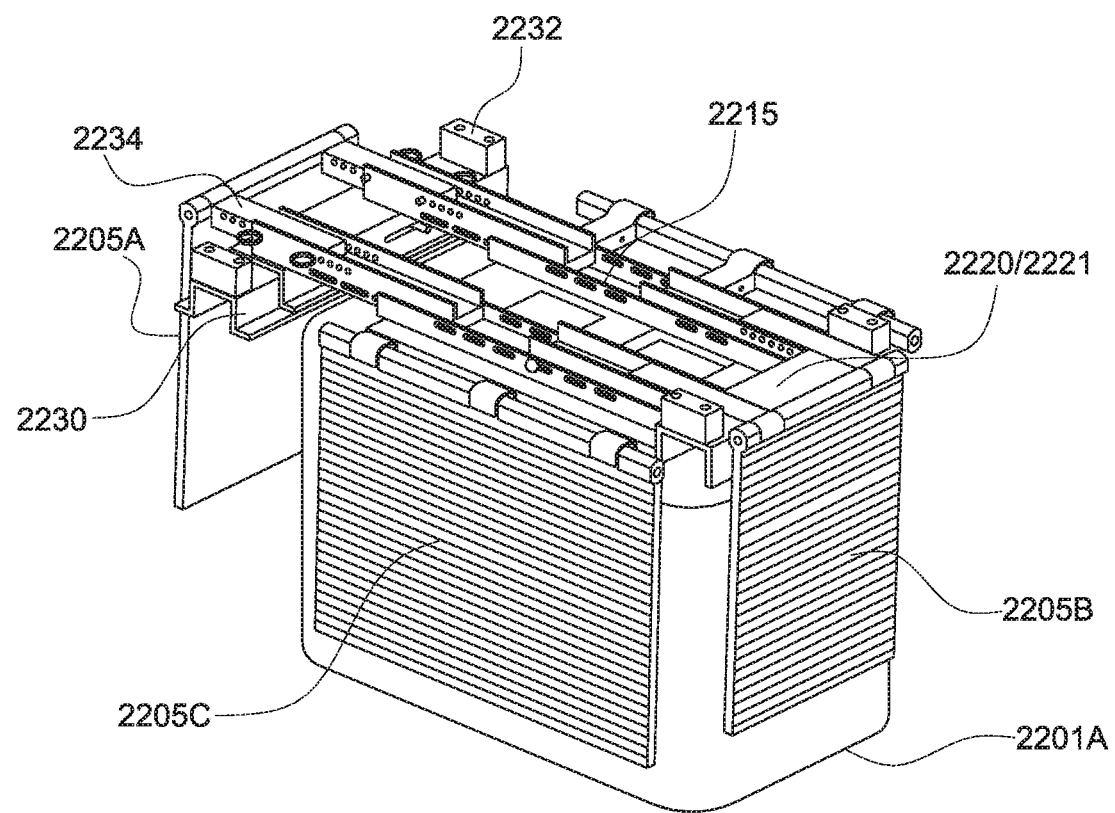

FIGS. 24A-24F depict various underside views of an exemplary adaptable modular accessory attachment system fitted to two differently sized coolers. FIG. 24A depicts a bottom, back, right-side perspective view of the system 2202, illustrating many of the individual components of the system 2202. FIG. 24A depicts various views of an exemplary first sized cooler fitted with an exemplary adaptable modular accessory attachment system configured in a first mode. FIG. 24B depicts the system 2202 from a back bottom perspective view, deployed on a small cooler 2201A. By longitudinally retracting the rear panel extensions 2224, the rear panel 2205B may be brought into a suitable fitting position relative to the small cooler 2201A. Using the front panel extensions 2234, the front panel 2205A may be brought into a suitable fitting position relative to the small cooler 2201A. Similarly, the lateral extension members 2235, 2236 may be extended/retracted along a lateral direction to bring the lateral side panels 2205C and 2205D into suitable fitting position relative to the small cooler 2201A. The panel extensions 2224, 2234, 2235, and 2236 may all be configured to selectively lock into position using a fastener such, as the spring loaded locking pins 2228.

Figure 24C:
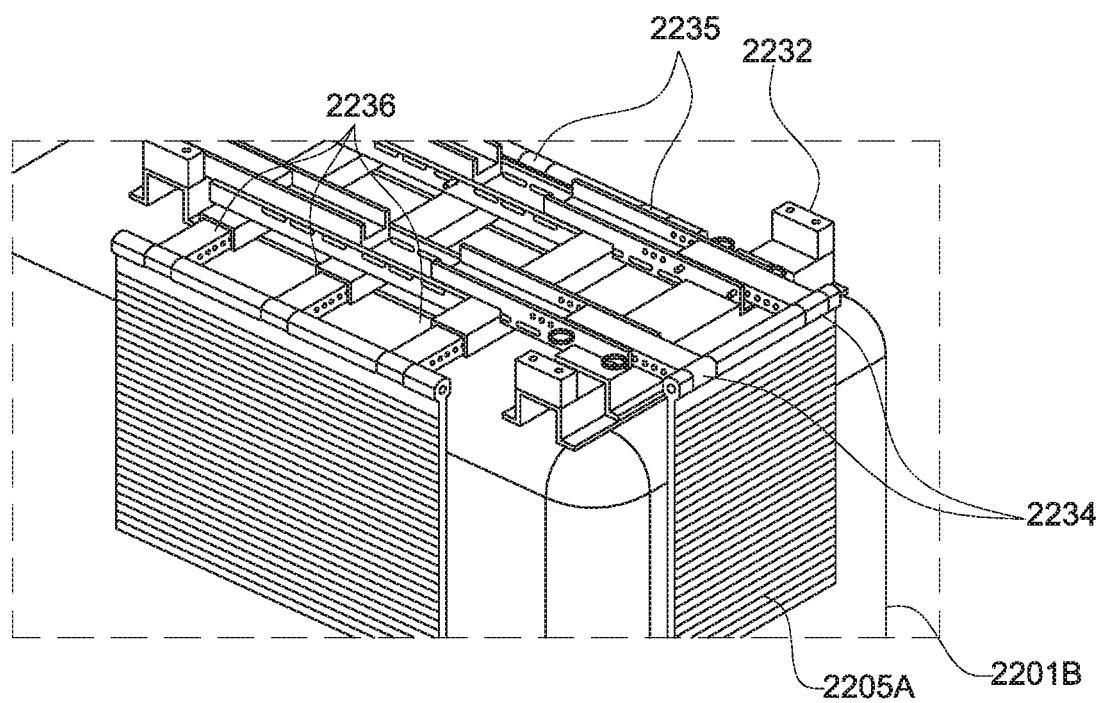

FIG. 24C depicts various views of an exemplary second sized cooler fitted with an exemplary adaptable modular accessory attachment system configured in a second mode. A large cooler 2201B has been fitted with the adjustable modular accessory attachment system 2202. In this depiction, the front panel 2205A is shown coupled to the front panel extension members 2234. The front panel extension members 2234 are shown in an extended state, locked into place via locking pins 2228. Therefore, the extension members 2224, 2234, 2235, 2236 may all have first/retracted and second/extended modes, to fit larger and smaller coolers, 2201A and 2201B.

In various examples, the members/arms 2224, 2234, 2235, 2236 may be configured to translate through a finite number of locked/fixed spatial (longitudinal/lateral) configurations, relative to the center of the system 2202. For example, there may be a finite number of fastening apertures through which fasteners may be inserted, to allow the members/arms into 3, 4, 5, 6, 7, 8, 9, or 10 different and distinct spatial positions. In some implementations, the members/arms 2224, 2234, 2235, 2236 may be configured to translate to set into locked/fixed continuous spatial (longitudinal/lateral) configurations.

Figure 24D:
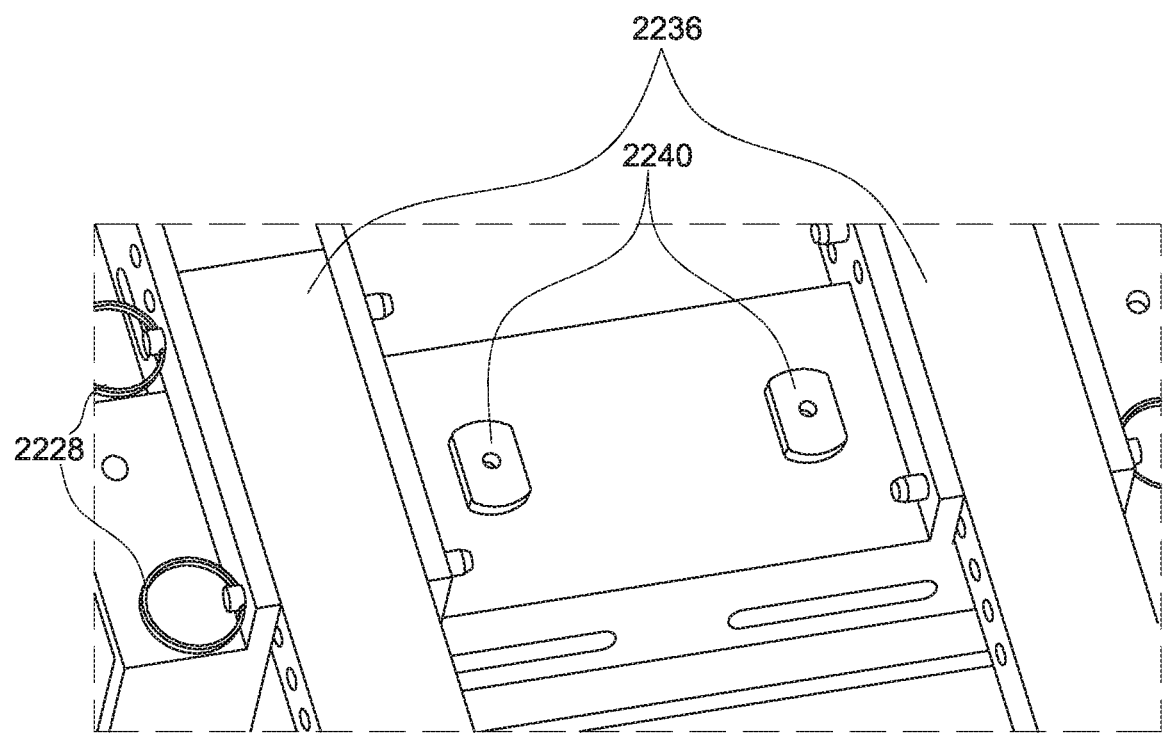
Figure 24E:
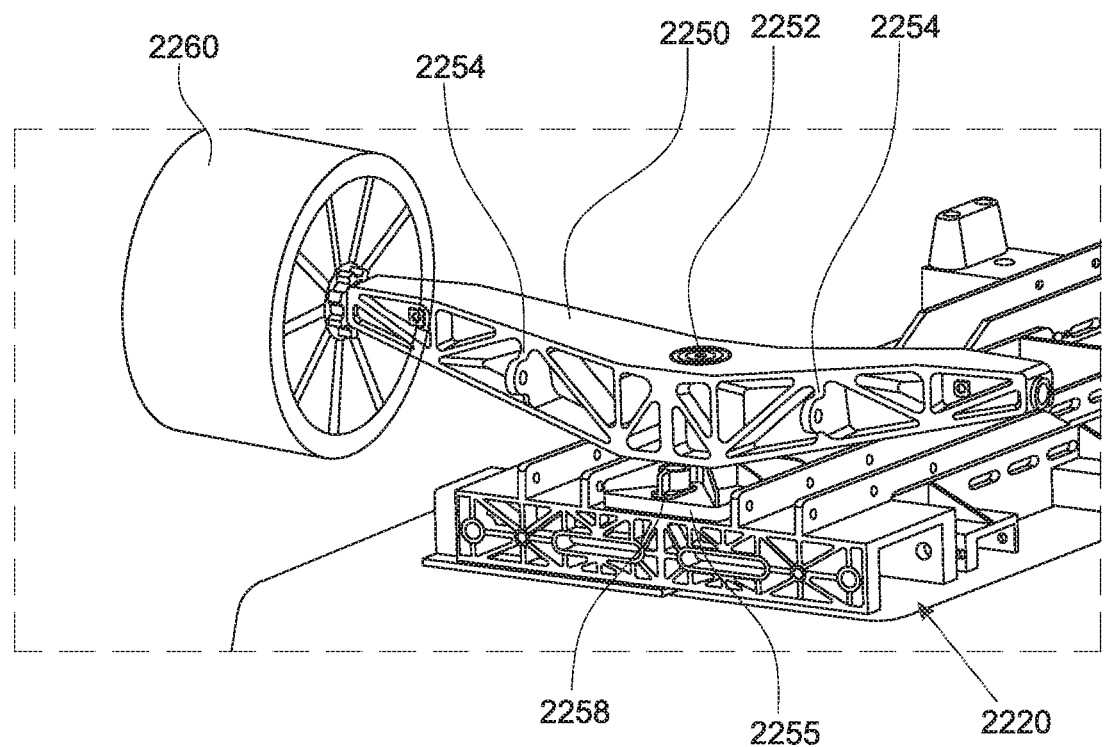
Figure 24F:
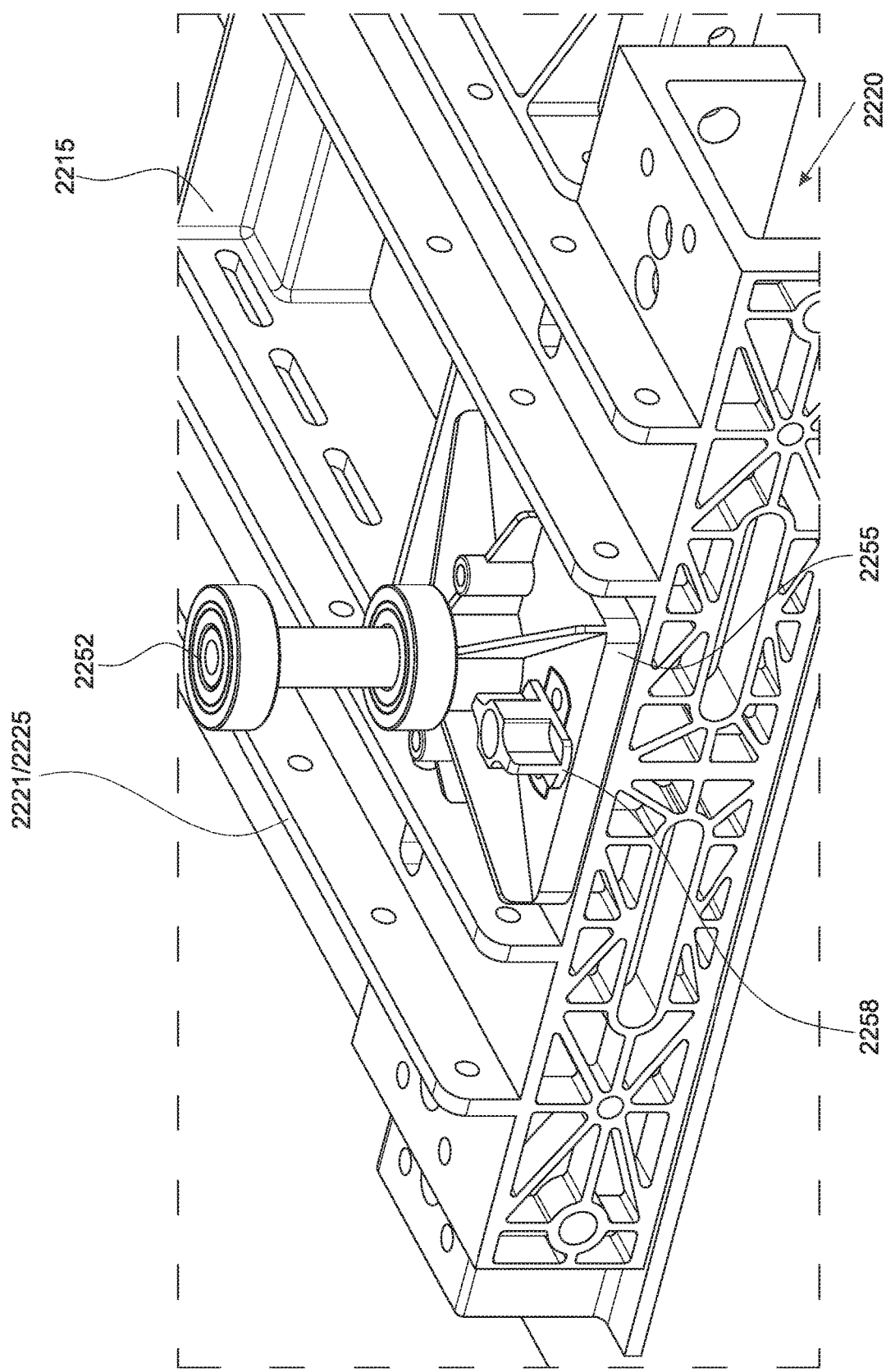

FIGS. 24D, 24E, and 24F depict various views of an exemplary cooler fitted with an exemplary adaptable modular accessory attachment system, illustrating various aspects of an exemplary wheel-axle assembly. Each chassis cap (or chassis support member 2220, 2226) may include an axle block coupler 2240 (rear, along with front axle block coupler 2242, shown in FIG. 23C). The axle block coupler 2240 may function to couple an axle 2250 to the chassis cap/support member via an axle block 2255, as shown in FIG. 24E. The axle 2250 may have central coupler 2252 (e.g., a shaft) configured to couple the axle to the axle block 2255. The axle block 2255 may be selectively locked onto the chassis cap/chassis support member 2220 (or support member 2226) via axle block lock 2258 (which may be a twist-to-lock type of fastener, for example). The axle 2254 may also include at least one handle coupler 2254 configured to (hingedly) couple with a handle for transporting the system 2200. The system 2200 may be transported over ground using wheels 2260 that are rotatably coupled with the axle 2250. FIG. 24F depicts a wheel-axle assembly, without the wheels and the axle, to expose the central axle coupler 2252, axle block 2255, and axle block lock 2258.

In various examples, the axle 2254 may attach to the chassis cap on the surface between the two rails of the support member (for the small panel extensions). There may be two raised areas with an elongated elliptical shape, in an exemplary embodiment. The axle block may, in some implementations, fit over these features/protrusions with similarly shaped holes. A (quarter turn) pin (e.g., axle block lock 2258) may sit inside and turn to lock the axle in place, in some embodiments. In some implementations, the axle block may be rotatably coupled to the axle block to rotate about a rotational axis defined by the central axle coupler 2252 (e.g., such that the forward wheels may be able to rotate along with the direction of an attached handle). In some implementations, the axle block may be non-rotatably coupled to the axle block to maintain a fixed spatial relationship relative to the axle block 2255 and the rest of the system 2202 (e.g., such that the backward wheels may remain facing forward and stationary relative to the system 2202).

As shown in FIG. 24F, the axle 2254 may have an axle coupling point 2255A (e.g., a hole/recess that may mate with the central axle shaft 2252) and chassis coupling point(s) 2255B (e.g., apertures through which a hole-protrusion 2240 of the chassis cap may be inserted). The axle 2250 includes a center axle hole 2250A through which the shaft/pin 2252 may be inserted to operably couple the axle to the axle block 2255. An exemplary axle block lock 2258 may be a hand twistable lock configured to selectively and releasably lock the axle block into place. An exemplary wheel 2260 configured to couple to the axle 2250 may include an associated wheel shaft 2267 configured to be inserted and selectively locked into the axle 2250.

Figure 25A:
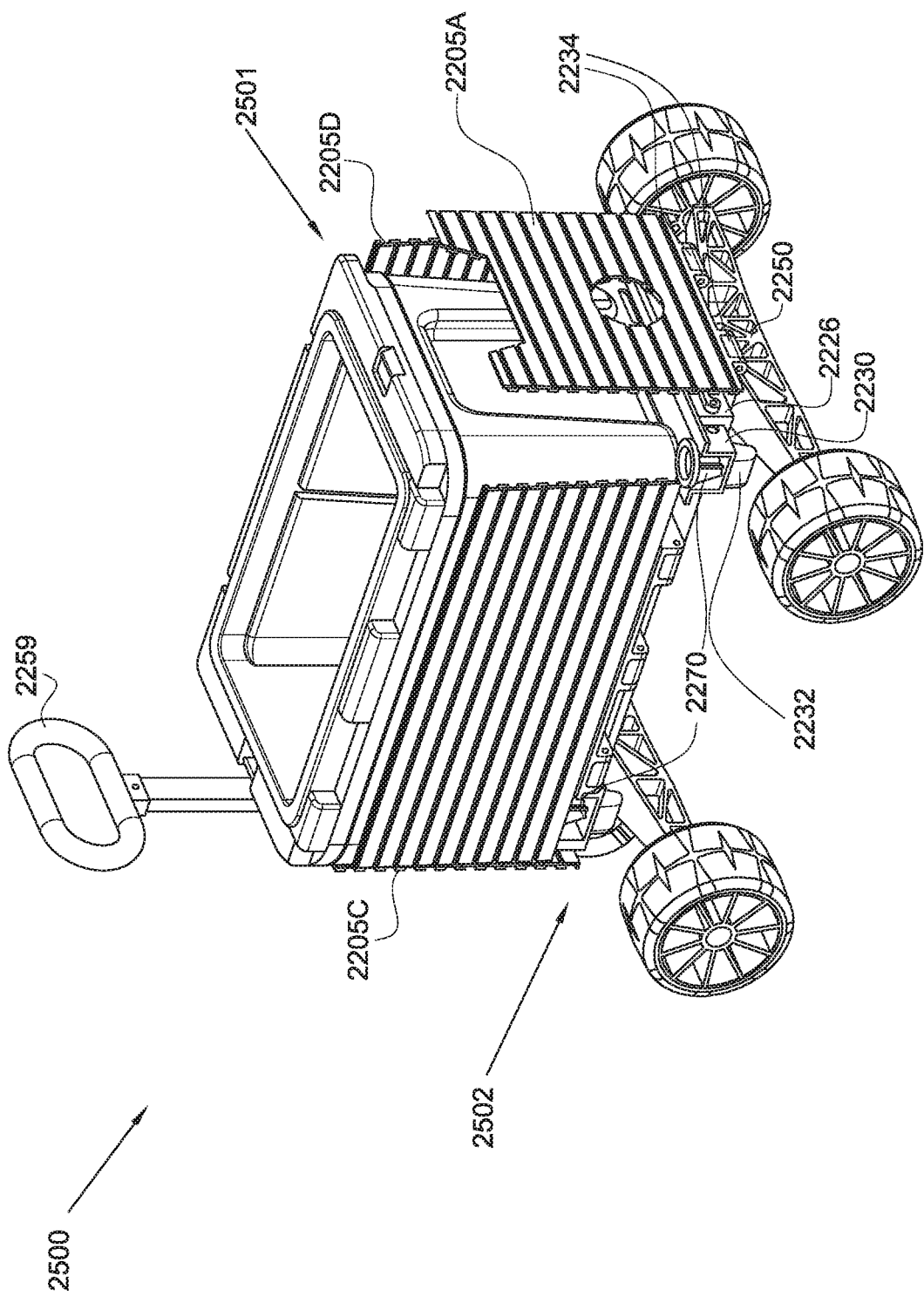
FIGS. 25A-25E various views of an assembled modular accessory attachment system coupled to an exemplary cooler.
Figure 25B:
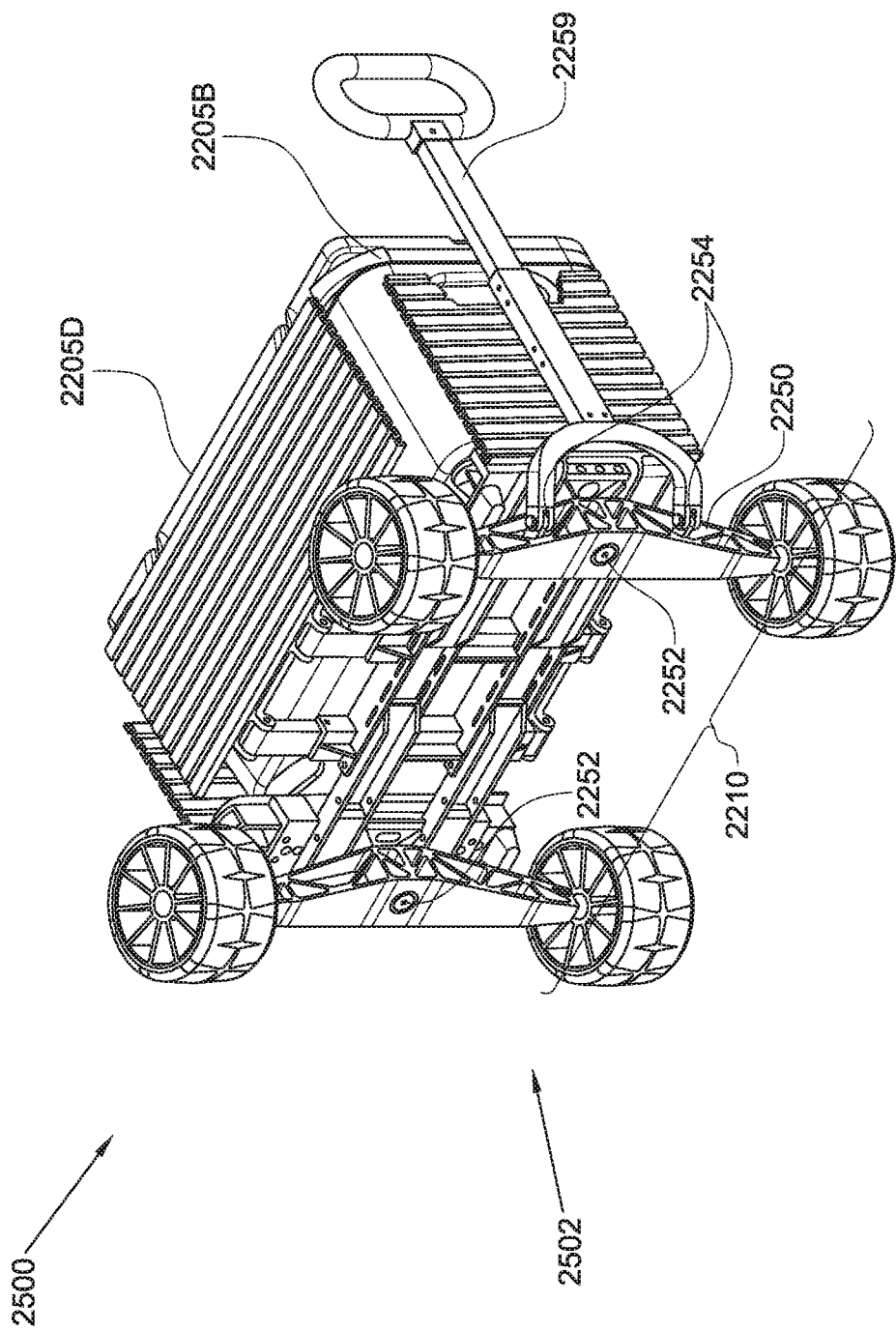
Figure 25C:
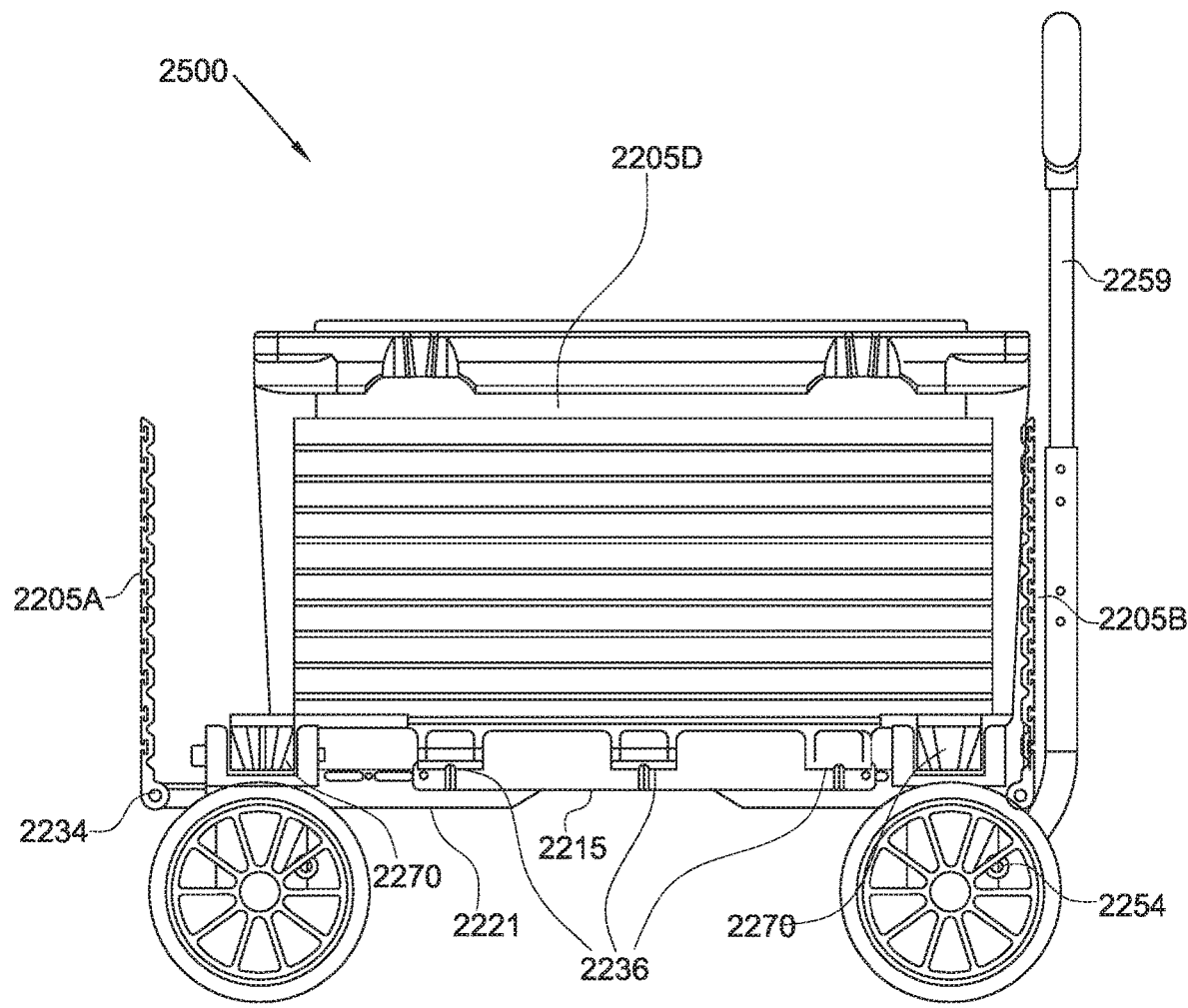

FIGS. 25A-25E various views of an assembled modular accessory attachment system coupled to an exemplary cooler. As shown in FIGS. 25A-25C, a first sized cooler 2201 is mechanically, securely, and releasably coupled to a modular accessory attachment system 2202 via a front container-chassis coupler 2270. The first sized cooler 2201 is mechanically, securely, and releasably coupled to a modular accessory attachment system 2202 via a rear/back container-chassis coupler 2275. Examples of couplers 2270, 2275 are depicted as coupler 2600 in FIGS. 26A-26C, discussed further below. In some implementations, the coupler 2270, 2275, 300 may mate with the chassis 2210 (e.g., on the underside of either the chassis cap or the foot extension, being fastened/bolted in place). In the illustrations of FIGS. 22A, 24A, 24B, and 25C, the modular accessory attachment system 2202 is actually sized slightly larger than the first sized cooler 2201. Accordingly, the state of the modular accessory attachment system 2202 shown in FIG. 25C is longitudinally configured to fit a larger cooler (e.g., the second-sized cooler 2201B of FIG. 24C), such that a user may transition the system 2202 to fit the first sized cooler 2201 by simply translating the panel 2205A and chassis cap 2226 towards the cooler 2001 (as detailed herein).

Figure 25D:
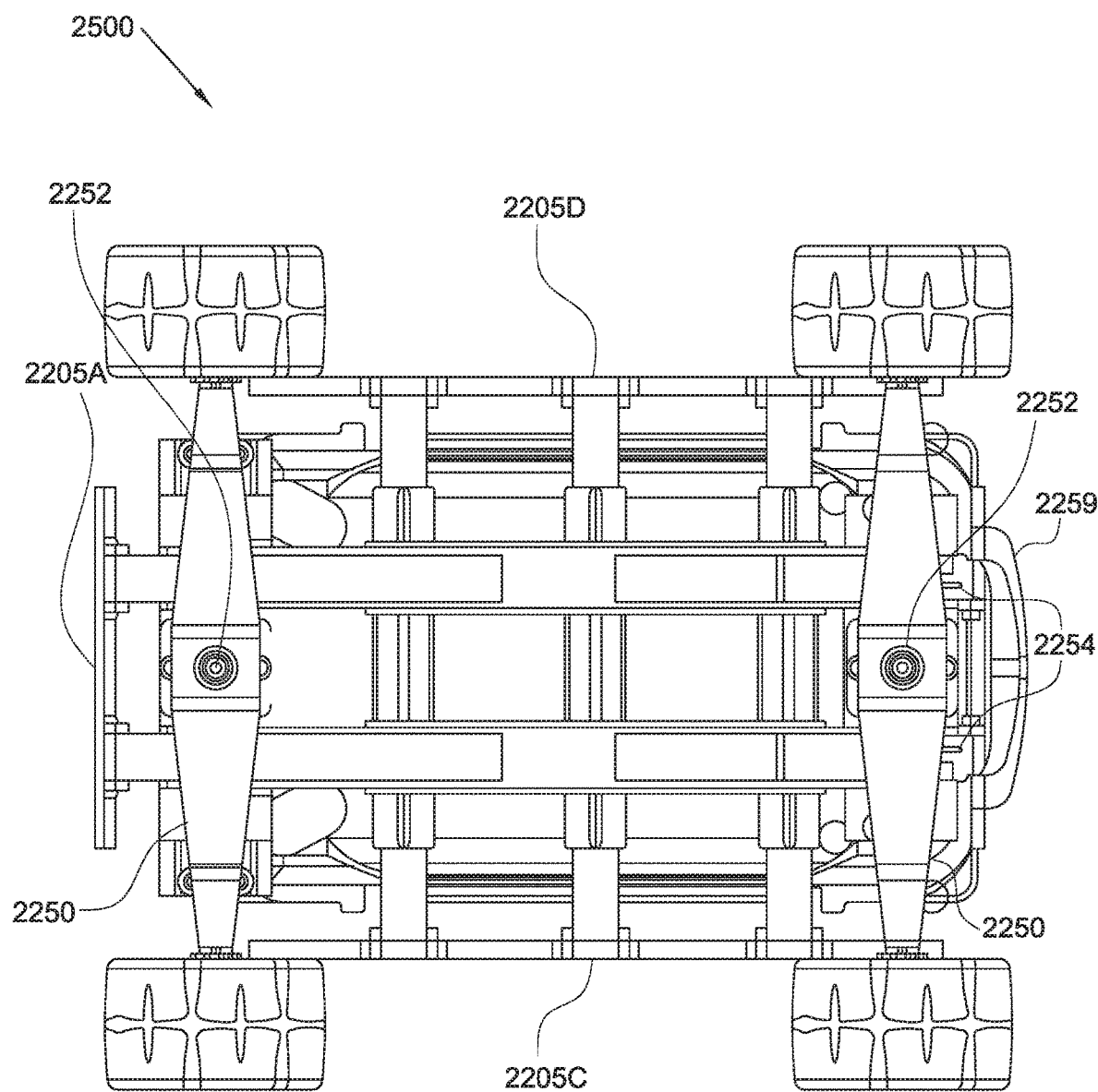
Figure 25E:
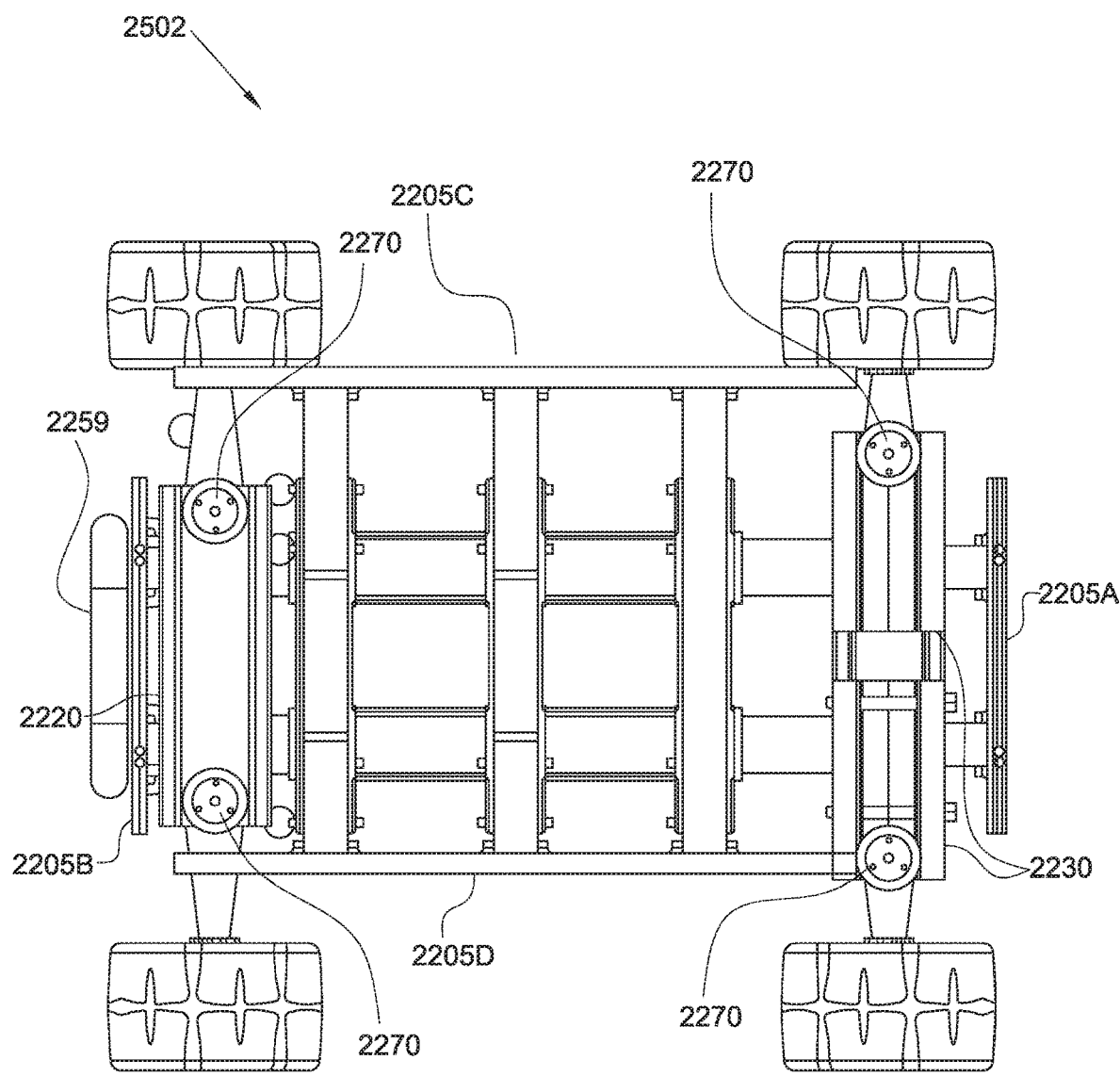

FIGS. 25A-25E various views of an assembled modular accessory attachment system coupled to an exemplary cooler. FIG. 25A depicts a top front perspective view of an assembled cooler system 2500 includes a cooler 2501 coupled to a modular accessory attachment system 2502 (e.g., substantially similar to the elements and functions of the systems 2200, 2202, and cooler 2201 disclosed herein (and as detailed above). FIG. 25B depicts a bottom back perspective view of the system 2500, depicting the chassis of the system 2501. FIG. 25C depicts a side elevation view of the system 2500, FIG. 25D depicts a bottom plan view of the system 2500, and FIG. 25E depicts a top plan view of the system 2502 (without the cooler 2501).

Exemplary mechanical elements and components of an adaptable modular accessory attachment system may include an exemplary backbone 2215, an exemplary chassis cap, an exemplary lateral foot extension member 2230, an exemplary foot 2222, 2232 configured to releasably couple to the chassis cap, and an exemplary longitudinal/lateral extension member 2224, 2234, having a (hinge) coupling point 2224A, 2234A to which panels 2205A-2205D may couple. Components may include an exemplary small attachment surface/panel 2205A, 2205B (e.g., with an optional hole 2206 to adapt to a drain outlet of a cooler) and an exemplary large attachment surface/panel 2205C, 2205B, with each panel having associated coupling points (at the bottom of the panels 2205A-2205D).

Figure 26A:
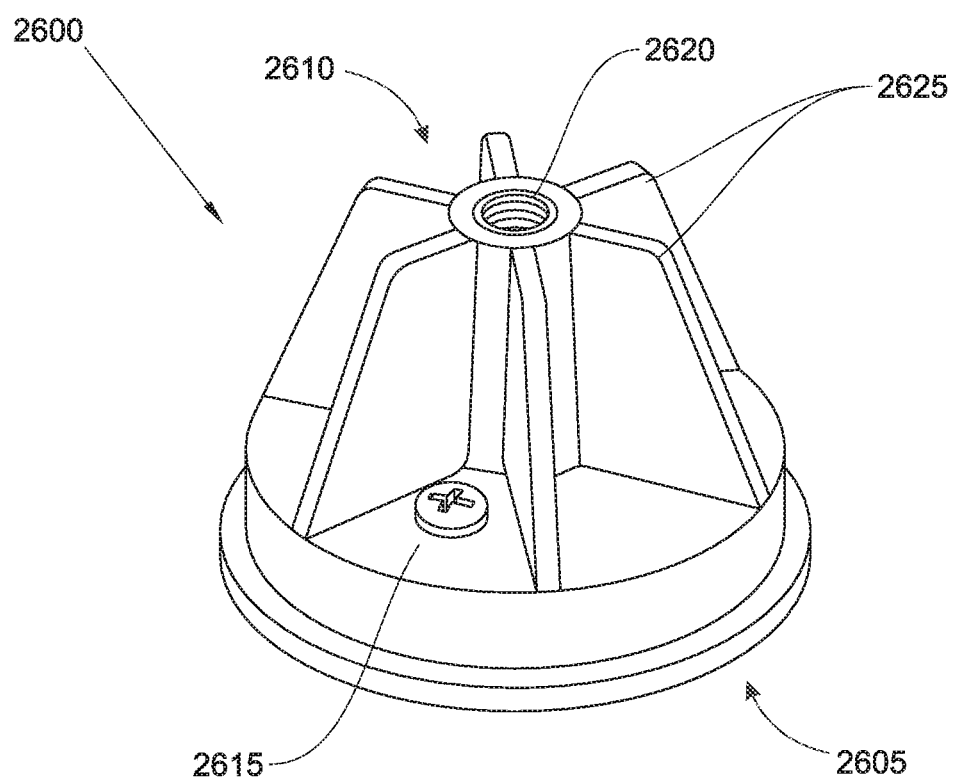
FIGS. 26A-26C depict various views of an exemplary foot coupler configured to fixedly couple a modular accessory attachment system to a cooler.
Figure 26B:
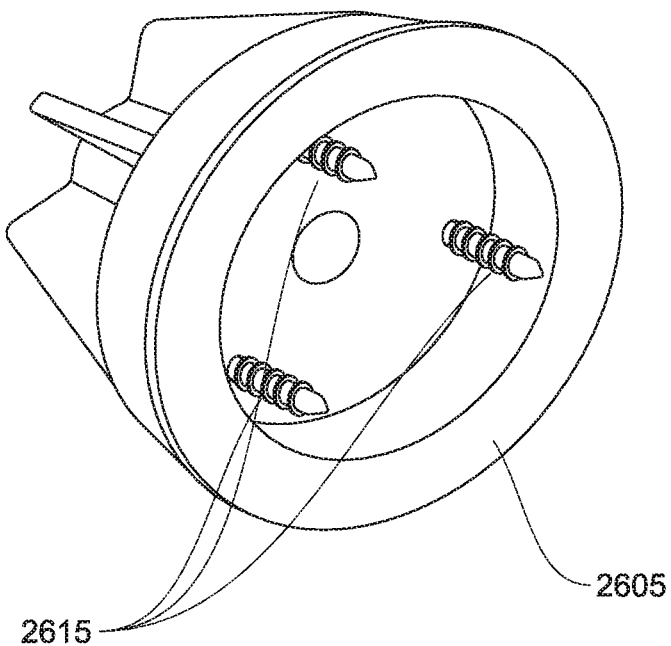
Figure 26C:
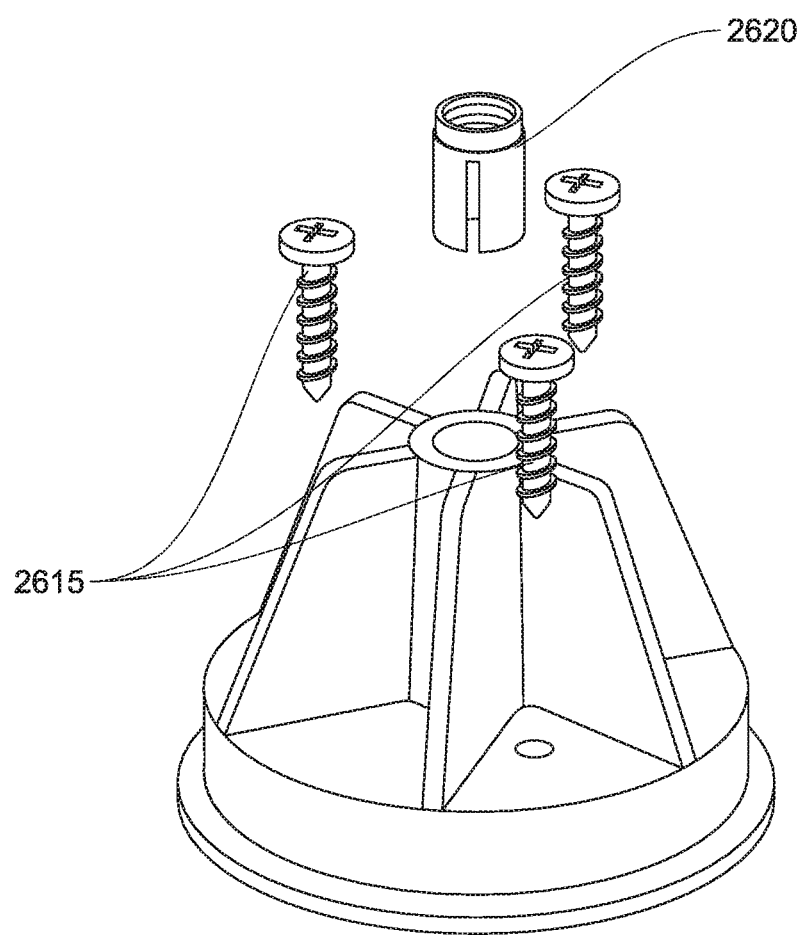

FIGS. 26A-26C depict various views of an exemplary foot coupler configured to fixedly couple a modular accessory attachment system to a cooler. A chassis-container coupler 2600 (also referred to as a container foot 2600) includes a proximal end 2605 configured to engage with a container such as a cooler, and a distal end 2610 configured to engage with the modular accessory attachment system 102. The coupler 2600 includes multiple screws 2615 configured to releasably fasten the coupler 2600 to attachment features (such as holes) the bottom of a cooler. The coupler also includes a threaded female aperture 2620 through which a fastener (such as a nut or bolt) may be inserted to releasably fasten the coupler 2600 to the modular accessory attachment system 2802. In various examples, the coupler 2600 may include multiple gussets 2625, which may advantageously increase the rigidity and stability of the coupler 2600. In some embodiments, the connection 2620 may be formed of a brass material.

Figure 27A:
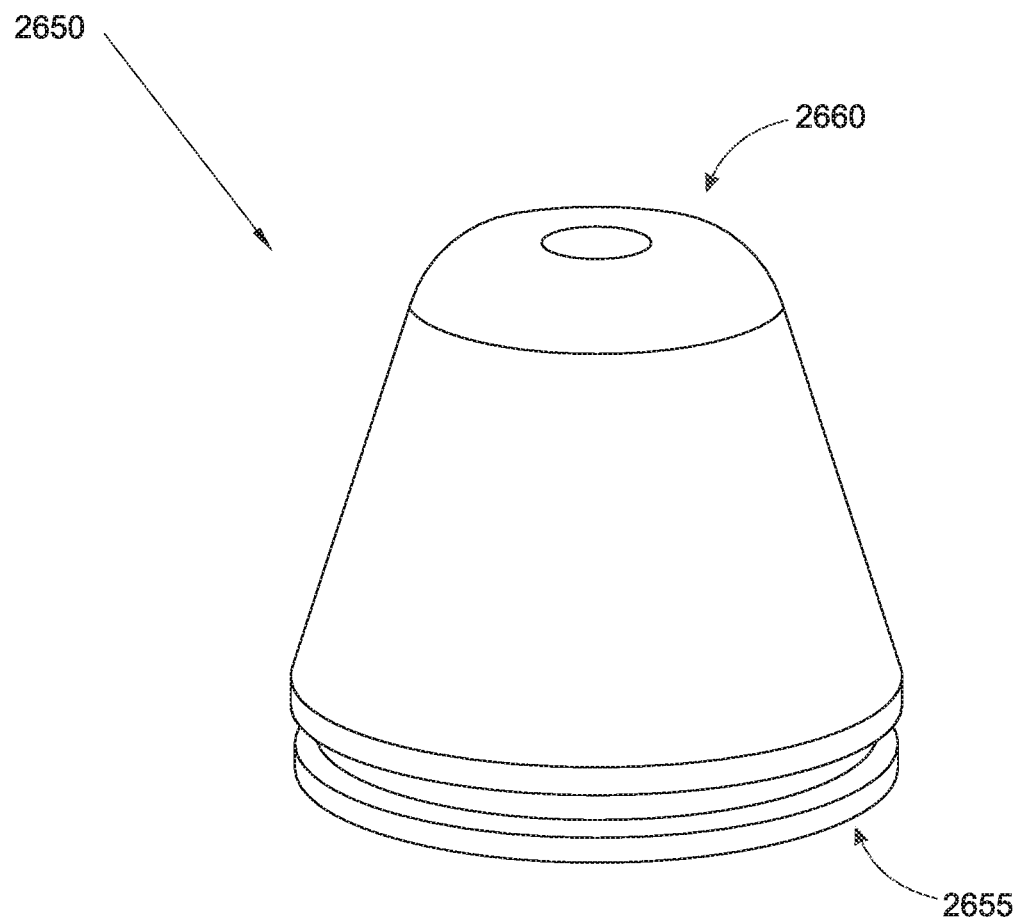
FIGS. 27A-27B depict various views of an exemplary foot cover configured to couple to a foot coupler.
Figure 27B:
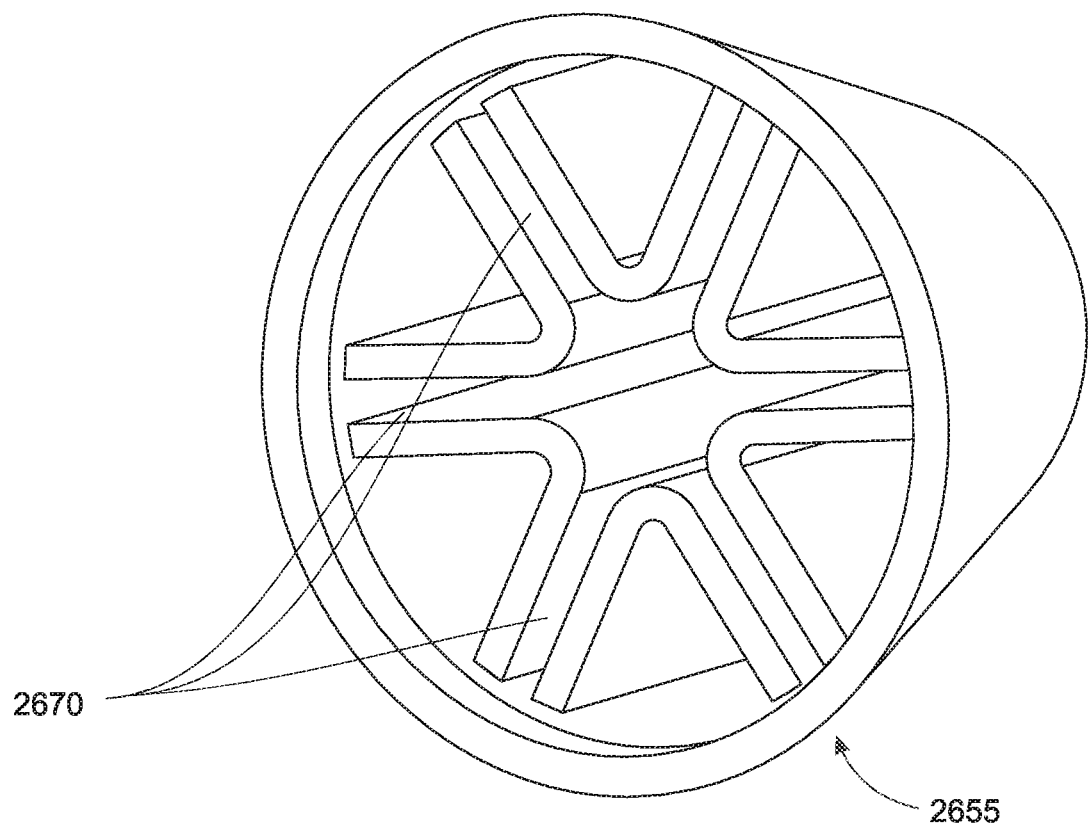

FIGS. 27A-27B depict various views of an exemplary foot cover configured to couple to a foot coupler. A foot cover or cap 2650 includes a proximal end 2655 and a distal end 2660. The cap 2660 includes recessed features 2670 that complement the central shaft and gussets of the coupler/foot 2600. The cap may therefore be securely placed over the coupler/foot 2600, to act has new "feet" for a cooler (if the feet 2600 have been installed on the cooler, a user may remove the modular accessory attachment system 2802 and just use the cooler 2801).

An exemplary chassis-container coupler 2600 assembly process is as follows. After a consumer/user buys a cooler at a retail store, the consumer will remove the existing/stock cooler feet. The user may then mechanically and operably couple the coupler/feet 2600, and then coupler to the system 2802. If the user desires to convert the cooler back to a wheel-less and accessory-less cooler, but has already installed the feet 2600, then the caps 2650 may be applied to each foot (using male/female mating features), where the caps may include some resilient material (e.g., rubber/or silicone material) to act as a proper set of feet for the augmented cooler.

Exemplary pins for fastening a cooler to a modular accessory attachment system may include a spring loaded pin, having a grip portion, a spring, and a translating pin/piston, housed with a housing. Exemplary pins may include a pin having spring-loaded balls at the ends. The features/functions of the pins may be combined into a double-spring pin, which may be used in conjunction with the system.

As can be seen in FIG. 25B, an exemplary handle 2259 for use with a modular accessory attachment system includes a chassis coupling member 2259A configured to hingeably couple to the handle couplers 2254 (shown also in FIG. 24E). The handle 2259 further includes a steering member 2259B configured to fixedly coupled to chassis coupling member 2259A at one end, and at an opposite end, fixedly couple to a handle 2259C (with an optional intermediate extension member 2259D coupled in between).

Although various embodiments have been described with reference to the 22A-27B, other embodiments are possible. For example, various components may be formed of aluminum, to provide high strength/resilience with light weight. Some components may, in some implementations, be (injection) molded from glass-filled structural plastic (such as nylon 6/6). The terms front/back/right/left/top/bottom (and similar spatial orientation terms) as used herein are merely relative terms, and not intended to be unduly limiting.

Figure 28A:
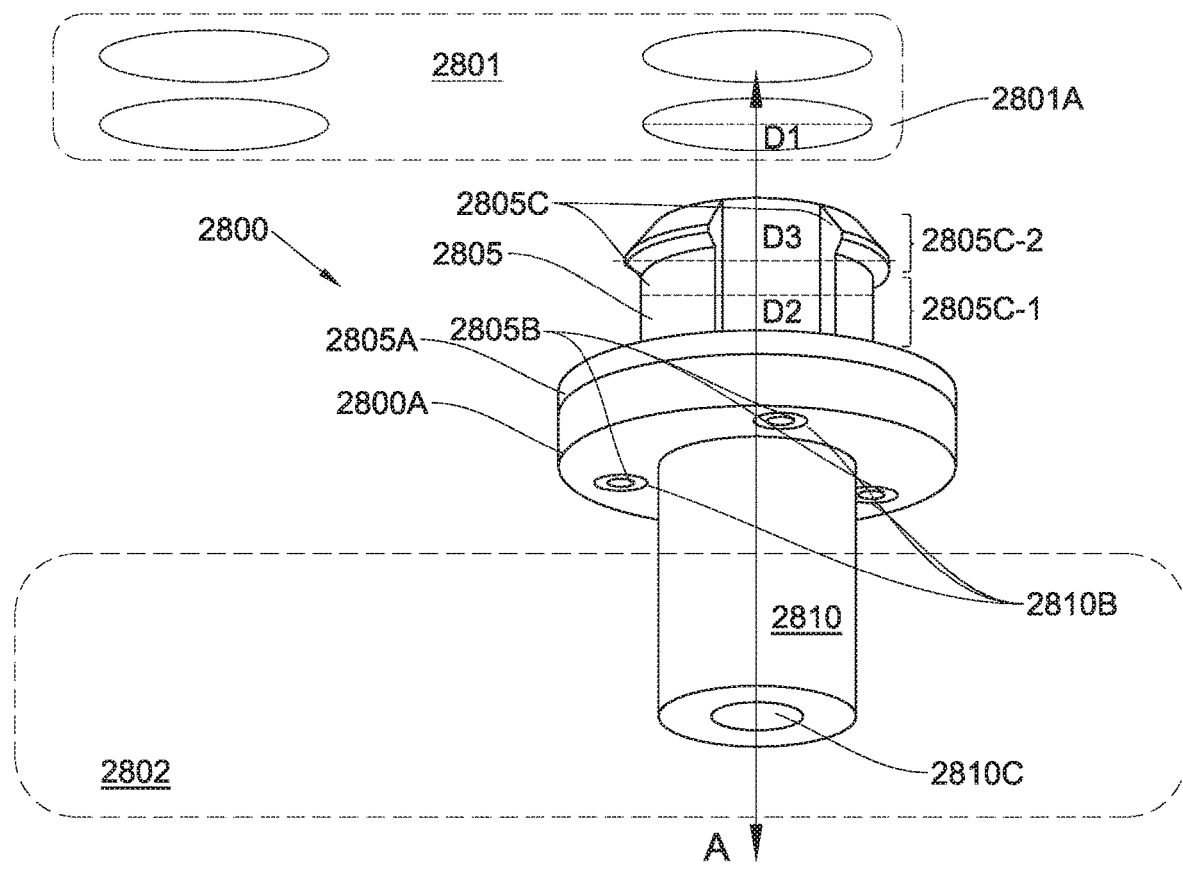
FIGS. 28A-28E depict various view of an exemplary first embodiment of a coupler assembly for mechanically securing a cooler to a cooler undercarriage system.
Figure 28B:
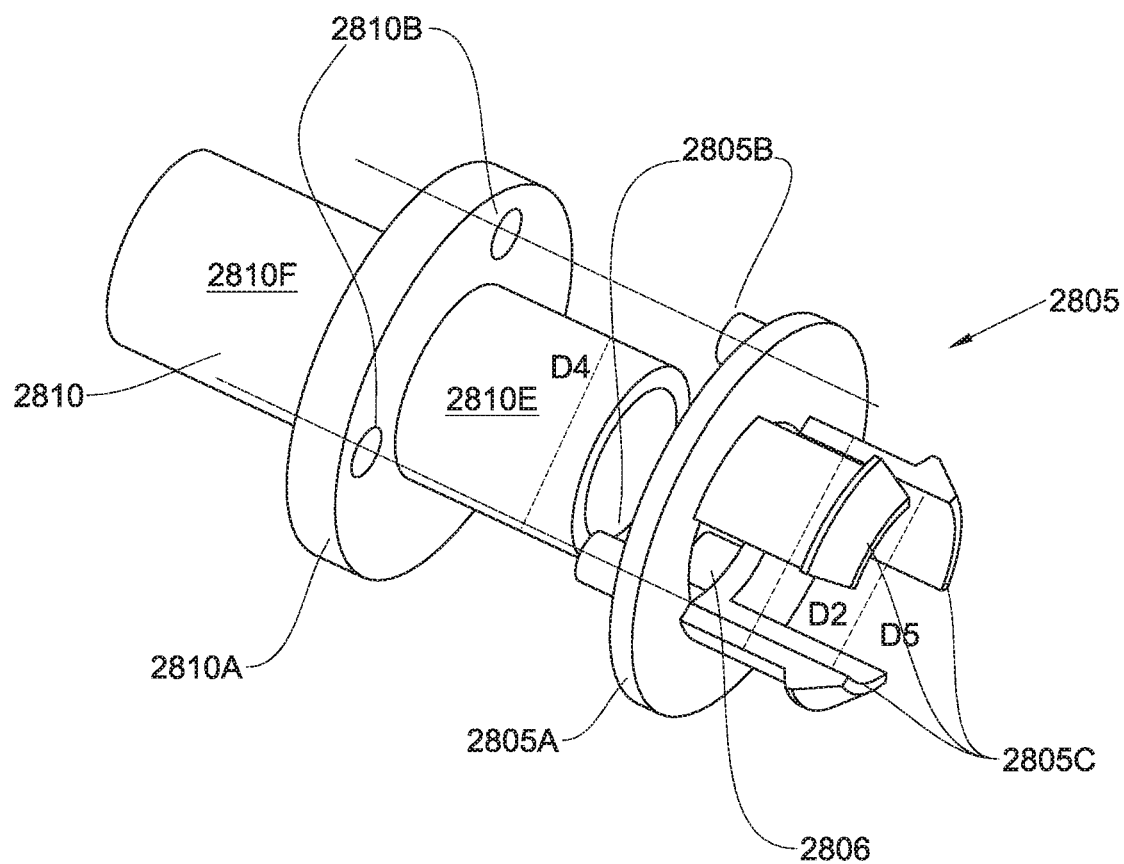
Figure 28C:
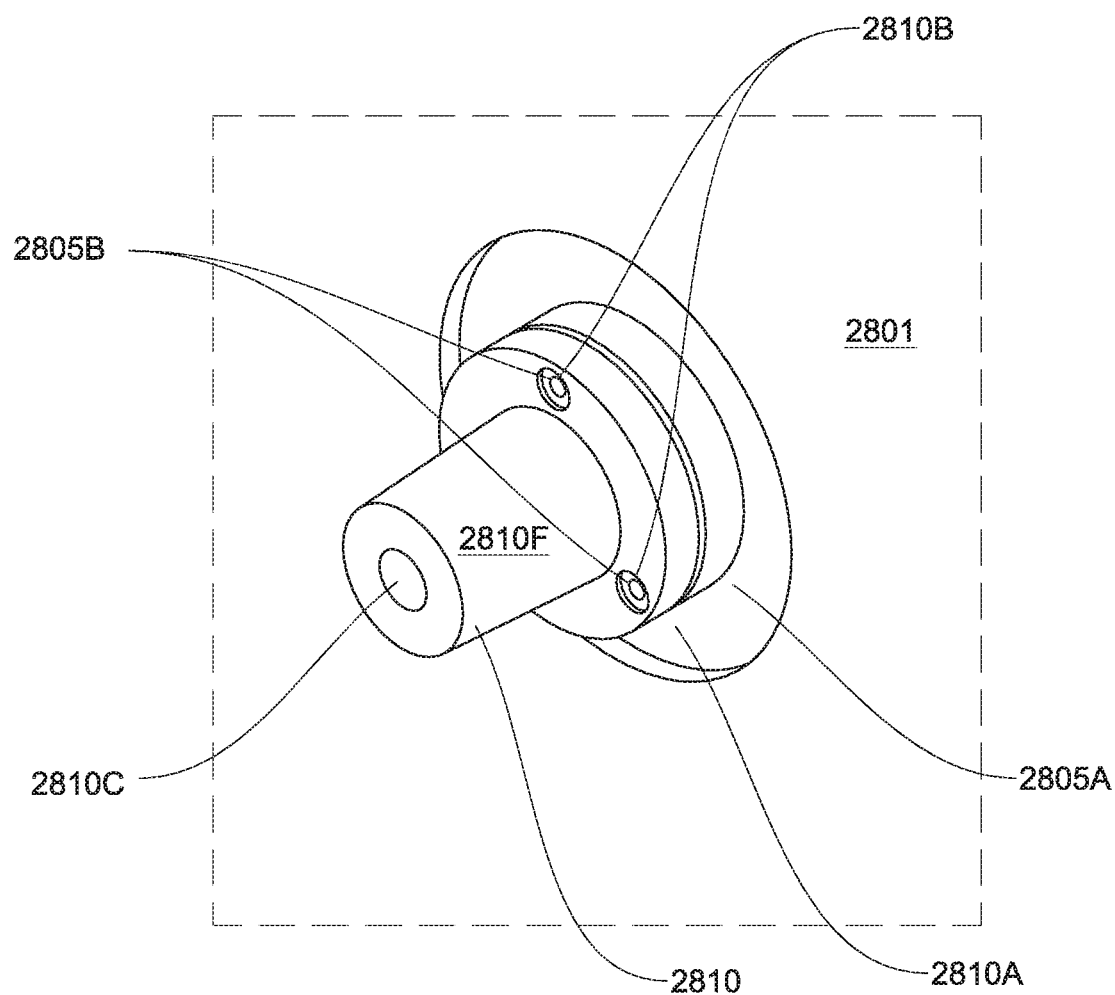

FIGS. 28A-28E depict various view of an exemplary first embodiment of a coupler assembly for mechanically securing a cooler to a cooler undercarriage system. A first exemplary coupler assembly 2800 is configured to fixedly couple a cooler 2801 to a cooler undercarriage system 2802. Examples for cooler undercarriage systems (also referred to as cooler chassis systems or cooler support systems) are described in both U.S. Provisional Application Ser. No. 62/809,365, titled "Modular Attachment and Accessory System for Containers," filed by William Jason Cohen, et al., on Feb. 22, 2019, and U.S. Provisional Application Ser. No. 62/916,085, titled "Adaptable Modular Attachment and Accessory System for Fitting Containers of Varying Sizes," filed by William Jason Cohen, et al., on Oct. 16, 2019, expressly incorporated herein as attached Appendices A and B. Some coolers may be manufactured with (circular) holes or apertures, such as holes machined or drilled into a hard exterior shell a cooler, for example. As shown in FIGS. 28A and 28C, a proximal end of the coupler assembly 2800 is configured to be inserted into a hole 2801A (out of four holes 2801A depicted) of the cooler 2801. A distal end of the coupler assembly 2800 is configured to be mechanically coupled to the cooler undercarriage system 2802 (e.g., via a fastener threadably mated in aperture 2810C in the distal end of the coupler assembly 2800). By employing multiple coupler assemblies 2800 (e.g., four coupler assemblies for each of the four holes 2801 shown in FIG. 28A), the coupler assemblies 2801 may cooperate to provide for a reliable and secure coupling mechanism that may advantageously yield easier and faster securing of the cooler 2801 to the cooler undercarriage system 2802.

An exemplary first coupler assembly 2800 includes a proximal coupler 2805. The coupler assembly 2800 further includes a distal coupler 2810 configured to securely and mechanically couple to the proximal coupler 2805. Both couplers 2805, 2810 extend along, and are configured to operably align with one another along a common longitudinal axis A. In many implementations, various features of the coupler assembly 2800 may be radially symmetric (e.g., about the longitudinal axis A). The proximal coupler 2805 and the distal coupler 2810 interface with one another at a flange interface between a first flange 2805A of the proximal coupler 2805 and a second flange 2810A of the distal coupler 2810. Specifically, (three) bosses 2805B of the flange 2805A of the proximal coupler 2805 may be inserted through (three) apertures 2810B in the flange 2810A of the distal coupler 2810, respectively, at which point fasteners (e.g., screws) may be applied to the bosses 2805B to compressingly fix the couplers 2805 and 2810 to one another.

The proximal coupler 2805 further includes (three) elastically-deforming locking tongs or tabs 2805C that extend proximally away from the first flange 2805A and along a direction parallel to the longitudinal axis A. Each tab 2805C includes a bridge 2805C-1 that terminates (at a proximal end) in a radially protruding lip or shoulder 2805C-2. As the tabs 2805C are inserted into the hole 2801A of the cooler 2801, the tabs 2805C may deflect (elastically deform) radially inward, until the radially protruding shoulder 2805C-2 translates far enough into the hole 2801A to snap back into an unbiased or undeformed state, thus securely and mechanically locking the coupler 2800 to the body, shell, or frame of the cooler 2801. More specifically, the hole 2801A may have a first diameter D1, the outside surfaces of the bridges 2805C-1 may define a second diameter D2 (less than or equal to D1), and the radially protruding shoulders 2805C-2 may define a third diameter D3 (greater than D2), where the diameters D2 and D3 may temporarily/slightly reduce in size as the coupler 2800 is inserted into the hole 2801A.

Furthermore, as shown in FIG. 28B, the distal coupler further includes a proximal-facing portion 2810E and distal-facing portion 2810F disposed on opposite sides of the second flange 2810A. The portions 2810E, 2810F are shaped as hollow cylinders or tubes, in this exemplary depiction. The proximal-facing portion 2810E has an outer diameter D4, which may be equal to or less than an inner diameter D5 defined by the inner surfaces of the tabs 2805C (see, e.g., FIGS. 1B and 1D). The proximal-facing portion 2810E is received in a central aperture 2806 of the proximal coupler 2805. The (hard) outer surface of the proximal-facing portion 2810E may function to hold the proximal ends of the locking tabs 2805C into a locked state once the coupler 2800 is operably coupled to the cooler 2801.

Figure 28D:
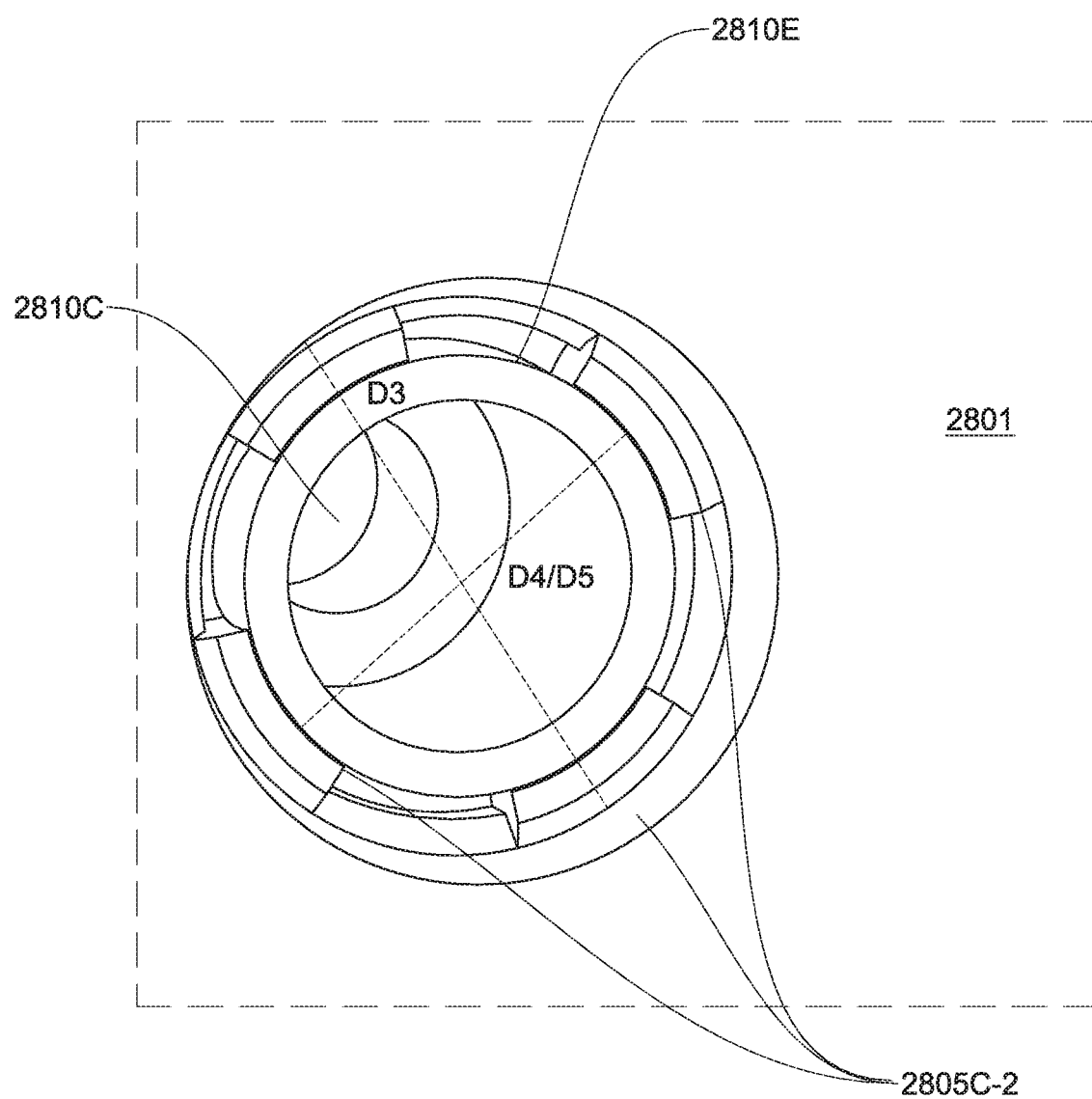
Figure 28E:
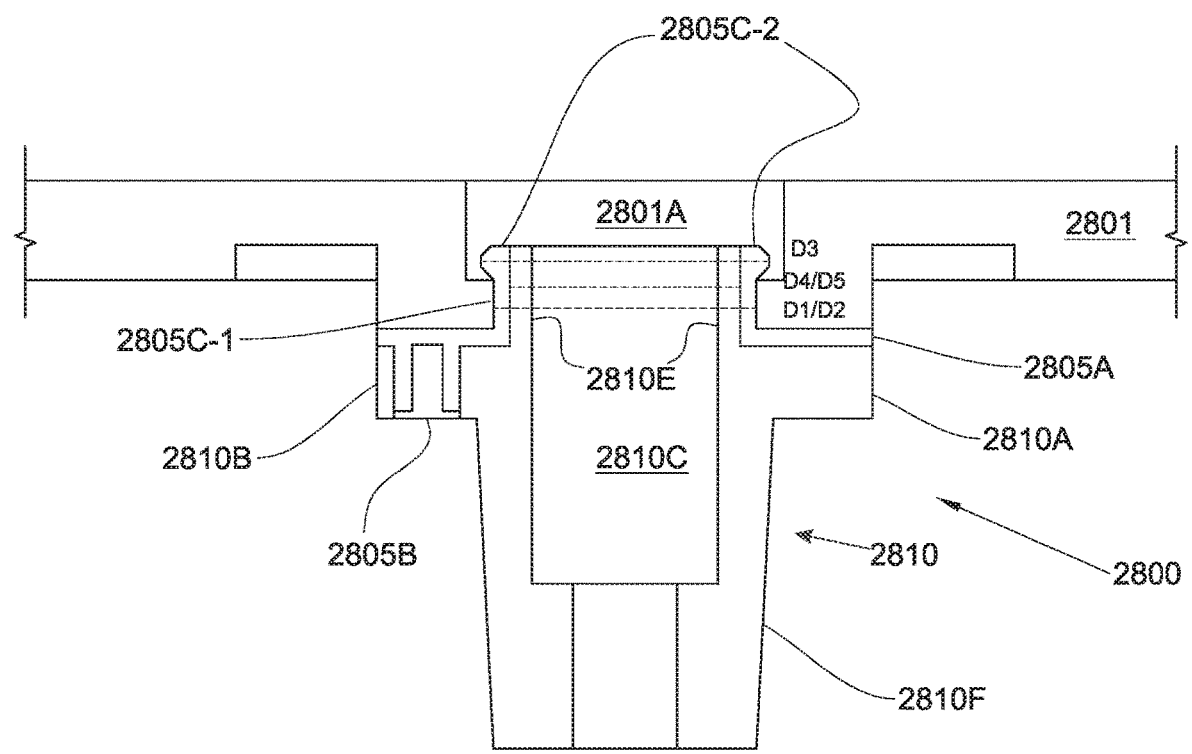

FIG. 28C depicts the coupler 2800 operably coupled to the cooler 2801, from a bottom perspective view of the cooler 2801, while FIG. 28D depicts the proximal parts of the coupler 2800 (in a securely locked state), from an interior perspective view of the cooler 2801. FIG. 28E depicts a cross-sectional view of the coupler 2800 operably coupled to the cooler 2801.

Figure 29A:
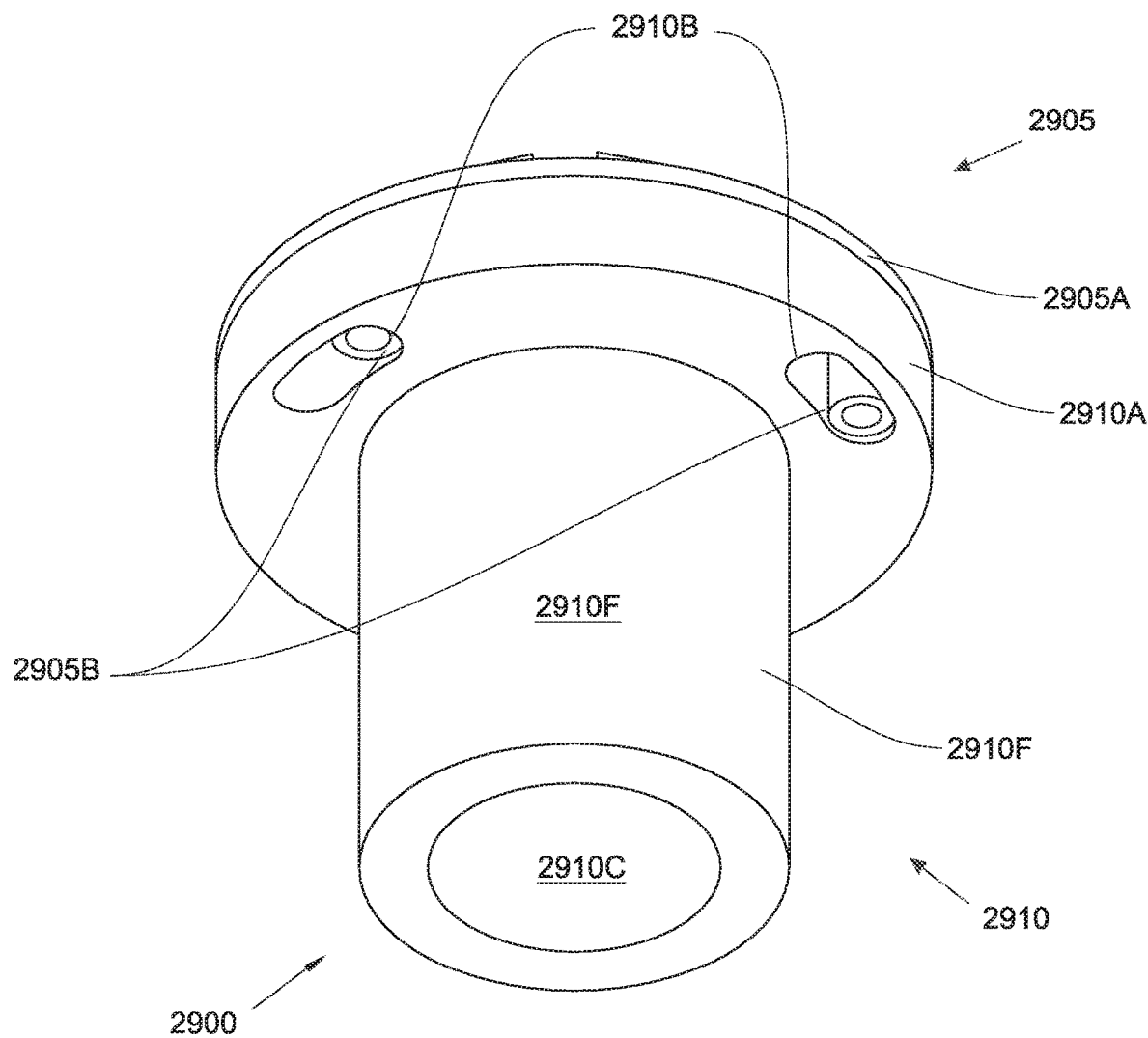
FIGS. 29A-29E depict various view of an exemplary second embodiment of a coupler assembly for mechanically securing a cooler to a cooler undercarriage system.
Figure 29B:
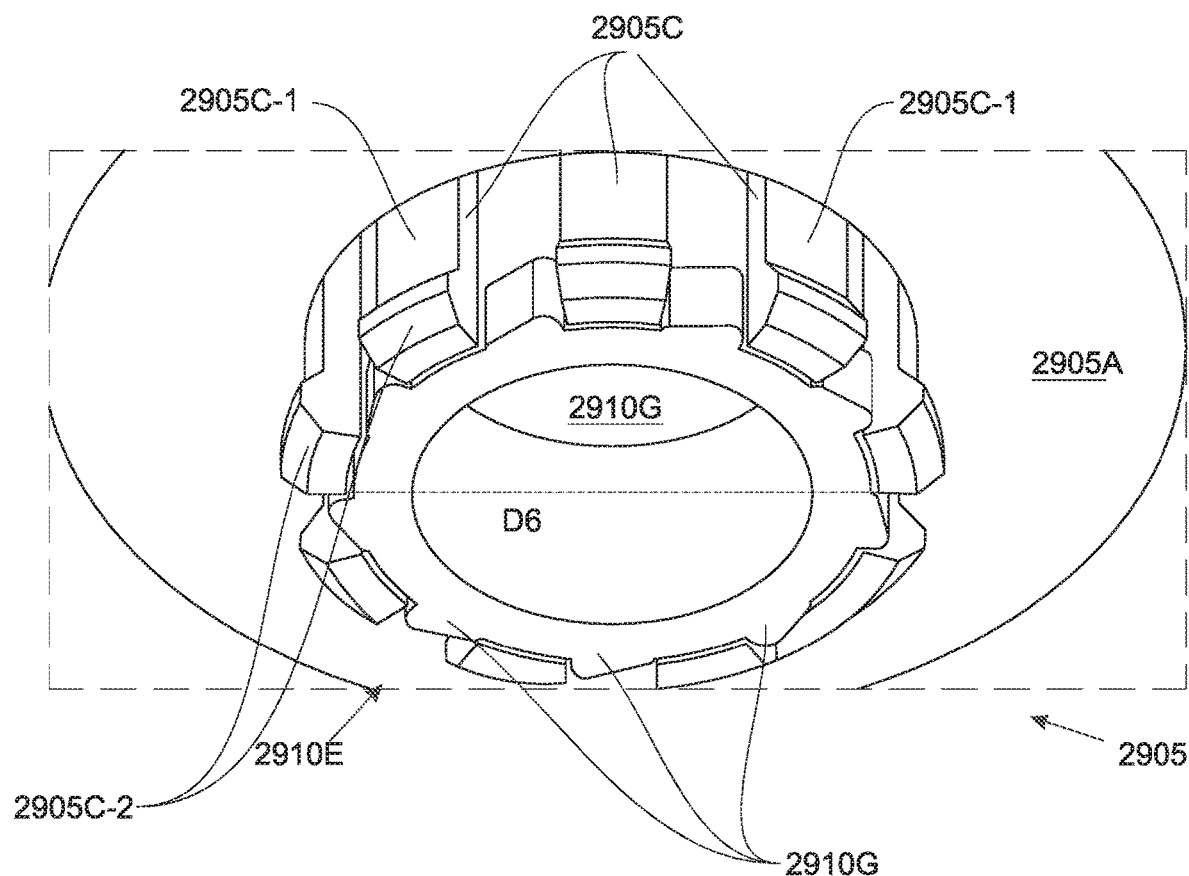
Figure 29C:
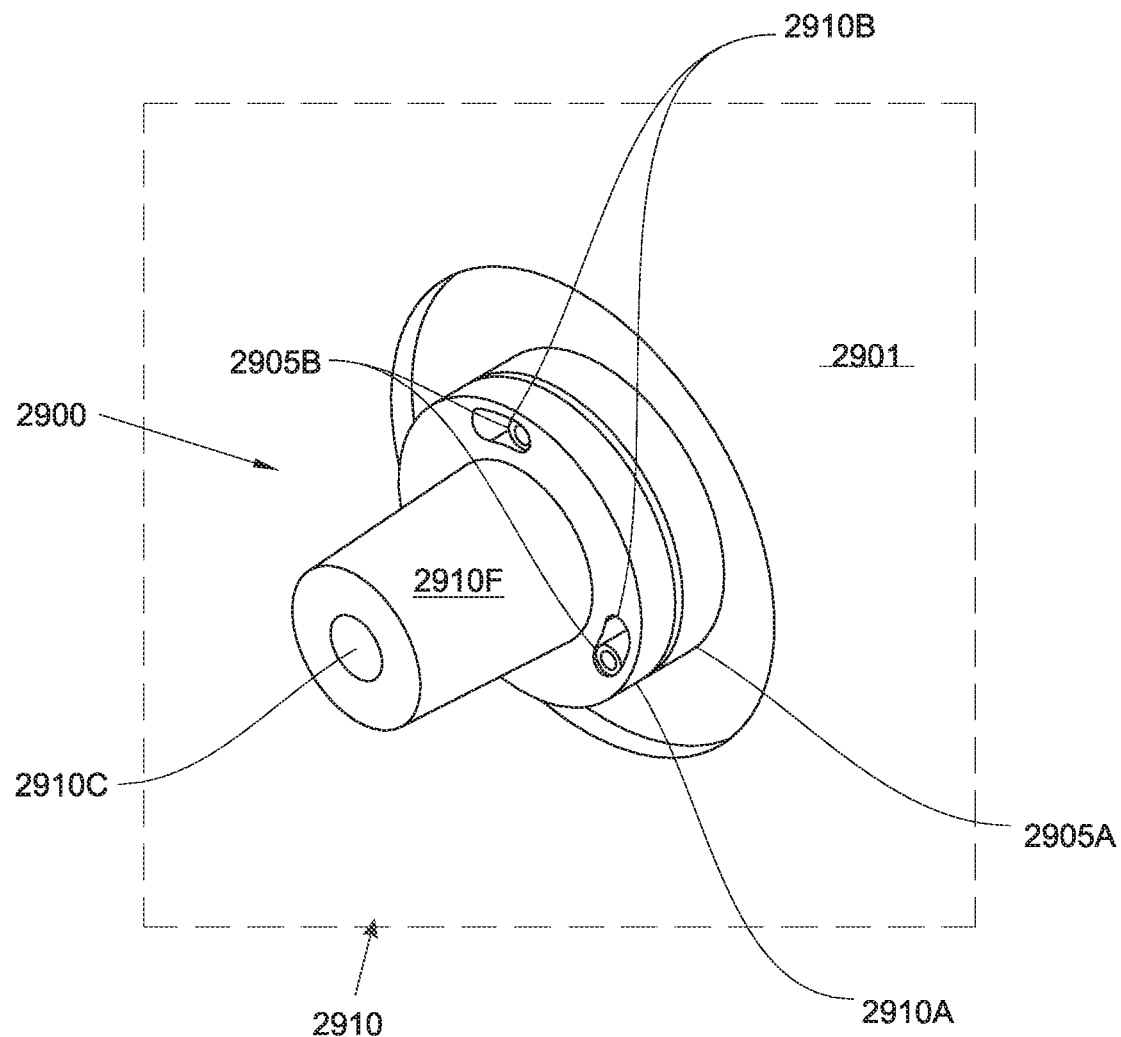
Figure 29D:
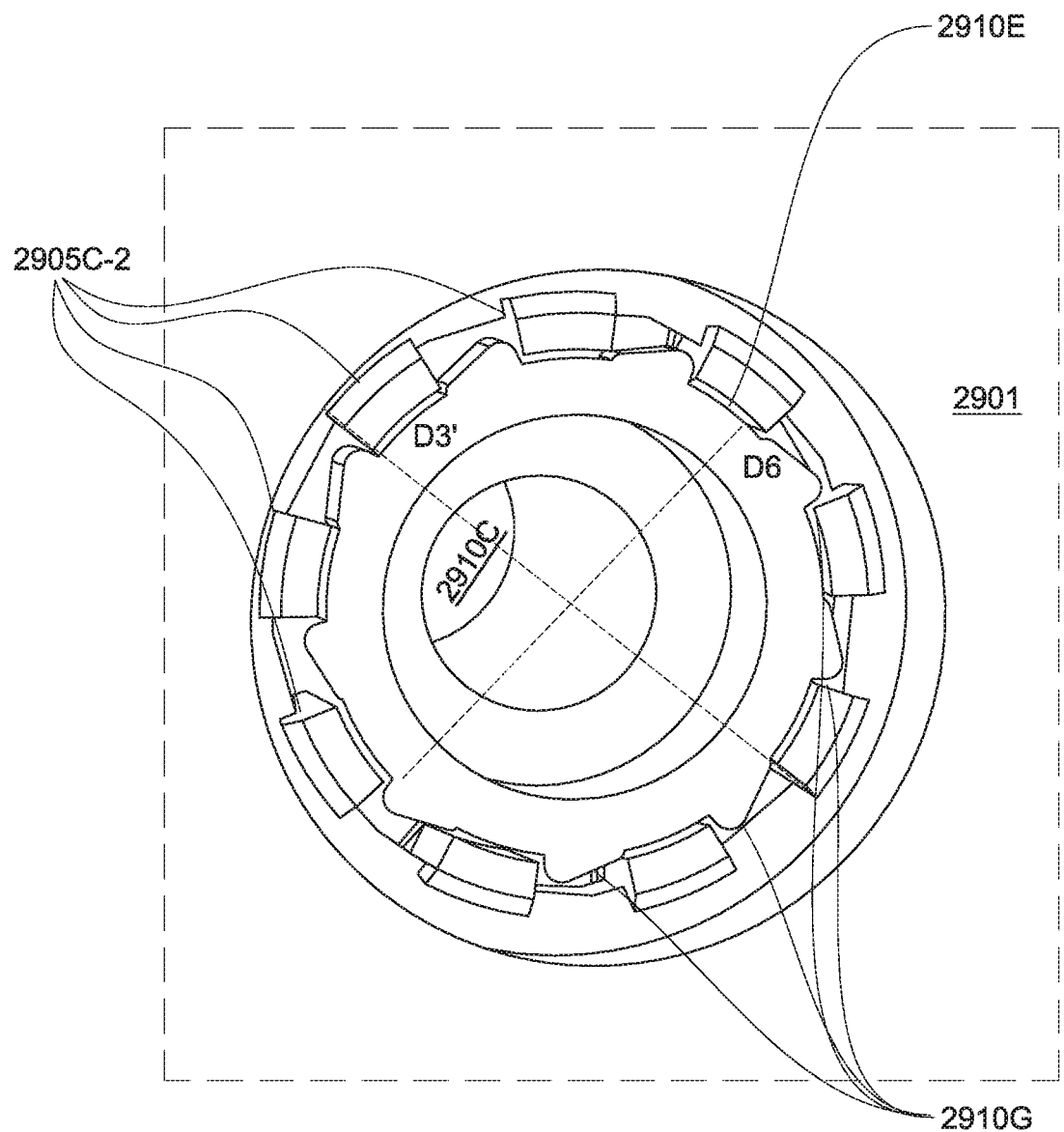
Figure 29E:
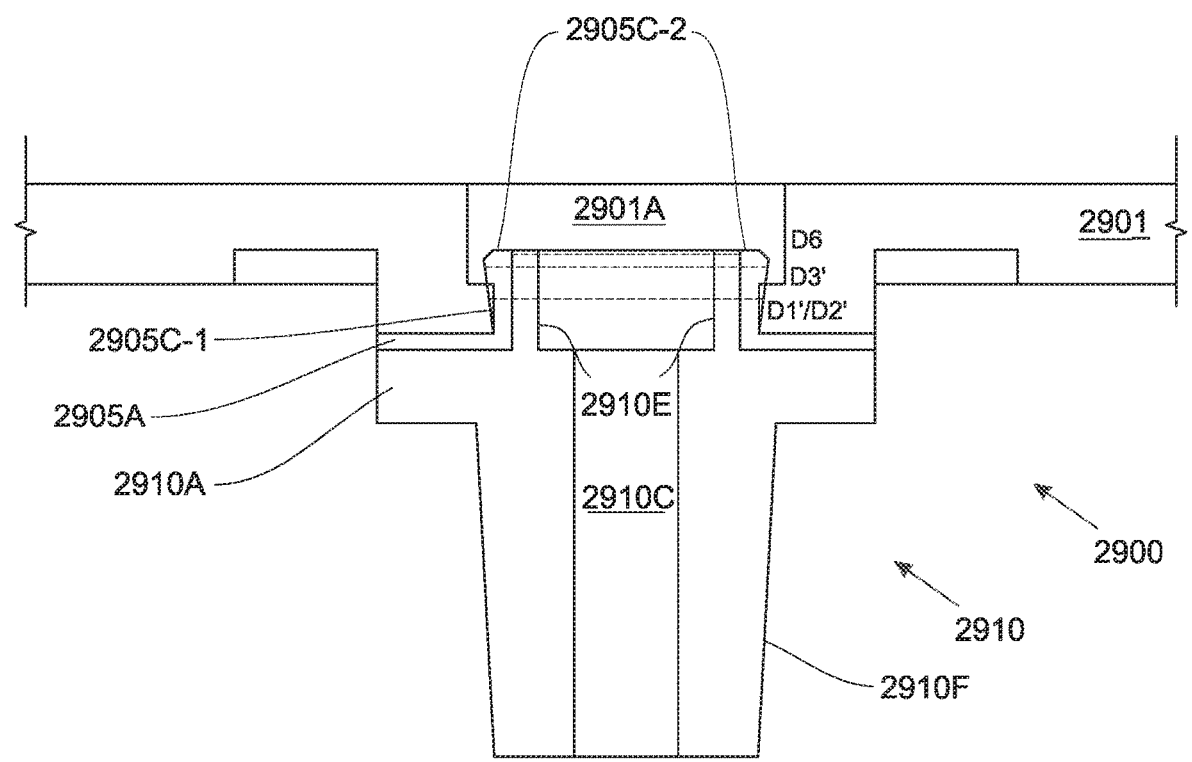

FIGS. 29A-29E depict various view of an exemplary second embodiment of a coupler assembly for mechanically securing a cooler to a cooler undercarriage system. FIGS. 2A, 2B, 2C, 2D, and 2E depict various view of an exemplary second embodiment of a coupler assembly for mechanically securing a cooler to a cooler undercarriage system. FIG. 29C depicts the coupler 2900 operably coupled to the cooler 2901, from a bottom perspective view of the cooler 2901, while FIG. 29D depicts the proximal parts of the coupler 2900 (in a securely locked state), from an interior perspective view of the cooler 2901. FIG. 29E depicts a cross-sectional view of the coupler 2900 operably coupled to the cooler 2901.

Various structures, components, and functions of an exemplary second embodiment of a coupler assembly 2900 may be similar to the structures, components, and functions of the exemplary first embodiment of the coupler assembly 100. For example, the coupler assembly 2900 includes a proximal coupler 2905 and a distal coupler 2910, each having their respective flanges 2905A, 2905B to interface and mechanically fix to one another. The proximal coupler 2905 includes (three) bosses 2905B configured to be received in (three) tangentially extending apertures or slots 2905B of the (second) flange 2910A, respectively. The slots 2905B may allow for (limited) rotation of the proximal coupler 2805 with respect to the distal coupler 2810.

As shown in FIG. 29B, a proximal end of the coupler assembly 2900 includes the proximal coupler 2905. Received in a central aperture of the proximal coupler 2905 is a proximal-facing end 2910E of the distal coupler 2910. Disposed radially along the proximal-facing end 2910E of the distal coupler 2910 are multiple sloped radial protrusions 2910G that define a variable diameter D6. Each protrusion 2910G is associated with a corresponding locking tab 2905. An outer surface of a sloped radial protrusions 2910G is configured to forcibly engage with an inner surface of an associated tab 2905 to selectively bias the tab radially outward, such that the tabs 2905 and the proximal-facing end 2910E cooperatively function as a mechanical bushing. Such selective biasing of the tabs 2905 may advantageously allow the coupler assembly 2900 to safely and securely couple to a wide variety of coolers (e.g., such as cooler 2901, having holes 2901A of diameter D1', which may be a different sized diameter from diameter D1 discussed above with reference to FIGS. 1A-1F). The extent to which the tabs 2905 are biased by the protrusions 2910G in cooperation with the proximal-facing end 2910E may be determined by a rotation angle of the distal coupler 2910 relative to the proximal coupler 2905. Once a user has set the desired level of biasing (to fit the cooler 2900 at hand), the user may fix the angular position of the distal coupler 2910 relative to the proximal coupler 2905 by fastening down the bosses 2905B at the corresponding orientation along the tangentially extending slots 2910B. In this sense, the coupler assembly 2900 is adapted to selectively in configuration (e.g., diameters D2' and D3' associated with the tabs 2905C) to advantageously fit coolers having attachment holes of varying sizes.

Figure 30A:
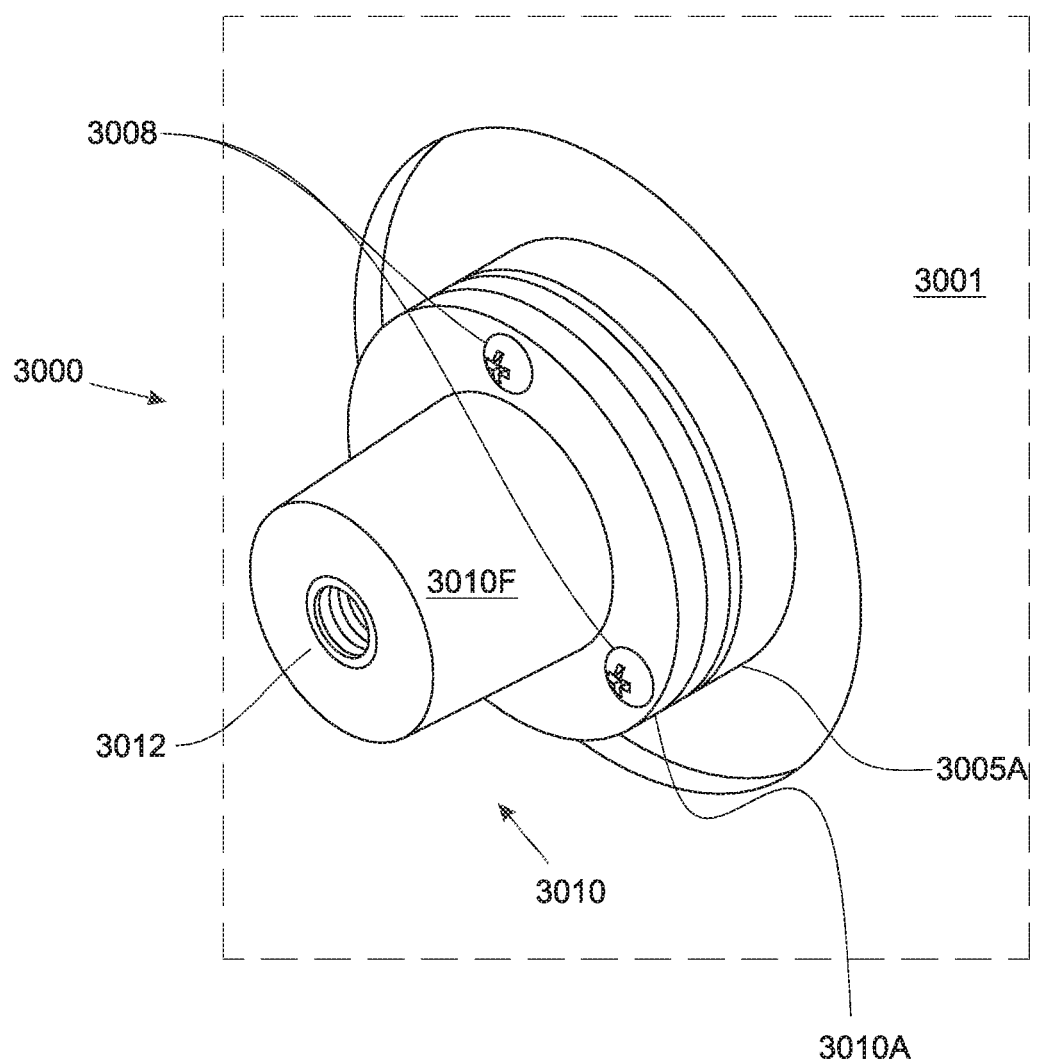
FIGS. 30A-30C depict various view of an exemplary third embodiment of a coupler assembly for mechanically securing a cooler to a cooler undercarriage system.
Figure 30B:
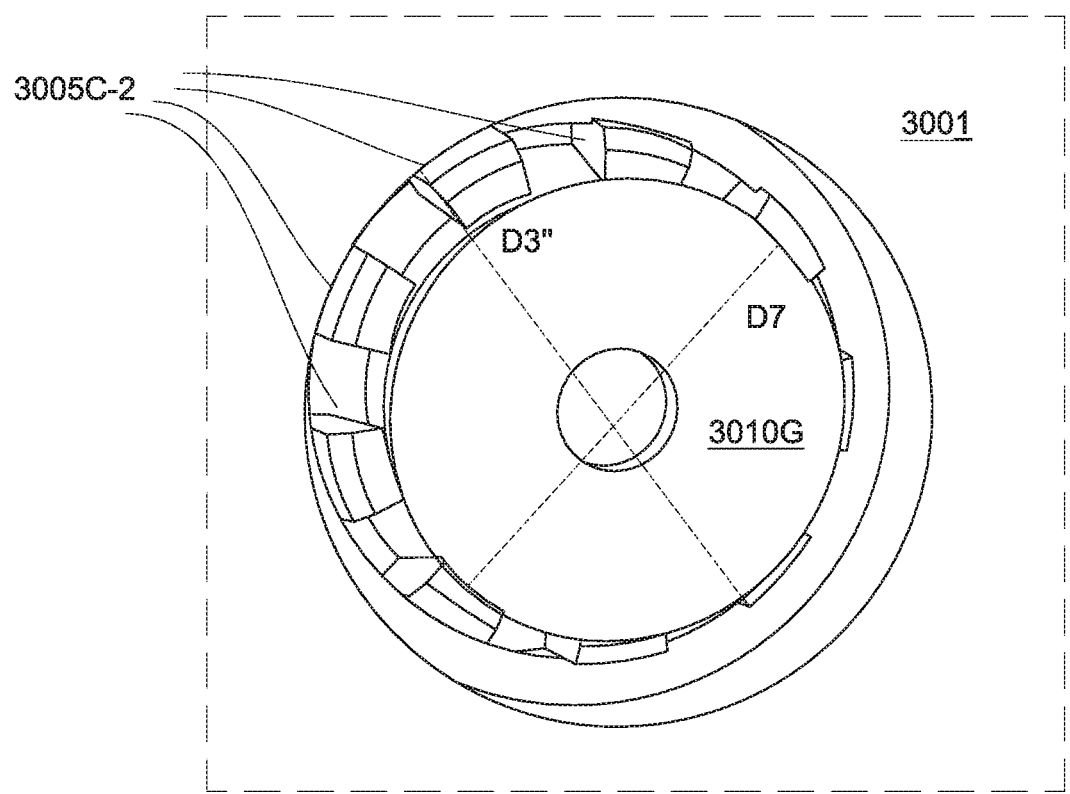
Figure 30C:
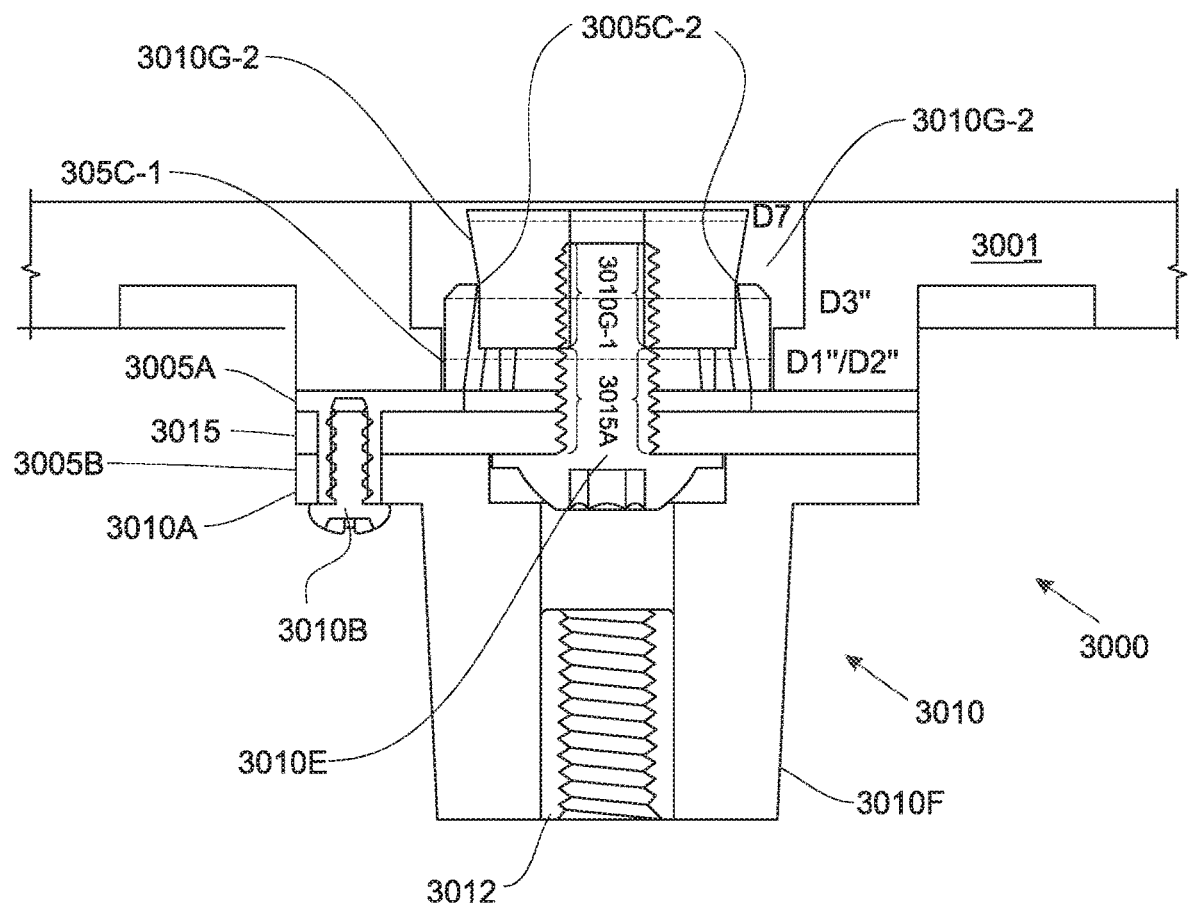

FIGS. 30A-30C depict various view of an exemplary third embodiment of a coupler assembly for mechanically securing a cooler to a cooler undercarriage system. FIGS. 3A, 3B, and 3C depict various view of an exemplary third embodiment of a coupler assembly for mechanically securing a cooler to a cooler undercarriage system. FIG. 30A depicts the coupler 3000 operably coupled to the cooler 3001, from a bottom perspective view of the cooler 3001, while FIG. 30B depicts the proximal parts of the coupler 3000 (in a securely locked state), from an interior perspective view of the cooler 3001. FIG. 30C depicts a cross-sectional view of the coupler 3000 operably coupled to the cooler 3001.

Various structures, components, and functions of an exemplary third embodiment of a coupler assembly 3000 may be similar to the structures, components, and functions of the exemplary first and second embodiments of the coupler assemblies 2800 and 2900. For example, the coupler assembly 3000 includes a proximal coupler 3005 and a distal coupler 3010, each having their respective flanges 3005A, 3005B to mechanically fix to one another. The proximal coupler 3005 includes (three) bosses 3005B configured to be received in (three) apertures 3005B of the (second) flange 3010A, respectively (along with associated fastening screws/bolts 3008). Fixed at a distal end of the distal-facing end 3010F is a fastening insert 3012 that occupies an internal aperture of the distal-facing end 3010F.

As shown in FIG. 30B the proximal end of the coupler assembly 3000 includes an adjustable biasing member 3010G. In operation, the adjustable biasing member 3010G may be configured to selectively set a level of outward radial bias of the tabs 3005C to fit the coupling assembly 3000 to a wide variety of cooler makes and models. More specifically, the adjustable biasing member 3010G includes (first) internal threads 3010G-1. The internal threads 3010G-1 is configured to threadingly couple with an adjustable screw 3010E (transparently depicted in FIG. 30C). Furthermore, an annular threaded member 3015 having (second) internal threads 3015E is also be configured to threadingly couple with an adjustable screw 3010E. When so coupled, a level of tightening of the adjustable screw 3010E may determine a longitudinal spatial position of the adjustable biasing member 3010G.

The adjustable biasing member 3010G may be have an outward radially symmetric surface that includes a taper or slope 3010G-2, such that a variable diameter D7 of the adjustable biasing member 3010G may decrease (or increase) in the size, depending on the longitudinal position of the adjustable biasing member 3010G relative to the rest of the assembly 3000. By selectively tightening the adjustable screw 3010E to adjust the longitudinal position of the adjustable biasing member 3010, an outer sloped surface 3010G-2 is configured to forcibly engage with an inner surface of an associated tab 3005 to selectively bias the tab radially outward. Such selective biasing of the tabs 3005 may advantageously allow the coupler assembly 3000 to safely and securely couple to a wide variety of coolers (e.g., such as cooler 3001, having holes 3001A of diameter D1", which may be a different sized diameter from diameter D1 or D1' discussed above). The extent to which the tabs 3005 are biased may be determined a level of tightening of the adjustable screw 3010E in the threads 3010G-1 and 3015A. Once a user has set the desired level of biasing (to fit the cooler 3000 at hand), the user may assemble to distal coupler 3010 to the proximal coupler 3005 by fastening down the bosses 3005B (e.g., using screws 3008 inserted into aperture 3010B). In this sense, the coupler assembly 3000 is adapted to selectively adjust in configuration (e.g., diameters D2" and D3" associated with the tabs 3005C) to advantageously fit coolers having attachment holes of varying sizes.

FIGS. 31A-31G depict various aspects of a modular accessory attachment system, including a clampable axle block, an extendable handle coupling point, and a handle clip accessory configured to releasably attach to a modular accessory attachment surface. Similar to the discussion above (with reference to FIGS. 22A-25E), a chassis or undercarriage 2210 is coupled to a cooler 2201, as shown in the front perspective zoomed-in view of FIG. 31A. The chassis 2210 includes a chassis cap 2226 and cap extensions 2230 mechanically coupled to a cooler 2201. A rolling chassis (associated with the chassis 2210) includes an axle 2250 fixedly yet releasably coupled to the chassis cap 2226 at an axle block 2255'. The axle block 2255' is clampingly retained to the cap 2226 using a clamp member 2265, which may be a Y-clamp, in various examples. The clamp member 2265 is configured to mechanically couple to the chassis cap 2226 via a fastener (thumbscrew) 2270. The axle block 2255' may be released from the clamp member 2265 by loosening the thumbscrew 2270, which may advantageously allow the chassis 2210 to be quickly and toolessly converted from a wheel-less chassis (with feet 2232) to a rolling chassis.

Figure 31A:
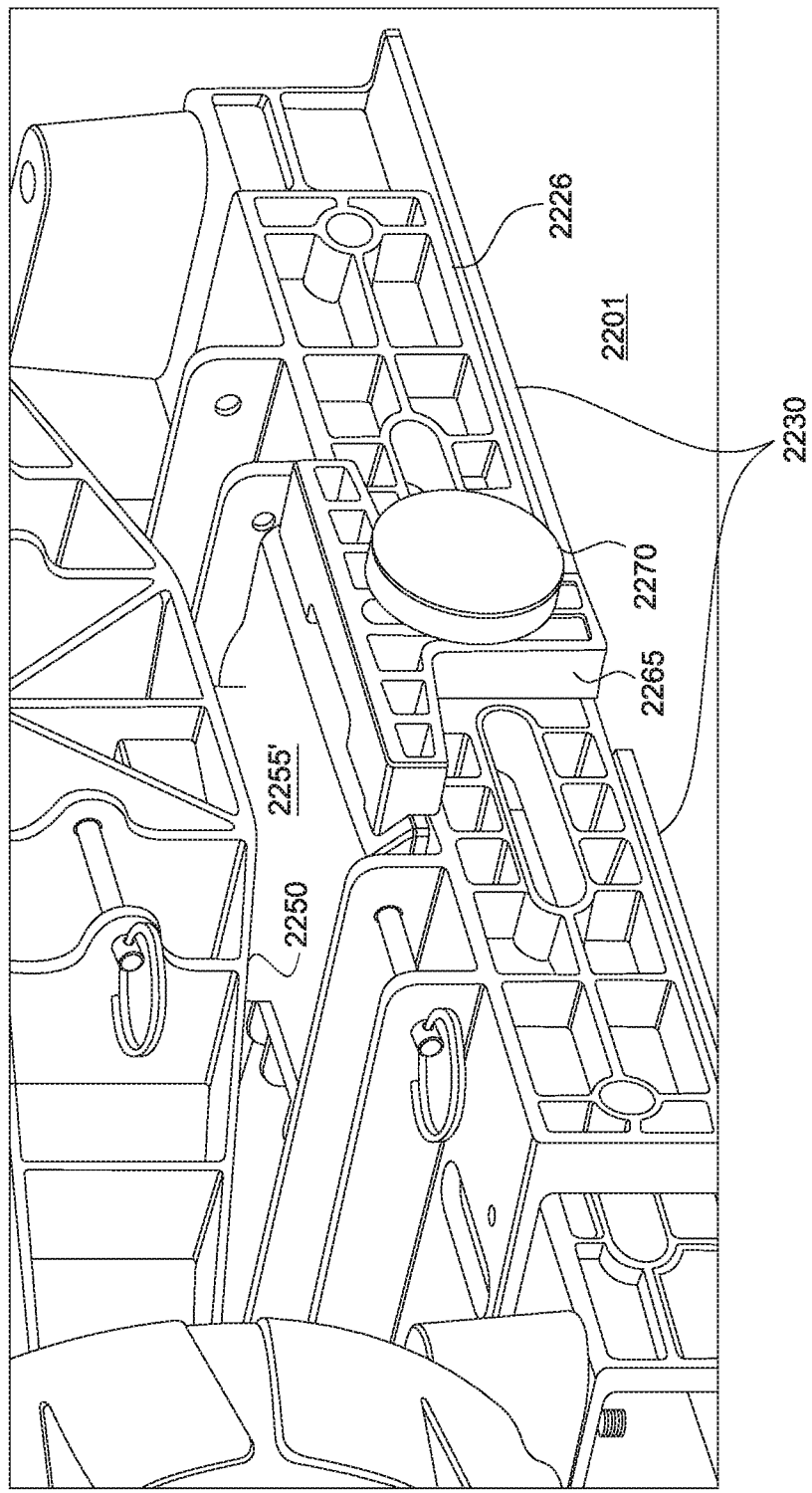
FIGS. 31A-31G depict various aspects of a modular accessory attachment system, including a clampable axle block, an extendable handle coupling point, and a handle clip accessory configured to releasably attach to a modular accessory attachment surface.
Figure 31B:
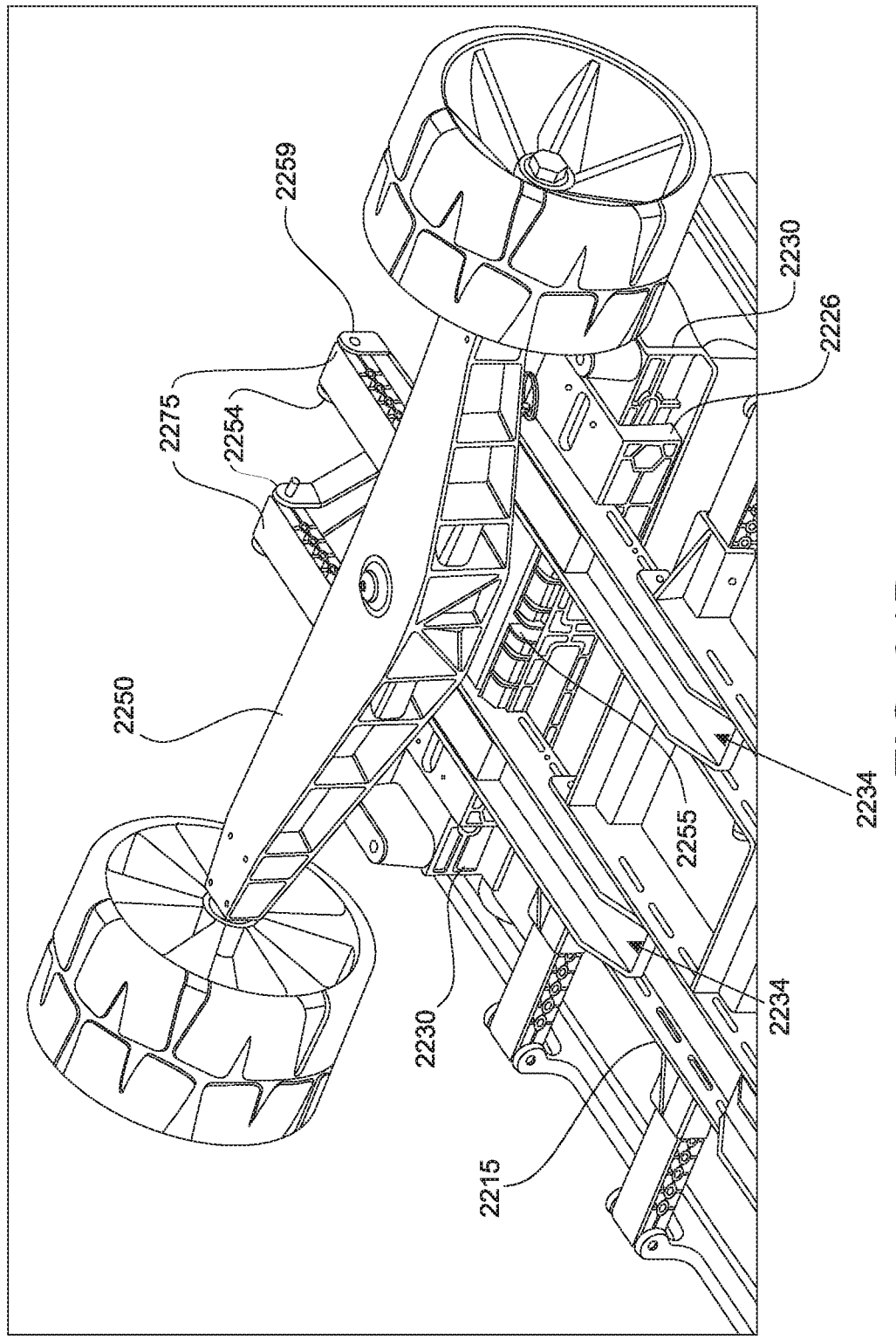

FIG. 31B depicts an underside perspective view of the chassis 2210 mechanically fixed to the cooler 2201. The chassis 2110 includes the pair of attachment surface extension members 2234 configured to mechanically set a longitudinal spatial position of a modular accessory attachment surface. Mechanically coupled to the axle 2110 are a pair of handle extension members 2275. The pair of handle extension members 2275 are (hingedly) coupled to an associated chassis handle 2259 at handle coupling points 2254'. The handle extension members 2275 are configured to selectively extend and retract relative to the axle 2250 to set a longitudinal position of a handle coupling points 2254' relative to the chassis frame 2210. FIG. 31B also shows how the axle block 2255' is clampingly retained (at least partially) by a (rear) portion of the chassis cap 2226.

Figure 31C:
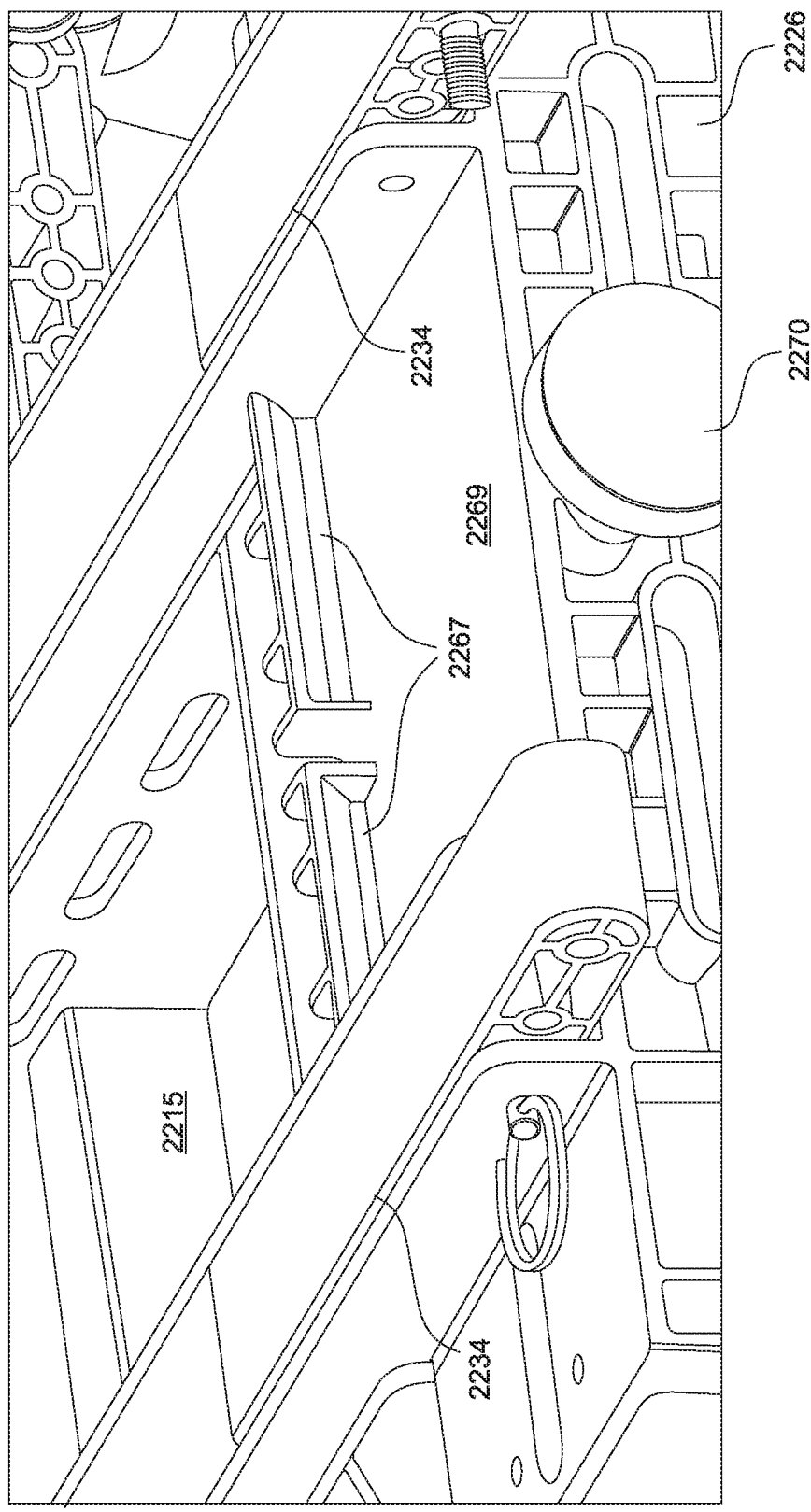
Figure 31D:
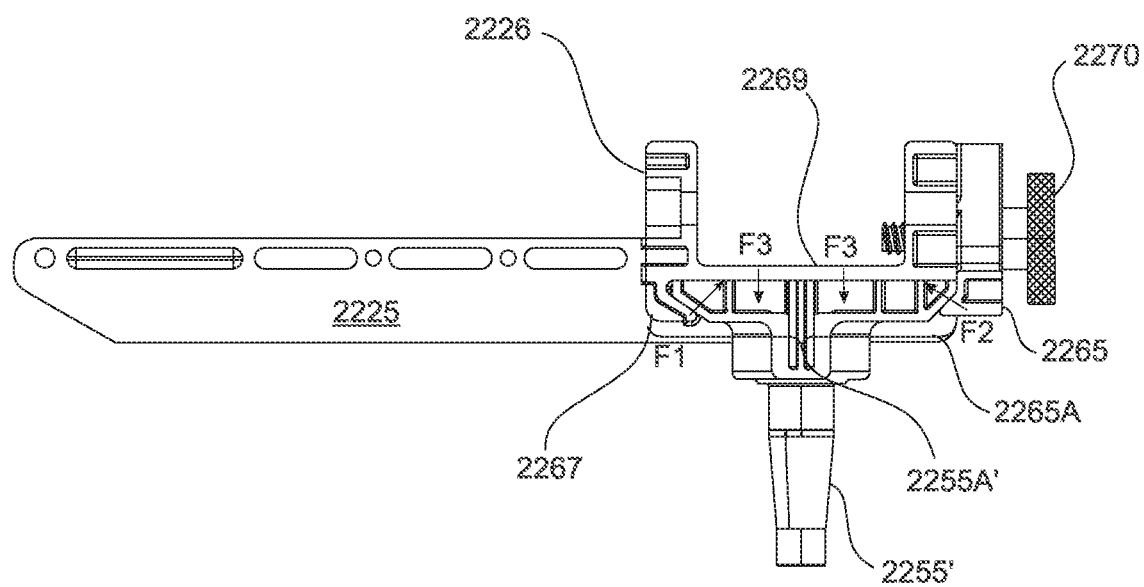

FIG. 31C depicts an underside perspective view of the chassis cap 2226, with the axle 2250, the axle block 2255', and the clamp member 2265 removed to expose an axle block engaging surface of receptacle 2269 of the underside of the chassis cap 2226. Also included with the chassis cap 2226 proximate to (or defining) the axle block receptacle 2269 are a pair of clamp surfaces, channels, or recesses 2267 configured to engage with a clamp engaging surface of the axle block 2255'. More specifically, and as shown in the longitudinal-vertical cross-sectional view of FIG. 31D, the chassis cap 2226 includes a chassis cap clamping recess/surface 2267. A rearward-facing surface of a base 2255A' of the axle block 2255' physically and forceably engages with the chassis cap clamping recess/surface 2267, due to the compressive force imparted by a clamp member clamping surface 2265A of the clamping member 2265 (by virtue of the tightened hand screw 2270). The fastener 2270 has been sufficiently tightened to place the axle block base section 2255A' into compressive, clamping contact with: (1) the chassis cap clamping surface 2267, (2) the clamp member clamping surface 2265A, and (3) the bottom-facing surface 2269 of the chassis cap 2226, which extends longitudinally between the surfaces 2267 and 2265A. In the exemplary depiction of FIG. 31D (and also seen in FIG. 31E), the axle block base 2255' possesses a dovetail shape or cross section. A dovetail shaped base 2255' may engage with (dovetail-) complementary surfaces 2265 and 2267, such that a compressive force (F1 and F2) may be applied not just to the longitudinal front and back of the base 2255A', but also at the vertical top and bottom of the base 2255A' (via forces F1, F2, and F3), since the base 2255A' is in forceable contact with the clamping surface 2270A of the chassis and the dovetail-complementary surfaces 2265 and 2267 have vertical components for their respective compressive forces. Accordingly, the dovetail shaped base 2255A' may advantageously provide for a highly strong and reliable mechanical clamping to releasably fix the axle block 2255' to the chassis cap 2226.

Figure 31E:
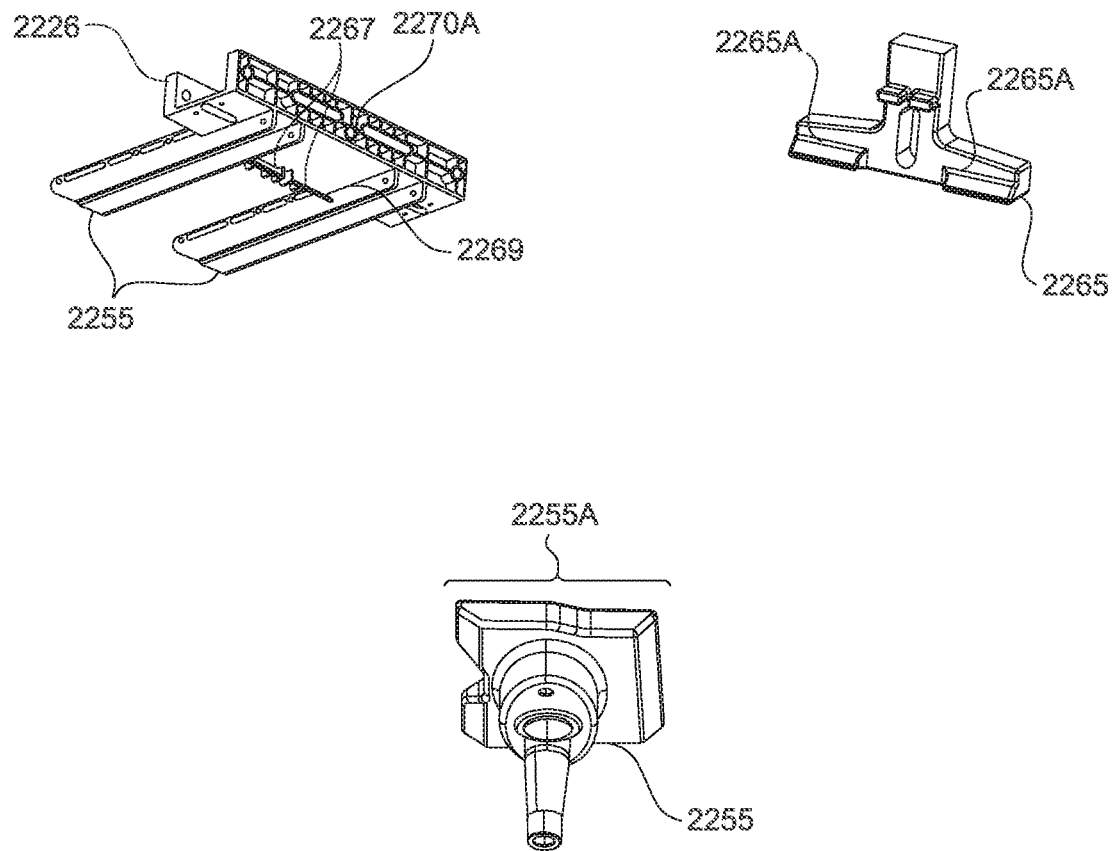

FIG. 31E depicts an exploded view illustrating various aspects of the chassis cap 2226, the axle block 2255', and the clamp member 2265. As seen on the right side of FIG. 31E, the clamp member 2265 is configured as a Y-clamp having a pair of clamping surfaces 2265 and a fastener hole 2265B through which the fastener 2270 may be inserted. As seen on the left, integrated with the chassis cap 2267 is a pair of chassis cap clamp receptacles 2267. The chassis cap 2226 further includes a fastener hole 2270A configured to couple with the fastener 2270 to selectively fix the clamp member 2265 to the chassis cap 2226.

Figure 31F:
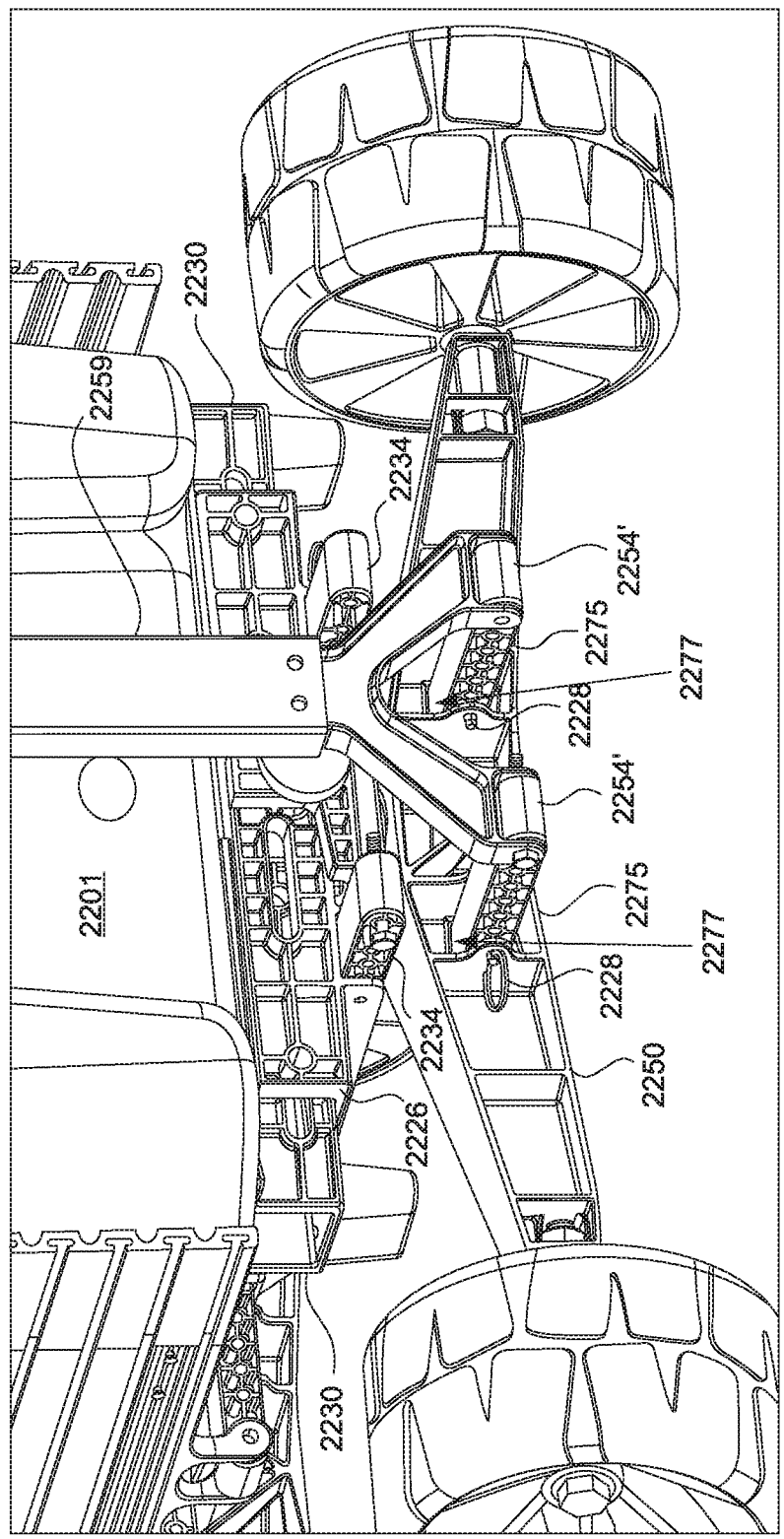

As seen in FIG. 31F, a rolling chassis includes the chassis 2210 and the axle 2250 coupled to a pair of wheels. Mechanically coupled to the axle 2210 (e.g., via extension receiving apertures 2277 of the axle 2250) are the pair of handle extension members 2275. The pair of handle extension members 2275 are (hingedly) coupled to an associated chassis handle 2259 at handle coupling points 2254'. The handle extension members 2275 are configured to selectively extend and retract relative to the axle 2250 (e.g., in and out of the axle apertures 2277) to set a longitudinal position of a handle coupling points 2254' relative to the chassis frame 2210. The longitudinal position of each extension member 2275 and associated handle couple point 2254 may be selectively fixed using associated locking pins 2228 (e.g., similar to locking pins used with various extension members discussed above). The handle extension members 2275 may therefore advantageously allow for selective configuration of a longitudinal position of the handle 2259 to operably fit coolers or other containers of various sizes (e.g., small, medium, and large sized containers).

Above the pair of handle extension members 2275 are a pair of attachment surface extension members 2234 configured to couple with a sliding rain/channel and/or male/female accessory attachment panel or board, for example. The clamp member 2265 is further shown tightened to the chassis cap 2226 (via thumbscrew 2270), to fixedly and securely couple the axle 2250 to the chassis 2210.

Figure 31G:
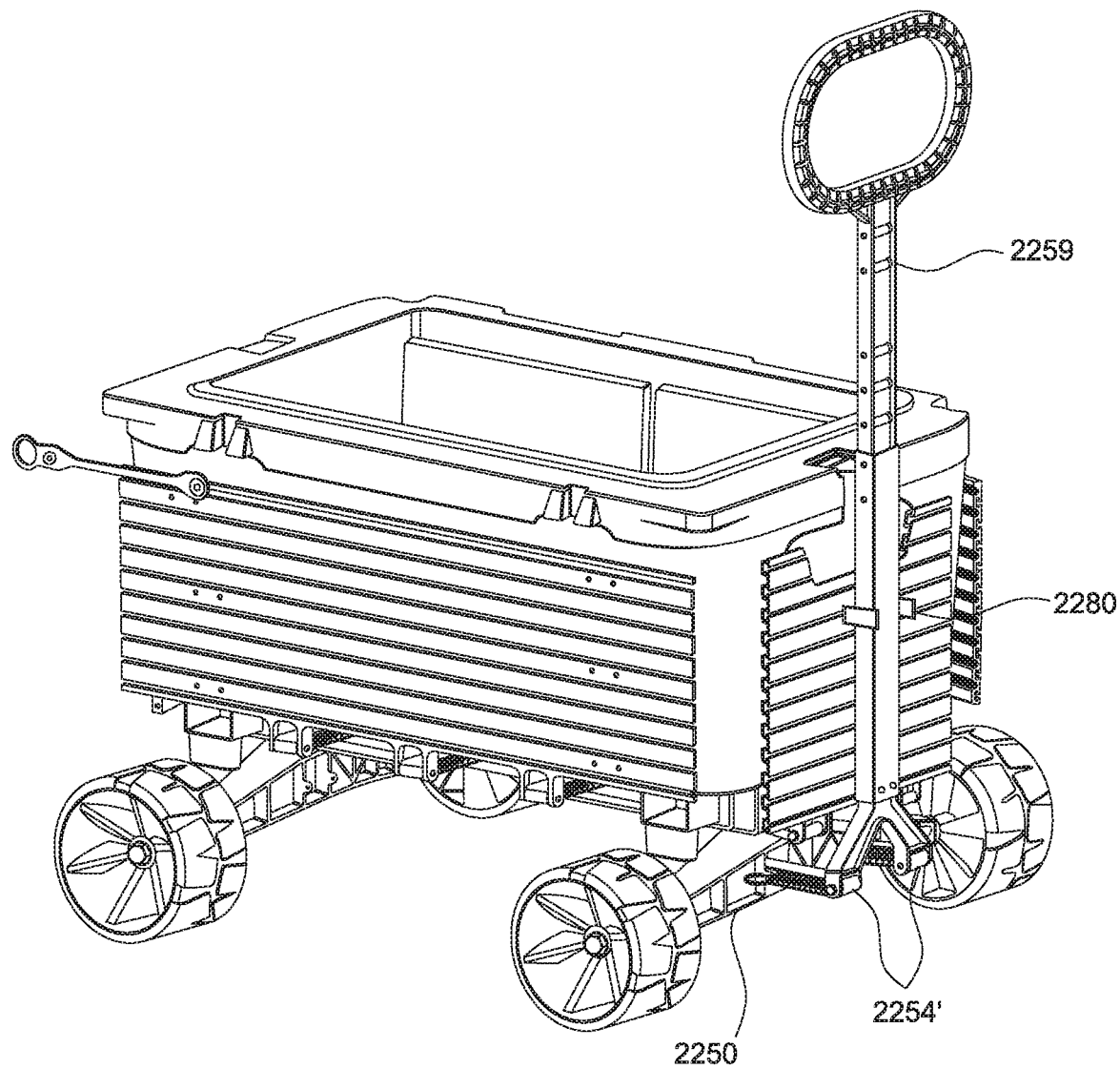

FIG. 31G depicts an exemplary chassis 2210 coupled to a cooler. The chassis 2210 is coupled to an axle 2250 has a pair of (longitudinally adjustable) handle coupling points 2254'. The handle 2259 is shown in an upright position and retained to the accessory attachment surface 2205B by virtue of a modular handle clamp accessory 2280. The accessory 2280 may include an attachment member (e.g., similar to the discussion of accessories shown in FIGS. 17A and 17B) configured to releasably attach the accessory 2280 to the accessory attachment surface 2205B (e.g., either sliding rails/channels or male/female twist-to-lock connectors). The handle 2259 being retained in the upright position by the modular handle clamp accessory 2280 may beneficially keep the handle 2259 upright and orderly (e.g., instead of laying cluttered on the ground).

Figure 32A:
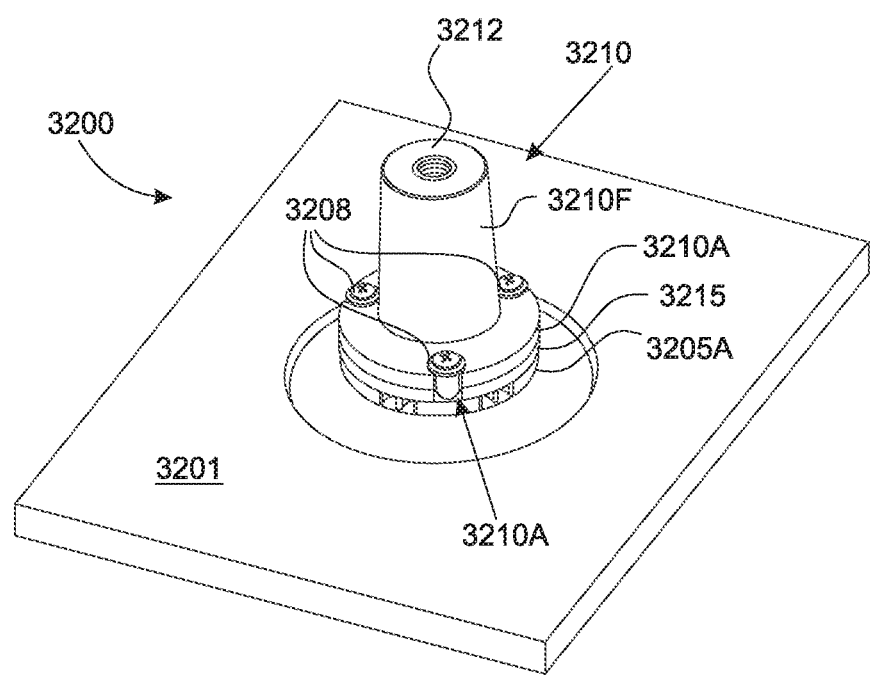
Figure 32B:
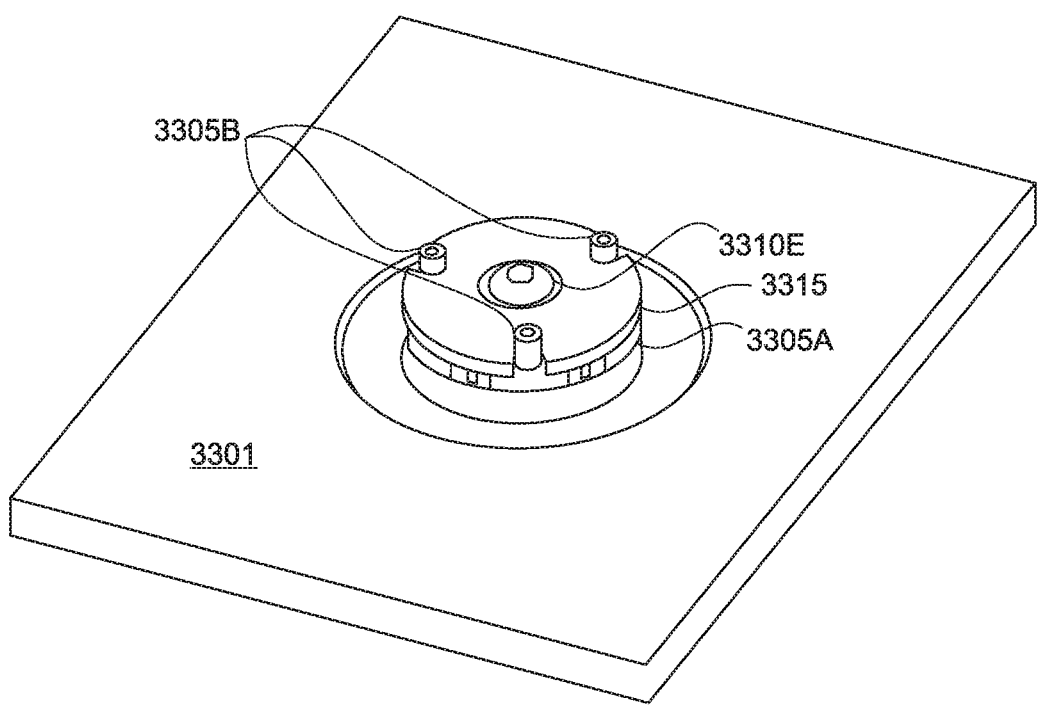
Figure 32C:
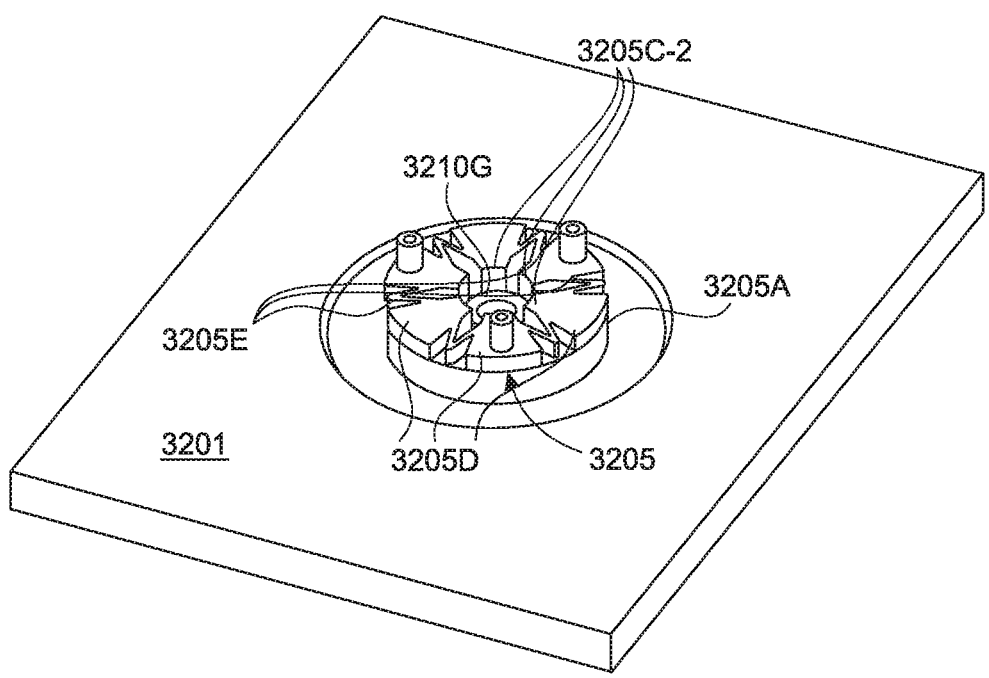
Figure 32D:
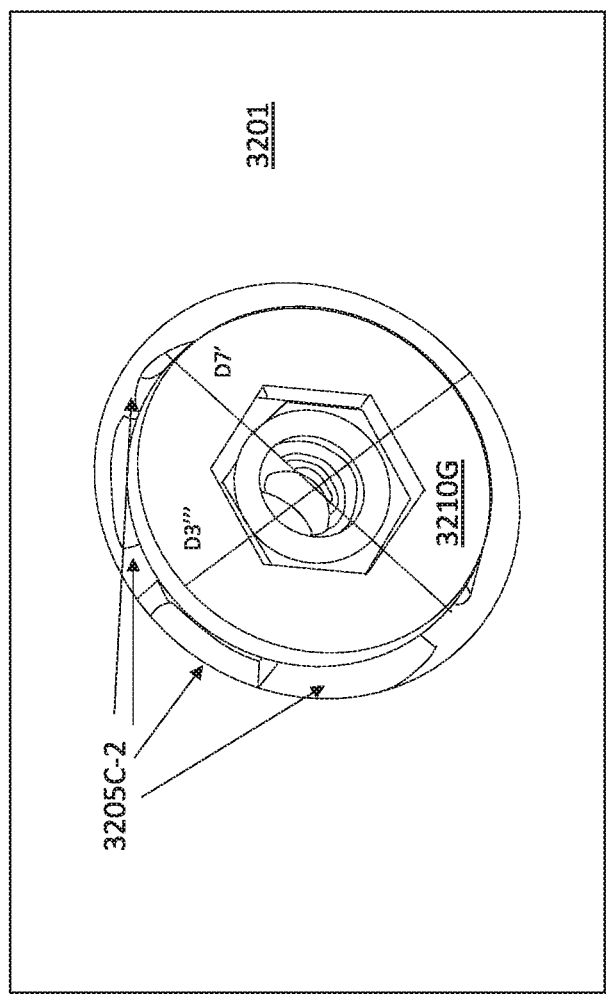

FIGS. 32A-32E depict various view of an exemplary fourth embodiment of a coupler assembly for mechanically securing a cooler to a cooler undercarriage system. FIG. 32A depicts a coupler 3200 operably coupled to a cooler 3201, from a bottom perspective view of the cooler 3201, while FIGS. 32B and 32C depict the same view of FIG. 32A, but with parts progressively removed to detail internal features of the coupler 3200. FIG. 32D depicts the proximal parts of the coupler 3200 (in a securely locked state), from an interior perspective view of the cooler 3201. FIG. 3E depicts a cross-sectional view of the coupler 3200 operably coupled to the cooler 3201.

Various structures, components, and functions of an exemplary third embodiment of a coupler assembly 3200 may be similar to the structures, components, and functions of the exemplary first, second, and third embodiments of the coupler assemblies 2800, 2900, and 3000. For example, the coupler assembly 3200 includes a proximal coupler 3205 and a distal coupler 3210, each having their respective flanges 3205A, 3205B to mechanically fix to one another. The proximal coupler 3205 includes (three) bosses 3205B configured to be received in (three) recesses/apertures 3210B of the (second) flange 3210A, respectively (along with associated fastening screws/bolts 3208). Fixed at a distal end of the distal-facing end 3210F is a fastening insert 3212 that occupies an internal aperture of the distal-facing end 3210F.

As shown in FIGS. 32D and 32E, the proximal end of the coupler assembly 3200 includes an adjustable biasing member 3210G. In operation, the adjustable biasing member 3210G may be configured to selectively set a level of outward radial bias of the tabs 3205C to fit the coupling assembly 3200 to a wide variety of cooler makes and models. More specifically, the adjustable biasing member 3210G includes (first) internal threads 3210G-1. The internal threads 3210G-1 is configured to threadingly couple with an adjustable screw 3210E. Furthermore, an annular threaded member 3215 having (second) internal threads 3215E is also be configured to threadingly couple with the adjustable screw 3210E. When so coupled, a level of tightening of the adjustable screw 3210E may determine a longitudinal spatial position of the adjustable biasing member 3210G.

The adjustable biasing member 3210G may be have an outward radially symmetric surface that includes a taper or slope 3210G-2, such that a variable diameter D7' of the adjustable biasing member 3210G may decrease (or increase) in the size, depending on the longitudinal position of the adjustable biasing member 3210G relative to the rest of the assembly 3200. By selectively tightening the adjustable screw 3210E to adjust the longitudinal position of the adjustable biasing member 3210, an outer sloped surface 3210G-2 is configured to forcibly engage with an inner surface of an associated tab 3205 to selectively bias the tab radially outward. Such selective biasing of the tabs 3205 may advantageously allow the coupler assembly 3200 to safely and securely couple to a wide variety of coolers (e.g., such as cooler 3201, having holes 3201A of diameter D1''', which may be a different sized diameter from diameters D1, D1', or D'' discussed above). The extent to which the tabs 3205 are biased may be determined a level of tightening of the adjustable screw 3210E in the threads 3210G-1 and 3215A. Once a user has set the desired level of biasing (to fit the cooler 3200 at hand), the user may assemble to distal coupler 3210 to the proximal coupler 3205 by fastening down the bosses 3205B (e.g., using screws 3208 inserted into aperture 3210B). In this sense, the coupler assembly 3200 is adapted to selectively adjust in configuration (e.g., diameters D2''' and D3''' associated with the tabs 3205C) to advantageously fit coolers having attachment holes of varying sizes.

As explained above, the proximal coupler 3205 acts as an anchor component (e.g., similar to proximal couplers 2805, 2905, and 3005) to forceably fix and lock the coupler assembly 3205 into a hole of a cooler. The proximal coupler 3205 may differ from the proximal couplers 2805, 2905, and 3005 in that the proximal coupler 3205 may include multiple expansion joints 3205E angularly or tangentially spaced about the (radially symmetric) flange 3205A of the proximal coupler 3205. Each expansion joint 3205E may function as a compressible spring element configured to decrease a perimeter or circumference profile of the flange 3205A. The expansion joints 3205E each have a V-shaped horizontal plane cross section, as can be seen in FIG. 32C. Each of the expansion joints 3205E are joined on either side (e.g., integrally formed) with a partial flange section 3205D. Extending longitudinally away from each partial flange section 3205D (into the hole of the cooler 3201) is an associated deflectable tab 3205C-2. Rather than just bending the tabs 3205C-2 outward toward the edges of the hole, the coupler assembly 3200 utilizes the adjustable biasing member 3210G (e.g., a threaded wedge) in cooperation with the expansion joints 3205E to also expand the anchor 3205A itself into the hole of the cooler 3201. Put another way, as the wedge 3205G forces the tabs 3205C-2 outward and inward into the hole (as seen in FIGS. 32D and 32E), the expansion joints 3205E may compress to decrease the circumference of the flange 3205A to forceably pull an inner radial portion of each partial flange section 3205D (e.g., the portions labeled near 3205C-2 in FIG. 32C) into the hole of the cooler 3201. The wedge 3210G may be configured to securely tighten to the adjustable screw 3210E and the remainder of the coupler assembly 3200 with the aid of a nut 3210G-3 configured to threadably engage with the screw 3210E. The annular threaded member 3215 is shown sandwiched between the distal coupler (foot) 3210 and proximal coupler (anchor) 3205, and prevents the anchor 3205 from "crinkling" as the screw 3210G is turned and the wedge 3210G is pulled closer to the anchor 3205 (thus forcing the anchor 3205 to expand into the hole). Furthermore, the foot 3210 is fastened to the anchor 3205 (via screws 3210B and bosses 3205B) to mechanically and compressingly hold the coupler assembly 3200 together.

Although various embodiments have been described with reference to the Figures, other embodiments are possible. For example, various embodiments of a modular accessory attachment system may be advantageously configured to couple to a wide variety of cooler makes/models/sizes, including coolers sold, manufactured, or distributed by the following brand names: Cabela's®, Engel®, Igloo®, Kodi®, Magellan®, Orca®, RTIC®, West Marine®, and/or Yeti®. In some examples, various modular accessory attachment boards, panels, or surfaces disclosed herein may be utilized with or fitted on containers other than "rotomolded" coolers (e.g., such as vinyl coolers or bait buckets). In some implementations, various modular accessory attachment boards, panels, or surfaces disclosed herein may be configured to mechanically couple to a vehicle, such as a golf cart of all terrain vehicle (ATV). For example, the modular accessory attachment boards panels shown in FIG. 22H may instead be mounted or mechanically attached to a front/back/side of a golf cart (e.g., using fasteners to couple the attachment features of the boards 105A-105D to a frame of the golf cart). In various examples, various modular accessory attachment boards, panels, or surfaces disclosed herein may be configured with adhesive to adhere the board/panel to another surface (e.g., a surface of a vehicle).

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:
1. A modular accessory attachment system comprising:
a chassis frame;
at least one chassis-container coupler configured to mechanically and securely couple the chassis frame to a first container; and,
a modular accessory attachment surface mechanically coupled to the chassis frame;
wherein the at least one chassis-container coupler comprises at least one coupler assembly, each coupler assembly comprising:
a proximal anchor coupler comprising a proximal anchor coupler flange and a plurality of tabs extending orthogonally away from the proximal anchor coupler flange;
a distal foot coupler having a distal foot coupler flange configured to mechanically fix to the proximal anchor coupler flange; and,
a biasing member configured to physically engage with each of the plurality of tabs to radially bias each of the plurality of tabs to mechanically and securely couple the proximal anchor coupler to a hole of the first container.

2. The modular accessory attachment system of claim 1, further comprising an axle and associated pair of wheels, the axle being configured to releasably couple to the chassis frame to convert the modular accessory attachment system to a wheel and modular accessory attachment system.

3. The modular accessory attachment system of claim 2, wherein the chassis further comprises a handle extension member coupled to the axle and configured to selectively extend and retract relative to the axle to set a longitudinal spatial position of a handle coupling point relative to the chassis frame.

4. The modular accessory attachment system of claim 3, wherein the chassis frame comprises a releasable clamp configured to clampingly engage with an axle block of the axle to releasably couple the axle to the chassis frame.

5. The modular accessory attachment system of claim 4, further comprising a clamping member and a thumbscrew, the thumbscrew configured to selectively adjust a spatial position of the clamping member relative to the chassis, wherein:
the axle block comprises a dovetail shaped axle block,
the chassis comprises a first dovetail clamping surface, and,
the clamping member comprises a second dovetail clamping surface, such that the dovetail shaped axle block is configured to be releasably coupled to the chassis frame by compressive physical engagement between the dovetail shaped axle block and the first and second dovetail clamping surfaces.

6. The modular accessory attachment system of claim 1, wherein the chassis further comprises a longitudinal extension member longitudinally translatable relative to a backbone of the chassis and configured to selectively adjust a longitudinal dimension of the chassis to fit the chassis for a second container having a second container lateral dimension that is different than a first container lateral dimension of the first container.

7. The modular accessory attachment system of claim 6, wherein the longitudinal extension member comprises a chassis cap, and wherein the chassis-container coupler is fastenable to the chassis cap, such that when so fastened, the chassis-container coupler is configured to mechanically and securely couple the chassis cap to the first container.

8. The modular accessory attachment system of claim 6, wherein the chassis further comprises a longitudinal attachment surface extension member mechanically coupled to the modular accessory attachment surface and longitudinally translatable relative to the longitudinal extension member of the chassis, such that the longitudinal attachment surface extension member is configured to selectively adjust a longitudinal spatial position of the modular accessory attachment surface to fit the chassis for the second container.

9. The modular accessory attachment system of claim 1, wherein the chassis further comprises a lateral extension member laterally translatable relative to a backbone of the chassis and configured to selectively adjust a lateral dimension of the chassis to fit the chassis for a second container having a second container lateral dimension that is different than a first container lateral dimension of the first container.

10. The modular accessory attachment system of claim 9, wherein a lateral spatial position of the lateral extension member relative to a backbone of the chassis is selectively fixable via a locking pin configured to lockingly engage the chassis cap to the backbone.

11. The modular accessory attachment system of claim 9, wherein the chassis further comprises a lateral attachment surface extension member mechanically coupled to the modular accessory attachment surface and laterally translatable relative to the backbone of the chassis, such that the lateral attachment surface extension member is configured to selectively adjust a lateral spatial position of the modular accessory attachment surface to fit the chassis for the second container.

12. The modular accessory attachment system of claim 1, wherein a female key profile of the keyed female apertures comprises a pair of opposing tab recesses complementary to a pair of opposing tabs of a male key profile of the keyed male member, such that the keyed female aperture is configured to release and receive the keyed male member in a first orientation, and lockingly engage with the keyed male member is a second orientation rotated by 90 degrees relative to the first orientation.

13. The modular accessory attachment system of claim 1, wherein the chassis-container coupler comprises a nut and a knob, the nut being fastenable to the first container and configured to mechanically engage with the nut, such that the nut and knob are configured to cooperate to mechanically and securely couple the chassis to the first container.

14. The modular accessory attachment system of claim 1, further comprising at least one accessory having an associated accessory attachment member configured to releasably couple the at least one accessory to least one of: (1) the plurality of keyed female apertures, or (2) the plurality of rails.

\* \* \* \* \*